United States Patent [19]

Weiner et al.

[11] Patent Number: 4,625,288

[45] Date of Patent: Nov. 25, 1986

[54] METHOD AND APPARATUS FOR CREATING A STRUCTURED IMAGE DATA SET BASED ON ACQUIRED IMAGE DATA

[75] Inventors: Herbert S. Weiner, Milwaukie; William L. Mills, Beaverton, both of Oreg.; Charles E. Perkins, Peekskill, N.Y.; Chi-Leung Lau, Aloha, Oreg.; Jeffrey P. Mayhew, Portland, Oreg.; Samuel Y. Gordon, Tualatin, Oreg.

[73] Assignee: Tektronix, Inc., Beaverton, Oreg.

[21] Appl. No.: 656,611

[22] Filed: Oct. 1, 1984

[51] Int. Cl.[4] ............................................ G06F 15/26

[52] U.S. Cl. ........................................ 364/521; 382/56

[58] Field of Search .................. 364/518, 521; 382/56; 340/739

[56] References Cited

U.S. PATENT DOCUMENTS

| | | | |
|---|---|---|---|
| 4,458,330 | 7/1984 | Imsand et al. | 364/521 X |
| 4,510,568 | 4/1985 | Kishi et al. | 364/521 X |
| 4,524,421 | 6/1985 | Searby et al. | 364/521 |

*Primary Examiner*—Michael L. Gellner
*Attorney, Agent, or Firm*—Daniel J. Bedell; Francis I. Gray; Robert S. Hulse

[57] ABSTRACT

A method of structuring vectorized data obtained by scanning a drawing or other document comprising the steps of displaying on a computer controlled display screen a template image comprising template lines and nodes corresponding to the acquired image data and selecting portions of the acquired image data to be designated for inclusion in a restructured image data set by using a screen cursor to select the corresponding template lines displayed on the screen. Inclusion designations are subsequently and selectively removed as desired from portions of the acquired image data from the structured data set by using the cursor to select the corresponding lines and nodes on the screen. When the desired portions of the acquired data set are selectively designated for inclusion in the restructured data set, all remaining designated data is copied into the restructured image data.

12 Claims, 34 Drawing Figures

METHOD AND APPARATUS FOR CREATING A STRUCTURED IMAGE DATA SET BASED ON ACQUIRED IMAGE DATA

BACKGROUND OF THE INVENTION

The present invention relates in general to computer-aided drawing systems and in particular to a method and apparatus for structuring data acquired by vectorizing a drawing so that such data may be accessed and manipulated by a computer-aided drawing or design system.

Computer-aided drawing or design (CAD) systems permit users to create and modify drawings formed on a CRT screen, and to store and retrieve data which may be used to recreate the drawing either on the CRT or on paper using a hard copy graphics output device such as a plotter or a printer. In the prior art, attempts have been made to improve the usefulness of CAD systems by providing digitizing means to convert a drawing on paper to a set of representative data compatible with the data used by a CAD system, permitting the CAD system to use the data to store, modify and reprint the original or modified drawing.

One such digitizing means is the automatic picture coding system described in prior U.S. application Ser. No. 624,434, filed June 24, 1984, by Benjamin E. McCann and Michael L. Rieger for "Method of Pixel to Vector Conversion in an Automatic Picture Coding System", wherein a bit-map image or the drawing is created by a scanning means such as a facsimile drum scanner, and then encoded into a set of representative line segments which are converted into vectorial representations compatible with the data used by many CAD systems.

While this raw vectorial data representing the drawing may be in a CAD system compatible form, the image recreated by the CAD system using it will generally not be structured in a way that can be easily manipulated by the CAD system. For instance, the drawing image may contain irrelevant marks or stains appearing on the original drawing along with erroneous inclusions or omissions resulting from inaccuracies in the digitizing process. Operators can sometimes use CAD systems to restructure the raw vectorial data correcting these problems but CAD systems are typically designed to operate on images created by the systems themselves and use of the CAD system itself to restructure the data can be time consuming and sometimes ineffectual.

Therefore what is needed is a method and apparatus for receiving raw vectorial data produced by a digitizing means and allowing an operator to quickly and easily restructure the data in a structural form compatible with a CAD system.

SUMMARY OF THE INVENTION

In accordance with one aspect of the invention, a vectorial data representation of a picture produced by a digitizing means is stored in a computer memory and used by the computer to display an image of the picture on a cathode ray tube (CRT) screen. The image is formed by a set of nodes and line connections therebetween, the arrangement of the nodes and connections being defined by the vector data. An operator uses the image as a "template" to restructure the stored vectorial data for subsequent use by a computer-aided design and drafting (CAD) system.

An operator controls the movement of a cursor on the screen by operating a graphic input device such as a tablet and stylus. If the data representing a line displayed on the screen is to be included in the restructured vectorial data set, a user may temporarily tag the data as being so included by using the stylus to select a "pencil" mode from a menu displayed on the screen and then approximately tracing or identifying the line on the template with the cursor in much the same way that a draftsperson would use a pencil and template to trace a pencil drawing. The line on the template is identified as being penciled in by a change in color. The totality of lines so traced in pencil mode becomes a "penciled structure" representing all such data temporarily tagged for inclusion in the restructured vectorial data set.

In another aspect of the invention, a user may delete penciled lines from the penciled structure by selecting an "erase" mode and then tracing or identifying the pencil line with the cursor acting like an eraser. The corresponding vector data is untagged and the template line image on the screen returns to original color.

In a further aspect of the invention, a user may permanently tag the data corresponding to a pencil structure he has thus created by using the stylus to select an "Ink Penciled Structure" command appearing on the menu in much the same way that a drafts man might ink in a penciled drawing when he is satisfied that the pencil drawing is correct. Permanently tagged data is sent to an output data file, becomes a permanent part of the restructured data set and cannot be erased. "Inked" lines are represented on screen by a further change in color of the template line.

According to still another aspect of the present invention, the user may select lines for penciling or erasing by locating the cursor in the vicinity of the lines, the selected template lines being automatically traced. The maximum distance between cursor and line for a line selection to occur is adjustable. Thus the operator does not have to laboriously trace over each line.

In a further aspect of the present invention, template lines may be temporarily removed from view ("masked") by selecting the lines with a cursor and the masked template lines may be restored to view by selecting an "unmask" command from the menu.

In view of the foregoing, it is an object of the present invention to provide an improved method of structuring data produced by a drawing vectorizing means for use by a CAD system.

It is another object of the present invention to minimize the amount of manual labor required to restructure data produced by a drawing digitizer, thereby reducing opportunity for human error.

It is a further object of the present invention to provide means to temporarily and permanently restructure digitized drawing data, such means being operated in a similar fashion as a draftsperson may use a template to create pencil and ink drawings, so that operation seems familiar to a skilled draftsperson thereby reducing operator training requirements.

The subject matter of the present invention is particularly pointed out and distinctly claimed in the concluding portion of this specification. However, both the organization and method of operation, together with further advantages and objects thereof, may best be understood by reference to the following description taken in conjunction with the accompanying drawings wherein like reference characters refer to like elements.

DESCRIPTION OF THE DRAWINGS

FIG. 11 is a flow chart of the InitializeVariables subroutine of FIGS. 3-10, FIG. 12 is a flow chart of the ParseFileNames subroutine of FIGS. 3-10, FIG. 13 is a flow chart of the ProcessHeaderFile subroutine of FIGS. 3-10, FIGS. 14-15 are a flow chart of the InitializeGraphics subroutine of FIGS. 3-10, FIG. 16 is a flow chart of the BuildMenu subroutine of FIGS. 3-10, FIG. 17 is a flow chart of the IssueStatusMessage subroutine of FIGS. 3-10, FIG. 18 is a flow chart of the InitializeBankSwitchedMemory subroutine of FIGS. 3-10, FIG. 19 is a flow chart of the InitializeCursorDrawing subroutine of FIGS. 3-10, FIG. 20 is a flow chart of the InitializeNibbleCursor subroutine of FIGS. 3-10, FIG. 21 is a flow chart of the InitializeDrawing subroutine of FIGS. 3-10, FIGS. 22-25 are a flow chart of the ReadDrawing subroutine of FIGS. 3-10, FIGS. 26-27 are a flow chart of the GetGin subroutine of FIGS. 3-10, FIG. 28 is a flow chart of the CrossHairOff subroutine of FIGS. 3-10, FIG. 29 is a flow chart of the TabletDemultiplexer subroutine of FIGS. 3-10, FIG. 30 is a flow chart of the OpenTablet subroutine FIGS. 3-10, FIGS. 31-32 are a flow chart of the Exit subroutine of FIGS. 3-10.

DETAILED DESCRIPTION

Figure 1:
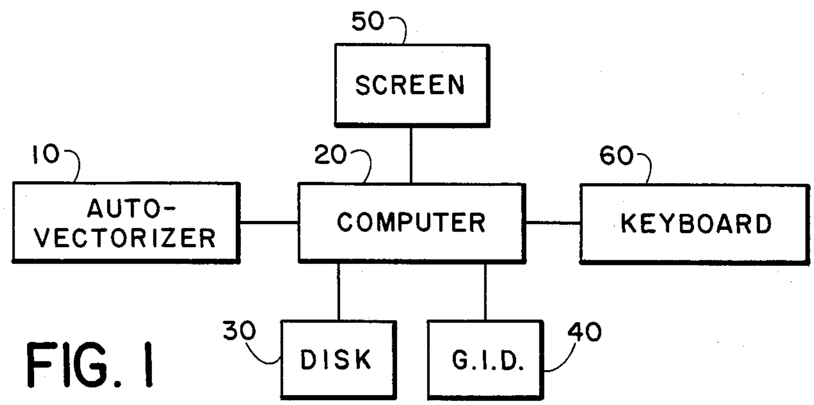
FIG. 1 is a block diagram of a system suitable for use with the present invention.

FIG. 1 is a block diagram of a system in which the present invention may be used. Autovectorizer 10 is a device, controlled by computer 20, which scans a drawing and transmits to computer 20 a set of data comprising vector formatted representations of the drawing. Computer 20 stores the data under a suitable file name on a floppy disk in disk drive 30. In the preferred embodiment autovectorizer 10 is a Tektronix model 4991 Autovectorizer and computer 20 is a Tektronix model 4115B Color Graphics Terminal with CP/M disk operating system and including a three-port interface for connecting to a graphics input device 40, floppy disk drive 30, keyboard 60, dual 10-megabyte disks (not shown) and 2 megabytes of random access memory. Also employed to practice the invention in the preferred embodiment area Textronix model 4957 graphics tablet (graphics interface device 40) with one button stylus, a Tektronics model 4100P01 Assembler program, a Pascal language compiler, and a data restructuring program as listed in Appendix I to this specification and as flowcharted in FIG. 3 to 34.

Referring to FIG. 1, autovectorizer 10 is a device for scanning a drawing, obtaining a bit map representation of the drawing, and then encoding the bit map into a data set of vectorial representations compatible with the data used by many CAD systems. In the vector format, the drawing is represented by a set of nodes corresponding to points on the drawing and by a set of straight lines beginning and ending on nodes. A node may therefore represent an independent dot on the drawing, the end of a line, or a connection between two or more lines. For instance, a circle on the drawing may be represented by a large number of short, straight lines connected by nodes and arranged in a loop. This data is passed to computer 20 of another interfaced computer and stored in a file having a drawing file name on a floppy or hard disk controlled by the interfaced computer.

An operator, wishing to restructure the data contained on the disk, for instance to eliminate unwanted portions of the drawing image or to reform poorly represented portions, can insert the disk into disk drive 30 of FIG. 1, and load and run the data restructuring program listed in Appendix I passing to it the drawing file name. The program formats a portion of its memory into a "tile" structure and then reads drawing data from file into the tile structure in a spatial format.

In the spatial format, a pointer to information about each node is stored in the tile structure. The pointer indicates the location in memory containing information about the node including the x,y coordinates of the node and pointers indicating the storage address associated with every other node in the drawing to which the node may be connected along with information about the characteristics of the connection or line bounded by the two nodes. As the drawing data is read into the tile structure, an image of the drawing is displayed on screen 50.

A line may have any of four characteristics: it may be a "template" line, a "pencil" line, an "ink" line, or a "masked template" line or a combination thereof. Initially, when the drawing data is read into the tile structure, all the lines in the drawing are template lines. Once the drawing data is fully read into the tile structure and the drawing is displayed on screen 50, the operator may use a screen cursor controlled by the movement of a stylus on tablet 40 to select template lines to be "penciled" in much the same way a draftsman may use a pencil and a template to create a pencil line. Here, an operator moves the cursor to the line by moving the stylus on tablet 40 and then depressing the stylus to operate a switch to indicate that the line is selected. By keeping the stylus depressed he may select all lines the cursor crosses as he moves it along the drawing. When a line is penciled, the data in the tile structure represented by that line is accordingly flagged.

Once the operator has selected a number of template lines to be penciled he may convert the "pencil structure" thus created to an "ink structure" by using the stylus and tablet to access a menu and selecting an "ink pencil structure" command from the menu. This causes the stored data representing the inked lines to be so flagged and it also causes vector formatted data representing the ink lines to be stored in an output file.

The operator may erase a pencil line by selecting an "erase" mode from the menu and then using the cursor to select pencil lines to be erased. When a pencil line is erased, the indicating flag which is associated with the tile structure data is reset to indicate a template line only. The operator may also cause the program to erase the entire penciled structure by selecting an "erase pencil structure" command from the menu. However ink and template lines are permanent and are not erased.

An operator may mask a template line from view, however, by using the menu to select a "mask template" mode and then selecting the template lines to be masked using the cursor. This permits the operator to temporarily remove template lines for clarity, particularily in a densely lined drawing. Later the operator may unmask all masked template lines by using the menu to select an "unmask template" command. The software will then automatically unmask and display all template lines.

Usually an operator wishes to create a new vector data set which can be used to create a new drawing not having unwanted lines and nodes which may have resulted from smudges on the original drawing, errors in the vectorizing process, or he may want to create a new drawing consisting of only a portion of the original. Once the drawing is displayed on the screen, he selects a "pencil" cursor mode from the menu and then uses the cursor to select template lines to be penciled in. If he includes an unwanted line by mistake, he may select the erase mode and select pencil lines to be erased. Once the operator is satisfied that all lines in the pencil structure are to be saved, he selects the "ink pencil" structure command from the menu and all pencil lines are transformed into ink lines and the vector data representing the ink lines only is sent to an output file. If he choses, the operator may continue to create pencil and ink lines in the same manner until he as inked all lines he wants to save in the output file. Thus the operator uses the template to create a new, restructured data set which can be used by a CAD system to create a new drawing devoid of unwanted lines, smudges and the like.

The operator may save the current status of the drawing, including ink, pencil, masked and template lines by selecting a "save drawing" command on the menu. This stores the contents of the tile sturucture in a disk file in vector form. The operator may access the file later if he wishes to continue restructuring the data in it. He may also save in a disk file only the current pencil structure by selecting a "save pencil structure" command from the menu. This allows the operator to separately store separate or overlapping portions of the original drawing.

Figure 2:
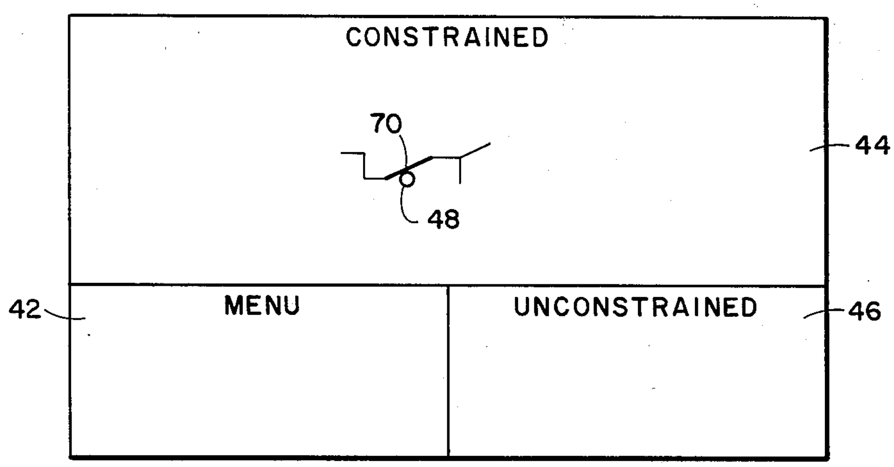
FIG. 2 is a diagram depicting the areas of the graphics input device of FIG. 1 used to select display of the menu and the drawing on the screen of FIG. 1, FIGS. 3-10 are flow charts generally illustrating computer implemented portion of the process in accordance with the present invention.

The menu is displayed on the screen only when needed. Referring to FIG. 2, tablet 40 has three areas, "constrained", "unconstrained", and "Menu". When the operator touches menu area 42 of tablet 40 with the stylus, the drawing displayed on the screen is dimmed and the menu is displayed on the screen along with a crosshair cursor centered on the menu at a point corresponding to the x,y coordinates of the stylus on the tablet. The menu consists of a number of boxes labeled with commands and cursor modes. To select a command or mode, the operator uses the stylus to move the crosshair over the selected menu item and then depresses the stylus to operate a switch therein. The menu item is highlighted to indicate the selection and any command selected is performed. If a cursor mode is selected then the cursor will remain in that mode until another mode is selected.

When the operator lifts the stylus from menu area 42, the selected menu item is dehighlighted, the menu disappears and the drawing is restored to full intensity. Wheh he places the stylus on the constained portion 44 of tables 40, the crosshair cursor appears on the screen in a location corresponding to the location of the stylus on the tablet. When he depresses the stylus in the constrained area, the crosshair cursor disappears and a small circular cursor symbol indicating the nibble cursor is active appears in the same location. When the operator places the stylus in the unconstrained graphics area 46 of the tablet, the menu disappears but the nibble cursor does not appear since the drawing is not displayed in the corresponding portion of the screen.

In the preferred embodiment, the cursor used to select lines is a "nibble" cursor meaning that an entire line or string of lines, from node-to-node will be penciled, erased or masked when any portion of that line is selected. Thus it is not necessary for the operator to move the cursor over the entire line to pencil, erase or mask it; thereby saving operator effort. Also in the preferred embodiment, the operator may select either of two cursor selection modes: single line or polyline. In the single line mode an entire line from node-to-node is selected if the cursor is pointed to any portion of it. In the polyline mode entire strings of lines interconnected by nodes are selected up to nodes having other than two connected lines.

In the preferred embodiment it is not necessary that the cursor touch the line being selected; it is only necessary that the cursor be in the vicinity of the line when the stylus switch is operated. The selection radius of the cursor may be adjusted to large or small by selection of the appropriate menu item. The nibble cursor appears on the screen as a circle of diameter sufficient to depict the selection radius and is illustrated at 48 in FIG. 2 for selecting line 70.

The tile structure used by the program listed in Appendix I is equivalent to a grid of memory locations, the grid being sized to match the size of the available memory. Each grid, or "tile" corresponds to a portion of the original drawing, and when the tile structure is loaded with drawing image data, each tile contains address pointers at x,y locations corresponding to nodes in the original drawing, a node being an isolated point or an end of a line. Where a line passes through a tile boundary, or grid line, a "pseudonode" is created and a pointer is stored to an address containing the location of all nodes in adjoining tiles connected to the pseudonode. Use of the tile structure helps to speed up search operations during the line selection process.

The operation of the data structuring program used in the preferred embodiment of the present invention is flow charted in FIGS. 3 to 34 and a description of the flow chart is included herebelow.

Before running the data structuring program the operator inserts a disk containing the vectorized drawing data from the autovectorizer into the terminal disk drive along with a file containing data defining the structure of the menu used in the data structuring program. To start the data structuring routine the operator types the file name of the data structuring program along with the file name of the file containing the vectorized drawing data and the name of the menu data file. A listing of the data structuring program, written in Pascal and assembly language, is included in Appendix I to this specification. The data structuring program is flowcharted in FIGS. 3 to 34.

Figure 3:
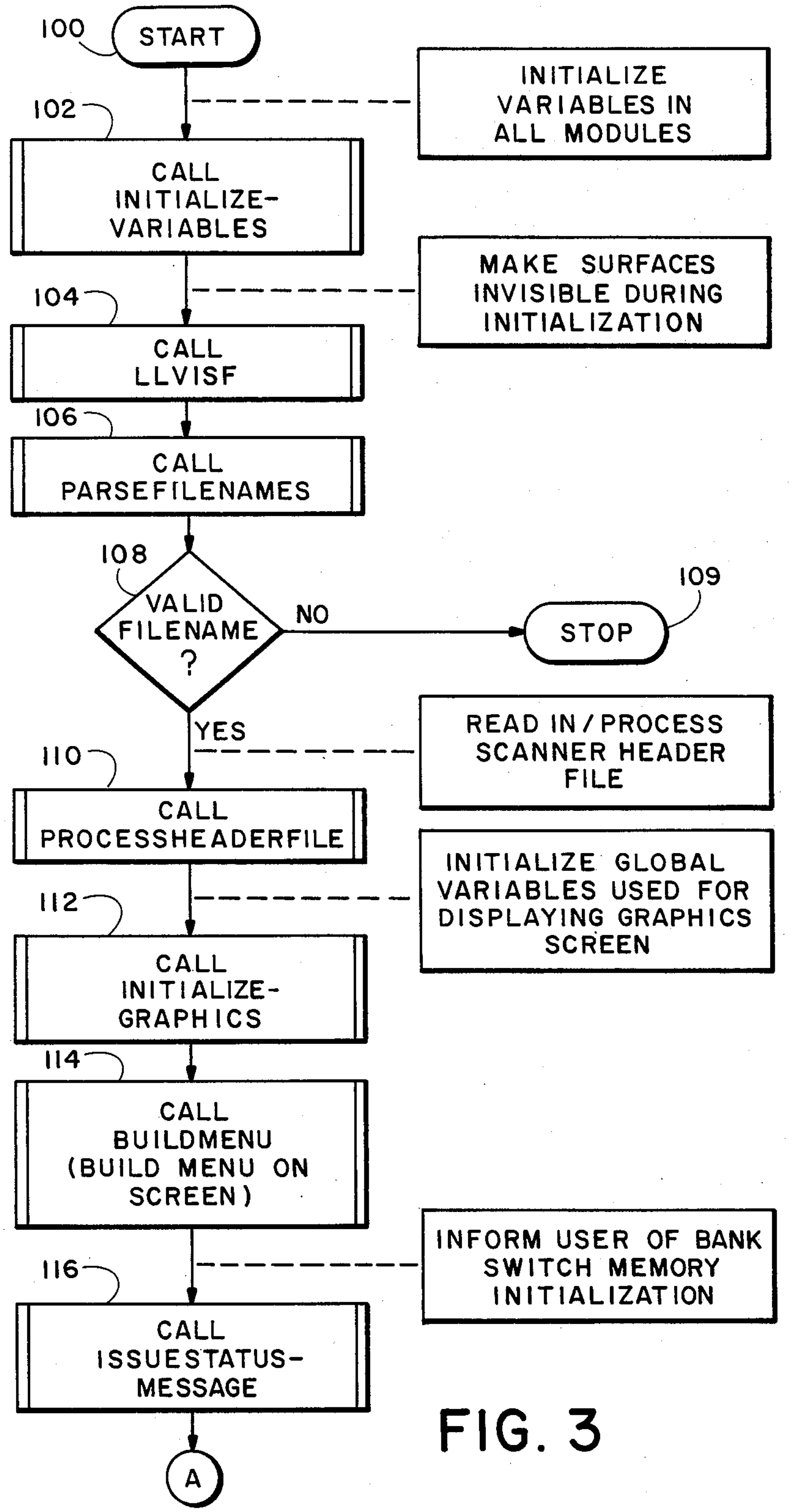
Figure 11:
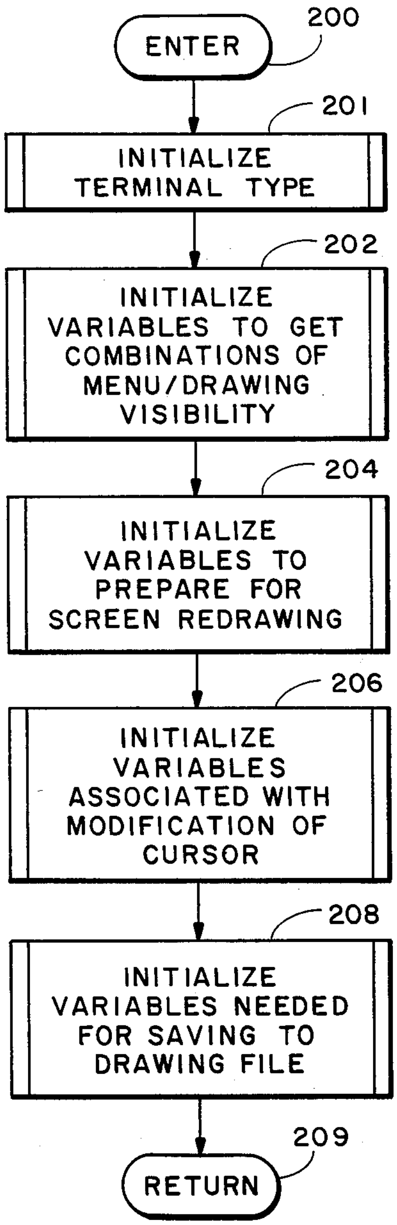
FIGS. 11-32 are flow charts generally depicting subroutines called by the computer implemented process illustrated in FIGS. 2-9.

Referring to FIG. 3 the data structuring program begins in block 100. In block 102 the InitializeVariables subroutine is called. Referring to FIG. 11 where the subroutine is flowcharted, the subroutine is entered in block 200 and program variables dependent on the terminal type are initialized in block 201. Next, in block 202, variables used to determine which combinations of surfaces are to be displayed are initialized and in block 204 variables used to draw to a surface are initialized. In block 206 variables used to change the cursor are initialized. Finally in block 208 variables used in saving the drawing to an output disk file are initialized. The subroutine ends in block 209 and program flow is returned to block 104 of FIG. 3.

Figure 12:
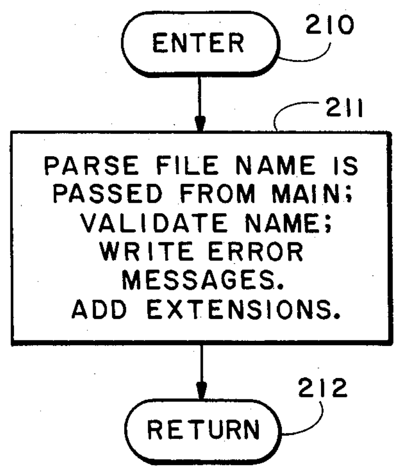

In block 104 of FIG. 3 the terminal screen is cleared by calling the LLVISF subroutine. All subroutines or functions with names beginning with "LL" are library subroutines or functions, part of the Tektronix Local Programmability option of the 4115B terminal and are described in 4100 Series Low-Level Terminal Interface Manual, Tektronix part number 070-4534-00. In block 106 subroutine ParseFileNames, flow charted in FIG. 12, is called to check to see if the data and menu file names are valid. Referring to FIG. 12, the subroutine is entered in block 210 and in block 211 the names are validated and extensions are added. If one or both of the file names is invalid, then a flag is set indicating the invalidity of the file names and an error message is written to the screen. In block 212 the subroutine ends and returns to block 108 of the main program module on FIG. 3. The file name error flag is tested in block 108. If one of the file names is invalid then the program is stopped in block 109. If both file names are correct then subroutine ProcessHeaderFile is called in block 110.

Figure 13:
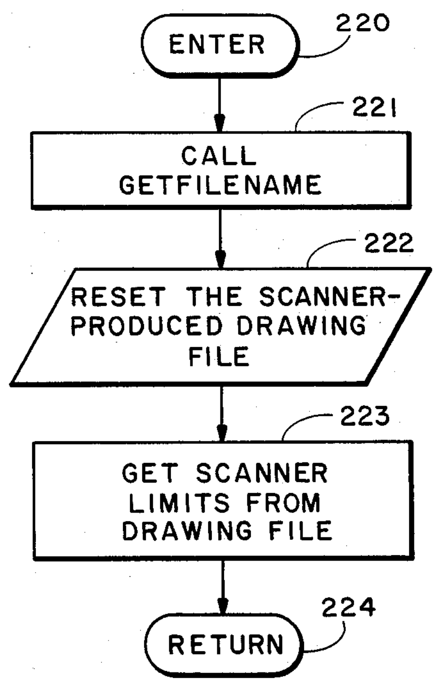

Referring to FIG. 13 flow charting the ProcessHeaderFile subroutine, the subroutine is entered in block 220 and then, in block 221, subroutine GetFileName is called to obtain the file name of the drawing data file as amended in block 211 of FIG. 12. In block 222 the data file is opened and in block 223 "header file" data, generated by the autovectorizer specifying size of the drawing scanned by the autovectorizer, is read. The subroutine ends in block 224 and program flow returns the the main program module block 112 in FIG. 3.

Figure 14:
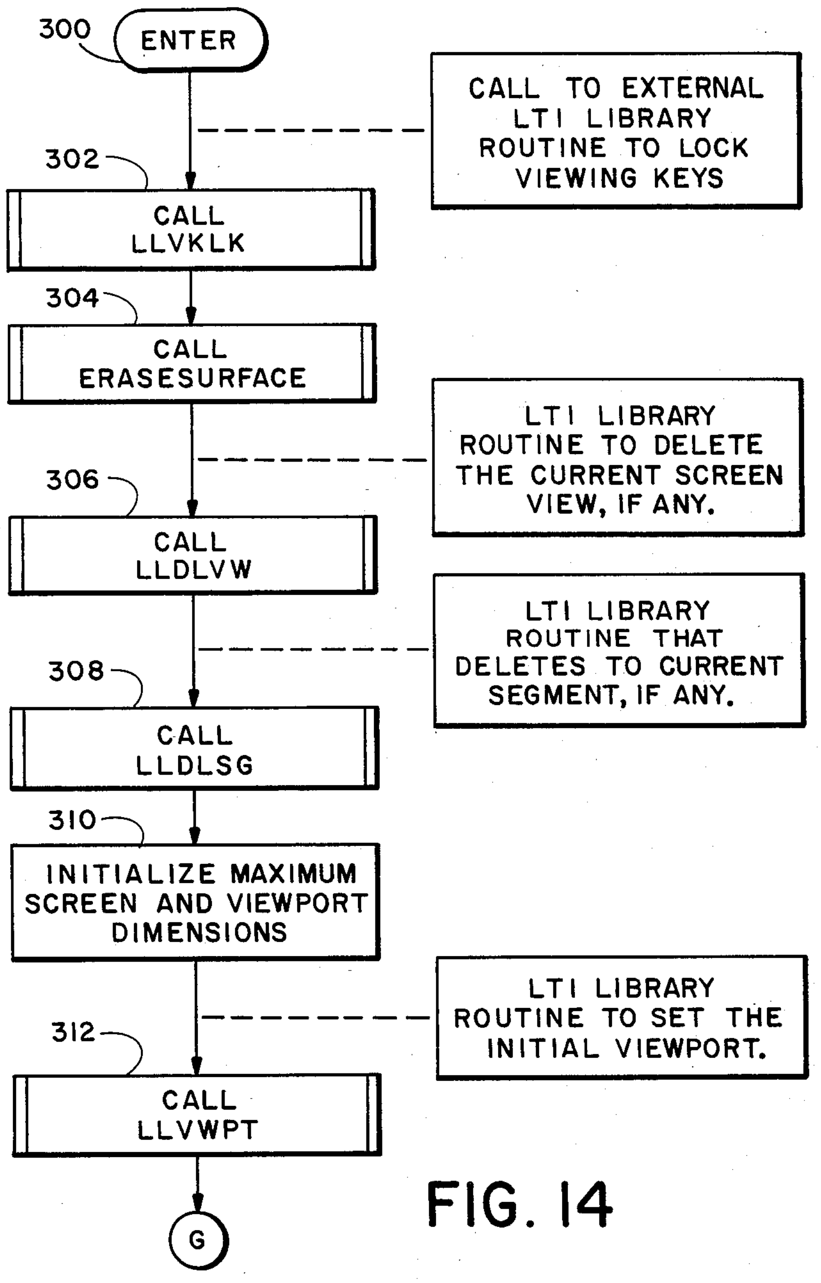

In block 112, the InitializeGraphics subroutine is called. Referring to FIG. 14, detailing the subroutine, the routine is entered at block 300 and then moves to block 302 where keys associated with the terminal which could be used to manipulate the viewing screen are locked by calling system subroutine LLVKLK to prevent the inadvertent use of these keys during execution of the data structuring program. Next, in block 304, the screen is cleared by calling the EraseSurface subroutine.

The Tektronix 4115B terminal may operate with different sizes of segmented screens. The portion of the screen actually available for displaying graphics information (the viewport) may also be specified. In the present application the screen and viewport are initialized so that the entire drawing will initially appear on the screen. Screen segmenting is not used. Therefore, in blocks 306 and 308 of FIG. 14, library subroutines LLDLVW and LLDLSG are called to delete the parameters specifying the current screen, view and segmenting. The parameters specifying the sizes of the viewport and screen are then initialized in block 310 to the maximum screen size available and the initial viewport is set to fit the drawing to the screen based on the drawing size information obtained from the header data by library subroutine LLVWPT called in block 312.

Figure 15:
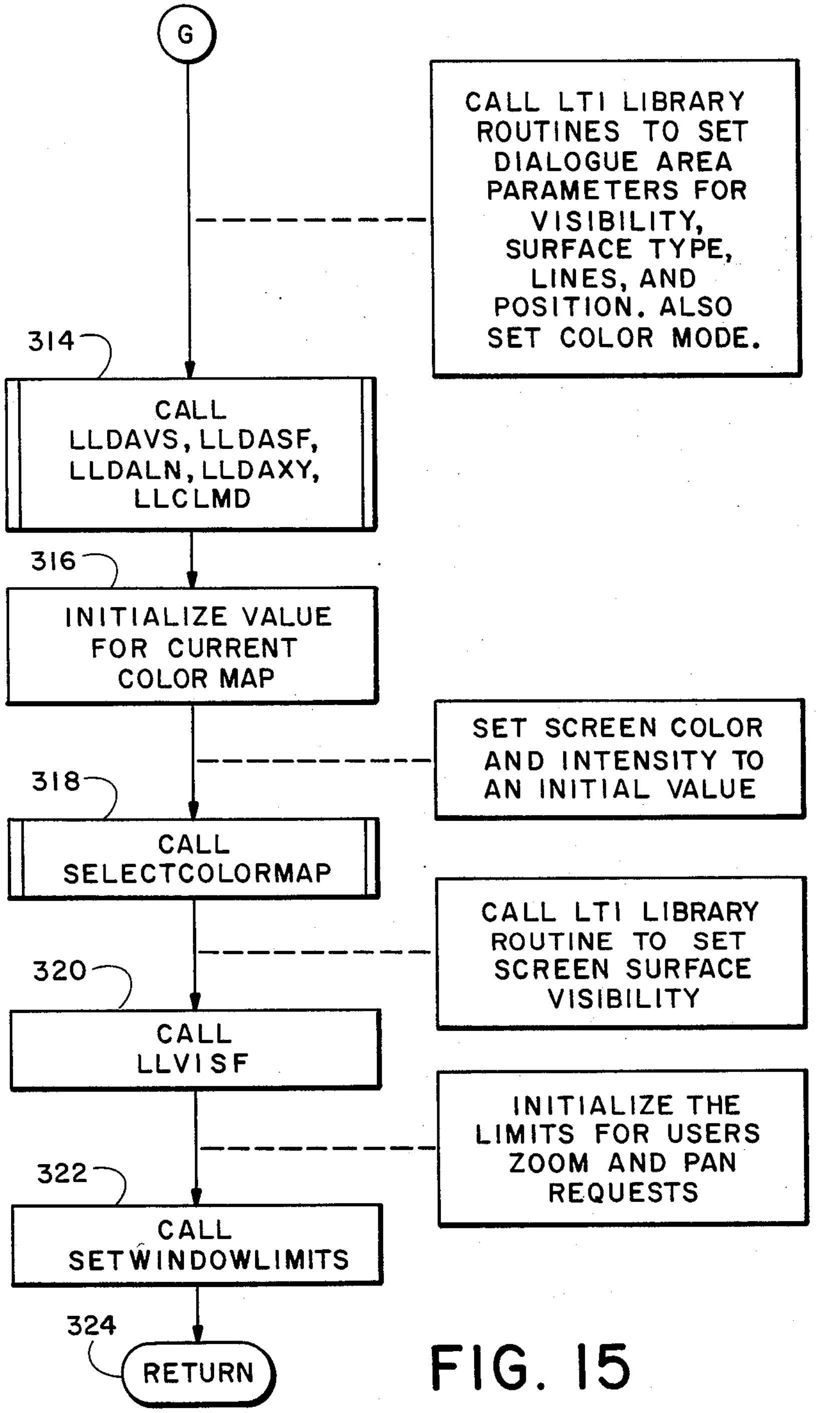

Then, following reference point G in FIG. 14 to point G in FIG. 15, library routines LLDAVS, LLDASF, LLDALN, LLDAXY and LLCLMD are called to initialize a number of parameters used to control the display attributes of the dialog surface including visibility, surface type, number of lines, and color mode. In block 316, parameters specifying the color map used with the each surface for intensity and color value are initialized. In block 318 color maps for all surfaces are set and in block 320 library routine LLVISF is called to set the initial visibility of all surfaces. Zoom and pan functions are available in the Tektronix graphics terminal and in block 322 the zoom and pan limits are set. However zoom and pan capability is not included in the preferred embodiment of the data structuring program disclosed herein but may be added thereto by one skilled in the art. Block 324 ends the InitializeGraphics subroutine and the data structuring program returns to the main module, block 114 of FIG. 3.

Figure 16:
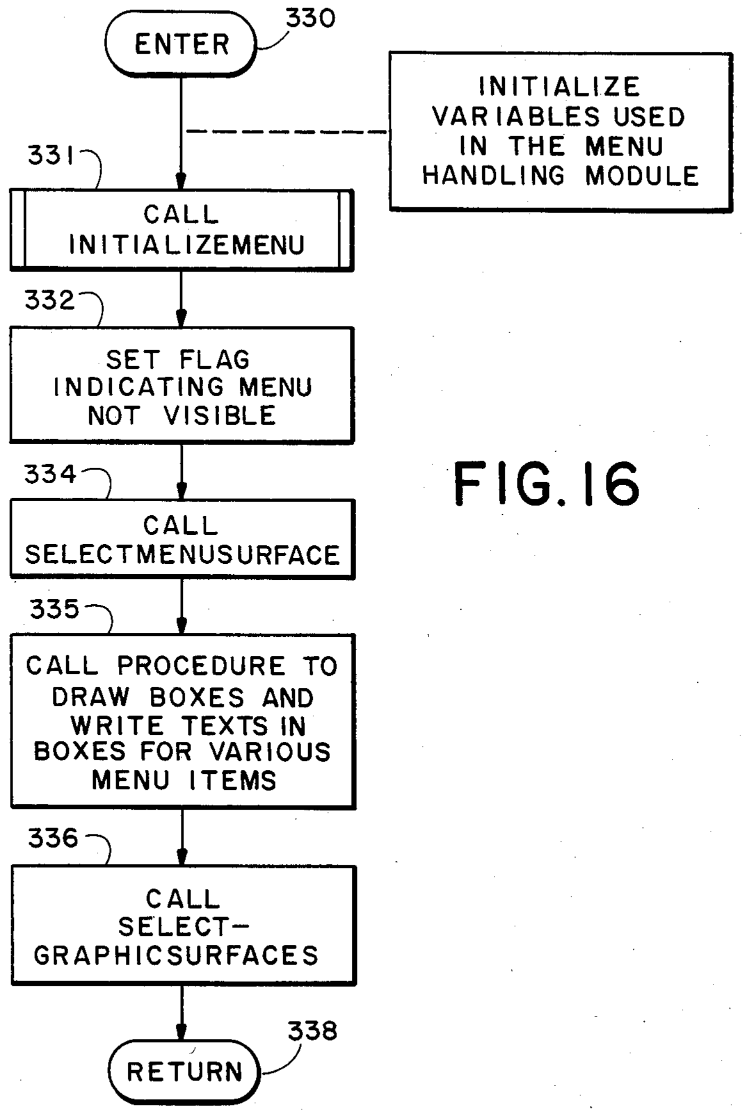
Figure 17:
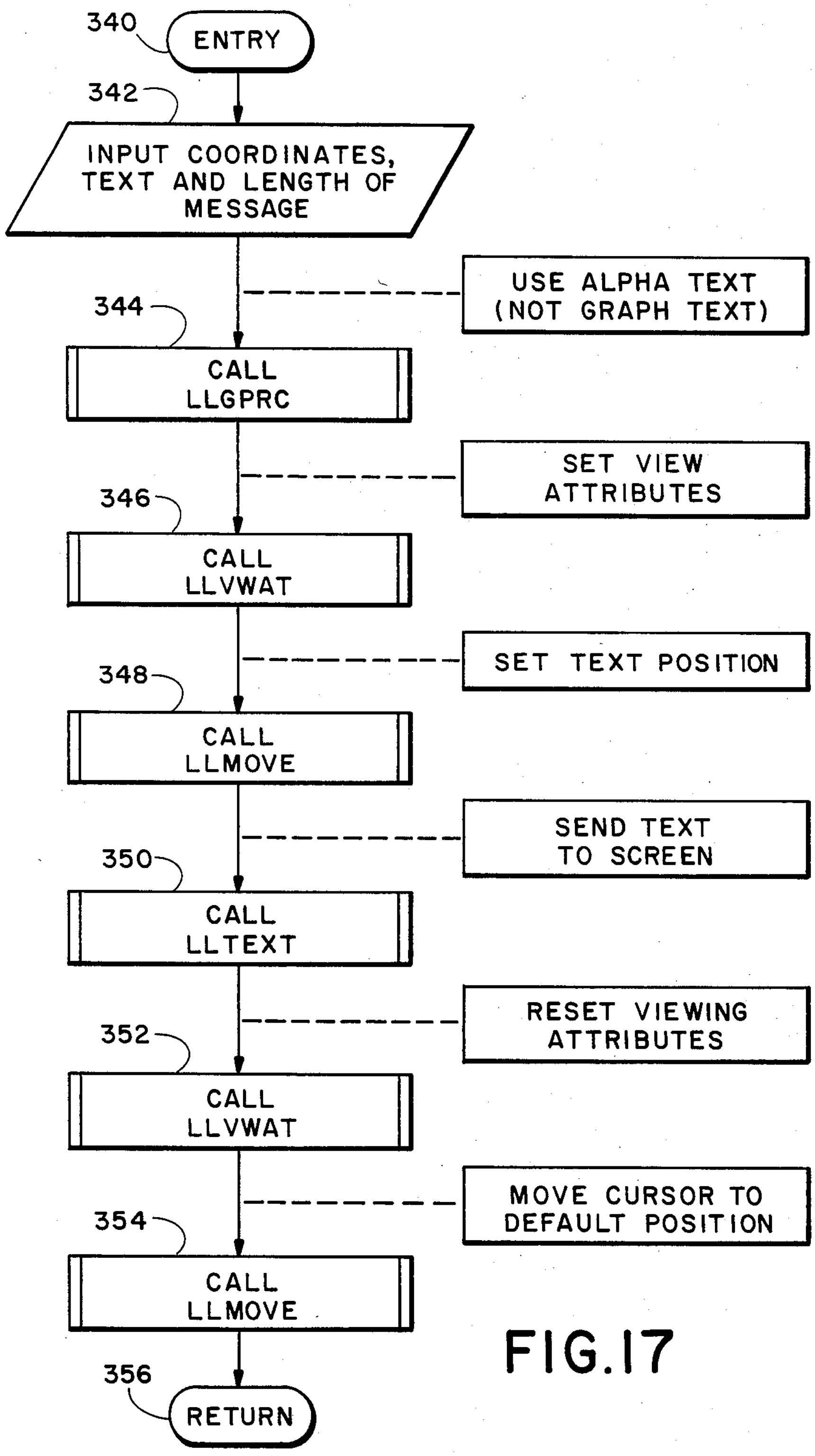
Figure 18:
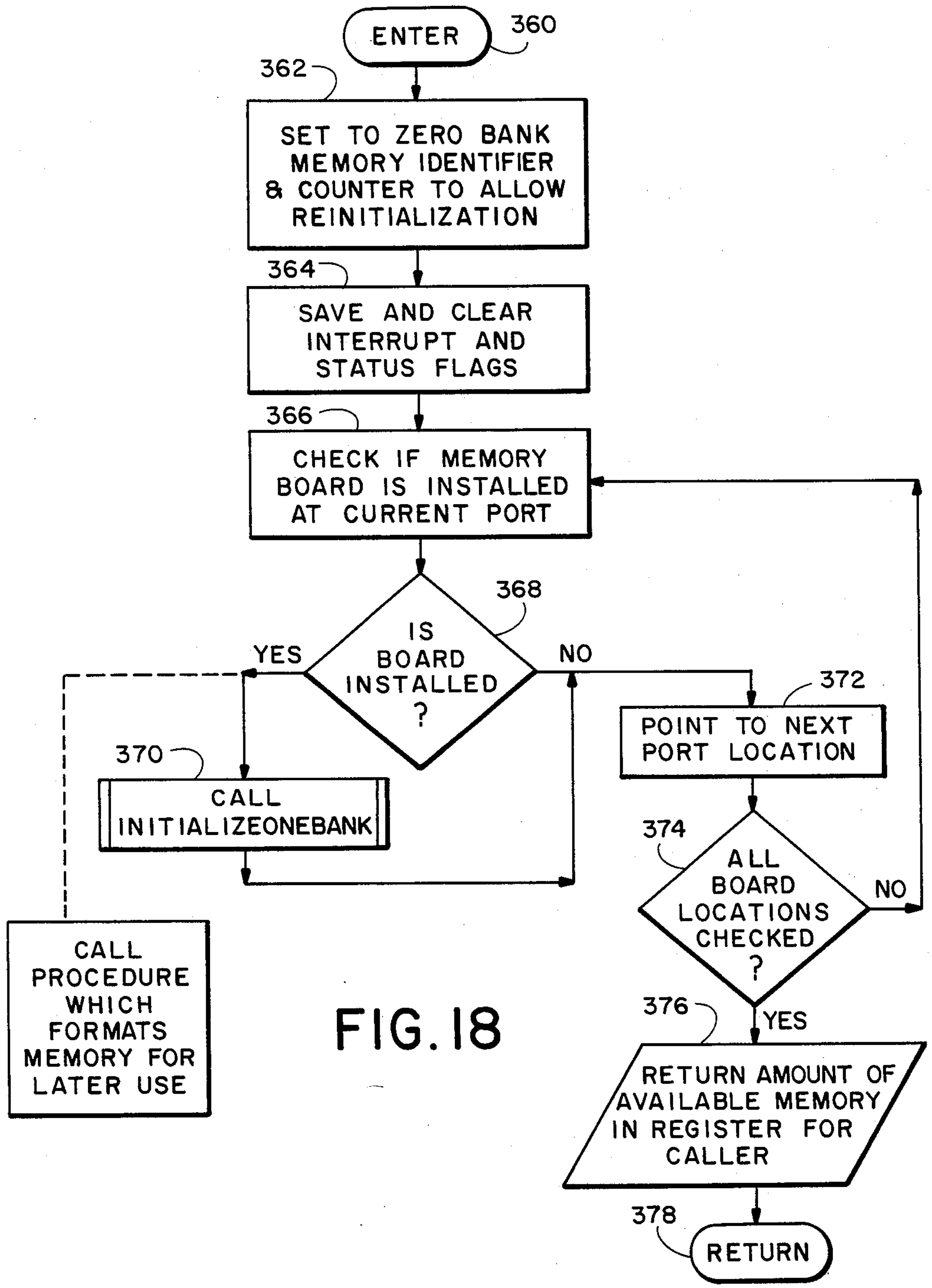

In block 114, a BuildMenu subroutine (seen in detail in FIG. 16) is called to create the menu on the menu surface. Referring to FIG. 16, the subroutine is entered in block 330 and then calls an InitializeMenu subroutine in block 331. The InitializeMenu subroutine obtains data contained in the menu file named by the operator when he called the data structuring program to initialize parameters used in creating the menu. Next, in block 332 a flag is set indicating that the menu surface is initially not visible on the screen. In block 334, a SelectMenuSurface subroutine is called to select the menu surface to be modified in block 335. Block 335 draws the menu on the surface using data from the menu file. With the menu drawn on the menu surface, but with the menu surface not yet displayed on the screen, the BuildMenu subroutine calls the SelectGraphicsSurfaces subroutine in block 336 to make the drawing surface available for later use and then ends in block 338 returning to block 116 of the main module seen in FIG. 3.

In block 116, an IssueStatusMessage subroutine is called to generate a message to the operator on the screen. This subroutine is entered in block 340 of FIG. 17. Next, in block 342 of FIG. 17, parameters specifying the screen coordinates where the message is to be displayed, the length of the message and the text of the message itself are passed to the subroutine from the main. In this case the message to be displayed is "Initializing Bank Switch Memory". In block 344 library subroutine LLGPRC is called to set the appropriate ("alpha") text writing mode and then in block 346 library subroutine LLVWAT is called to set the appropriate view attributes of the text to be written on the screen based on parameters initialized in block 314 of FIG. 15.

Next, in block 348, library subroutine LLMOVE uses the data passed in block 342 to locate a portion of the screen to display the message and the message is actually displayed using library subroutine LLTEXT called in block 350. After the message is written to the dialog area the view attributes used for subsequent screen writing operations are reset to the states occurring prior to block 346 by recalling the LLVWAT library subroutine in block 352. Finally, the writing location is moved to a default position on the screen by calling the LLMOVE subroutine in block 354. In block 356 the IssueStatusMessage ends and operation is returned to the calling point of the main module, in this case point A of FIG. 3.

Figure 4:
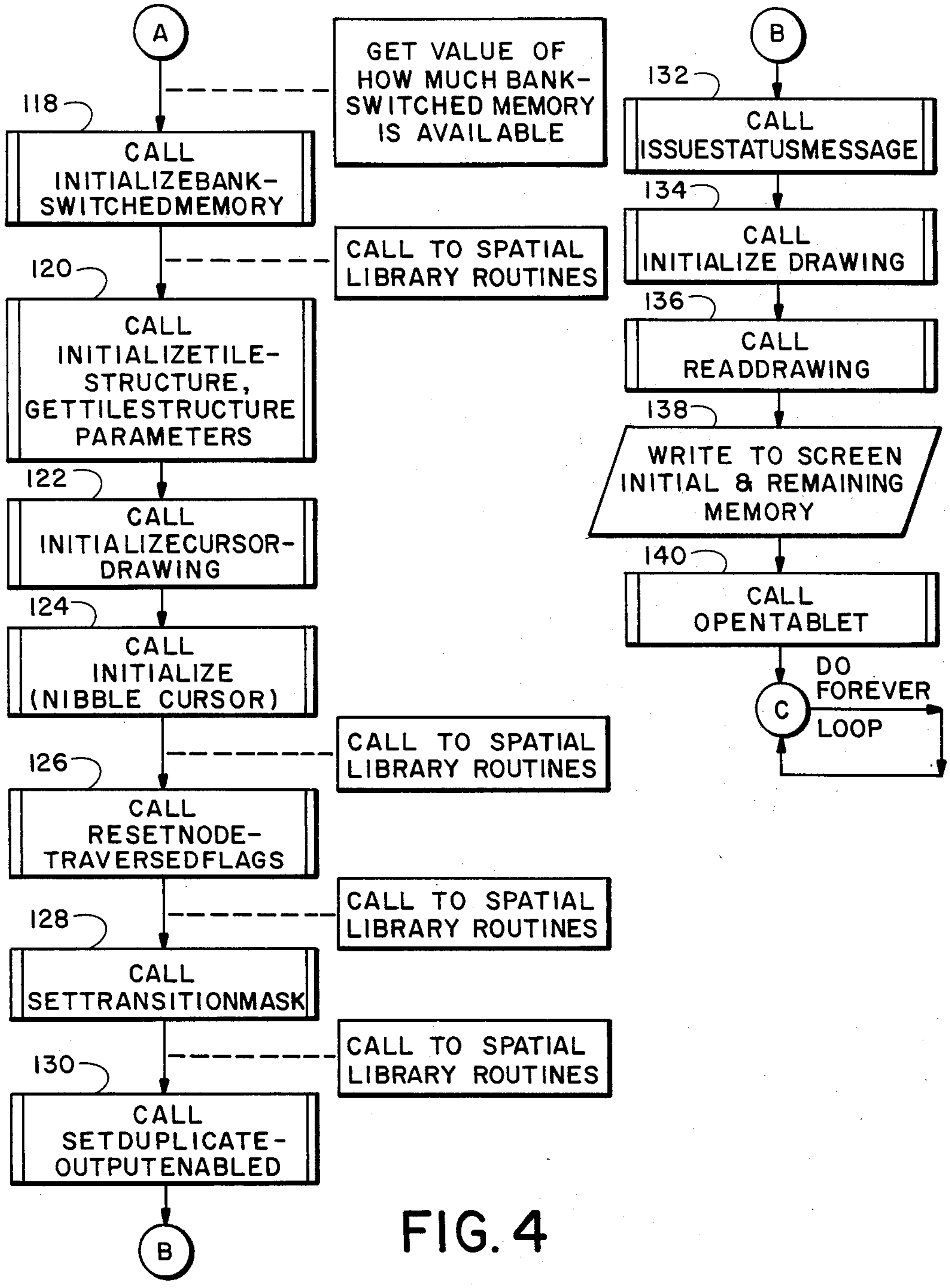

Point A of FIG. 3 leads the data structuring program to point A of FIG. 4 and then to block 118. In block 118, while the "Initializing Bank Switched Memory" message is displayed, the banked switched memory available in the terminal is linked and formatted by called subroutine InitializeBankSwitchedMemory detailed in FIG. 18. In the Tektronix 4115B Terminal random access memory is grouped into banks mounted on separate boards installed in ports along the terminal backplane. This subroutine formats all available memory for use by the data structuring program. Entering the subroutine at block 360 and then moving to block 362, variables used to identify the particular bank, or port, being checked and for counting memory banks checked are zeroed. Then to prevent interrupts when checking memory banks not installed, block 364 current interrupt and status flags are saved and cleared.

Starting with memory port 0, the port is checked in block 366 to see if a memory board is installed in the port. If the memory board is installed a parameter containing a logical true is passed to block 368 which directs the subroutine to block 370 calling an InitializeOneBank subroutine to format the memory. The subroutine then moves to block 372 from block 370, or directly from block 368 if no memory board was installed in the port. In block 372, the port counter is incremented. If the memory port counter is less than the highest numbered port available then operation is redirected by block 374 to block 366 where the next port is checked. When all ports have been checked and all memory banks have been formatted block 374 directs subroutine operation to block 376 where the total amount of memory is ascertained and stored in a register available to the main program module. The InitializeBankSwitchMemory subroutine ends at block 378 and is returned to block 120 of the main module seen in FIG. 4.

Figure 19:
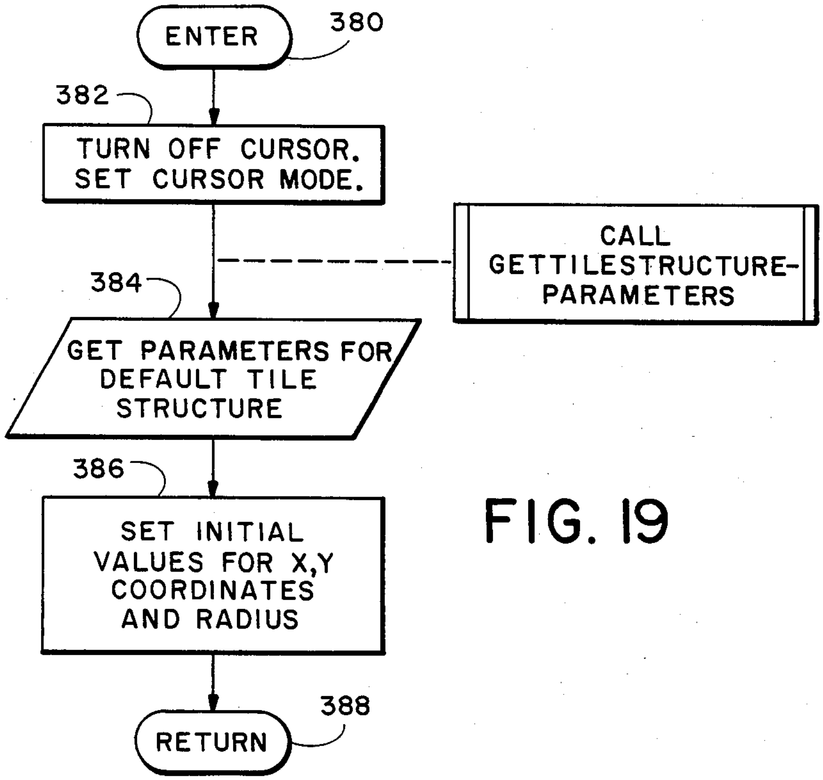
Figure 30:
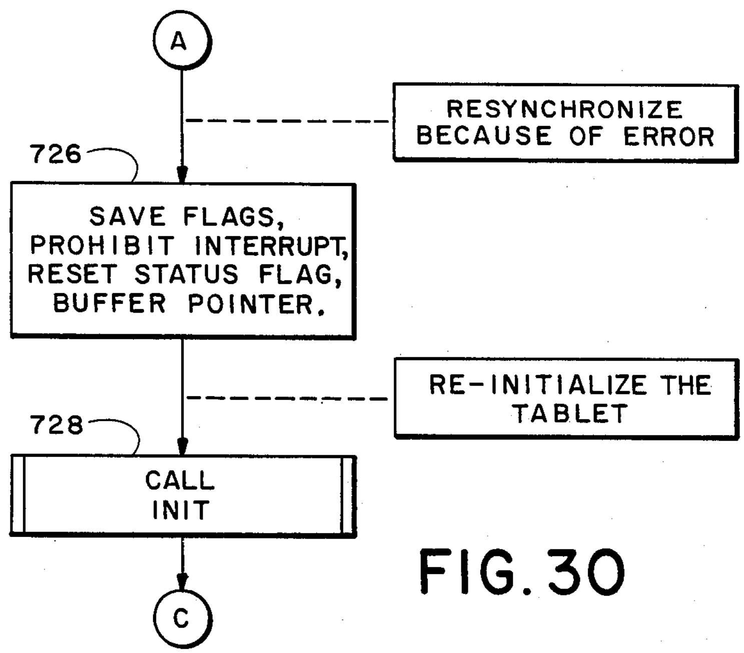

Referring to FIG. 4, block 120 calls the InitializeTileStructure and GetTileStructureParameters subroutines which adjust the tile structure in memory for storing drawing information. The number of tiles and the size of each tile is adjusted to suit the amount of memory available. Next, in block 122 an InitializeCursorDrawing subroutine is called. This subroutine, detailed in FIG. 19, is entered in block 380. In block 382 the cursor surface is made invisible and the curser is initialized to the pencil mode. In blocks 384 and 386 the x,y coordinates of all tile block corners and the length ("radius") of each tile block side is set. The subroutine ends in block 388 and returns to block 124 of the main program module in FIG. 4.

Figure 20:
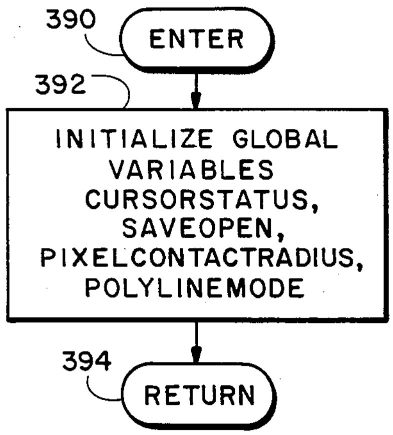

Block 124 calls the InitializeNibbleCursor subroutine of FIG. 20. In FIG. 20 several variables associated with the nibble cursor are initialized. A CursorStatus variable is initialized to "limbo" (described later) and a SaveOpen variable is initialized to "true" indicating that only one cursor at a time is being used. A PixelContactRadius variable, controlling the radius of the nibble cursor, is set to five pixels and the polyline mode is turned off so that the nibble cursor will be initially in the line mode. The subroutine ends in block 394 returning to block 126 of the main module, FIG. 4.

Figure 21:
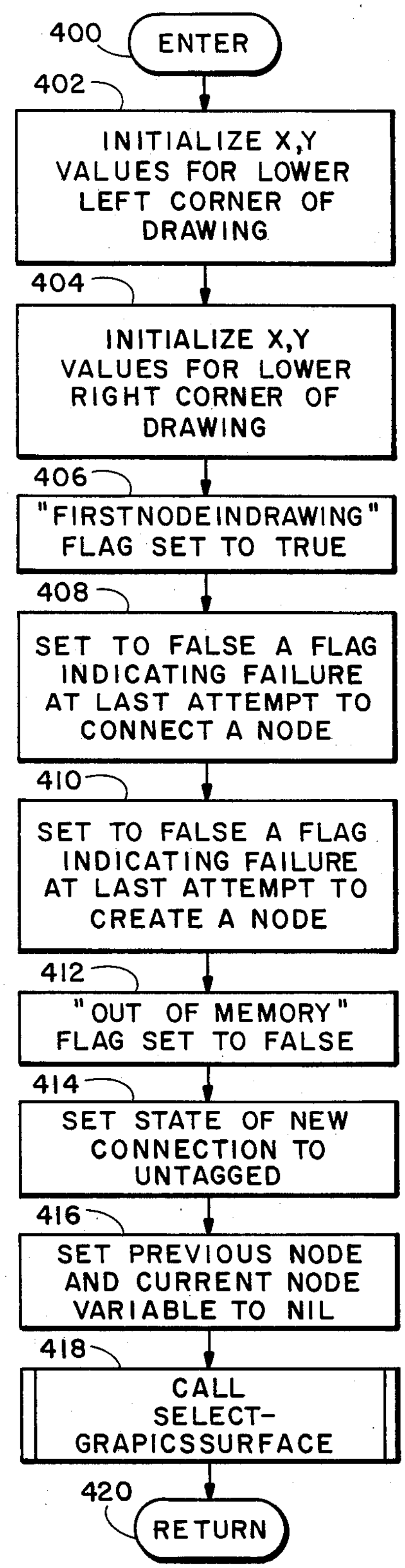

Next, in blocks 126, 128 and 130, ResetNodeTraversedFlags, SetTransitionMask, and SetDuplicateOutputEnabled subroutines are called to initialize parameters and flags later used in converting the drawing data into the spatial structure. The program flow then moves to block 132 where the IssueStatusMessage subroutine of FIG. 17 (previously described) is called to display a "Reading Drawing" message on the screen. With the message displayed, an InitializeDrawing subroutine is called in block 134. Referring to FIG. 21 charting the called subroutine, after entry at point 400, the routine initializes the x,y coordinates for the lower left and upper right corners of the drawing in blocks 402 and 404 and then sets a FirstNodeInDrawing flag to logical true in block 406. In blocks 408, 410 and 412 three error flags, used to indicate errors encountered while attempting to write the data in the drawing file into the tile structure, are reset indicating that no such errors have yet occurred. The errors which may be subsequently flagged are errors associated with "failed attempt to connect a node" (block 408), "failed attempt to create a node" (block 410), and "out of memory" (block 412).

Next, in block 414 of FIG. 21, a "new connection" variable is set to "template" and in block 418 a "previous node" variable and a "current node" variable are initialized to zero. The purposes of these variables are explained below. Finally a "SelectGraphicsSurface" subroutine is called in block 418 which selects the drawing surface for subsequent modification. The InitializeDrawing subroutine then ends in block 420 returning to block 136 of the main program module on FIG. 4.

Figure 22:
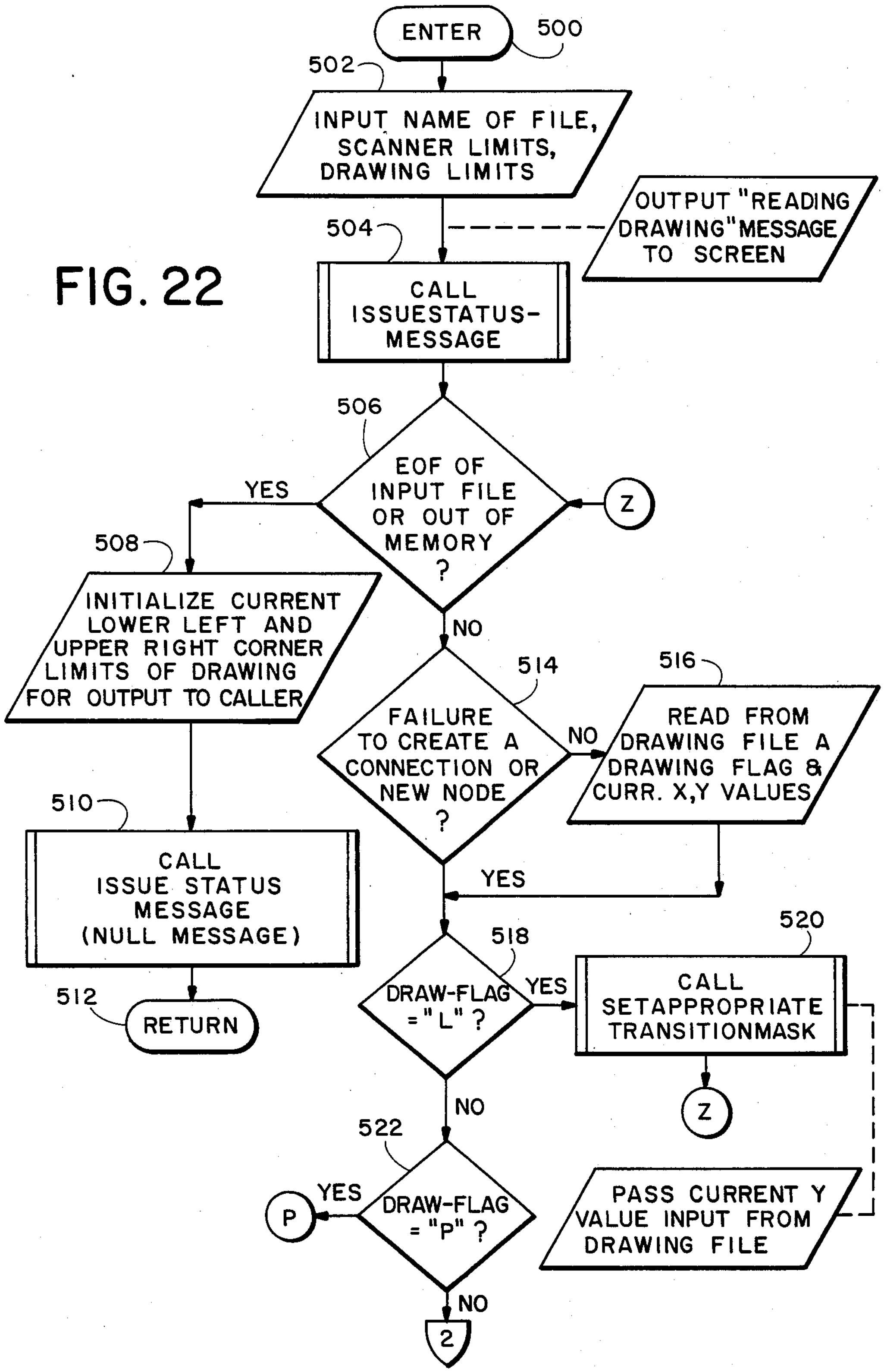

In block 136 of FIG. 4 a ReadDrawing subroutine, detailed in FIG. 22, is called to read the drawing data from the file and, using this data, to load drawing information into the tile structure in a spatial format. At the same time, the image of the drawing is written to the drawing surface and displayed on the screen. The drawing data file is a series of data lines consisting of a draw-flag and an x,y coordinate or a draw-flag and a code indicating a line type (pencil, template, ink or mask). The draw-flags will be either an "L", a "P", an "M" or a "D". It is convenient to think of the draw-flags as directions to a plotter for drawing lines because the drawing structure is written into the tiles in much the same fashion. An "M" draw-flag indicates that the plotter pen is lifted and "M"oved to the point indicated by the x,y coordinate data on the data file line containing the "M" flag. A "D" draw-flag indicates that the "plotter pen" remains "D"own while moving to the indicated x,y coordinate from the last x,y coordinate. A "P" draw-flag indicates that the next x,y coordinate is an isolated "P"oint so that the plotter pen is moved to the indicated point and momentarily dropped to create a dot. The data following an "L" draw-flag indicates the type of "L"ine that all subsequent lines are to be designated (pencil, template, ink or mask). When the first line of the data file does not contain an "L" type draw-flag, the program assumes all lines to be drawn are template lines until an "L" draw-flag line occurs.

In FIG. 22, the ReadDrawing subroutine is entered at block 500 and then in block 502 the name of the drawing file and the scanner and drawing limits contained in the drawing file header are obtained. In block 504 the IssueStatusMessage subroutine is called to display a "Reading Drawing" message on the screen while the ReadDrawing subroutine is in operation. Block 506 then checks for flags indicating end of data file or out of memory conditions. If no such flags are set then block 514 checks for flags indicating a failure to create a connection or a new node. Initially, however, before any data lines are read, these flags are all reset. Thus, prior to the reading of the first line in the drawing file, block 514 directs program flow to block 516 of FIG. 22 where the first line in the drawing file is read. Normally the first line will contain an L or and M draw-flag. If it contains an L flag, block 518 directs program flow to block 520 where a SetAppropriateTransitionMask subroutine is called to cause all subsequent connections to be labeled as pencil, ink, template or masked template lines (or a combination thereof) as determined by the data following the L flag. When a file is initially received from the autovectorizer all lines are template lines. However, as seen below, restructured drawing files created by the data structuring program containing pencil, ink and masked template lines along with unmasked template lines may be recalled and further restructured.

Figure 23:
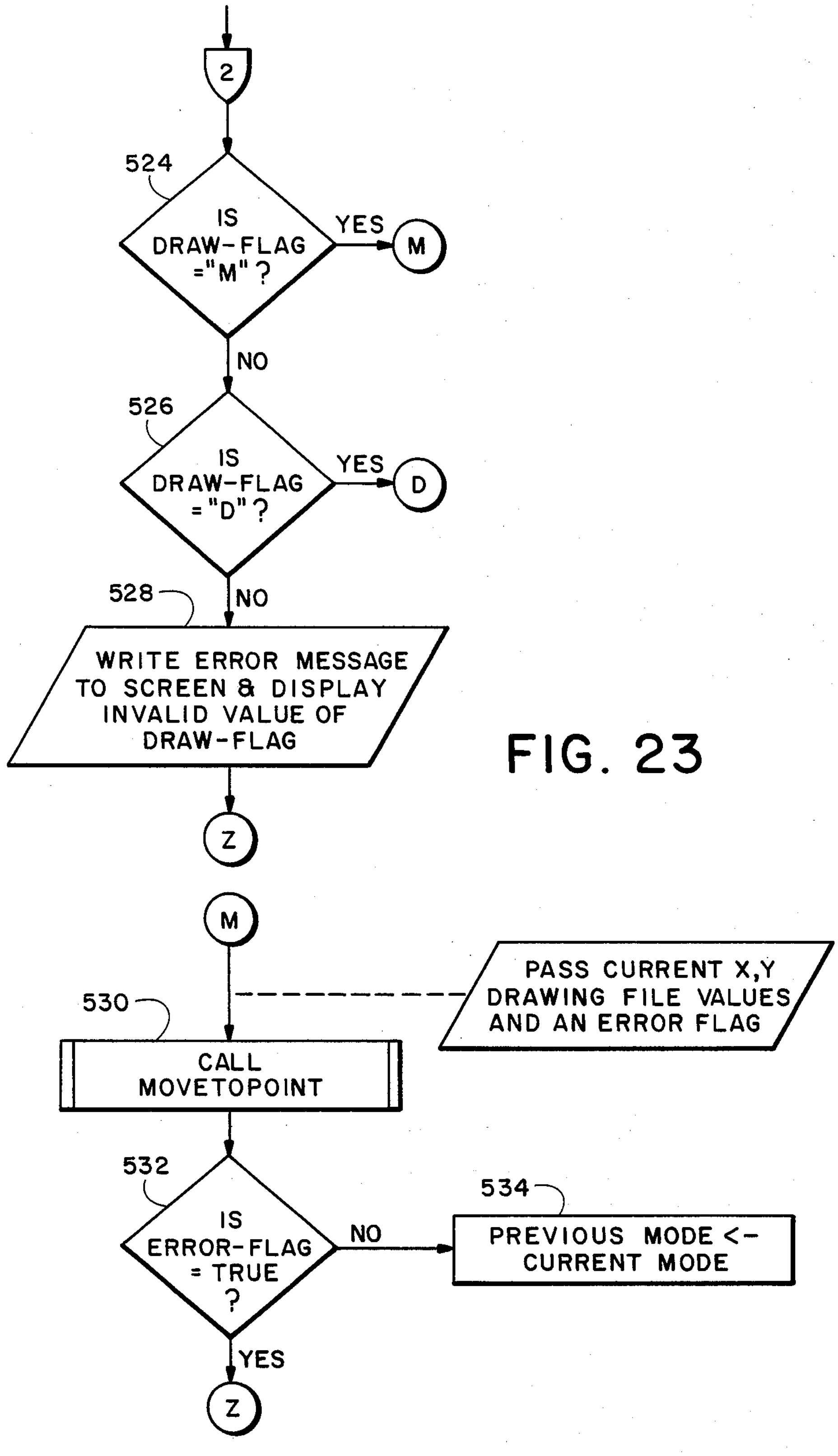
Figure 24:
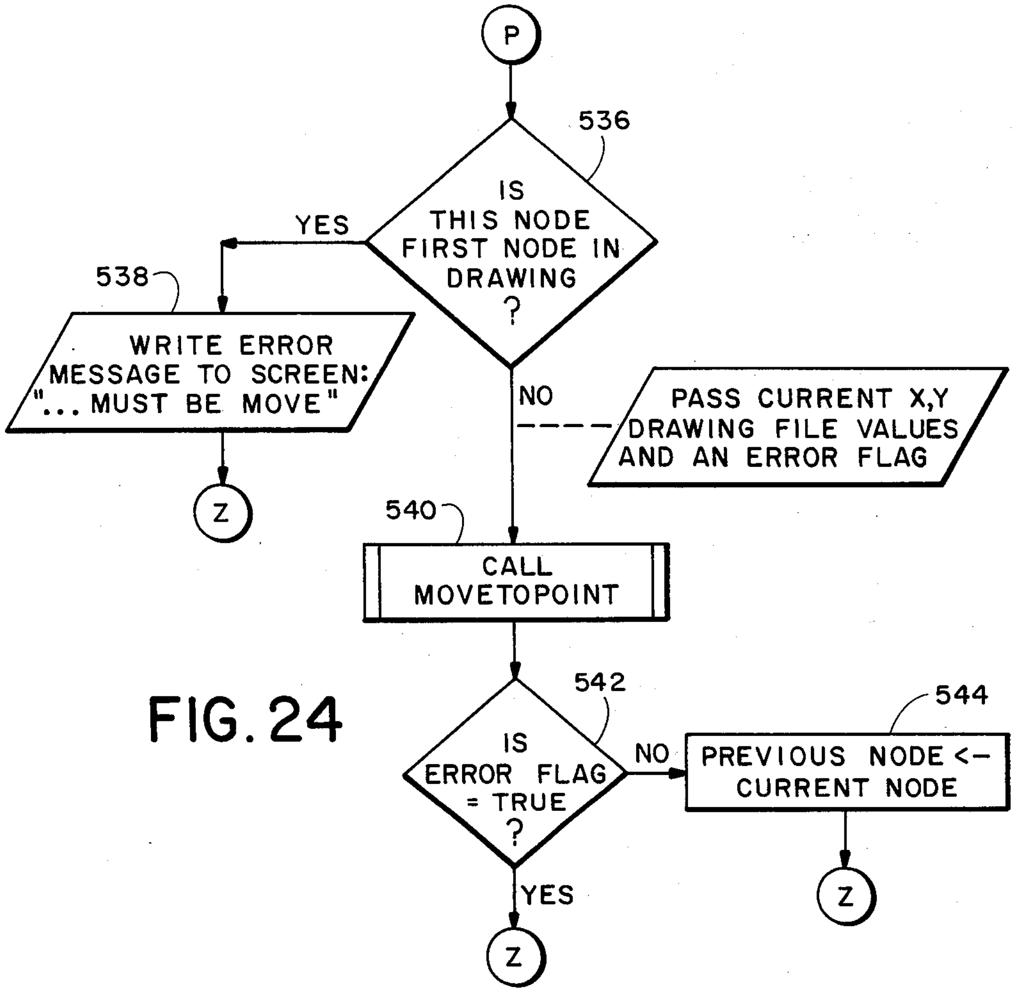
Figure 25:
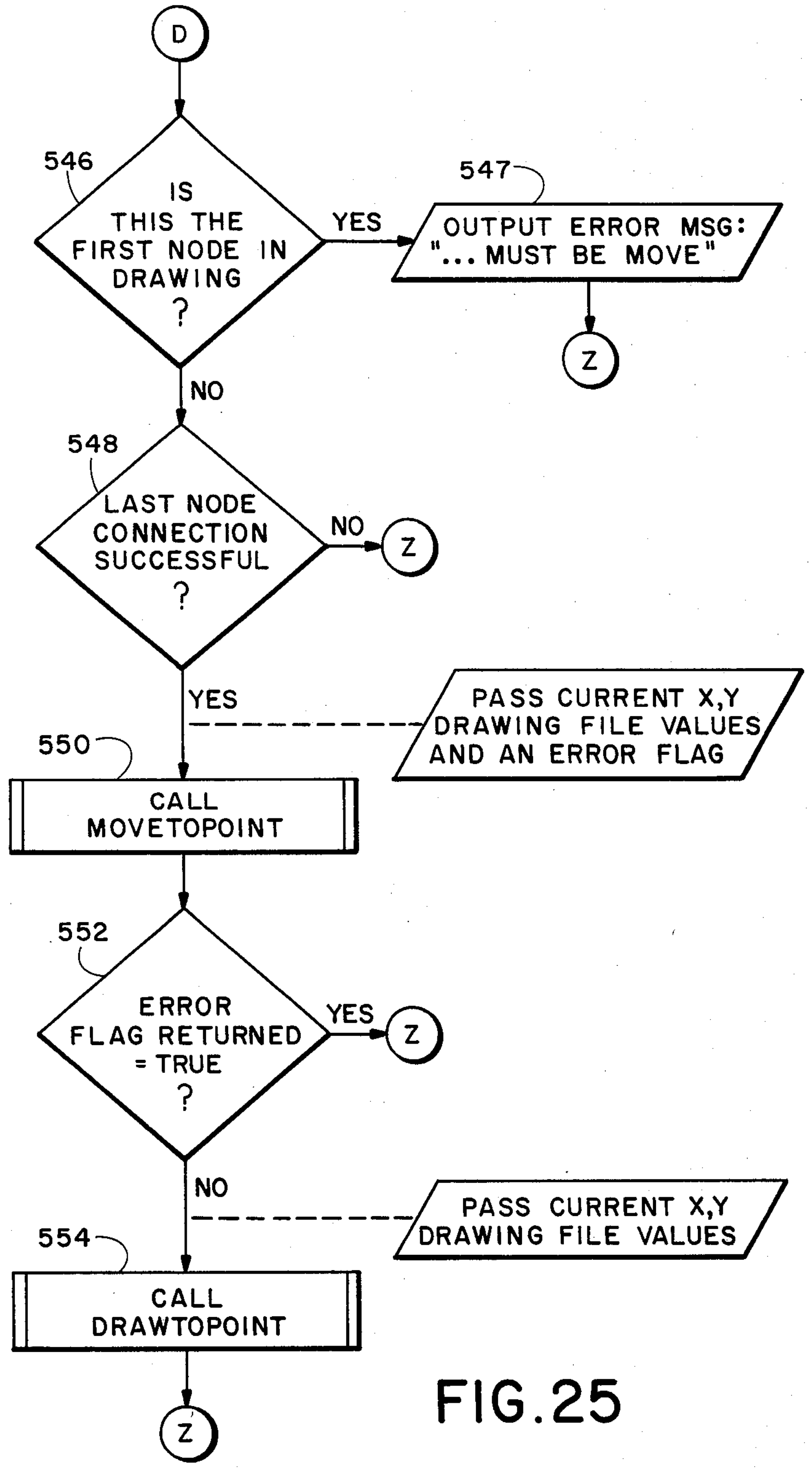

If the first data line contains an M flag, then blocks 518, 512 and 524 (of FIG. 23) direct program flow to point M and then to block 530 of FIG. 23. In block 530 a MoveToPoint subroutine is called causing a new node to be written into the tile structure at the indicated x,y coordinates. If the coordinates are out of range or if there is insufficient memory to store the new node, a "failure to create a node" or an "out of memory" flag is returned. If no such error occurs then the coordinates or the current node are saved as the coordinates of the previous node in block 534 and program flow returns to point Z of FIG. 22. However if such an error occurs, the current node information is not saved and program flow returns directly to point Z from block 532.

Assuming that the out of memory and end of file flags have not been set and that no failure to create a connection or failure to create a new node flags have been set, blocks 506 and 514 again direct program flow to block 516 where a new data line is read. If the new line contains a "P" flag, the program flow is directed through blocks 518 and 522 to point P FIG. 24. Then in block 536 of FIG. 24, the FirstNodeInDrawing flag is tested. If true an error message ". . . must be Move" is written to screen in block 538 and program flow is directed back to point Z of FIG. 22. If the current data lines does not contain the first node read then the flag will be false and block 536 will direct program flow to block 540 where the MoveToPoint subroutine is called to enter the node into the tile structure without a connection to the previous node. Again in block 542 any error flags generated by the MoveToPoint subroutine are tested and if errors have occured program flow is directed back to point Z of FIG. 22 without saving the current node data. In the absence of an out of memory or a failure to create a node error, block 542 routes program flow through block 544 to save the current node as the previous node.

Referring back to FIG. 22 and assuming again that the out of memory and end of file flags have not been set and that no failure to create a connection or failure to create a new node flags have been set, blocks 506 and 514 again direct program flow to block 516 where another data line is read. If the new line contains a "P" flag, the program flow is directed through blocks 518 and 522 to point 2 of FIG. 23 and then through blocks 524 and 526 to point D of FIG. 25. Then in block 546 of FIG. 25, the FirstNodeInDrawing flag is tested. If true an error message ". . . must be Move" is written to screen and program flow is directed to point Z of FIG. 22. If the current data line does not contain the first node read then the flag will be false and block 536 will direct program flow to block 540 where the MoveToPoint subroutine is called to enter the node into the tile structure without a connection to the previous node. Again in block 542 any error flags generated by the MoveToPoint subroutine are tested and if errors have occurred program flow is directed back to point Z of FIG. 22 without saving the current node data. In the absence of an out of memory or a failure to create a node error, block 542 routes program flow through block 544 to save the current node as the previous node.

With the drawing written into memory and appearing on screen, the amount of memory available before storing the drawing data and the amount of available memory remaining after storing the drawing data are displayed in the dialog area of the screen in block 138.

Figure 26:
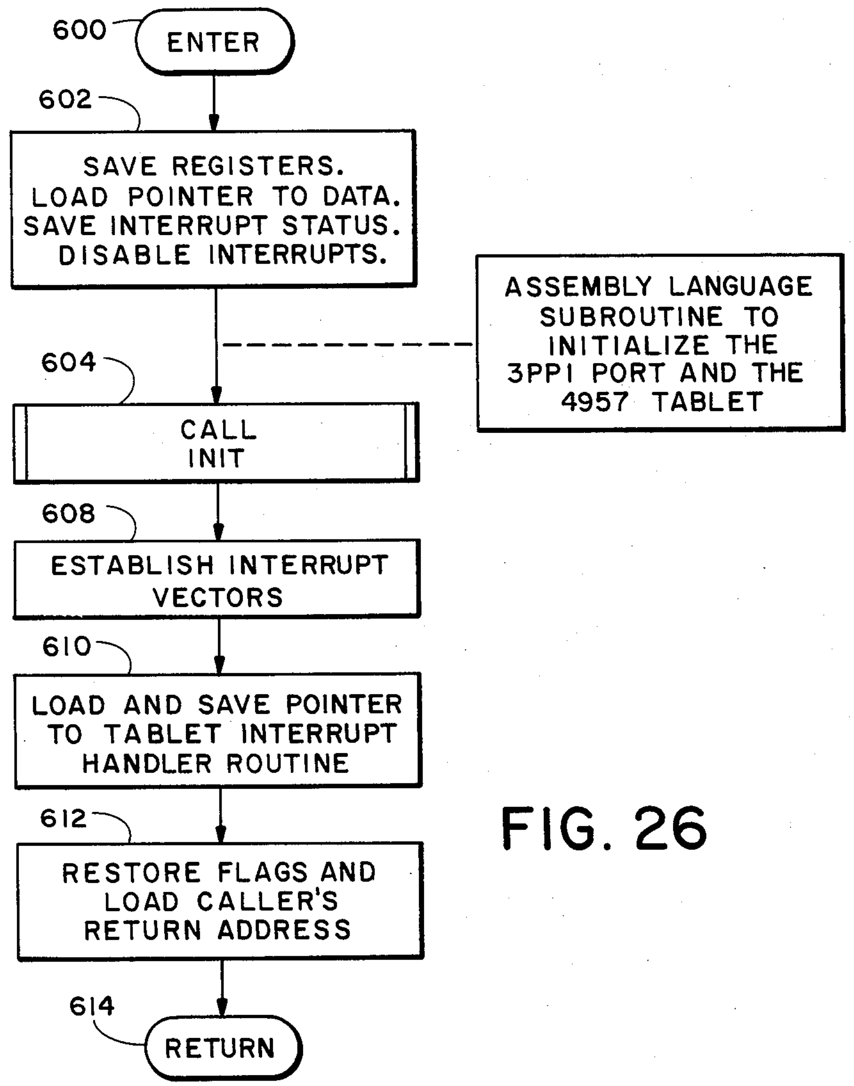

The tablet input device is then enabled in block 140 by calling subroutine OpenTablet. Turning now to FIG. 26, the OpenTablet routine begins in block 600. Then in block 602 the contents of a number of registers currently in use are saved in memory along with the present interrupt status. All interrupts are disabled. In block 604 subroutine Init is called to initialize the drivers for the tablet and the terminal port connecting the tablet and to synchronize the tablet with the data structuring program. The interrupts are enabled in block 610 and the registers saved in block 602 are reloaded in block 612. The subroutine ends in block 614 and program flow is returned to point C of the main program module shown in both FIGS. 4 and 5.

With the drawing data loaded into the tile structure and the drawing displayed on the screen and with the graphics input tablet enabled and synchronized with the data structuring program, the operator may begin editing the drawing by manipulating the stylus on the tablet to control the movements of cursors on the screen. However, any time the operator wishes to exit from the data structuring program he may type a Control C on the terminal keyboard. In block 142 program flow is then directed to block 144 where an Exit subroutine is called to return terminal operation to the CP/M operating system, the data structuring program thereby ending as indicating in block 146.

Figure 27:
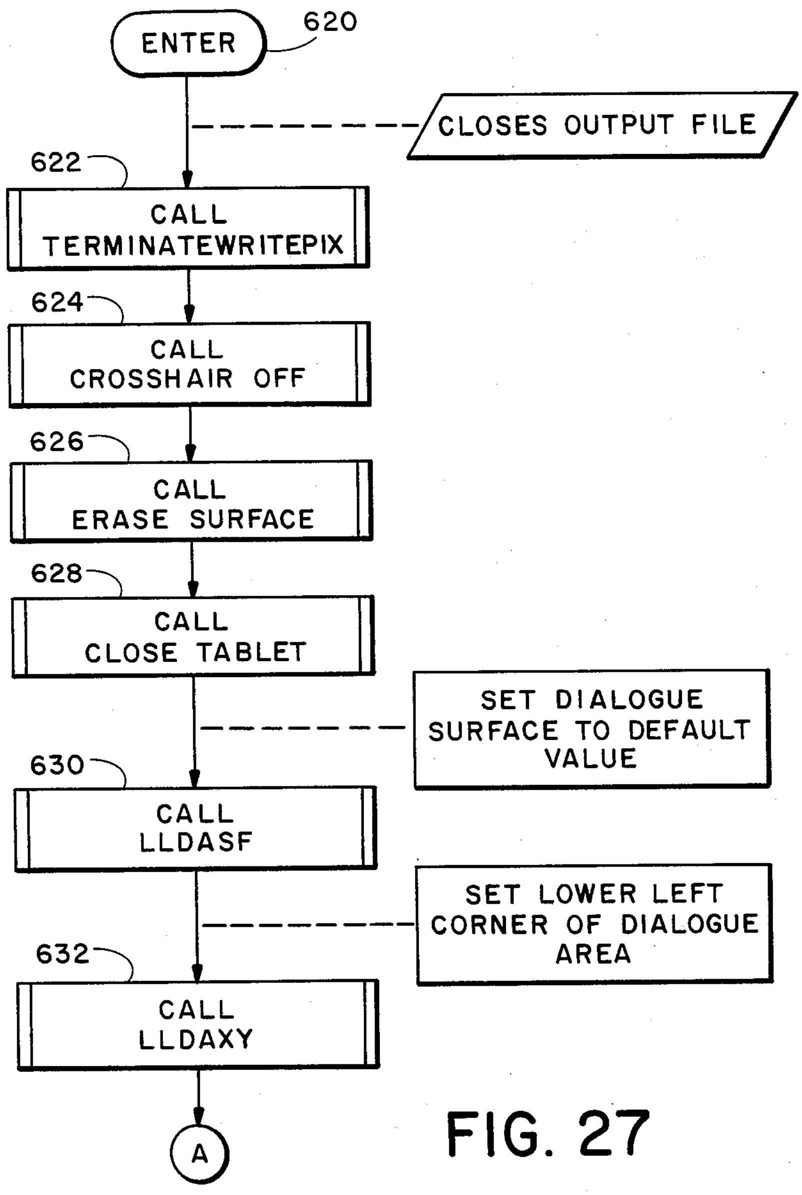
Figure 28:
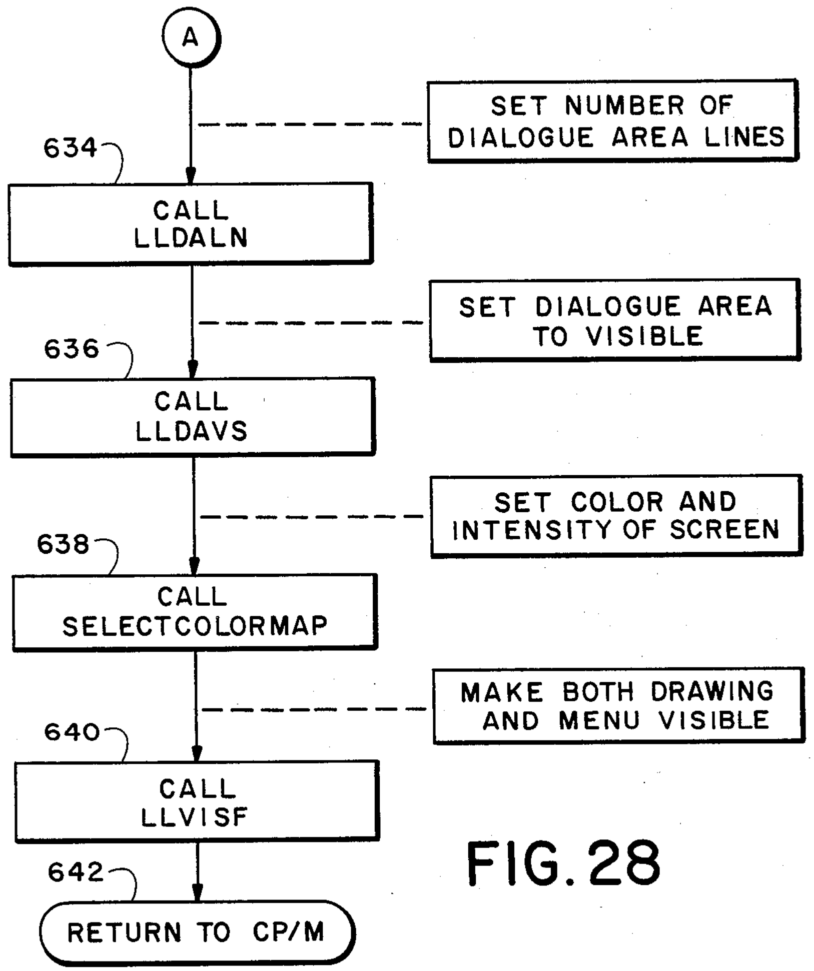

The Exit subroutine is flowcharted in FIGS. 27 and 28. After subroutine entry in block 620, the output file is closed in block 622 by calling a TerminateWritePix subroutine. The crosshair is then turned off if it was on in block 624 by calling a Crosshair Off routine and the cursor surface is erased in block 626 by calling an EraseSurface subroutine. The tablet is disabled in block 628 by calling a CloseTablet subroutine which restores interrupt vectors taken by the OpenTablet subroutine. The dialog area is restored and repositioned in blocks 630 and 632 by calling library subroutines LLDASF and LLDAXY and, in FIG. 28 the dialog area is dimensioned and made visible by calling library routines LLDALN and LLDAVS in blocks 634 and 636. The color and intensity of the screen are set in block 638 by calling the SelectColorMap subroutine and the drawing and menu surfaces are also made visible if not already so in block 640 by calling library subroutine LLVISF. Terminal operation is then returned to CP/M level in block 642.

Figure 5:
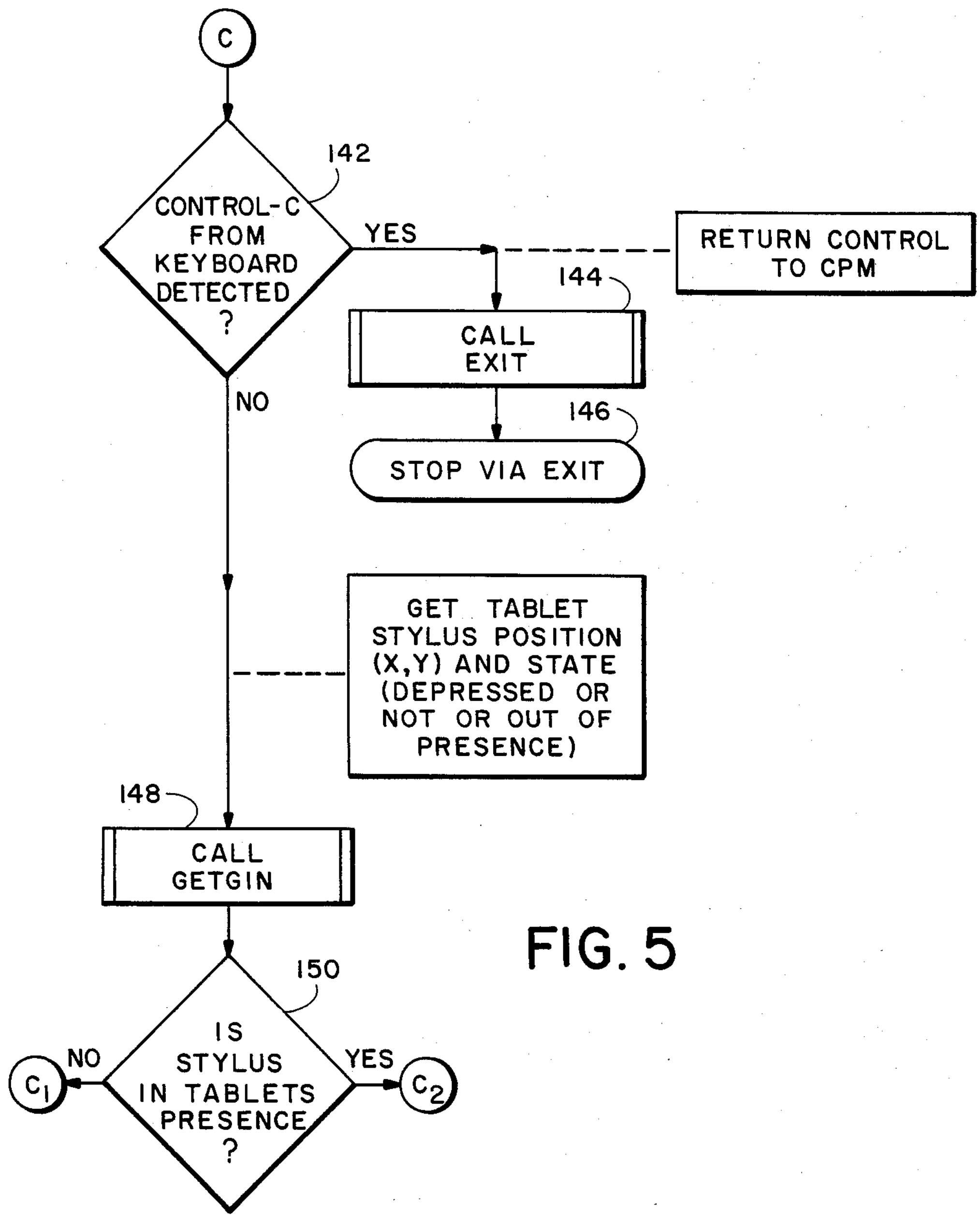
Figure 29:
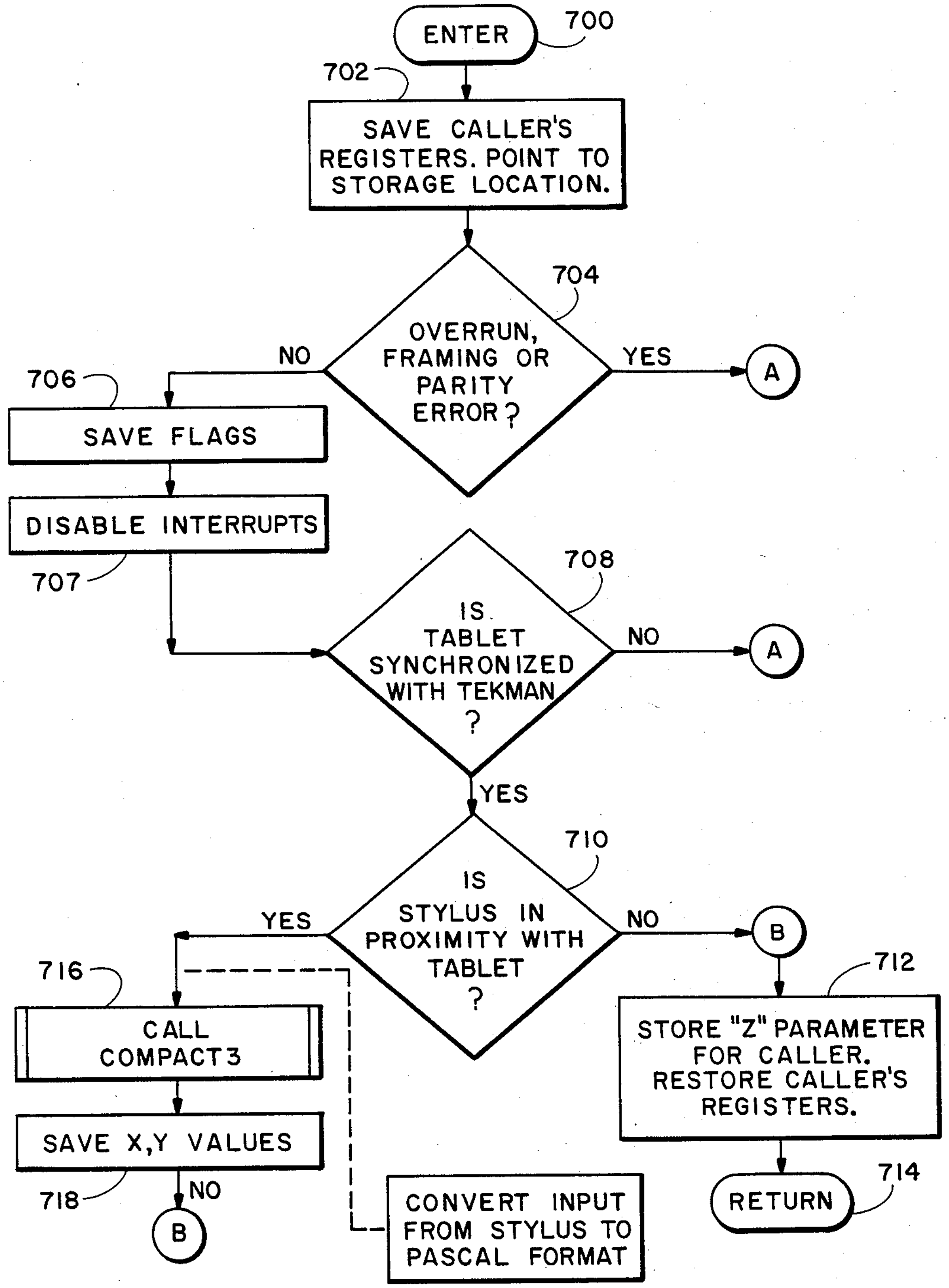

Returning now to the main program module in FIG. 5, assuming the operator does not want to exit the program by typing Control-C at the terminal, block 142 directs program flow to block 148 where a GetGin subroutine is called. The GetGin subroutine determines the position and state of the stylus on the tablet and returns the information to the calling routine. GetGin is flowcharted in FIG. 29. Referring to FIG. 29, the GetGin subroutine begins in block 700 and in block 702 saves the contents of any registers in use by the calling routine along with a pointer to the storage location of the current stylus data. Then in block 704 errors associated with message transmission from the tablet are checked including overrun (data arriving too quickly for the interrupt handling routines to keep up), framing (incorrect baud rate), and parity (garbled transmision) errors. If any of these errors are present, then program flow is directed to point A of FIG. 30 leading to block 726 where procedures to store any incoming interrupt flags for the duration of the subroutine are enabled, interrupts are disabled, the appropriate error status flag is reset and a buffer pointer is established. Then in block 728 that Init subroutine is called to reinitialize the port and tablet thereby synchronizing tablet operation with the program. Operation of the GetGin subroutine is then terminated without a return and program flow is redirected to point C of FIG. 5.

Turning again to the GetGin subroutine of FIG. 29, if there are no overrun, framing or parity errors detected in block 704, preparations are made to save interrupt flags occurring during the subroutine in block 706 and interrupts are disabled in block 707. Synchronization between tablet and the program is checked in block 708 with subroutine flow redirected to point A of FIG. 30 for tablet reinitialization as described above if the tablet and the program are not synchronized.

If the tablet and program are synchronized, then block 708 of FIG. 29 directs program flow to block 710 were the proximity of the stylus to the tablet is checked. A stylus condition indicator returned from the tablet with the x,y coordinates of the stylus represents any of three values: "out of proximity." if the stylus is not on the tablet, "in proximity," if the stylus is on the tablet but a select switch on the end of the stylus is not activated, or "depressed" if the stylus is on the on the tablet and the stylus switch is activated. If the stylus is not on the table then in block 712 a "z" parameter is set to indicate the "not in proximity" condition, the caller's registers are restored and, in block 714, the GetGin subroutine is ended and program flow is returned to block 150 of FIG. 5. On the other hand, if the stylus is on the tablet, block 710 directs program flow to block 716 where subroutine Compact3 is called to convert to Pascal format data transmitted from the tablet to the terminal indicating the x,y stylus position on the tablet.

The converted x,y coordinates of the stylus are stored in memory in block 718. Then block 720 checks for operation of any keys on the terminal. Since the operator is supposed to use only the tablet for input at this point, an error is signaled in block 722 using a tone generator in the terminal if any keys are depressed and the subroutine is terminated in block 724 by returning program flow to the calling routine. Assuming no terminal keys are depressed, block 720 directs program flow to point B of FIG. 29 leading to block 712 where the z parameter indicating either the depressed or the in proximity condition is stored and the caller's registers are reloaded with data stored in block 702. The subroutine then ends in block 714 and program operation is returned to the calling routine, in this case to block 150 of FIG. 5.

Referring again to FIG. 5, in block 150 the condition of the stylus is determined by checking the value of the z parameter returned from the GetGin subroutine called in block 148. If the z parameter indicates the out of proximity position, then the stylus is not on the tablet and program flow is directed to point C1 on FIGS. 5 and 6. Then in block 152 of FIG. 6 a CrossHairOff subroutine is called to remove the crosshair from the screen, if it is presently on.

Figure 31:
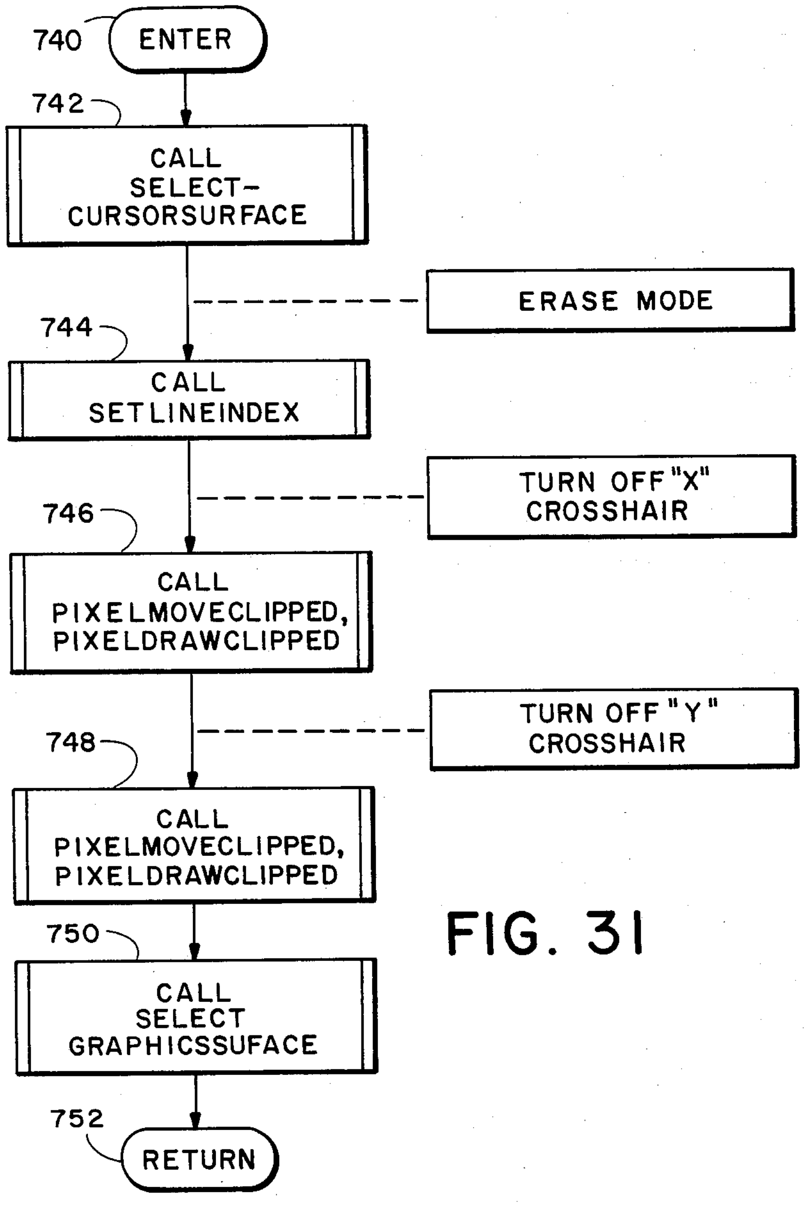

The CrossHairOff subroutine is flowcharted in FIG. 31. After subroutine entry in block 740, the cursor surface is selected to receive graphics input by calling the SelectCursorSurface subroutine in block 742. The operation to be performed on the cursor surface is selected to be an erase in block 744 by calling a SetLineIndex subroutine. The x and y crosshairs of the crosshair cursor are then erased from the cursor surface in blocks 746 and 748 by calling subroutines PixelMoveClipped and PixelDrawClipped. The crosshair then disappears from the screen. The drawing surface is reselected for graphics input in block 750 and then in block 752 the subroutine ends, returning program flow to block 154 of FIG. 6.

Figure 6:
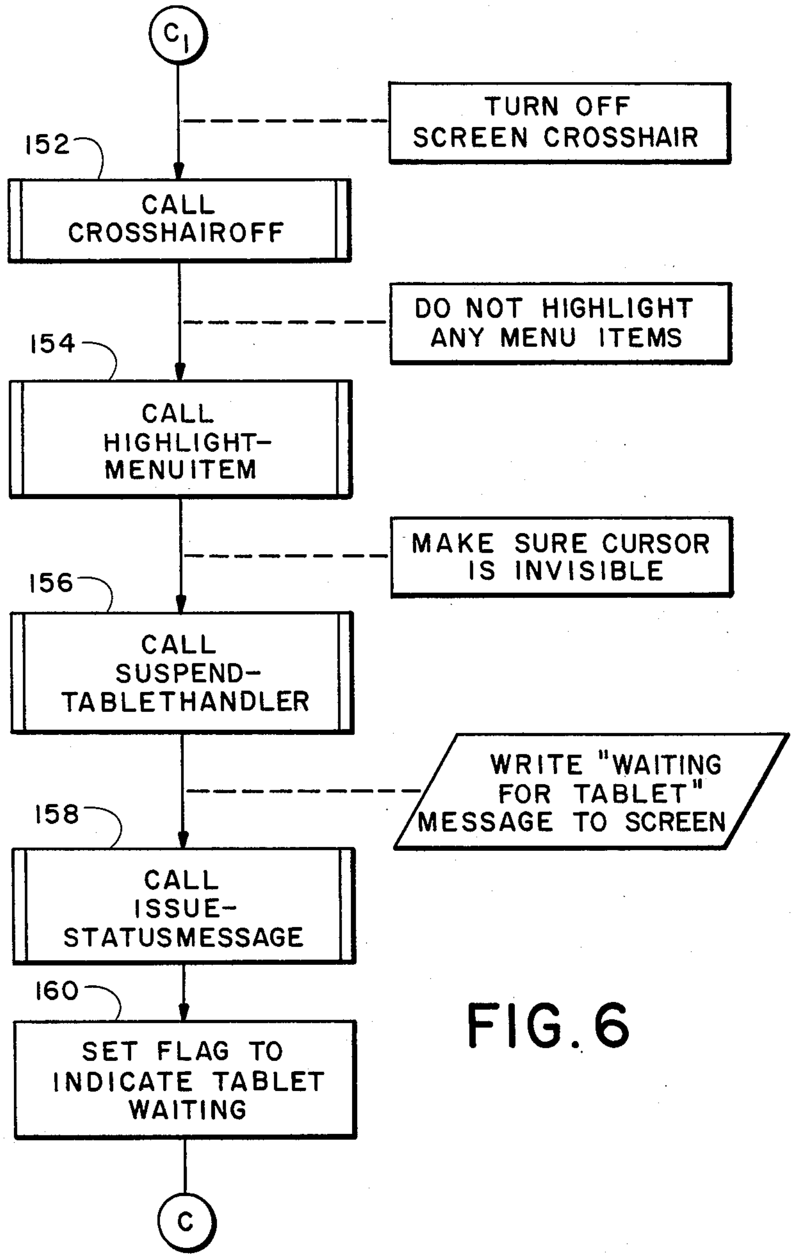

Whenever the operator removes the stylus after selecting a menu item the highlighted menu item is dimmed by calling a HighlightMenuItem subroutine in block 154 of FIG. 6. Also if the nibble cursor is present on the screen, the cursor is erased by calling a SuspendTabletHandle subroutine in block 156. Then the IssueStatusMessage subroutine is called in block 158 to generate a "Waiting for Tablet" message on the screen dialog area and a "tablet waiting" flag is set to "true" in block 160. Program flow is then redirected to point C of FIG. 5. The program will continue to cycle through the C/C1 loop on FIGS. 5 and 6 until the operator places the stylus on the tablet. At that point the Z parameter returned by the GetGin subroutine of block 148 will be in either the proximate/on or proximate/off condition and block 150 of FIG. 5 will direct program flow to point C2 of FIG. 7 and then to block 162 where the TabletMessageVisible subroutine is called to remove the "tablet waiting" message from the screen.

Next, in block 164, the table waiting flag is checked and if in the off condition program flow is directed to block 170. On the other hand, if the tablet waiting flag is in the on condition program flow is directed to block 166 where the "tablet waiting" message is removed from the screen and the tablet waiting flag is reset to off in block 168. Program flow is then also directed to block 170.

Figure 32:
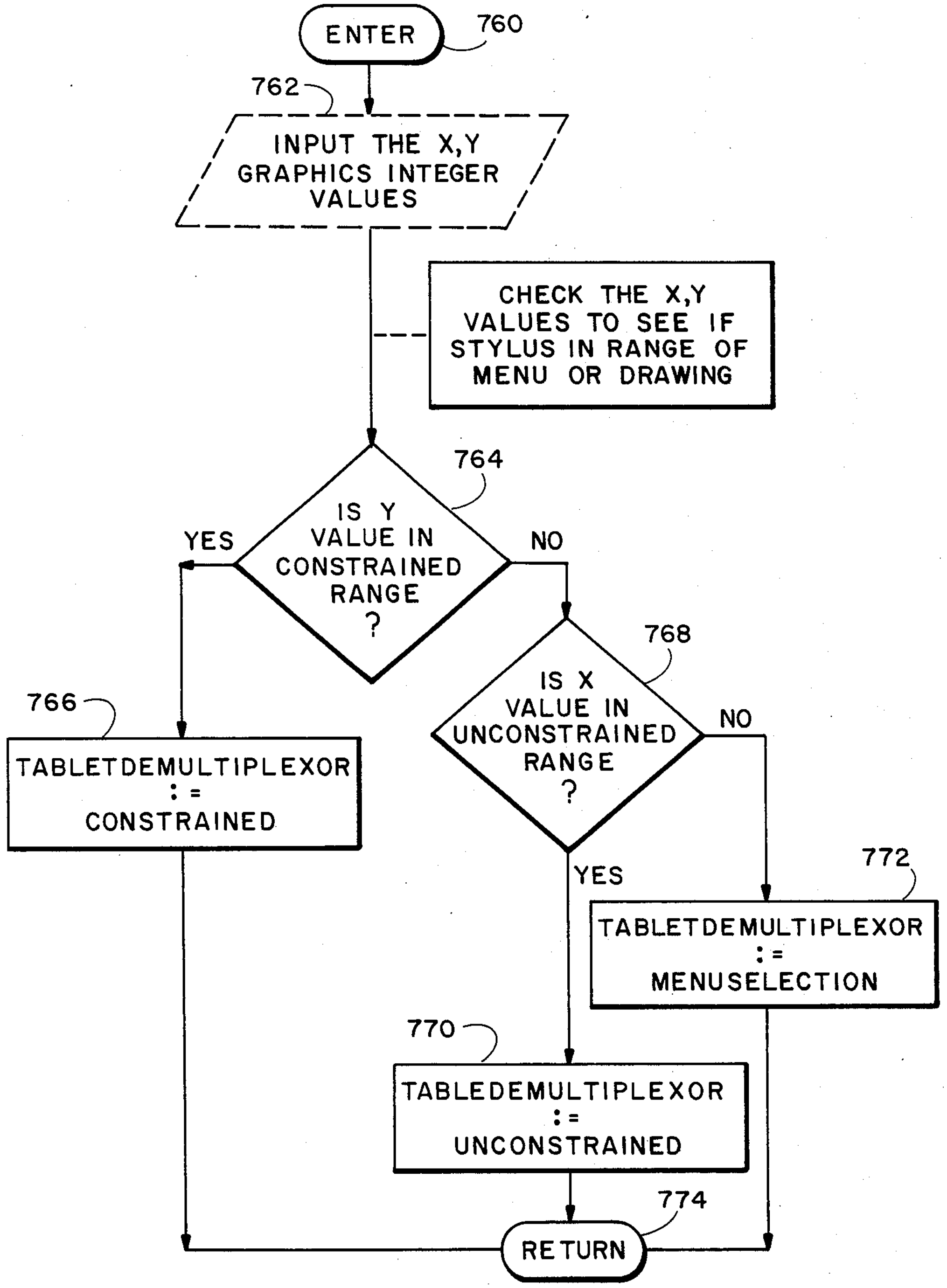

In block 170 a TabletDemultiplexer subroutine is called to check the position of the stylus on the tablet and return a TabletDemultiplexer parameter indicating the stylus position. Referring to FIG. 32 where the TabletDemultiplexer subroutine is flowcharted, the routine is entered at block 760 and receives the x,y coordinates of the cursor in block 762. Nex, in block 764, the x,y coordinates are checked to see if they lie in the constrained range. If so, the TabletDemultiplexer parameter is set to "constrained" in block 766 and the subroutine is ended and returned to the caller in block 774. Alternately, if the x,y coordinates of the stylus lie in the unconstrained range, block 764 directs program flow to block 768 which in turn direct flow to block 770 where the TabletDemultiplexer parameter is set to "unconstrained" before the subroutine is ended in block 774. Finally, if the x,y coordinates of the stylus lie in the menu area, then blocks 764 and 768 direct program flow to block 772 where the TabletDemultiplexer parameter is set to "MenuSelection". Thereafter the subroutine is ended in block 774 and program flow is returned to block 170 of FIG. 7.

Figure 7:
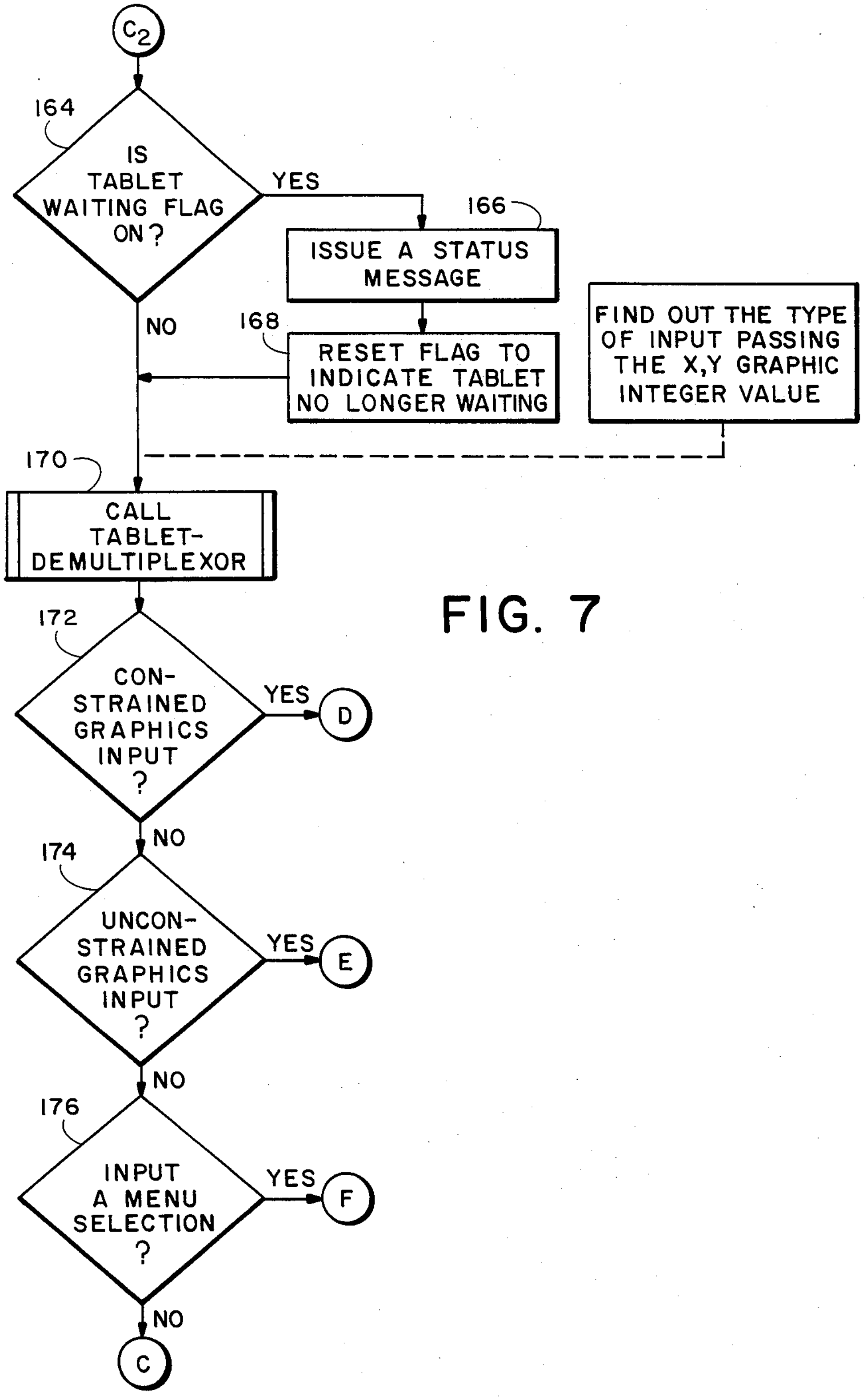

In FIG. 7 blocks 172, 173 and 174 direct program flow according to the state of the TabletDemultiplexer parameter and therefore according to the area of the tablet the operator has selected with the stylus. If he has selected the constrained graphics area then block 172 will direct program flow to point D of FIG. 8 to call subroutines allowing the operator to use a cursor to make changes to the drawing. If the operator has selected the unconstrained graphics area then blocks 172 and 174 will direct program flow to point E of FIG. 9 to call subroutines to remove the menu from view if it is visible and undim the drawing if it has been dimmed. Finally, if the operator has selected the menu area, then Tablet-Demultiplexer parameter will be in the "menu" state and blocks 172, 174 and 176 will direct program flow to point F of FIG. 10 to display the menu on the screen.

Figure 10:
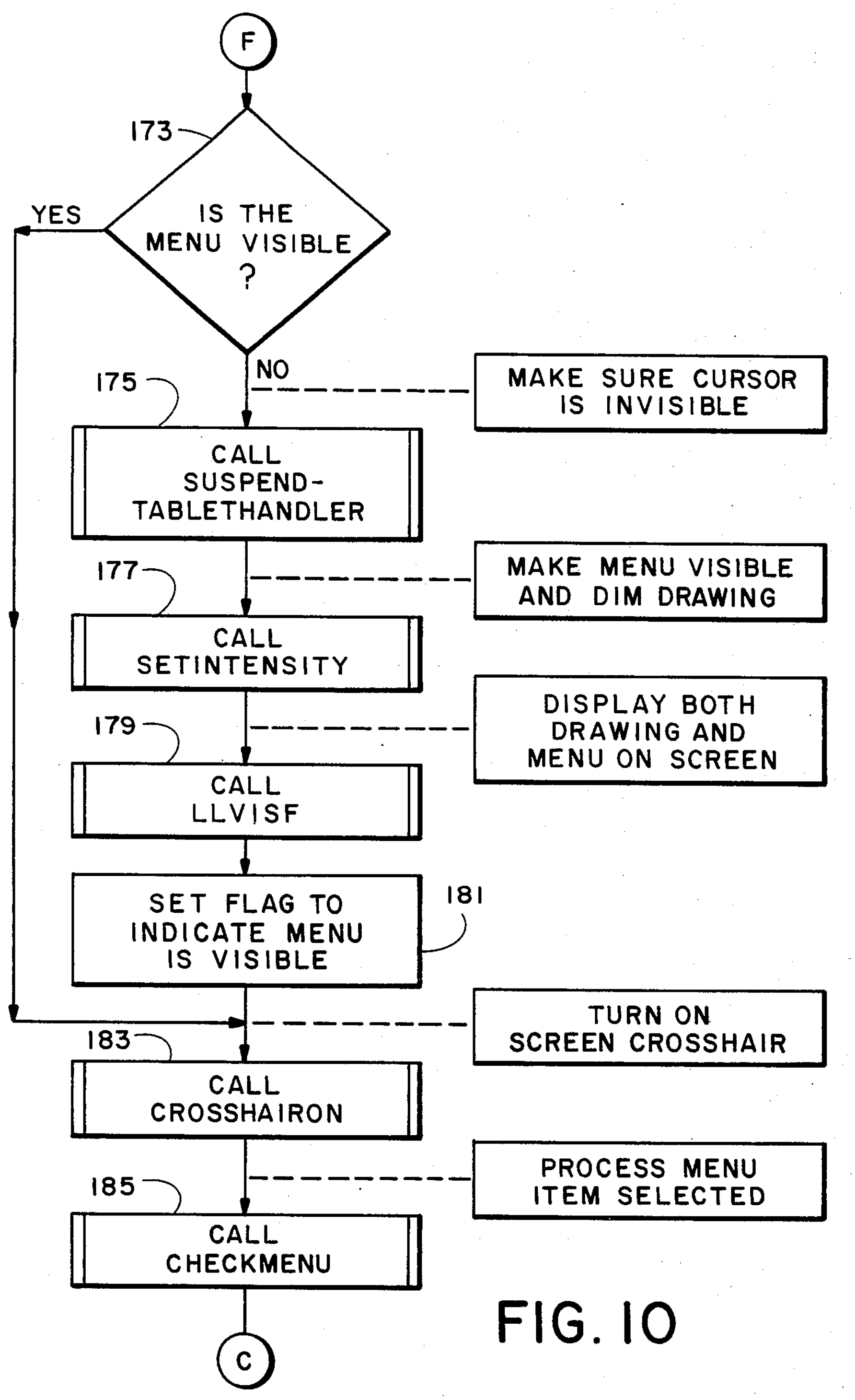

Assuming now that the operator has selected the menu area with is stylus and referring to FIG. 10, a MenuVisible flag is checked to determine if the menu is on in block 173 and if the menu is on program flow is directed to block 183 to turn the crosshair on. However if the menu is not on block 173 directs program flow to block 175 where the SuspendTabletHandler subroutine is called to make the nibble cursor invisible if it is currently visible. Then in block 177 the menu and drawing surface intensities are set by the SetIntensity subroutine, with the drawing surface being dimmed and the LLVISF library subroutine in block 179 displays the menu surface and the dimmed drawing surface on the screen. The MenuVisible flag is set in block 181 and then in block 183 the crosshair is turned on by calling a CrosshairOn subroutine. The crosshair appears on the screen in the x,y location corresponding to the x,y location of the stylus on the tablet. At this point the CheckMenu subroutine of FIG. 34 is called to enable the operator to select a menu item.

Figure 34:
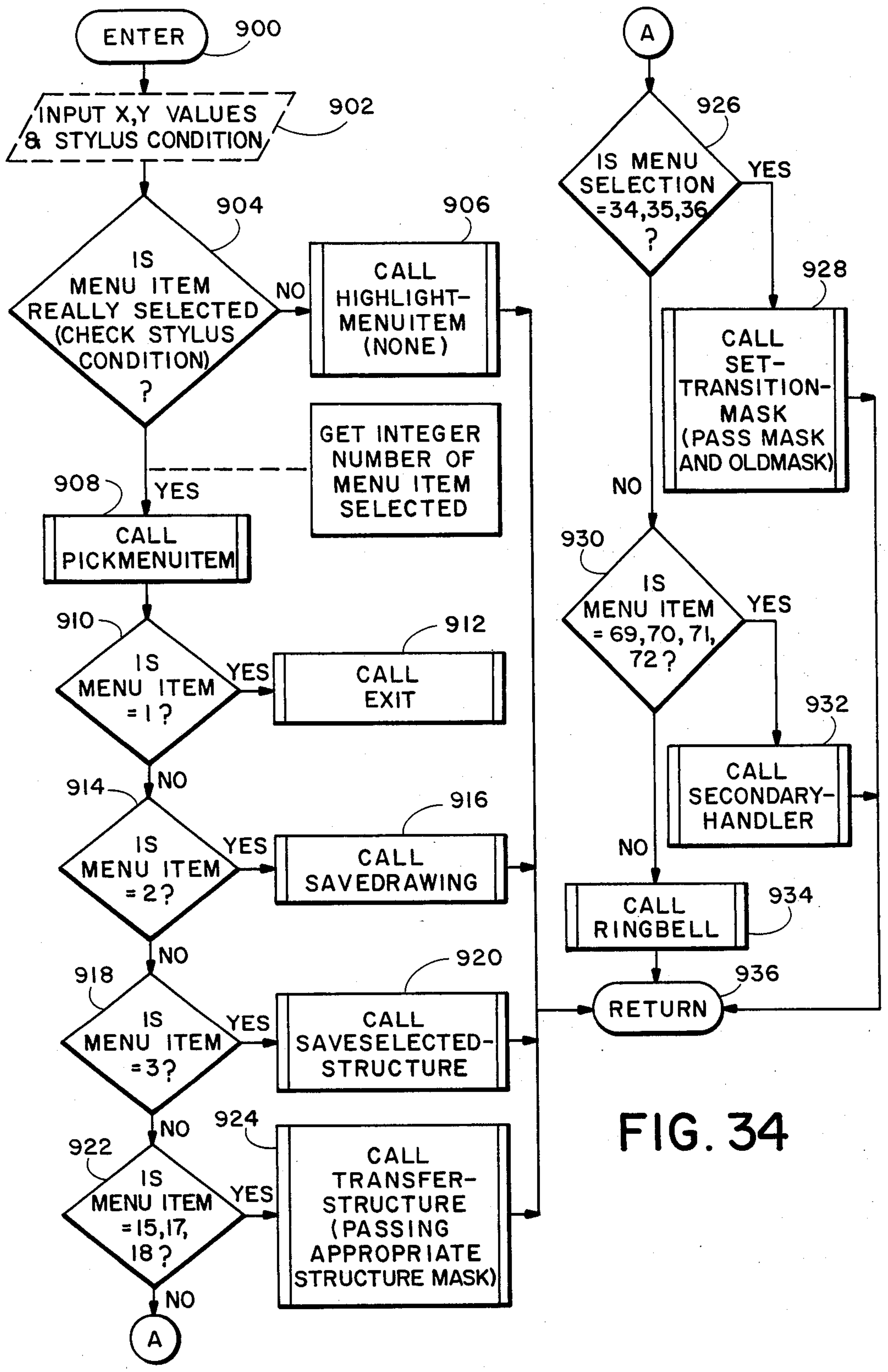
FIG. 34 is a flow chart of the CheckMenu subroutine of FIGS. 3-10.

Referring to FIG. 34, the CheckMenu subroutine begins in block 900 and then in block 902 obtains the x,y and z parameter values. If the crosshair is not on a menu item then block 904 directs action to block 906 where the HighlightMenuItem subroutine is called to dim any highlighted menu item, the subroutine then ending in lock 936. If a menu item was selected, then block 904 directs program flow to block 908 where a PickMenuItem subroutine is called to determine the number of the menu item selected and to return that number as a "menu item" variable. Program flow is then directed by blocks 910, 914, 918, 922, 926 and 930 depending on the menu item number selected by the operator.

It menu item 1 was chosen, labled "Exit" on the screen, then block 910 directs program flow to block 912 where the Exit subroutine described earlier is called to end program operation and return to CP/M operating system.

If menu item number 2, labeled "Save Drawing" on the screen, is selected then block 914 directs operation to block 916 where a SaveDrawing subroutine is called which stores the present state of the drawing data representing all template, ink, pencil and masked template lines in a disk file. This file may later be recalled and restructured if desired. The subroutine then ends in block 936.

If the operator has selected menu item number 3, "Save Pencil", then block 918 directs program flow to block 920. A SaveSelectedStructure subroutine is called which saves only the current pencil structure in a disk file for later use. This feature permits the operator to save a selected portion of the drawing for later restructuring. The subroutine then ends in block 936.

If the operator has selected menu items 15, 17 or 18, shown on the screen as "Unmask All", "Erase All Pencil", and "Ink All Pencil", respectively, then subroutine TransferStructure is called in block 924 to perform the indicated operation. If "Unmask All" is selected, then all masked template lines are unmasked and displayed on the screen. If "Erase All Pencil" is selected the pencil structure is deleted although any corresponding template lines remain. If the "Ink All Pencil" operation is selected, all lines and points in the pencil structure are converted to ink lines and the data corresponding to the inked structure is stored in an output disk file for later use by a CAD system. After performing the indicated operation the CheckMenu subroutine in ended in block 936.

When a menu item 34, 35 or 36 is chosen the cursor operation is selected as either "Mask Template", "Erase", or "Pencil". Block 926 diverts program flow to block 928 where subroutine SetTransitionMask is called to set the cursor mode. Thereafter lines and nodes selected by the nibble cursor will either be masked, erased or penciled in depending on the mode selected.

When menu items 69, "Select Small Radius", 70 , "Select Large Radius", 71, "Set Line Mode" or 72 "Set Polyline Mode" are selected block 930 directs program flow to block 932 to call a SecondaryHandler subroutine to change the selection characteristics of the cursor. If item 69 is selected the maximum distance the cursor must be from a line in order to select the line (the cursor radius) is set to a small, predetermined distance. If menu item 70 was selected, then the cursor radius is set to a larger, predetermined value. If item 71 is chosen, the cursor is placed in the single line mode so that lines must be selected by the cursor one line at a time. Finally, if menu item 72 is selected the cursor is placed in the polyline mode so that all lines connected in a node-to-node string up to all nodes having other than two connected lines if the nibble cursor is pointed to any one line in the string.

If the operator points the cursor to a location in the menu area not containing a selection item then block 930 directs program flow to block 934 to call subroutine RingBell to generate a tone indicating an incorrect cursor position. Thereafter, and after all selected menu operations have been executed, the CheckMenu subroutine is terminated at block 936 and returned to the main program module at point C, FIG. 5.

Figure 9:
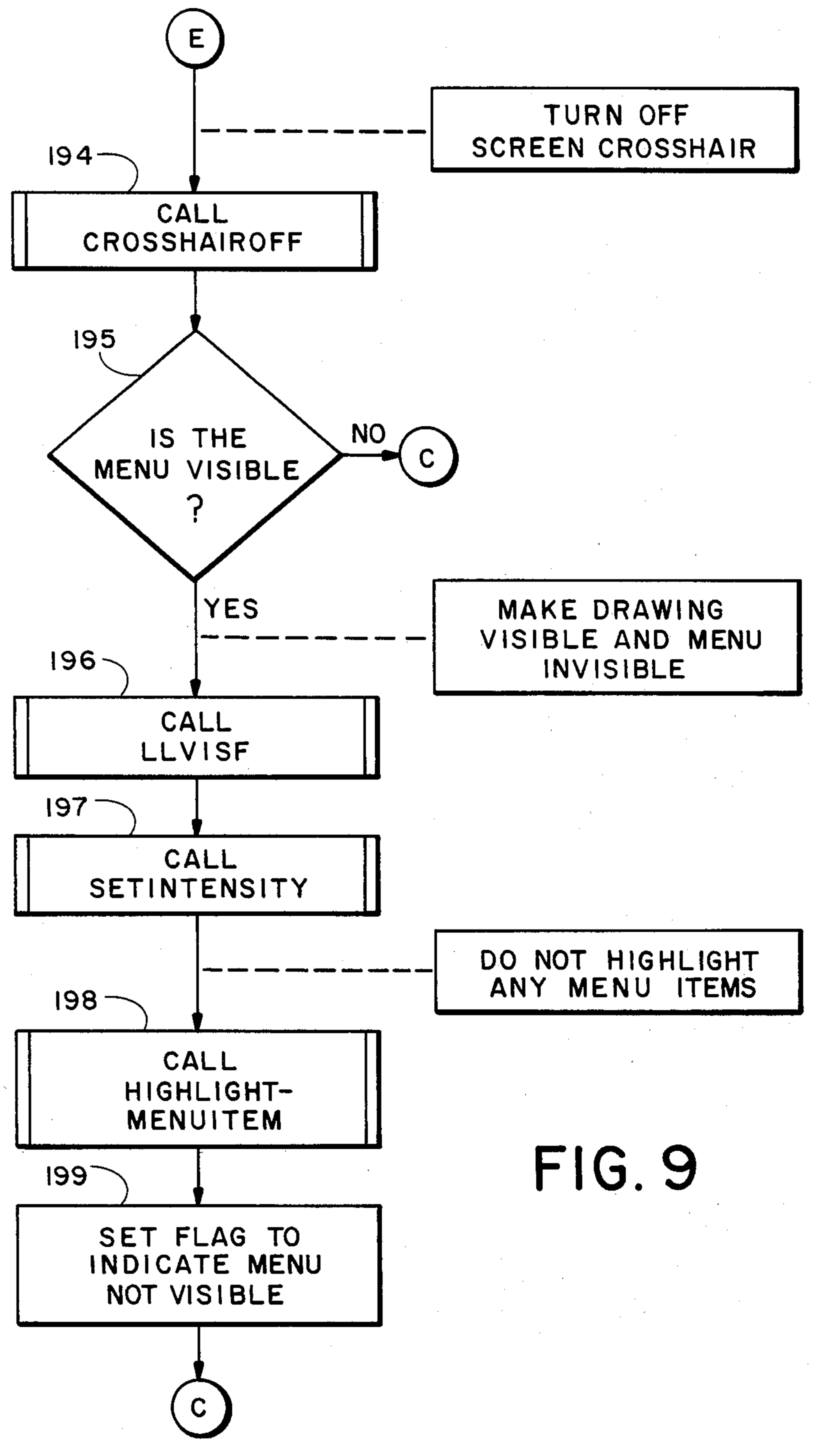

Returning now to FIG. 7 and assuming that the operator has placed the crosshair in the unconstrained graphics area in the lower right corner of the screen, block 174 directs program operation to point E of FIG. 9 leading to block 194. In block 194 the cross hair is turned off, it if was on, by calling subroutine CrosshairOff. Then in block 195 the menu visible flag is checked. If the menu is not visible then program flow is returned to point C of FIG. 5. If the menu is visible, then the menu is turned off before returning to point C of FIG. 5. Block 195 directs the program to block 196 were the LLVISF library subroutine is called to make the menu invisible and make the drawing visible. The intensity of the drawing is increased by calling the SetIntensity subroutine in block 197 and the HighlightMenuItem subroutine in block 198 to dehighlight any highlighted menu item. Then in block 199 the menu visible flag is set to indicate that the menu is not visible. Program operation then returns to point C of FIG. 5.

Figure 8:
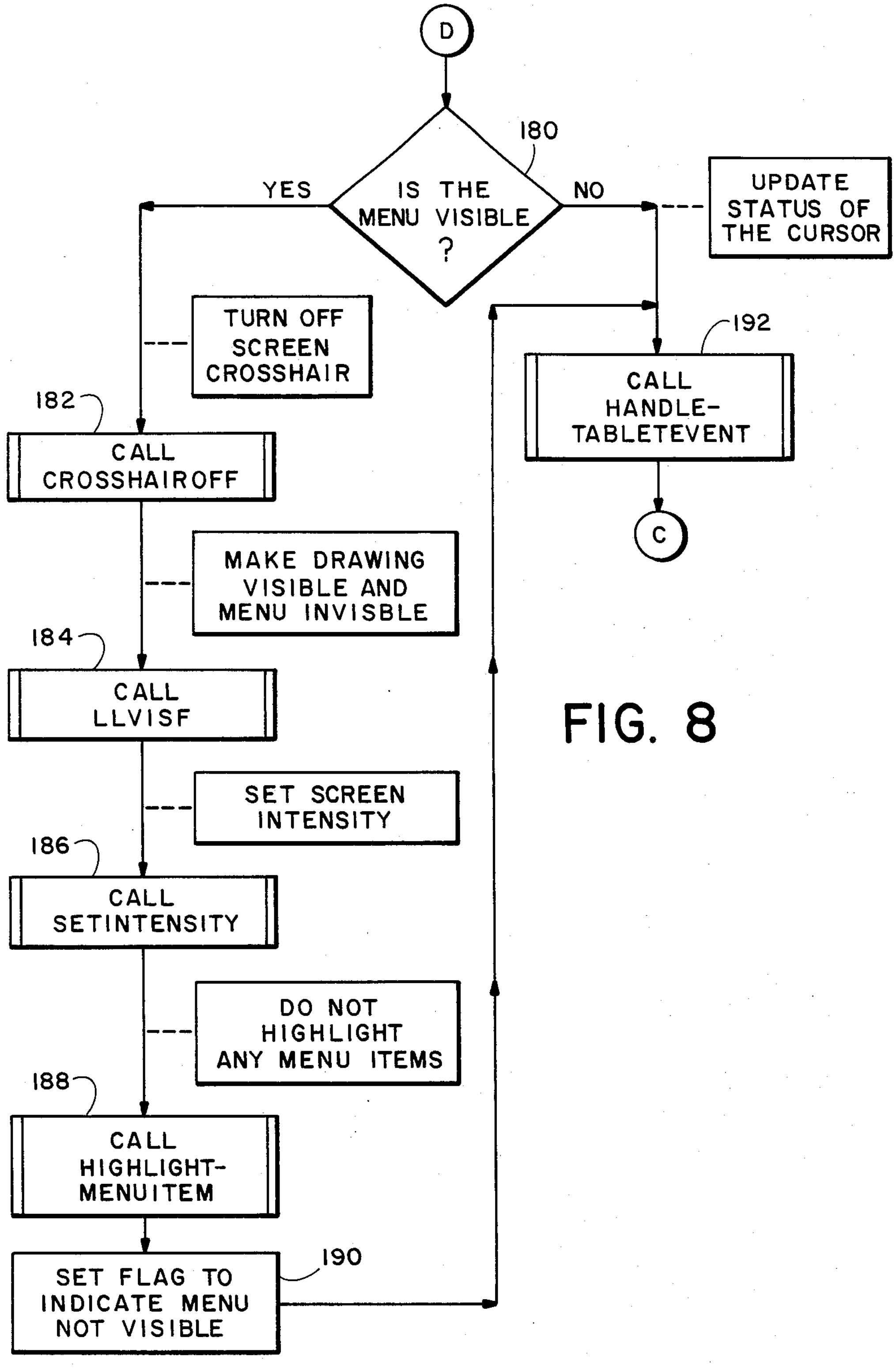

Again returning to FIG. 7, if the operator moves the cursor to the constrained graphics area in the upper portion of the screen block 172 directs program flow to point D of FIG. 8 and then to block 180. In block 180 the menu visible flag is checked. If the menu is visible, block 180 diverts program flow to block 182 where the CrosshairOff subroutine is called to turn off the crosshair, to block 184 where the LLVISF library routine makes the menu invisible and the drawing visible, to block 186 where the SetIntensity subroutine is called to increase the drawing intensity, to block 188 where the HighlightMenuItem subroutine is called to dehighlight any highlighted menu item and to block 190 where the menu visible flag is set to indicate menu not visible. Once the menu is not visible then program flow is directed either from block 180 or block 190 to block 192 where a HandleTabletEvent subroutine is called.

Figure 33:
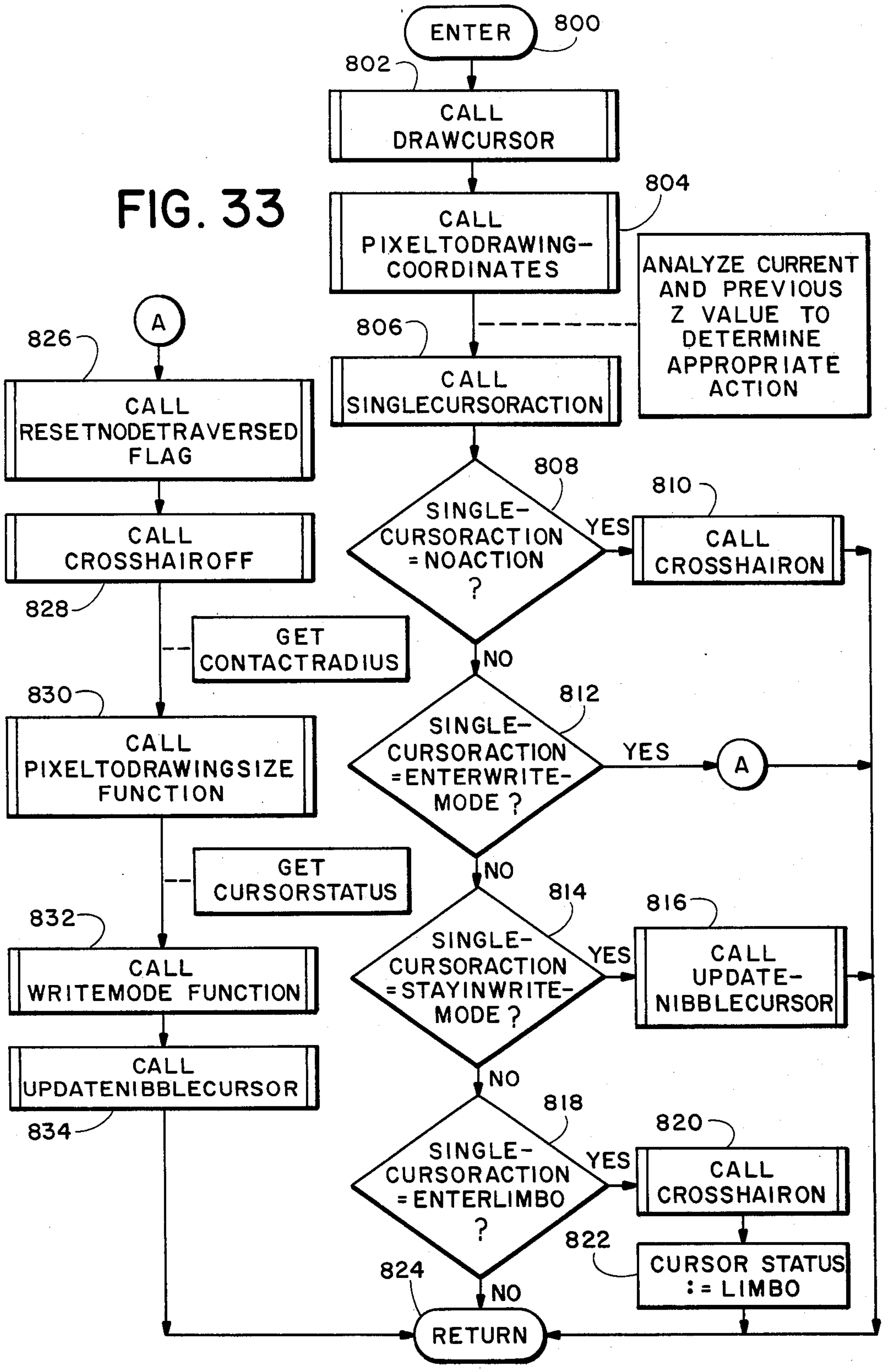
FIG. 33 is a flow chart of the HandleTabletEvent subroutine of FIGS. 3-10.

The HandleTabletEvent subroutine is flowcharted in FIG. 33. Entered in block 800 the subroutine calls a DrawCurser subroutine in block 802 which draws the circular nibble cursor on the cursor surface in the location on the screen corresponding to the position of the stylus on the tablet. The pixel x,y coordinates of the cursor are then converted to drawing x,y coordinates in block 804. Next, in block 806 subroutine SingleCursorAction is called to analyze the current and previous z parameter value, indicating the current and previous condition of the stylus, and to set a SingleCursorAction variable to indicate the next appropriate action. If the condition of the stylus is not depressed and has not changed since the last time the HandleTabletEvent subroutine was called, block 808 directs program flow to block 810 where the CrosshairOn subroutine is called to turn on the crosshair and then the HandleTabletEvent subroutine is terminated in block 824.

If, however, the stylus has been depressed since the last time the HandleTabletEvent routine was called, block 812 directs program flow to point A of FIG. 33 where operations affecting the status of lines selected by the cursor begin to occur. In block 826 a ResetNodeTraversedFlags subroutine resets all "node traversed" flags which have been previously set. Each node in the drawing has an associated "node traversed" flag which is set during any operation modifying data in the data structure. Next, in block 828, subroutine CrosshairOff is called to turn off the crosshair and in block 830 the contact radius parameter of the nibble cursor is converted to drawing units from pixel units by calling the PixelToDrawingSize function. In block 832 the nibble cursor is placed in the erase, pencil or mask mode and in the polyline or single line modes as previously selected by the operator using the menu. Finally in block 834 the line or lines selected by the nibble cursor are erased, penciled or masked according to the selected cursor mode and the HandleTabletEvent subroutine ends in block 824.

Returning to block 812, if the operator has kept the nibble cursor switch on but has moved the position of the cursor, then blocks 812 and 814 direct program mode to block 816 where the UpdateNibbleCursor subroutine is called so that any new lines selected by the cursor are erased, penciled or masked according to the current cursor mode.

If the operator then raises the stylus enough to turn off the stylus switch but does not remove the stylus from the tablet, then block 818 directs program flow to block 820 calling the CrosshairOn routine, to turn the crosshair on, and to block 822 to set the CursorStatus parameter to "limbo". The HandleTabletEvent then ends in block 824 and program flow returns to the main program module at point C of FIG. 5.

This completes the description of FIGS. 3–34. It should be noted that other cursor selection modes may be included according to alternative embodiments of the present invention and incorporated into the program of Appendix I by any programmer skilled in the art. These would include, for instance, "block" selection using the cursor to describe an area, all lines intersecting the area, "gobble" selection where all interconnected lines are selected, using the cursor to select a portion of any one line, "polygon" selection, where all lines forming the closest polygon surrounding the cursor are selected. Also, in alternate embodiments, a text cursor may format areas to receive text entered on keyboard 60. In this way vectorized text may be erased and replaced with better formatted text. These alternative cursor selection methods may be used with the present invention, however only the "nibble" cursor is included in the preferred embodiment particularly by way of example. Finally, in alternative embodiments, an "entry mode" cursor may allow the operator to enter new template, pencil or ink lines not existing in the original drawing.

Thus while a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

```
Source File: A:TEKMAN.PAS

Controls Specified: ERRORPRINT, NOOBJECT, PRINT(D:TEKMAN.LST[G9]), SUBTITLE(
                    TEKMAN EDITOR).

STMT LINE NESTING        SOURCE TEXT: A:TEKMAN.PAS

   1    4  0  0          MODULE Tekman;

   2    8  0  0          {=====================================================================}
                         {                                                                     }
                         {                                                                     }
                         {                                                                     }
                         {                                                                     }
                         {=====================================================================}
                         {                                                                     }
                         {  MODULE:        TekMan                                              }
                         {                    Initialization and control structure for the date file }
                         {                    converter.  As of SR1, contains a few support support }
                         {                    routines not yet moved elsewhere.                }
                         {                                                                     }
                         {  ROUTINES:      Exit                                                }
                         {                    Cleans up after TekMan, reinstalling the device  }
                         {                    drivers used by CP/M.                            }
                         {                                                                     }
                         {                 RingBell                                            }
                         {                    Makes the terminal go 'beep'.                    }
                         {                                                                     }
                         {                                                                     }
                         {                                                                     }
                         {                                                                     }
                         {                                                                     }
                         {                                                                     }
                         {                                                                     }
                         {                                                                     }
                         {                                                                     }
                         {                                                                     }
                         {                                                                     }
                         {=====================================================================}

                         $INCLUDE (Tekman.Ext)
                   =1    PUBLIC TekMan;
                   =1
   3    3  0  0    =1    CONST
                   =1      MaximumLengthOfFileName =   14;
   4    5  0  0    =1      xMaxDisplayPixel        = 1279    {tk4115};
   5    6  0  0    =1      xMaxViewportCoordinate  = 4095    {tk4113};
   6    7  0  0    =1      xNumberOfDisplayPixels  = 1280    {tk4115};
   7    8  0  0    =1      yMaxDisplayPixel        =  959    {tk4115};
   8    9  0  0    =1      yMaxViewportCoordinate  = 3071    {tk4113};
   9   10  0  0    =1      yNumberOfDisplayPixels  =  960    {tk4115};
                   =1
  10   12  0  0    =1    TYPE
                   =1      CursorStatusType = (Limbo,
```

```
                 =1                          WriteMode,
                 =1                          LockMode,
                 =1                          LockAndWriteMode);
                 =1
11   18   0   0  =1       CursorActionType = (NoAction,
                 =1                          EnterWriteMode,
                 =1                          StayInWriteMode,
                 =1                          EnterLimbo,
                 =1                          EnterLockMode,
                 =1                          StayInLockMode,
                 =1                          EnterLockAndWriteMode,
                 =1                          StayInLockAndWriteMode,
                 =1                          ReturnToLockMode,
                 =1                          ReturnToWriteMode);
                 =1
12   29   0   0  =1       FileName         = PACKED ARRAY [1..MaximumLengthOfFilename] OF CHAR;
                 =1
13   31   0   0  =1       GINType          = (ConstrainedGIN,
                 =1                          UnconstrainedGIN,
                 =1                          MenuSelection);

14   41   0   0         PUBLIC Tekman;

15   43   0   0           PROCEDURE Exit;
16   44   0   0           PROCEDURE OpenOutputFile;
17   45   0   0           PROCEDURE RingBell;
18   46   0   0           PROCEDURE WriteCharacterToOutputFile (Ch : Char);
19   47   0   0           PROCEDURE WriteLnToOutputFile;

20   49   0   0         PUBLIC Writepix;
21   50   0   0           PROCEDURE InitializeWritePix;
22   51   0   0           PROCEDURE SaveDrawing;
23   52   0   0           PROCEDURE SaveSelectedStructure;
24   53   0   0           PROCEDURE TerminateWritePix;

25   55   0   0         PUBLIC Nibble;
26   56   0   0           PROCEDURE Initialize;
27   57   0   0           PROCEDURE SuspendTabletHandler;
28   58   0   0           PROCEDURE HandleTabletEvent(xPixelGin,yPixelGin:INTEGER;Stylus:CHAR);
29   59   0   0           PROCEDURE SecondaryMenuHandler(ItemNumber:INTEGER);
30   60   0   0         PUBLIC BankRam;

31   62   0   0           FUNCTION  InitializeBankSwitchedMemory : LongInt;
32   63   0   0           FUNCTION  NumberOfAvailableParagraphs  : LongInt;

33   65   0   0         $INCLUDE (CursDraw.Ext)
                 =1     PUBLIC CursorDrawing;
                 =1
34    3   0   0  =1       PROCEDURE DrawCursor (Mode    : TypeOfNeighbor;
                 =1                             x,y     : Integer;
                 =1                             Radius  : Integer);
                 =1
35    7   0   0  =1       PROCEDURE EraseCursor;
                 =1
36    5   0   0  =1       PROCEDURE InitializeCursorDrawing;
```

```
37   67  0  0       $INCLUDE (Cursor.Ext)
               =1   PUBLIC Cursor;
38    2  0  0  =1     PROCEDURE InitializeCursor;
               =1
39    4  0  0  =1     PROCEDURE IssueStatusMessage (     x,y    : Integer;
               =1                                VAR Text   : Bytes;
               =1                                    Length : Integer);
               =1
40    8  0  0  =1     PROCEDURE SelectCursorSurface;
               =1
41   10  0  0  =1     PROCEDURE SelectGraphicsSurfaces;
               =1
42   12  0  0  =1     PROCEDURE SelectMenuSurface;
               =1
43   14  0  0  =1     PROCEDURE SetLineIndex (LineIndex : Integer);

44   69  0  0       $INCLUDE (ioSupLib.Ext)
               =1   PUBLIC IOsupportLibrary;
               =1
45    3  0  0  =1     PROCEDURE ReadQuotedString  (VAR InputFile     : Text;
               =1                                VAR Str           : Bytes;
               =1                                    MaximumLength : Integer);
               =1
46    7  0  0  =1     PROCEDURE ReadUnquotedString (VAR InputFile     : Text;
               =1                                 VAR Str           : Bytes;
               =1                                     MaximumLength : Integer);

47   71  0  0       $INCLUDE (LTI.Ext)
               =1   PUBLIC LTI;
               =1
48    3  0  0  =1   PROCEDURE LLBPXL (VAR Surface,ALU.Bits : INTEGER);   {Begin-Pixel-Operations}
49    4  0  0  =1   PROCEDURE LLCLMD (VAR Mode,Overlav,Grey : INTEGER);  {Set-Color-Mode}
50    5  0  0  =1   PROCEDURE LLCLMP (VAR Surface.Len : INTEGER:VAR Map : BYTES); {Set-Surface-Color-Map}
51    6  0  0  =1   PROCEDURE LLDAEN (VAR Enabled : INTEGER);            {Enable-Dialogue-Area}
52    7  0  0  =1   PROCEDURE LLDALN (VAR Lines : INTEGER);              {Set-Dialogue-Area-Lines}
53    8  0  0  =1   PROCEDURE LLDASF (VAR Surface : INTEGER);            {Set-Dialogue-Area-Surface}
54    9  0  0  =1   PROCEDURE LLDAVS (VAR Vis : INTEGER);                {Set-Dialogue-Area-Visibility}
55   10  0  0  =1   PROCEDURE LLDAXY (VAR X,Y : INTEGER);                {Set-Dialogue-Area-Position}
56   11  0  0  =1   PROCEDURE LLDLSG (VAR Seg : INTEGER);                {Delete-Segment}
57   12  0  0  =1   PROCEDURE LLDLVW (VAR View : INTEGER);               {Delete-View}
58   13  0  0  =1   PROCEDURE LLGPRC (VAR Precision: INTEGER);           {Set-Graphtext-Precision}
59   14  0  0  =1   PROCEDURE LLGSIZ (VAR Width,Height,Spacing:INTEGER); {Set-Graphtext-Size}
60   15  0  0  =1   PROCEDURE LLINIT (VAR TerminalType : INTEGER);       {LTI-Initialization}
61   16  0  0  =1   PROCEDURE LLLNIN (VAR Index: INTEGER);               {Set-Line-Index}
62   17  0  0  =1   PROCEDURE LLMOVE (VAR X,Y: INTEGER);                 {Move}
63   18  0  0  =1   PROCEDURE LLRCFL (VAR X1,Y1,X2,Y2.Pen : INTEGER);    {Rectangle-Fill}
64   19  0  0  =1   PROCEDURE LLSYNC;                                    {Synchronize Firmware}
65   20  0  0  =1   PROCEDURE LLTEXT (VAR Count:INTEGER:VAR Str:BYTES:Dummy:INTEGER): {Graphic-Text}
66   21  0  0  =1   PROCEDURE LLVISI (VAR Count : INTEGER;VAR Vis : BYTES); {Set-Surface-Visibility}
67   22  0  0  =1   PROCEDURE LLVKLK (VAR Lockmode : INTEGER);           {Lock-Viewing-Keys}
68   23  0  0  =1   PROCEDURE LLVWAT (VAR Surface,Wipe,Border:INTEGER);  {Set-View-Attributes}
69   24  0  0  =1   PROCEDURE LLVWPT (VAR X1,Y1,X2,Y2 : INTEGER);        {Set-Viewport}
70   25  0  0  =1   PROCEDURE LLWAIT (VAR TimerInterval : INTEGER);      {Pause for interval}
71   26  0  0  =1   PROCEDURE LLWIND (VAR X1,Y1.X2.Y2 : INTEGER);        {Set-Window}
```

```
72   73  0  0       $INCLUDE (MaskDefs.Ext)
                =1  PUBLIC MaskDefinitions:
73    2  0  0 =1      VAR
                =1      ClearSelectedStructureMask : TransitionMask:
74    4  0  0 =1        CorrectModeMask : TransitionMask;
75    5  0  0 =1        HideModeMask : TransitionMask;
76    6  0  0 =1        RecoverHiddenStructureMask : TransitionMask;
77    7  0  0 =1        SelectModeMask : TransitionMask;
78    8  0  0 =1        WriteSelectedStructureMask : TransitionMask;
79    9  0  0 =1        TraverseHiddenMask : TransitionMask;
80   10  0  0 =1        TraversePrimitiveMask : TransitionMask;
81   11  0  0 =1        TraverseReserved6Mask : TransitionMask;
82   12  0  0 =1        TraverseReserved7Mask : TransitionMask;
83   13  0  0 =1        TraverseSelectedMask : TransitionMask;
84   14  0  0 =1        TraverseSelectedWrittenMask : TransitionMask:
85   15  0  0 =1        TraverseUntaggedMask : TransitionMask;
86   16  0  0 =1        TraverseWrittenMask : TransitionMask;

87   75  0  0       $INCLUDE (Menu.Ext)
                =1  PUBLIC Menu;
                =1
88    3  0  0 =1    CONST
                =1    NumberOfRows = 18                   {Number of rows of menu positions} ;
89    5  0  0 =1      NumberOfColumns = 6                 {Number of columns of menu positions} ;
90    6  0  0 =1      NumberOfMenuPositions = 108         {Total Number of Menu Positions} ;
91    7  0  0 =1      PixelTotalWidth = 218               {Total width of each menu position} ;
92    8  0  0 =1      PixelTotalHeight = 49               {Total height of each menu position} ;
93    9  0  0 =1      PixelBoxWidth = 189                 {Width of each menu box} ;
94   10  0  0 =1      PixelBoxHeight = 35                 {Height of each menu box} ;
95   11  0  0 =1      PixelHorizontalOrigin = 0           {X origin for first menu box} ;
96   12  0  0 =1      PixelVerticalOrigin = 78            {Y origin for first menu box} ;
97   13  0  0 =1      TextHorizontalOffset = 8            {X offset for text} ;
98   14  0  0 =1      TextVerticalOffset = 6              {Y offset for text} ;
99   15  0  0 =1      MenuTextPrecision = 2               {Stroke Precision} ;
100  16  0  0 =1      AlphaHeightBelowCharacter = 6       {Height below each character in pixels} ;
101  17  0  0 =1      AlphaHeightAboveCharacter = 4       {Height above each character in pixels} ;
102  18  0  0 =1      AlphaTextHeight = 28                {Total Height of each character in pixels} ;
103  19  0  0 =1      AlphaSpaceBetweenCharacters = 2     {Space between characters in pixels} ;
104  20  0  0 =1      AlphaTextWidth = 16                 {Total Width of each character in pixels} ;
105  21  0  0 =1      GraphicHeightBelowCharacter = 3     {Height below each character in pixels} ;
106  22  0  0 =1      GraphicHeightAboveCharacter = 3     {Height above each character in pixels} :
107  23  0  0 =1      GraphicTextHeight = 14              {Total Height of each character in pixels} :
108  24  0  0 =1      GraphicSpaceBetweenCharacters = 2   {Space between characters in pixels} :
109  25  0  0 =1      GraphicTextWidth = 9                {Total Width of each character in pixels} ;
110  76  0  0         PROCEDURE InitializeMenu;
111  77  0  0         PROCEDURE EraseMenuItem(N:INTEGER);
112  78  0  0         PROCEDURE HilightMenuItem(N:INTEGER);
113  79  0  0         PROCEDURE LabelMenuItem(N:INTEGER;VAR Line1.Line2:BYTES);
114  80  0  0         FUNCTION  PickMenuItem(X,Y:INTEGER):INTEGER;

115  82  0  0       $INCLUDE (ParamSup.Ext)
                =1  PUBLIC ParameterSupport:
                =1
116   3  0  0 =1      FUNCTION  ParseFileNames (     NumberOfFileNames    : Integer;
```

```
                =1                    VAR DefaultFileNameList : Bytes) : Boolean;
                =1
117   6  0  0  =1   PROCEDURE GetFileName (    i                   : Integer;
                =1                      VAR FileNameVariable : FileName;
                =1                      VAR NewExtension     : Bytes);

118  84  0  0      $INCLUDE (PixelSys.Ext)
                =1 PUBLIC PixelSys;
119   2  0  0  =1   PROCEDURE SetPixelWindow (x1,y1, x2,y2 : INTEGER);
                =1
120   4  0  0  =1   PROCEDURE PixelMoveTransformed (x, y : INTEGER);
                =1
121   6  0  0  =1   PROCEDURE PixelDrawTransformed (x, y : INTEGER);

122  86  0  0      $INCLUDE (PollCh.Ext)
                =1 PUBLIC PollCh;
                =1
123   3  0  0  =1   FUNCTION PollChar : Char;

124  88  0  0      $INCLUDE (ReadPix.Ext)
                =1 PUBLIC ReadPix;
                =1
125   3  0  0  =1   PROCEDURE GetDrawingLimits (VAR xLow,yLow,  xHigh,yHigh : Integer);
                =1
126   5  0  0  =1   PROCEDURE InitializeDrawing;
                =1
127   7  0  0  =1   PROCEDURE ReadDrawing (VAR InputFile   : Text;
                =1                             xMin,yMin   : Integer;
                =1                             xMax,yMax   : Integer;
                =1                         VAR xLow,yLow   : Integer;
                =1                         VAR xHigh,yHigh : Integer);

128  90  0  0      $INCLUDE (Redraw.Ext)
                =1 PUBLIC Redraw;
                =1
129   3  0  0  =1  TYPE
                =1   ColorNameType = PACKED ARRAY [1..10] OF CHAR;
                =1
130   6  0  0  =1   PROCEDURE EraseSurface(Surface:INTEGER);
131   7  0  0  =1   PROCEDURE InitializeRedraw;
132   8  0  0  =1   PROCEDURE InquireColor(ColorNumber:INTEGER;VAR ColorName:ColorNameType;
                =1                      VAR Red,Green,Blue:INTEGER);
133  10  0  0  =1   PROCEDURE InquireDrawingWindow(VAR x1,y1, x2,y2 : INTEGER);
134  11  0  0  =1   PROCEDURE PixelToDrawingCoordinates(    xPixel,   yPixel:   INTEGER;
                =1                                  VAR xDrawing, yDrawing: INTEGER);
135  13  0  0  =1   FUNCTION  PixelToDrawingSize(PixelSize:INTEGER):INTEGER;
136  14  0  0  =1   PROCEDURE SetColor(ColorNumber,Red,Green,Blue:INTEGER);
137  15  0  0  =1   PROCEDURE SetIntensity(Intensity:INTEGER);
138  16  0  0  =1   PROCEDURE SelectColorMap (MapNumber, Intensity : INTEGER);
139  17  0  0  =1   PROCEDURE SetDrawingWindow(x1,y1, x2,y2 : INTEGER);
140  18  0  0  =1   PROCEDURE SetWindowLimits(x1,y1, x2,y2 : INTEGER);

141  92  0  0      $INCLUDE (Spatial.Ext)
                =1                  { Spatial Data Structure Routines}
                =1
```

```
                =1     PUBLIC SpatialLibrary;
                =1
142    5  0  0  =1       CONST
                =1         NilConnection        = 0;
143    7  0  0  =1         NilNode              = 0;
144    8  0  0  =1         MaxConnections       = 14;
                =1
145   10  0  0  =1       TYPE
                =1         ConnectionPointer    = LongInt;
                =1
146   13  0  0  =1         NodePointer          = LongInt;
                =1
147   15  0  0  =1         PointerToNodePointer= ^NodePointer;
                =1
148   17  0  0  =1         StateType            = (Hidden,
                =1                                 Untagged,
                =1                                 Selected,
                =1                                 Written,
                =1                                 SelectedAndWritten,
                =1                                 Primitive,
                =1                                 Reserved6,
                =1                                 Reserved7);
                =1
149   26  0  0  =1         StructureActionType = (DoNothing,
                =1                                 AddToStructure,
                =1                                 DeleteFromStructure);
                =1
150   30  0  0  =1         TransitionMask       = PACKED ARRAY [Hidden..Reserved7] OF CHAR;
                =1
151   32  0  0  =1         TypeOfNeighbor       = (Nodes, Lines, Edges);
                =1
                =1
                =1
152   36  0  0  =1       FUNCTION  ConnectionTraversable (Connection : ConnectionPointer) : Boolean;
                =1
153   38  0  0  =1       FUNCTION  CreateConnection (Node1          : NodePointer;
                =1                                   Node2          : NodePointer;
                =1                                   FilledAreaFlag : Boolean;
                =1                                   ConnectionState: StateType)
                =1                                  : ConnectionPointer;
                =1
154   44  0  0  =1       FUNCTION  CreateDuplicateNode (x,y : INTEGER)
                =1                                      : NodePointer;
                =1
155   47  0  0  =1       PROCEDURE DeleteConnection (Connection : ConnectionPointer);
                =1
156   49  0  0  =1       PROCEDURE DeleteNode (Node : NodePointer);
                =1
157   51  0  0  =1       PROCEDURE DeleteNodeAndConnections (Node : NodePointer);
                =1
158   53  0  0  =1       PROCEDURE DeleteObject (Node  : NodePointer;
                =1                               State : StateType);
                =1
159   56  0  0  =1       FUNCTION  EdgeConnection (CurrentConnection : ConnectionPointer)
                =1                                : ConnectionPointer;
```

```
                =1
160   59  0  0  =1     FUNCTION  EndNode (Connection : ConnectionPointer)
                =1                         : NodePointer;
                =1
161   62  0  0  =1     FUNCTION  ExamineNodeTraversedFlag (Node : NodePointer)
                =1                                            : Boolean;
                =1
162   65  0  0  =1     FUNCTION  FindNeighbors (    x,y                    : INTEGER;
                =1                                  Radius                 : INTEGER;
                =1                                  MaximumNumber          : INTEGER;
                =1                                  NeighborMode           : TypeOfNeighbor;
                =1                              VAR Neighbors              : BYTES;
                =1                              VAR DistanceToNeighbors    : BYTES)
                =1                             : INTEGER;
                =1
                =1
163   74  0  0  =1     FUNCTION  FirstConnectionInPolyline (CurrentConnection : ConnectionPointer)
                =1                                              : ConnectionPointer;
                =1
164   77  0  0  =1     FUNCTION  FirstConnectionInTile (i,j       : INTEGER;
                =1                                      xMin,yMin : INTEGER;
                =1                                      xMax,yMax : INTEGER)
                =1                                     : ConnectionPointer;
                =1
165   82  0  0  =1     FUNCTION  FirstNodeInTile (i,j : INTEGER)
                =1                               : NodePointer;
                =1
166   85  0  0  =1     FUNCTION  FirstTraversedNode : NodePointer;
                =1
167   87  0  0  =1     FUNCTION  FirstPolylineInObject (Node : NodePointer)
                =1                                     : ConnectionPointer;
                =1
168   90  0  0  =1     FUNCTION  GetConnection (Node              : NodePointer;
                =1                              ConnectionNumber : INTEGER)
                =1                             : ConnectionPointer;
                =1
169   94  0  0  =1     PROCEDURE GetConnectionInformation (    Connection : ConnectionPointer;
                =1                                         VAR Edge       : Boolean;
                =1                                         VAR State      : StateType);
                =1
170   98  0  0  =1     FUNCTION  GetConnectionNumber (Connection : ConnectionPointer)
                =1                                   : INTEGER;
                =1
171  101  0  0  =1     FUNCTION  GetFirstTileContainingLine (x1,y1 : INTEGER;
                =1                                           x2,y2 : INTEGER)
                =1                                          : LONGINT;
                =1
172  105  0  0  =1     FUNCTION  GetNextTileContainingLine : LONGINT;
                =1
173  107  0  0  =1     PROCEDURE GetNodeLocation (    Node : NodePointer;
                =1                                VAR x,y  : INTEGER);
                =1
174  110  0  0  =1     FUNCTION  GetNodePointer (x,y : INTEGER)
                =1                              : NodePointer;
                =1
```

```
175  113  0  0 =1     PROCEDURE GetTileIndex (     x,y : INTEGER;
                =1                             VAR I,J : INTEGER);
                =1
176  116  0  0 =1     FUNCTION  GetTilePointer (I,J : INTEGER)
                =1                              : PointerToNodePointer;
                =1
177  119  0  0 =1     PROCEDURE GetTileStructureParameters (VAR x1,y1    : INTEGER;
                =1                                          VAR x2,y2    : INTEGER;
                =1                                          VAR TileSize : INTEGER);
                =1
178  123  0  0 =1     PROCEDURE InitializeTileStructure (x1,y1    : INTEGER;
                =1                                       x2,y2    : INTEGER;
                =1                                       TileSize : INTEGER);
                =1
179  127  0  0 =1     FUNCTION  InsertNodeIntoConnection (Connection   : ConnectionPointer;
                =1                                        x,v          : INTEGER)
                =1                                       : ConnectionPointer;
                =1
180  131  0  0 =1     FUNCTION  MergeTwoNodes (Node1 : NodePointer;
                =1                             Node2 : NodePointer)
                =1                            : NodePointer;
                =1
181  135  0  0 =1     FUNCTION  MergeThreeNodes (Node1 : NodePointer;
                =1                               Node2 : NodePointer;
                =1                               Node3 : NodePointer)
                =1                              : NodePointer;
                =1
182  140  0  0 =1     FUNCTION  MoveNode ( Node         : NodePointer;
                =1                         NewX, NewY : INTEGER)
                =1                       : Boolean;
                =1
183  144  0  0 =1     FUNCTION  NextConnectionInPolyline (CurrentConnection : ConnectionPointer;
                =1                                         FirstConnection   : ConnectionPointer)
                =1                                        : ConnectionPointer;
                =1
184  146  0  0 =1     FUNCTION  NextConnectionInTile (CurrentConnection : ConnectionPointer)
                =1                                    : ConnectionPointer;
                =1
185  151  0  0 =1     FUNCTION  NextNodeInTile (CurrentNode : NodePointer)
                =1                              : NodePointer;
                =1
186  154  0  0 =1     FUNCTION  NextPolylineInObject : ConnectionPointer;
                =1
187  156  0  0 =1     FUNCTION  NextTraversedNode : NodePointer;
                =1
188  158  0  0 =1     FUNCTION  NumberOfConnections (Node : NodePointer)
                =1                                   : INTEGER:
                =1
189  161  0  0 =1     FUNCTION  NumberOfTilesContainingLine (x1,y1 : INTEGER;
                =1                                           x2,y2 : INTEGER)
                =1                                          : INTEGER:
                =1
190  165  0  0 =1     FUNCTION  ReciprocalConnection (Connection : ConnectionPointer)
                =1                                    : ConnectionPointer;
                =1
```

```
191  168  0  0 =1     PROCEDURE ReleaseTileStructure;
                =1
192  170  0  0 =1     PROCEDURE ResetNodeTraversedFlags;
                =1
193  172  0  0 =1     PROCEDURE SetDuplicateOutputEnabled (DuplicateOutput : Boolean);
                =1
194  174  0  0 =1     PROCEDURE SetNodeTraversedFlag (Node : NodePointer);
                =1
195  176  0  0 =1     PROCEDURE SetTransitionMask (VAR NextMask     : TransitionMask;
                =1                                VAR PreviousMask : TransitionMask);
                =1
196  179  0  0 =1     FUNCTION  TransferConnection (CurrentConnection : ConnectionPointer;
                =1                                  NewNode           : NodePointer)
                =1                                : ConnectionPointer;
                =1
197  183  0  0 =1     FUNCTION TransferConnectionField ( CurrentConnection : ConnectionPointer;
                =1                                        NewNode           : NodePointer)
                =1                                      : ConnectionPointer;
                =1
198  187  0  0 =1     PROCEDURE UpdateConnectionStatus
                =1                      (    CurrentConnection        : ConnectionPointer;
                =1                       VAR SelectedStructureAction : StructureActionType;
                =1                       VAR WrittenStructureAction  : StructureActionType);

199   94  0  0       $INCLUDE (TabDemux.Ext)
                =1   PUBLIC TabletDemux;
                =1
200    3  0  0 =1     FUNCTION TabletDemultiplexor (VAR xGIN, yGIN : Integer) : GinType;

201   96  0  0       $INCLUDE (TabletDr.Ext)
                =1   PUBLIC TabletDr;
                =1
202    3  0  0 =1     PROCEDURE GetGIN (VAR x,y : Integer; VAR z : Char);
                =1
203    5  0  0 =1     PROCEDURE OpenTablet;
                =1
204    7  0  0 =1     PROCEDURE CloseTablet;

205   98  0  0       $INCLUDE (ThumbDr.Ext)
                =1   PUBLIC ThumbDr;
                =1
206    3  0  0 =1     PROCEDURE OpenThumbwheels;
                =1
207    5  0  0 =1     PROCEDURE CloseThumbwheels;
                =1
208    7  0  0 =1     PROCEDURE ReadThumbwheels (VAR x,y : Integer);

209  100  0  0       $INCLUDE (Transfer.Ext);
                =1   PUBLIC TransferStructures;
                =1
210    3  0  0 =1     PROCEDURE TransferStructure (Mask : TransitionMask);

211  103  0  0       $INCLUDE (xHairDr.Ext)
                =1   PUBLIC xHairDr;
```

```
                =1
212    3  0  0 =1        PROCEDURE CrossHairOff;
                =1
213    5  0  0 =1        PROCEDURE CrossHairOn (x,y : Integer);

214  106  0  0        {trace} PUBLIC DDTBreak;
215  107  0  0        {trace}
                      {trace}   PROCEDURE DDTBreakPoint;

216  110  0  0        {==========================================================================}

                      PROGRAM Tekman(Input,Output);

217  114  0  0        LABEL 0;

218  116  0  0        TYPE
                        Coordinate =
                          RECORD
218  119  0  1              x : Integer;
219  120  0  1              y : Integer;
220  121  0  1            END;

221  123  0  0          DeviceDesignator = RECORD
221  124  0  1                               Device  : Integer;
222  125  0  1                               Release : Char;
223  126  0  1                             END;

224  128  0  0          DynamicMenuHandlerPointer      = ^DynamicMenuHandler;

225  130  0  0          DynamicMenuHandler =
                          RECORD
225  132  0  1              Line1                       : PACKED ARRAY [1..18] OF Char;
226  133  0  1              Line2                       : PACKED ARRAY [1..18] OF Char;
227  134  0  1              MenuItemNumber              : Integer;
228  135  0  1              NextDynamicMenuHandler      : DynamicMenuHandlerPointer;
229  136  0  1              PrimaryMenuHandlerNumber    : Integer;
230  137  0  1              SecondaryMenuHandlerIndex   : Integer;
231  138  0  1            END;

233  140  0  0          MenuRange                      = 0..NumberOfMenuPositions;

233  142  0  0          ScannerHeaderType =
                          RECORD
233  144  0  1              Hardware    : DeviceDesignator;
234  145  0  1              Software    : Real;
235  146  0  1              Units       : Char;  { M or I }
236  147  0  1              Scale       : Real;
237  148  0  1              LowerLeft   : Coordinate;
238  149  0  1              UpperRight  : Coordinate;
239  150  0  1              Threshold   : 0..100;
240  151  0  1              Background  : Char:  { L or I }
241  152  0  1              VoidSize    : 0..3;
242  153  0  1              DotSize     : 0..3;
243  154  0  1              Smooths     : 0..1;
```

```
244  155  0  1            Grows       : 0..3;
245  156  0  1            Thins       : 0..7;
246  157  0  1            Tolerance   : 0..160;
247  158  0  1          END;

248  162  0  0      VAR
                      { All of the LTL library routines are FORTRAN callable.  This means they }
                      { use VAR parameters exclusively.  Thus constants may not be passed from }
                      { Pascal to LTL routines as parameters.  The following variables are     }
                      { 'variables' whose value is constant.  Their only use is as parameters  }
                      { to LTL routines.                                                        }

                      cnl                      : Integer;     { constant  -1 as variable }
249  170  0  0        c0                       : Integer;     { constant   0 as variable }
250  171  0  0        c1                       : Integer;     { constant   1 as variable }
251  172  0  0        c3                       : Integer;     { constant   3 as variable }
252  173  0  0        c4                       : Integer;     { constant   4 as variable }
253  174  0  0        c10                      : Integer;     { constant  10 as variable }
254  175  0  0        c32                      : Integer;     { constant  32 as variable }
255  176  0  0        c34                      : Integer;     { constant  34 as variable }
256  177  0  0      {trace} c80                : Integer;     { constant  80 as variable }
257  178  0  0        c231                     : Integer;     { constant 231 as variable }

258  180  0  0        ColorMapNumMessage       : PACKED ARRAY [1..5] OF Char;
259  181  0  0                                               { text of 'CM #n' message          }

                      CurrentColorMap          : Integer;     { index of current color map       }

260  185  0  0        FirstDynamicMenuHandler  : DynamicMenuHandlerPointer;
261  186  0  0                                               { vector to current primary menu    }
                                                              { handler                            }

                      InputFile                : Text;        { First used as file variable for   }
262  190  0  0                                               { reading the configuration file.   }
                                                              { After the configuration file has  }
                                                              { been read, used to read the       }
                                                              { picture file.                      }

                      MenuVisible              : Boolean;     { Flag indicating whether or not    }
263  196  0  0                                               { the menu is being displayed.      }

                      OldMask                  : TransitionMask;
264  199  0  0                                               { Dummy - used as return variable   }
                                                              { when the transition mask is       }
                                                              { initialized.                       }

                      ParagraphsAvailable      : LongInt;     { Amount of memory available -      }
265  204  0  0                                               { returned by                        }
                                                              { InitializeBankSwitchedMemory.     }

                      ScannerHeader            : ScannerHeaderType;
266  208  0  0                                               { Structure holding the scanner     }
                                                              { parameters as read from the       }
```

```
                                                         { configuration file.               }
267  213  0  0   Stylus                 : Char;          { Indicates whether or not the      }
                                                         { stylus is in proximity to the     }
                                                         { tablet.                           }
268  217  0  0   TabletMessageVisible   : Boolean;       { Indicates whether or not the      }
                                                         { message 'Waiting for tablet' is   }
                                                         { visible on the screen.            }
                 TileSize               : Integer;       { Size of a tile in scanner pixels  }
269  223  0  0   UtilityFile            : Text;          { First used to read configuration  }
270  223  0  0                                           { file.  Is re-used to write        }
                                                         { picture files.                    }
                 VisBoth                : ARRAY [1..4] OF Integer;
271  227  0  0                                           { Parameters to LLVISE to make both }
                                                         { drawing and menu visible.         }
                 VisDraw                : ARRAY [1..4] OF Integer;
272  231  0  0                                           { Parameters to LLVISE to make the  }
                                                         { drawing visible and the menu      }
                                                         { invisible.                        }
                 VisMenu                : ARRAY [1..4] OF Integer;
273  236  0  0                                           { Parameters to LLVISE to make the  }
                                                         { menu visible and the drawing      }
                                                         { invisible.                        }
                 xHigh                  : Integer;       { Greatest x of any node in drawing }
274  242  0  0   xLow                   : Integer;       { Least x of any node in drawing.   }
275  244  0  0   xLower                 : Integer;       { x coordinate of lower-left corner }
276  245  0  0                                           { of tile structure (as returned by }
                                                         { GetTileStructureParameters).      }
                 xMax                   : Integer;       { x coordinate of upper-right corner}
277  250  0  0                                           { of the scan-area (in scanner      }
                                                         { units)                            }
                 xMin                   : Integer;       { x coordinate of lower-left corner }
278  254  0  0                                           { of the scan-area (in scanner      }
                                                         { units).                           }
                 xPixelGin              : Integer;       { x coordinate of stylus position   }
279  259  0  0   xThumb                 : Integer;       { Number of 'clicks' of horizontal  }
280  260  0  0                                           { thumbwheel since last query.      }
                 xUpper                 : Integer;       { x coordinate of upper right corner}
281  261  0  0                                           { of tile structure (as returned by }
                                                         { GetTileStructureParameters).      }
```

```
               yHigh        : Integer;   { Greatest y of any node in drawing }
282  268  0  0 yLow         : Integer;   { Least y of any node in drawing.   }
283  270  0  0 yLower       : Integer;   { y coordinate of lower-left corner }
284  271  0  0                           { of tile structure (as returned by }
                                         { GetTileStructureParameters).      }

               yMax         : Integer;   { y coordinate of upper-right corner}
285  276  0  0                           { of the scan-area (in scanner      }
                                         { units).                           }

               yMin         : Integer;   { y coordinate of lower-left corner }
286  280  0  0                           { of the scan-area (in scanner      }
                                         { units).                           }

               yPixelGin    : Integer;   { y coordinate of stylus position   }
287  285  0  0 yThumb       : Integer;   { Number of 'clicks' of vertical    }
288  286  0  0                           { thumbwheel since last query.      }

               yUpper       : Integer;   { y coordinate of upper-right corner}
289  289  0  0                           { of tile structure (as returned by }
                                         { GetTileStructureParameters).      }


               $subtitle('      Initialization PROCEDUREs')

                                 INITIALIZATION PROCEDURES

STMT LINE NESTING  SOURCE TEXT: A:TEKMAN.PAS

               {==================================================================}
               { ProcessHeaderFile        Reads scanner-produced header from the   }
               {                          drawing file.                            }
               {==================================================================}

               PROCEDURE ProcessHeaderFile;

290  304  1  0   VAR
                   InputFileName : FileName;

291  307  1  0   BEGIN { ProcessHeaderFile }
291  308  1  1     GetFileName (1, InputFileName, '?PIX');
292  309  1  1     RESET (InputFile, InputFileName);

293  311  1  1     { Whatever we are going to do with the header file goes here     }
                   {  -- one of the things in the header will be the scanner limits }
                   {  -- the following are the 'prototype' values:                 }
```

```
                     WITH ScannerHeader DO
294  316  1  1         BEGIN
294  317  1  2           LowerLeft.x  :=    0;
295  318  1  2           LowerLeft.y  :=    0;
296  319  1  2           UpperRight.x := 7400 * 4;
297  320  1  2           UpperRight.y := 5550 * 4;
298  321  1  2         END;

300  323  1  1       WITH ScannerHeader DO
301  324  1  1         BEGIN
301  325  1  2           xMin := LowerLeft.x;
302  326  1  2           yMin := LowerLeft.y;
303  327  1  2           xMax := UpperRight.x;
304  328  1  2           yMax := UpperRight.y;
305  329  1  2         END;
307  330  1  1     END   { ProcessHeaderFile };

308  333  0  0   {==========================================================================}
                 { InitializeVariables          This procedure initializes all variables     }
                 {                              in all TekMan modules.                        }
                 {==========================================================================}

                 PROCEDURE InitializeVariables;

309  340  1  0     CONST
                     CursorSurface  = 3;
310  342  1  0       DrawingSurface = 2;
311  343  1  0       Invisible      = 0; { 4113 Surface-Visibility Code }
312  344  1  0       MenuSurface    = 1;
313  345  1  0       Visible        = 1; { 4113 Surface-Visibility Code }

314  345  1  0     VAR
                     TerminalType: Integer;

315  351  1  0     BEGIN { InitializeVariables }
315  352  1  1       LLINIT (TerminalType);  { Returns terminal type }

316  354  1  1       cnl   :=   -1;
317  355  1  1       c0    :=    0;
318  356  1  1       c1    :=    1;
319  357  1  1       c3    :=    3;
320  358  1  1       c4    :=    4;
321  359  1  1       c10   :=   10;
322  360  1  1       c32   :=   32;
323  361  1  1       c34   :=   34;
324  362  1  1   {trace} c80 := 80;
325  363  1  1       c231  :=  231;

326  365  1  1       { VisMenu, VisDraw, and VisBoth are arrays of parameters to the LTL }
                     { routine LLVISF.  Odd subscripts specify the surface and even      }
                     { subscripts specify the visibility/invisibility.                   }
```

```
{ For example, VisMenu is set to make the menu visible and the      }
{ drawing invisible.  The cursor (since it is not referenced) is    }
{ not changed.                                                      }

   VisMenu [1] := MenuSurface;
   VisMenu [2] := Visible;
   VisMenu [3] := DrawingSurface;
   VisMenu [4] := Invisible;

   VisDraw [1] := DrawingSurface;
   VisDraw [2] := Visible;
   VisDraw [3] := MenuSurface;
   VisDraw [4] := Invisible;

   VisBoth [1] := MenuSurface;
   VisBoth [2] := Visible;
   VisBoth [3] := DrawingSurface;
   VisBoth [4] := Visible;

   InitializeRedraw;
   InitializeCursor;
   InitializeWritePix;
 END; {InitializeVariables}

{===========================================================================}
{ InitializeGraphics          This procedure initializes the display and   }
{                             global variables for graphics.  DO NOT call  }
{                             this procedure until done with the dialogue  }
{                             area.                                         }
{===========================================================================}

PROCEDURE InitializeGraphics;

 VAR
   VarXMaxViewportCoordinate : Integer;
   VarXMaxDisplayPixel       : Integer;
   VarYMaxViewportCoordinate : Integer;
   VarYMaxDisplayPixel       : Integer;

 BEGIN
   LLVKLK(cl);                          {$Lock-Viewing-Keys}
   EraseSurface(-1);
   LLDLVW(cnl);                         {$Delete-View}
   LLDLSG(cnl);                         {$Delete-Segment}

   VarXMaxDisplayPixel := xMaxDisplayPixel;
   VarYMaxDisplayPixel := yMaxDisplayPixel;
   LLWind (c0, c0, VarXMaxDisplayPixel, VarYMaxDisplayPixel); { Set Window }

   VarXMaxViewportCoordinate := xMaxViewportCoordinate;
   VarYMaxViewportCoordinate := yMaxViewportCoordinate:
                                        {Set Viewport }
   LLVwPt (c0, c0, VarXMaxViewportCoordinate, VarYMaxViewportCoordinate):
```

```
357  423  1  1        LLDAVS(c0);                           {$Set-Dialogue-Area-Visibility}
358  424  1  1        LLDASF(c3);                           {$Set-Dialogue-Area-Surface}
359  425  1  1        LLDALN(c32);                          {$Set-Dialogue-Area-Lines}
360  426  1  1        LLDAXY(c0,c231);                      {$Set-Dialogue-Area-Position}
361  427  1  1        LLCLMD(c1,c1,c1);                     {$Set-Color-Mode}
362  428  1  1        CurrentColorMap := 1;
363  429  1  1        SelectColorMap (CurrentColorMap, 2);
364  430  1  1        LLVISF(c4,VisDraw);                   {$Set-Surface-Visibility}

365  432  1  1        SetWindowLimits (       0,          0,  { lower left }
                                        xMax - 1,  yMax - 1); { upper right }

366  434  1  1      END; {InitializeGraphics}
367  435  0  0    $subtitle('                Input PROCEDUREs')

                  {=====================================================================}
                  { OpenOutputFile      Opens UtilityFile for output to ?.OUT          }
                  {=====================================================================}

                    PROCEDURE OpenOutputFile;

368  445  1  0        VAR
                        OutputFileName : FileName;

369  448  1  0        BEGIN { OpenOutputFile }
369  449  1  1          GetFileName (1, OutputFileName, 'OUT');
370  450  1  1          Rewrite (UtilityFile, OutputFileName);
371  451  1  1        END   { OpenOutputFile };


372  455  0  0    {=====================================================================}
                  { WriteCharacterToOutputFile  . Writes one character to the output file   }
                  {=====================================================================}

                    PROCEDURE WriteCharacterToOutputFile (Ch : Char);

373  461  1  0        BEGIN { WriteCharacterToOutputFile }
373  462  1  1          Write (UtilityFile, Ch);
374  463  1  1        END   { WriteCharacterToOutputFile };


375  467  0  0    {=====================================================================}
                  { WriteLnToOutputFile    Do a WriteLn on the output file              }
                  {=====================================================================}

                    PROCEDURE WriteLnToOutputFile;

376  473  1  0        BEGIN { WriteLnToOutputFile }
376  474  1  1          WriteLn (UtilityFile);
377  475  1  1        END   { WriteLnToOutputFile };
```

```
{==============================================================================}
{ RingBell                      This procedure rings the bell.                 }
{==============================================================================}

  PROCEDURE RingBell;
    BEGIN
      Write(CHR(7));
    END;


{==============================================================================}

{ Exit                          This procedure cleans up and returns control }
{                               to CPM.                                        }
{==============================================================================}

  PROCEDURE Exit;
    VAR
      I: Integer;
      OutputFileName: FileName;
    BEGIN
      TerminateWritePix;
      CrosshairOff;
      EraseSurface(-1);
      CloseTablet;
      LLDASF(c1);                           {$Set-Dialogue-Area-Surface}
      LLDAXY(c0,c0);                        {$Set-Dialogue-Area-Position}
      LLDALN(c34);                          {$Set-Dialogue-Area-Lines}
      LLDAVS(c1);                           {$Set-Dialogue-Area-Visibility}
      SelectColorMap(1,2);
      LLVISF(c4,VisBoth);                   {$Set-Surface-Visibility}
      GOTO 0;
    END;
$subtitle('                    Menu PROCEDUREs')

{==============================================================================}
{ BuildMenu                          This procedure places the necessary boxes and}
{                                    text into the appropriate segments so that  }
{                                    the various menues can be displayed.        }
{==============================================================================}

PROCEDURE BuildMenu;

  BEGIN { BuildMenu }
    InitializeMenu;
    MenuVisible := FALSE;
    SelectMenuSurface;
    LabelMenuItem(01,'       Exit       ',' Editing Session  ');
    LabelMenuItem(02,'   Save Drawing   ','                  ');
    LabelMenuItem(03,'   Save Pencil    ','                  ');
    LabelMenuItem(15,'    Unmask All    ','     Template     ');
    LabelMenuItem(17,' Erase All Pencil ','                  ');
    LabelMenuItem(18,'  Ink All Pencil  ','                  ');
```

```
      LabelMenuItem(34,'Mask Template Mode','                    ');
      LabelMenuItem(35,'    Erase Mode    ','                    ');
      LabelMenuItem(36,'    Pencil Mode   ','                    ');
      LabelMenuItem(69,'      Select      ','   Small Radius     ');
      LabelMenuItem(70,'      Select      ','   Large Radius     ');
      LabelMenuItem(71,'       Set        ','     Line Mode      ');
      LabelMenuItem(72,'       Set        ','  Polyline Mode     ');
      SelectGraphicsSurfaces;
    END   { BuildMenu };

  {=========================================================================}
  { CheckMenu                     This procedure invokes the appropriate   }
  {                               routine based upon the menu item selected. }
  {=========================================================================}

  PROCEDURE CheckMenu (x,y : Integer;  z : Char);

    VAR
      n            : Integer;

    BEGIN { CheckMenu }
      CASE Z OF
        '1','2':
          BEGIN
            n := PickMenuItem (x,y);
            CASE n OF
              01: Exit;
              02: SaveDrawing;
              03: SaveSelectedStructure;
              15: TransferStructure(RecoverHiddenStructureMask);
              17: TransferStructure(ClearSelectedStructureMask);
              18: TransferStructure(WriteSelectedStructureMask):
              34: SetTransitionMask(HideModeMask,OldMask);
              35: SetTransitionMask(CorrectModeMask,OldMask);
              36: SetTransitionMask(SelectModeMask,OldMask);
              69: SecondaryMenuHandler(02);
              70: SecondaryMenuHandler(01);
              71: SecondaryMenuHandler(04);
              72: SecondaryMenuHandler(03);
              OTHERWISE RingBell;
            END {CASE} ;
          END {BEGIN} ;
        OTHERWISE HilightMenuItem(0);
      END {CASE Z} ;
    END {CheckMenu} ;
  $subtitle('               Outer Block')

  {=========================================================================}
  { Outer Block                   This section of code performs the TekMan }
  {                               initialization and contains the main     }
  {                               processing loop.                         }
  {=========================================================================}
```

```
          BEGIN { TekMan }
0  1        InitializeVariables;

0  1        LLVISF(c4,VisMenu);                {$Set-Surface-Visibility}

0  1        IF NOT ParseFileNames(3,'/,TEKMAN,,')
              THEN
0  1            GOTO 0;

0  1        ProcessHeaderFile;
0  1        InitializeGraphics;
0  1        BuildMenu;

0  1        IssueStatusMessage(0,8,'Initializing Bank Memory', 24);

0  1        ParagraphsAvailable := InitializeBankSwitchedMemory;
0  1        InitializeTileStructure (xMin,yMin,  xMax,yMax,  TileSize);
0  1        GetTileStructureParameters (xLower,yLower,  xUpper,yUpper,  TileSize);
0  1        InitializeCursorDrawing;
0  1        Initialize {Nibble Cursor} ;

0  1      - ResetNodeTraversedFlags;
0  1      - SetTransitionMask(SelectModeMask,OldMask);
0  1      - SetDuplicateOutputEnabled(FALSE);
0  1      - IssueStatusMessage(0,8,'                              ', 24);

0  1        InitializeDrawing;
0  1        ReadDrawing
                  (InputFile, xMin,yMin, xMax,yMax   {scanner limits - passed},
                              xLow,yLow, xHigh,yHigh {drawing limits - returned});

0  1        WRITELN ('Memory stats : Initial   => ',ParagraphsAvailable,CR,LF,
                     '                Remaining => ',NumberOfAvailableParagraphs);

0  1        TabletMessageVisible := FALSE;

0  1        OpenTablet;

0  1        WHILE TRUE DO
0  1          BEGIN
0  2            IF PollChar = CHR(3)
                  THEN Exit;
0  2            GetGin(XpixelGin,YpixelGin,Stylus);
0  2            IF Stylus = '-' {Stylus not in presence}
                  THEN
0  2                BEGIN
0  3                  CrosshairOff;
0  3                  HilightMenuItem(0);
0  3                  SuspendTabletHandler;
0  3                  IssueStatusMessage(0,8,'Waiting for Tablet',18);
0  3                  TabletMessageVisible := TRUE;
0  3                END
0  2              ELSE
0  2                BEGIN
```

```
478  639  0  3            IF TabletMessageVisible
                            THEN
479  641  0  3                BEGIN
479  642  0  4                  IssueStatusMessage(0,8,'                    ',18);
480  643  0  4                  TabletMessageVisible := FALSE;
481  644  0  4                END;
483  645  0  3            CASE TabletDemultiplexor(XpixelGin,YpixelGin) OF
484  646  0  4              ConstrainedGin:
                              BEGIN
484  648  0  5                  IF MenuVisible
                                  THEN
485  650  0  5                      BEGIN
485  651  0  6                        CrosshairOff;
486  652  0  6                        LLVISE(c4,VisDraw);
487  653  0  6                        SetIntensity(2);
488  654  0  6                        HilightMenuItem(0);
489  655  0  6                        MenuVisible := FALSE;
490  656  0  6                      END;
492  657  0  5                  HandleTabletEvent(XpixelGin,YpixelGin,Stylus);
493  658  0  5                END;
495  659  0  4              UnconstrainedGin:
                              BEGIN
495  661  0  5                  CrosshairOff;
496  662  0  5                  IF MenuVisible
                                  THEN
497  664  0  5                      BEGIN
497  665  0  6                        LLVISE(c4,VisDraw);
498  666  0  6                        SetIntensity(2);
499  667  0  6                        HilightMenuItem(0);
500  668  0  6                        MenuVisible := FALSE;
501  669  0  6                      END;
503  670  0  5                END;
505  671  0  4              MenuSelection:
                              BEGIN
505  673  0  5                  IF NOT MenuVisible
                                  THEN
506  675  0  5                      BEGIN
506  676  0  6                        SuspendTabletHandler;
507  677  0  6                        SetIntensity(1);
508  678  0  6                        LLVISE(c4,VisBoth);
509  679  0  6                        MenuVisible := TRUE;
510  680  0  6                      END;
512  681  0  5                  CrosshairOn(XpixelGin,YpixelGin);
513  682  0  5                  CheckMenu(XpixelGin,YpixelGin,Stylus);
514  683  0  5                END;
515  684  0  4            END {CASE} ;
515  685  0  3          END {ELSE} ;
520  686  0  2      END; {WHILE loop}
521  687  0  1  0:END. { Tekman }
                 1080 Lines Read.
                    0 Errors Detected.
                  77% Utilization of Memory.
```

```
Source File: A:PARAMSUP.PAS
Object File: <none>
Controls Specified:  ERRORPRINT, NOOBJECT, PRINT(D:PRAMSUP.LST[G9]), TITLE(              PARAMETER|SUPPORT).

STMT LINE NESTING       SOURCE TEXT: A:PARAMSUP.PAS
  1     2  0  0
                        MODULE ParameterSupport;
  2     4  0  0


                        PUBLIC ParameterSupport;

  3     9  0  0         CONST
                          MaximumLengthOfFileName = 14;
  4    11  0  0           MaximumNumberOfFileNames = 3;

  5    13  0  0         TYPE
                          STRING = PACKED ARRAY [1..1] OF CHAR;
  6    15  0  0           FileName = PACKED ARRAY [1..MaximumLengthOfFileName] OF CHAR;

  7    17  0  0         FUNCTION ParseFileNames(NumberOfFileNames:INTEGER;VAR DefaultFileNameList:STRING):BOOLEAN;
  8    19  0  0         PROCEDURE GetFileName(I:INTEGER;VAR FileNameVariable:FileName;VAR NewExtension:STRING);

  9    20  0  0         PUBLIC UDI;
 10    21  0  0         FUNCTION dqGetArgument(VAR String:BYTES;VAR Exception:INTEGER):CHAR;
 11    22  0  0         PRIVATE ParameterSupport;

 12    24  0  0         VAR
                          Extension: ARRAY [1..MaximumNumberOfFileNames] OF INTEGER;
 13    26  0  0           FileNames: ARRAY [1..MaximumNumberOfFileNames] OF FileName;

 14    28  0  0         {=============================================================================}
                        { ParseFileNames                    This procedure parses the file names passed }
                        {                                   as arguments to TekMan.                     }
                        {=============================================================================}

                        FUNCTION ParseFileNames(NumberOfFileNames:INTEGER;VAR DefaultFileNameList:STRING):BOOLEAN;

 15    35  1  0           {-------------------------------------------------------------------------
                            Format of the DefaultFileNameList: 'default1,default2,....defaultN,'
                            (Note that there MUST be a comma after the last default in the list.)
                            Each default in the list can be a filename (extension optional) or
                            the character '/', the character '=', or NIL (e.g. ',,' OR ', ,').
                            '/' indicates that there is no default for that parameter: if the user
                            omits it, an error message is issued.  A NIL value indicates that there
                            is no default for that parameter, but that no error message is issued
                            if it is omitted.  If the parameter is omitted, a field of all blanks
                            will be returned by GetFileName.  '=' indicates that the default for
                            that parameter is the value of the previous parameter.  For example,
                            '/,=,' indicates that there is no default for the first parameter,
                            and that the default value for the second parameter is whatever value
                            the user supplies for the first parameter.
                          -------------------------------------------------------------------------
                          VAR
                            I, J, K, Exception: INTEGER;
```

```
16   53  1  0        Delimiter: CHAR;
17   54  1  0        Argument: PACKED ARRAY [0..80] OF CHAR;
18   55  1  0      BEGIN
18   56  1  1        FOR I := 1 TO MaximumNumberOfFileNames DO
19   57  1  1          BEGIN
19   58  1  2            Extension[I] := 0;
20   59  1  2            FOR J := 1 TO MaximumLengthOfFileName DO
21   60  1  2              FileNames[I,J] := ' ';
23   61  1  2          END;
24   62  1  1        IF NumberOfFileNames > MaximumNumberOfFileNames
                       THEN NumberOfFileNames := MaximumNumberOfFileNames;
26   64  1  1        ParseFileNames := TRUE;
27   65  1  1        Delimiter := ' ';
28   66  1  1        K := 0;
29   67  1  1        FOR I := 1 TO NumberOfFileNames DO
30   68  1  1          BEGIN
30   69  1  2            K := K + 1;
31   70  1  2            IF (Delimiter <> CHR(10)) AND (Delimiter <> CHR(13))
                           THEN Delimiter := dqGetArgument(Argument,Exception)
32   72  1  2              ELSE Argument[0] := CHR(0);
34   73  1  2            IF ORD(Argument[0]) > MaximumLengthOfFileName
                           THEN
35   75  1  2                BEGIN
35   76  1  3                  WriteLn('Error: Parameter ',I,' is too long (',MaximumLengthOfFileName,
                                       ' character limit).');
36   78  1  3                  ParseFileNames := FALSE;
37   79  1  3                END
38   80  1  2            ELSE IF ORD(Argument[0]) = 0
39   81  1  2              THEN
40   82  1  2                CASE DefaultFileNameList[K] OF
41   83  1  3                  '/':       BEGIN
41   84  1  4                               WriteLn('Error: Parameter ',I,' is required but omitted.');
42   85  1  4                               ParseFileNames := FALSE;
43   86  1  4                             END;
45   87  1  3                  '=':       BEGIN
45   88  1  4                               FOR J := 1 TO MaximumLengthOfFileName DO
46   89  1  4                                 FileNames[I,J] := FileNames[I-1,J];
47   90  1  4                               Extension[I] := Extension[I-1];
48   91  1  4                             END;
50   92  1  3                  OTHERWISE BEGIN
51   93  1  4                               J := 1;
52   94  1  4                               WHILE (J <= MaximumLengthOfFileName)
                                            AND (DefaultFileNameList[K] <> ',')
                                            AND (DefaultFileNameList[K] <> ' ') DO
52   97  1  4                                 BEGIN
53   98  1  5                                   FileNames[I,J] := DefaultFileNameList[K];
54   99  1  5                                   IF DefaultFileNameList[K] = '.'
                                                  THEN Extension[I] := J;
56  101  1  5                                   J := J + 1;
57  102  1  5                                   K := K + 1;
58  103  1  5                                 END {WHILE} ;
60  104  1  4                               IF (Extension[I] = 0) AND (J + 4 <= MaximumLengthOfFileName)
                                              THEN Extension[I] := J + 1;
62  106  1  4                             END {OTHERWISE} ;
64  107  1  3                END {CASE}
```

```
65  108  1  2              ELSE
66  109  1  2                BEGIN
66  110  1  3                  FOR J := 1 TO ORD(Argument[0]) DO
67  111  1  3                    BEGIN
67  112  1  4                      FileNames[I,J] := Argument[J];
68  113  1  4                      IF Argument[J] = '.' THEN Extension[I] := J;
70  114  1  4                    END;
72  115  1  3                  IF (Extension[I] = 0) AND (ORD(Argument[0]) + 4 <= MaximumLengthOfFileName)
                                   THEN Extension[I] := ORD(Argument[0]) + 1;
74  117  1  3                END;
76  118  1  2            WHILE DefaultFileNameList[K] <> '.' DO
77  119  1  2              K := K + 1;
78  120  1  2          END {FOR I} ;
80  121  1  1        IF (Delimiter <> CHR(10)) AND (Delimiter <> CHR(13))
                         THEN WriteLn('Warning: ',NumberOfFileNames,
81  123  1  1                      ' parameters processed; extra parameters ignored');
82  124  1  1      END {ParseFileNames} ;

83  126  0  0    {=========================================================================}
                 { GetFileName                      This procedure returns the filename to the  }
                 {                                  caller, after inserting the new extension.  }
                 {=========================================================================}

                 PROCEDURE GetFileName(I:INTEGER;VAR FileNameVariable:FileName;VAR NewExtension:STRING);

84  133  1  0      {-----------------------------------------------------------------------
                     Format of NewExtension: 'ext' OR '?ext'.  If '?' is present, it indicates
                     that 'ext' is a default.  If '?' is NOT present, it indicates that 'ext'
                     unconditionally overrides the operator-specified extension.
                   -----------------------------------------------------------------------}

                   VAR
                     J: INTEGER;
85  141  1  0      BEGIN
85  142  1  1        IF (I > 0) AND (I <= MaximumNumberOfFileNames)
                     AND (Extension[I] + 3 <= MaximumLengthOfFileName)
                       THEN
86  145  1  1            BEGIN
86  146  1  2              FOR J := 1 TO MaximumLengthOfFileName DO
87  147  1  2                FileNameVariable[J] := FileNames[I,J];
88  148  1  2              IF NewExtension[1] = '?'
                               THEN J := 1
89  150  1  2                ELSE J := 0;
91  151  1  2              IF ((J = 0) OR (FileNameVariable[Extension[I]] = ' ')) AND (Extension[I] > 0)
                               THEN
92  153  1  2                  BEGIN
92  154  1  3                    FileNameVariable[Extension[I]] := '.';
93  155  1  3                    FileNameVariable[Extension[I] + 1] := NewExtension[J + 1];
94  156  1  3                    FileNameVariable[Extension[I] + 2] := NewExtension[J + 2];
95  157  1  3                    FileNameVariable[Extension[I] + 3] := NewExtension[J + 3];
96  158  1  3                  END;
98  159  1  2            END;
100 160  1  1      END;

101 162  0  0
```

```
162 Lines Read.
  0 Errors Detected.
 43% Utilization of Memory.

Source File: A:CURSOR.PAS
Object File: <none>
Controls Specified:  ERRORPRINT, NOOBJECT, PRINT(D:CURSOR.LST[G9]), TITLE(          CURSOR SUPPORT ROUTINES).

STMT LINE NESTING        SOURCE TEXT: A:CURSOR.PAS
  1     2  0  0
                         MODULE Cursor;
  2     4  0  0


                         PUBLIC Cursor;

  3     9  0  0            TYPE
                             CursorStatusType = (Limbo, WriteMode, LockMode, LockAndWriteMode);
  4    11  0  0              CursorActionType = (NoAction, EnterWriteMode, StayInWriteMode, EnterLimbo,
                               EnterLockMode, StayInLockMode, EnterLockAndWriteMode,
                               StayInLockAndWriteMode, ReturnToLockMode, ReturnToWriteMode);

  5    15  0  0          PROCEDURE InitializeCursor;
  6    16  0  0          PROCEDURE SelectGraphicsSurfaces;
  7    17  0  0          PROCEDURE SelectCursorSurface;
  8    18  0  0          PROCEDURE SelectMenuSurface;
  9    19  0  0          PROCEDURE SetLineIndex(LineIndex:INTEGER);
 10    20  0  0          PROCEDURE IssueStatusMessage(X,Y:INTEGER;VAR Text:CHAR;Length:INTEGER);
 11    21  0  0          FUNCTION SingleCursorAction(Stylus:CHAR;CursorStatus:CursorStatusType):CursorActionType;
 12    22  0  0          FUNCTION DualCursorAction(Stylus:CHAR;CursorStatus:CursorStatusType):CursorActionType;

 13    24  0  0          $INCLUDE (LTI.EXT);
                 =1      PUBLIC LTI;
                 =1
 14     3  0  0 =1       PROCEDURE LLBPXL (VAR Surface,ALU,Bits : INTEGER);   {Begin-Pixel-Operations}
 15     4  0  0 =1       PROCEDURE LLCLMD (VAR Mode,Overlay,Grey : INTEGER);  {Set-Color-Mode}
 16     5  0  0 =1       PROCEDURE LLCLMP (VAR Surface,Len : INTEGER;VAR Map : BYTES); {Set-Surface-Color-Map}
 17     6  0  0 =1       PROCEDURE LLDAEN (VAR Enabled : INTEGER);            {Enable-Dialogue-Area}
 18     7  0  0 =1       PROCEDURE LLDALN (VAR Lines : INTEGER);              {Set-Dialogue-Area-Lines}
 19     8  0  0 =1       PROCEDURE LLDASF (VAR Surface : INTEGER);            {Set-Dialogue-Area-Surface}
 20     9  0  0 =1       PROCEDURE LLDAVS (VAR Vis : INTEGER);                {Set-Dialogue-Area-Visibility}
 21    10  0  0 =1       PROCEDURE LLDAXY (VAR X,Y : INTEGER);                {Set-Dialogue-Area-Position}
 22    11  0  0 =1       PROCEDURE LLDLSG (VAR Seg : INTEGER);                {Delete-Segment}
 23    12  0  0 =1       PROCEDURE LLDLVW (VAR View : INTEGER);               {Delete-View}
 24    13  0  0 =1       PROCEDURE LLGPRC (VAR Precision: INTEGER);           {Set-Graphtext-Precision}
 25    14  0  0 =1       PROCEDURE LLGSIZ (VAR Width,Height,Spacing:INTEGER); {Set-Graphtext-Size}
 26    15  0  0 =1       PROCEDURE LLINIT (VAR TerminalType : INTEGER);       {LTI-Initialization}
 27    16  0  0 =1       PROCEDURE LLLNIN (VAR Index: INTEGER);               {Set-Line-Index}
 28    17  0  0 =1       PROCEDURE LLMOVE (VAR X,Y: INTEGER);                 {Move}
 29    18  0  0 =1       PROCEDURE LLRCFL (VAR X1,Y1,X2,Y2,Pen : INTEGER);    {Rectangle-Fill}
 30    19  0  0 =1       PROCEDURE LLSYNC;                                    {Synchronize Firmware}
 31    20  0  0 =1       PROCEDURE LLTEXT (VAR Count:INTEGER;VAR Str:BYTES;Dummy:INTEGER); {Graphic-Text}
 32    21  0  0 =1       PROCEDURE LLVISF (VAR Count : INTEGER;VAR Vis : BYTES); {Set-Surface-Visibility}
 33    22  0  0 =1       PROCEDURE LLVKLK (VAR Lockmode : INTEGER);           {Lock-Viewing-Keys}
```

```
34   23  0  0 =1    PROCEDURE LLVWAT (VAR Surface,Wipe,Border:INTEGER):  {Set-View-Attributes}
35   24  0  0 =1    PROCEDURE LLVWPT (VAR X1,Y1,X2,Y2 : INTEGER);        {Set-Viewport}
36   25  0  0 =1    PROCEDURE LLWAIT (VAR TimerInterval : INTEGER);      {Pause for interval}
37   26  0  0 =1    PROCEDURE LLWIND (VAR X1,Y1,X2,Y2 : INTEGER);        {Set-Window}

38   26  0  0       PUBLIC PixelSys;
39   27  0  0       PROCEDURE PixelMoveTransformed(X,Y:INTEGER);
40   28  0  0       PROCEDURE PixelDrawTransformed(X,Y:INTEGER);
41   29  0  0       PROCEDURE PixelMoveClipped(X,Y:INTEGER);
42   30  0  0       PROCEDURE PixelDrawClipped(X,Y:INTEGER);

43   32  0  0       PRIVATE Cursor;

44   34  0  0         VAR
                        c0, c1, c2, c3: INTEGER;

45   37  0  0       {==========================================================================}
                    { InitializeCursor                  This procedure initializes the global   }
                    {                                   variables.                              }
                    {==========================================================================}

                    PROCEDURE InitializeCursor;
46   43  1  0         BEGIN
46   44  1  1           c0 := 0; c1 := 1; c2 := 2; c3 := 3;
50   45  1  1         END;

51   47  0  0       {==========================================================================}
                    { SelectGraphicsSurfaces            This procedure selects the graphics surfaces.}
                    {==========================================================================}

                    PROCEDURE SelectGraphicsSurfaces;
52   52  1  0         BEGIN
52   53  1  1           LLVWAT(c2,c0,c0);                          {$Set-View-Attributes}
53   54  1  1           LLMOVE(c0,c0);                             {$Move}
54   55  1  1         END;

55   57  0  0       {==========================================================================}
                    { SelectCursorSurface               This procedure selects the cursor surface.   }
                    {==========================================================================}

                    PROCEDURE SelectCursorSurface;
56   62  1  0         BEGIN
56   63  1  1           LLVWAT(c3,c0,c0);                          {$Set-View-Attributes}
57   64  1  1           LLMOVE(c0,c0);                             {$Move}
58   65  1  1         END;

59   67  0  0       {==========================================================================}
                    { SelectMenuSurface                 This procedure selects the menu surface.     }
                    {==========================================================================}

                    PROCEDURE SelectMenuSurface;
60   72  1  0         BEGIN
60   73  1  1           LLVWAT(c1,c0,c0);                          {$Set-View-Attributes}
61   74  1  1           LLMOVE(c0,c0);                             {$Move}
```

```
62   75   1  1          SetLineIndex(1);
63   76   1  1        END;

64   78   0  0    {===========================================================================}
                  { SetLineIndex                      This procedure sets the line index.      }
                  {===========================================================================}

65   83   1  0      BEGIN
65   84   1  1        LLLNIN(LineIndex);
66   85   1  1      END;

67   87   0  0    {===========================================================================}
                  { IssueStatusMessage                This procedure places the specified status  }
                  {                                   message in the specified location.          }
                  {===========================================================================}

                  PROCEDURE IssueStatusMessage(X,Y:INTEGER;VAR Text:CHAR;Length:INTEGER);
68   93   1  0      BEGIN
68   94   1  1        LLGPRC(c1);                  {$Set-Graphtext-Precision}
69   95   1  1        LLVWAT(c3,c0,c0);            {$Set-View-Attributes}
70   96   1  1        LLMOVE(X,Y);                 {$Move}
71   97   1  1        LLTEXT(Length,Text,Length);  {$Graphic-Text}
72   98   1  1        LLVWAT(c2,c0,c0);            {$Set-View-Attributes}
73   99   1  1        LLMOVE(c0,c0);               {$Move}
74  100   1  1      END;

75  102   0  0    {===========================================================================}
                  { SingleCursorAction                This function returns a code indicating the  }
                  {                                   appropriate cursor action for a cursor which }
                  {                                   supports only write mode.                    }
                  {===========================================================================}

                  FUNCTION SingleCursorAction(Stylus:CHAR;CursorStatus:CursorStatusType):CursorActionType;
76  109   1  0      BEGIN
76  110   1  1        CASE Stylus OF
77  111   1  2          '2','!':  CASE CursorStatus OF
78  112   1  3                      Limbo:          SingleCursorAction := EnterWriteMode;
79  113   1  3                      WriteMode:      SingleCursorAction := StayInWriteMode;
80  114   1  3                    END {CASE CursorStatus} ;
82  115   1  2          OTHERWISE CASE CursorStatus OF
84  116   1  3                      Limbo:          SingleCursorAction := NoAction;
85  117   1  3                      WriteMode:      SingleCursorAction := EnterLimbo;
86  118   1  3                    END {CASE CursorStatus} ;
88  119   1  2        END {CASE Stylus} ;
90  120   1  1      END; {SingleCursorAction}

91  122   0  0    {===========================================================================}
                  { DualCursorAction                  This function returns a code indicating the  }
                  {                                   appropriate cursor action for a cursor which }
                  {                                   supports both write and lock modes.          }
                  {===========================================================================}

                  FUNCTION DualCursorAction(Stylus:CHAR;CursorStatus:CursorStatusType):CursorActionType;
92  129   1  0      BEGIN
```

```
 92  130  1  1          CASE Stylus OF
 93  131  1  2            '1':      CASE CursorStatus OF
 94  132  1  3                        Limbo:            DualCursorAction := EnterLockMode;
 95  133  1  3                        WriteMode:        DualCursorAction := EnterLockAndWriteMode;
 96  134  1  3                        LockMode:         DualCursorAction := EnterLimbo;
 97  135  1  3                        LockAndWriteMode: DualCursorAction := ReturnToWriteMode;
 98  136  1  3                      END {CASE CursorStatus} ;
100  137  1  2            '2','!':  CASE CursorStatus OF
101  138  1  3                        Limbo:            DualCursorAction := EnterWriteMode;
102  139  1  3                        WriteMode:        DualCursorAction := StayInWriteMode;
103  140  1  3                        LockMode:         DualCursorAction := EnterLockAndWriteMode;
104  141  1  3                        LockAndWriteMode: DualCursorAction := StayInLockAndWriteMode;
105  142  1  3                      END {CASE CursorStatus} ;
107  143  1  2            OTHERWISE CASE CursorStatus OF
109  144  1  3                        Limbo:            DualCursorAction := NoAction;
110  145  1  3                        WriteMode:        DualCursorAction := EnterLimbo;
111  146  1  3                        LockMode:         DualCursorAction := StayInLockMode;
112  147  1  3                        LockAndWriteMode: DualCursorAction := ReturnToLockMode;
113  148  1  3                      END {CASE CursorStatus} ;
115  149  1  2           END {CASE Stylus} ;
117  150  1  1          END; {DualCursorAction}

118  152  0  0

178 Lines Read.
  0 Errors Detected.
46% Utilization of Memory.
```

```
4110 CP/M UDI2.1      8086/8087/8088 MACRO ASSEMBLER V1.1 ASSEMBLY OF MODULE BANKRAM
NO OBJECT MODULE REQUESTED
ASSEMBLER INVOKED BY:  D:ASM86 A:BANKRAM.ASM NOOJ EP PW(132) PR(D:BANKRAM.LST[89])


LOC  OBJ                     LINE     SOURCE

                                1 +1  $title (Bank-Switched RAM Support Routines)
                                2     ;
                                3     ;
                                4     ;
                                5     ;
                                6     ;
                                7     ; Hardware, firmware, and local programmability dependencies:
                                8     ;
                                9     ; 1.  This code is dependent upon the hardware interface to the
                               10     ;     bank-switch memory (RAM) boards, including the output register
                               11     ;     (0090H), the input registers (00A0H - 00ACH), the board
                               12     ;     address space, the board strapping, etc.
                               13     ;
                               14     ; 2.  This code is dependent upon the hardware protocol for processing
                               15     ;     bus timeout errors.  These occur during initialization while
                               16     ;     determining the installed memory configuration.
                               17     ;
                               18     ; 3.  This code is dependent upon owning the bank-switched memory
```

```
                    ;       (RAM); neither the firmware nor local programmability may
                    ;       use this memory or switch banks.
                    ;
                                NAME    BankRAM
                    ;
                                PUBLIC  InitializeBankSwitchedMemory,AllocateParagraph,DisposeParagraph
                                PUBLIC  NumberOfAvailableParagraphs,LinkParagraphs,GetParagraphLink
                    ;
00ED                IsTimr@TimeOutReg EQU 00EDH         ; 8 bit I/O reg containing bus timeout error flag
0001                IsTimr@TimeOutBit EQU 01H           ; bus timeout error bit in above register
                    ;
----                BankRamData SEGMENT
0000 0000           NextAvailableParagraph DW 0,0
0002 0000
0004 0000           AvailableParagraphCount DW 0,0
0006 0000
----                BankRamData ENDS
                    ;
----                BankRamCode SEGMENT
                                ASSUME  CS:BankRamCode,DS:BankRamData
                    $eject
                    ; PROCEDURE InitializeOneBank(BankNumber:BX) {Scratch Registers: AX, CX, ES} ;
                    ;
                    ; This local procedure initializes one bank of bank-switched memory to one big
                    ; linked list consisting of two entries in each link field: bank number, and
                    ; pointer to next paragraph.  The link field in the last paragraph of each bank
                    ; is initialized to point to the previously initialized bank (if any) or set to
                    ; NilParagraph.
                    ;
0000                InitializeOneBank PROC NEAR
0000 8BC3                       MOV     AX,BX                   ; Bank number
0002 E790                       OUT     90H,AX                  ; Switch banks
0004 B800A0                     MOV     AX,0A000H               ; Starting paragraph address in bank
0007 B900E0                     MOV     CX,0E000H               ; Ending paragraph address in bank
000A 8EC0           LinkLoop:   MOV     ES,AX                   ; Current Paragraph address
000C 40                         INC     AX                      ; Next paragraph address
000D 26891E0000                 MOV     ES:WORD PTR 0,BX        ; Bank number to first word
0012 26A30200                   MOV     ES:WORD PTR 2,AX        ; Paragraph address to second word
0016 3BC1                       CMP     AX,CX                   ; Done with bank?
0018 75F0                       JNE     LinkLoop                ; No, process next paragraph
001A 8B0E0000                   MOV     CX,NextAvailableParagraph
001E 26890E0000                 MOV     ES:WORD PTR 0,CX        ; Bank number to first word
0023 8B0E0200                   MOV     CX,NextAvailableParagraph+2
0027 26890E0200                 MOV     ES:WORD PTR 2,CX        ; Paragraph address to second word
002C 891E0000                   MOV     NextAvailableParagraph,BX ; Bank number to first word
0030 C70602000000A0             MOV     NextAvailableParagraph+2,0A000H ; Paragraph address to second
0036 810606000040               ADD     AvailableParagraphCount+2,16384
003C 8316040000                 ADC     AvailableParagraphCount,0
0041 C3                         RET                             ; Return to InitializeBankSwitchedMemory
                    InitializeOneBank ENDP
                    $eject
```

```
                            ; FUNCTION InitializeBankSwitchedMemory:LONGINT (Scratch Registers: AX, BX, CX, DX, ES)
                            ;
0042                        InitializeBankSwitchedMemory PROC FAR
0042 1E                             PUSH    DS                      ; Save DS for Pascal
0043 BA----          R              MOV     DX,BankRamData          ; Address of data segment
0046 8EDA                           MOV     DS,DX                   ; Make it addressable
                            ;
0048 C70600000000                   MOV     NextAvailableParagraph,0 ; Allow reinitialization
004E C70602000000                   MOV     NextAvailableParagraph+2,0
0054 C70604000000                   MOV     AvailableParagraphCount,0
005A C70606000000                   MOV     AvailableParagraphCount+2,0
                            ;
0060 BAAC00                         MOV     DX,00ACH                ; I/O Address of Banks 12 and 13
0063 BB0D00                         MOV     BX,13                   ; Bank 13
0066 9C                     BoardLoop:PUSHF                         ; Save interrupt enabled flag
0067 FA                             CLI                             ; Clear interrupt enabled flag
0068 ED                             IN      AX,DX                   ; Get status for bank-switched RAM board
0069 8BC8                           MOV     CX,AX                   ; Save status
006B E4ED                           IN      AL,TsTimr@TimeOutReg ; Get bus timeout status
006D 8AE0                           MOV     AH,AL                   ; Save status
006F 32C0                           XOR     AL,AL                   ; Clear AL
0071 E6ED                           OUT     TsTimr@TimeOutReg,AL ; Reset bus timeout flag
0073 9D                             POPF                            ; Restore interrupt enabled flag
0074 F6C401                         TEST    AH,TsTimr@TimeOutBit ; Did bus timeout occur?
0077 7514                           JNZ     SkipBoth                ; Yes, skip init; board not installed
0079 F7C11000                       TEST    CX,10H                  ; Is any bank installed?
007D 740E                           JZ      SkipBoth                ; No, skip board initialization
007F F7C12000                       TEST    CX,20H                  ; Is high bank installed?
0083 7403                           JZ      SkipHigh                ; No, skip high bank initialization
0085 E878FF                         CALL    InitializeOneBank       ; Initialize it
0088 4B                     SkipHigh: DEC   BX                      ; Decrement bank number
0089 E874FF                         CALL    InitializeOneBank       ; Initialize it
008C 43                             INC     BX                      ; Faster than a JMP
008D 4B                     SkipBoth: DEC   BX                      ; Decrement bank number
008E 4B                             DEC     BX                      ; Decrement bank number
008F 4A                             DEC     DX                      ; Decrement I/O address
0090 4A                             DEC     DX                      ; Decrement I/O address
0091 81FAA000                       CMP     DX,00A0H                ; Processed all boards yet?
0095 7DCF                           JGE     BoardLoop               ; No, process next board
                            ;
0097 8B160400                       MOV     DX,AvailableParagraphCount
009B A10600                         MOV     AX,AvailableParagraphCount+2
                            ;
009E 1F                             POP     DS                      ; Restore DS for Pascal
009F CB                             RET                             ; Return to Pascal
                            InitializeBankSwitchedMemory ENDP
                            $eject
                            ; FUNCTION AllocateParagraph:ParagraphPointer (Scratch Registers: AX, BX, ES) ;
                            ;
00A0                        AllocateParagraph PROC FAR
00A0 1E                             PUSH    DS                      ; Save DS for Pascal
00A1 BA----          R              MOV     DX,BankRamData          ; Address of data segment
00A4 8EDA                           MOV     DS,DX                   ; Make it addressable
                            ;
```

```
00A6 8B160400            MOV   DX,AvailableParagraphCount
00AA A10600              MOV   AX,AvailableParagraphCount+2
00AD 0BC2                OR    AX,DX              ; Check for out of memory
00AF 7444                JZ    AllocateReturn     ; Return if no more memory
                   ;
00B1 832E060001          SUB   AvailableParagraphCount+2,1
00B6 831E040000          SBB   AvailableParagraphCount,0
                   ;
00BB C4060000            LES   AX,DWORD PTR NextAvailableParagraph ; First word -> AX: Second word ->
00BF 8BD0                MOV   DX,AX
00C1 E790                OUT   90H,AX             ; Switch banks
                   ;
00C3 26A10000            MOV   AX,ES:WORD PTR 0
00C7 A30000              MOV   NextAvailableParagraph,AX
00CA 26A10200            MOV   AX,ES:WORD PTR 2
00CE A30200              MOV   NextAvailableParagraph+2,AX
                   ;
00D1 33C0                XOR   AX,AX
00D3 26A30000            MOV   ES:WORD PTR 0,AX
00D7 26A30200            MOV   ES:WORD PTR 2,AX
00DB 26A30400            MOV   ES:WORD PTR 4,AX
00DF 26A30600            MOV   ES:WORD PTR 6,AX
00E3 26A30800            MOV   ES:WORD PTR 8,AX
00E7 26A30A00            MOV   ES:WORD PTR 10,AX
00EB 26A30C00            MOV   ES:WORD PTR 12,AX
00EF 26A30E00            MOV   ES:WORD PTR 14,AX
                   ;
00F3 8CC0                MOV   AX,ES
                   ;
00F5 1F            AllocateReturn:POP DS          ; Restore DS for Pascal
00F6 CB                  RET                      ; Return to caller
                   AllocateParagraph ENDP
                   $eject
                   ; PROCEDURE DisposeParagraph(Paragraph:ParagraphPointer) {Scratch Registers: AX, BX, DX, ES} ;
                   ;
----               DisposeStructure STRUC          ; BP points to this structure
0000                     DW    ?                  ; Prologue code saves BP here
0002                     DW    ?                  ; Prologue code saves DS here
0004                     DD    ?                  ; Return address for FAR procedures
0008               Paragraph DW   ?,?             ; Paragraph address, bank to dispose
----               DisposeStructure ENDS
                   ;
00F7               DisposeParagraph PROC FAR
00F7 1E                  PUSH  DS                 ; Save DS for Pascal
00F8 BA----     R        MOV   DX,BankRamData     ; Address of data segment
00FB 8EDA                MOV   DS,DX              ; Make it addressable
00FD 55                  PUSH  BP                 ; Save BP for Pascal
00FE 8BEC                MOV   BP,SP              ; Establish addressability to parameters
                   ;
0100 8306060001          ADD   AvailableParagraphCount+2,1
0105 8316040000          ADC   AvailableParagraphCount,0
                   ;
010A 8E4608              MOV   ES,[BP].Paragraph  ; Load paragraph address
010D 8B460A              MOV   AX,[BP].Paragraph+2 ; Load bank number
```

```
0110 250F00                     AND     AX,0FH                  ; Clear unused bits
0113 E790                       OUT     90H,AX                  ; Switch banks
0115 8B1E0000                   MOV     BX,NextAvailableParagraph
0119 26891E0000                 MOV     ES:WORD PTR 0,BX
011E 8B1E0200                   MOV     BX,NextAvailableParagraph+2
0122 26891E0200                 MOV     ES:WORD PTR 2,BX
0127 A30000                     MOV     NextAvailableParagraph,AX
012A 8C060200                   MOV     NextAvailableParagraph+2,ES
                        ;
012E 5D                         POP     BP                      ; Restore BP for Pascal
012F 1F                         POP     DS                      ; Restore DS for Pascal
0130 CA0400                     RET     4                       ; Return; remove 4 bytes from stack
                        DisposeParagraph ENDP
                     +1 $eject
                        ; FUNCTION NumberOfAvailableParagraphs:LONGINT;
                        ;
0133                    NumberOfAvailableParagraphs PROC FAR
0133 1E                         PUSH    DS                      ; Save DS for Pascal
0134 BA----         R           MOV     DX,BankRamData          ; Address of data segment
0137 8EDA                       MOV     DS,DX                   ; Make it addressable
                        ;
0139 8B160400                   MOV     DX,AvailableParagraphCount
013D A10600                     MOV     AX,AvailableParagraphCount+2
                        ;
0140 1F                         POP     DS                      ; Restore DS for Pascal
0141 CB                         RET                             ; Return to caller
                        NumberOfAvailableParagraphs ENDP
                     +1 $eject
                        ; PROCEDURE LinkParagraphs(Paragraph1.Paragraph2:ParagraphPointer;LinkNumber:INTEGER);
                        ;
----                    LinkStructure STRUC                     ; BP points to this structure
0000                            DW      ?                       ; Prologue code saves BP here
0002                            DW      ?                       ; Prologue code saves DS here
0004                            DD      ?                       ; Return address for FAR procedures
0008                    LinkNumber DW   ?                       ; Link number
000A                    Paragraph2 DW   ?,?                     ; Last ParagraphPointer
000E                    Paragraph1 DW   ?,?                     ; First ParagraphPointer
----                    LinkStructure ENDS
                        ;
0142                    LinkParagraphs PROC FAR
0142 1E                         PUSH    DS                      ; Save DS for Pascal
0143 BA----         R           MOV     DX,BankRamData          ; Address of data segment
0146 8EDA                       MOV     DS,DX                   ; Make it addressable
0148 55                         PUSH    BP                      ; Save BP for Pascal
0149 8BEC                       MOV     BP,SP                   ; Establish addressability to parameters
                        ;
014B 8B5E08                     MOV     BX,[BP].LinkNumber      ; Link number
014E 4B                         DEC     BX                      ; From one to zero origin
014F 7C33                       JL      LinkReturn              ; Return if negative
0151 83FB05                     CMP     BX,5                    ; Excessive value
0154 7D1E                       JGE     LinkReturn              ; Return if greater or equal
0156 8BC3                       MOV     AX,BX                   ; Temporary register
0158 03C0                       ADD     AX,AX                   ; 2 * LinkNumber
015A 03D8                       ADD     BX,AX                   ; 3 * LinkNumber
                        ;
```

```
015C 8B4610               MOV    AX,[BP].Paragraph1+2 ; Bank number
015F 250F00               AND    AX,0FH               ; Clear unwanted bits
0163 E790                 OUT    90H,AX               ; Switch banks
0164 8E460E               MOV    ES,[BP].Paragraph1   ; Paragraph number
                      ;
0167 8B460C               MOV    AX,[BP].Paragraph2+2 ; Bank Number
016A 268807               MOV    ES:[BX],AL           ; Save it in link field
016D 8B460A               MOV    AX,[BP].Paragraph2   ; Paragraph number
0170 26894701             MOV    ES:[BX+1],AX         ; Save it in link field
                      ;
0174 5D               LinkReturn: POP  BP             ; Restore BP for Pascal
0175 1F                   POP    DS                   ; Restore DS for Pascal
0176 CA0A00               RET    10                   ; Return: remove 10 bytes from stack
                      LinkParagraphs ENDP
                 +1   $eject
                      ; FUNCTION GetParagraphLink(Paragraph2:ParagraphPointer;LinkNumber:INTEGER):ParagraphPointer;
                      ;
----                  GetLinkStructure STRUC                  ; BP points to this structure
0000                      DW     ?                    ; Prologue code saves BP here
0002                      DW     ?                    ; Prologue code saves DS here
0004                      DD     ?                    ; Return address for FAR procedures
0008                  GetLinkNumber DW  ?             ; Link number
000A                  GetParagraph DW   ?,?           ; ParagraphPointer
----                  GetLinkStructure ENDS
                      ;
0179                  GetParagraphLink PROC FAR
0179 1E                   PUSH   DS                   ; Save DS for Pascal
017A BA----        R      MOV    DX,BankRamData       ; Address of data segment
017D 8EDA                 MOV    DS,DX                ; Make it addressable
017F 55                   PUSH   BP                   ; Save BP for Pascal
0180 8BEC                 MOV    BP,SP                ; Establish addressability to parameters
                      ;
0182 33D2                 XOR    DX,DX                ; Clear upper bits of result
0184 33C0                 XOR    AX,AX                ; Clear lower bits of result
                      ;
0186 8B5E08               MOV    BX,[BP].GetLinkNumber ; Link number
0189 4B                   DEC    BX                   ; From one to zero origin
018A 7C1D                 JL     GetReturn            ; Return if negative
018C 83FB05               CMP    BX,5                 ; Excessive value
018F 7D18                 JGE    GetReturn            ; Return if greater or equal
0191 8BC3                 MOV    AX,BX                ; Temporary register
0193 03C0                 ADD    AX,AX                ; 2 * LinkNumber
0195 03D8                 ADD    BX,AX                ; 3 * LinkNumber
                      ;
0197 8B460C               MOV    AX,[BP].GetParagraph+2 ; Bank number
019A 250F00               AND    AX,0FH               ; Clear unwanted bits
019D E790                 OUT    90H,AX               ; Switch banks
019F 8E460A               MOV    ES,[BP].GetParagraph ; Paragraph number
                      ;
01A2 268A17               MOV    DL,ES:[BX]           ; Bank number and flags
01A5 268B4701             MOV    AX,ES:[BX+1]         ; Paragraph number
                      ;
01A9 5D               GetReturn:POP  BP               ; Restore BP for Pascal
01AA 1F                   POP    DS                   ; Restore DS for Pascal
```

```
01AB CA0600                          RET      6                    ; Return; remove 6 bytes from stack
                                GetParagraphLink ENDP
                                ;
----                            BankRamCode ENDS
                                     END

ASSEMBLY COMPLETE, NO ERRORS FOUND

Source File: A:CURSDRAW.PAS
Object File: <none>
Controls Specified:  ERRORPRINT, NOOBJECT, PRINT(D:CURSDRAW.LST[G9]), SUBTITLE(                PUBLIC DECLARATIONS), TITLE(
              DRAW CURSORS).

STMT LINE NESTING       SOURCE TEXT: A:CURSDRAW.PAS

  1    4  0  0          MODULE CursorDrawing;

  2    6  0  0

                        {------------------------------------------------------------------------------}
                        {                                                                              }
                        {  MODULE: CursorDrawing                                                       }
                        {                                                                              }
                        {  ROUTINES CONTAINED IN CursorDrawing:                                        }
                        {                                                                              }
                        {     PUBLIC:                                                                  }
                        {       DrawCursor:                                                            }
                        {                                                                              }
                        {       EraseCursor:                                                           }
                        {                                                                              }
                        {                                                                              }
                        {                                                                              }
                        {                                                                              }
                        {                                                                              }
                        {------------------------------------------------------------------------------}

                        $INCLUDE (CursDraw.Ext)
                 =1     PUBLIC CursorDrawing;
                 =1
  3    3  0  0   =1       PROCEDURE DrawCursor (Mode    : TypeOfNeighbor;
                 =1                             x,y     : Integer;
                 =1                             Radius  : Integer);
                 =1
  4    7  0  0   =1       PROCEDURE EraseCursor;
                 =1
  5    9  0  0   =1       PROCEDURE InitializeCursorDrawing;
```

```
 6   33  0  0        $INCLUDE (Spatial.Ext)
                 =1                       { Spatial Data Structure Routines}
                 =1
                 =1   ,PUBLIC SpatialLibrary;
                 =1
 7    5  0  0    =1      CONST
                 =1        NilConnection       = 0;
 8    7  0  0    =1        NilNode             = 0;
 9    0  0  0    =1        MaxConnections      = 14;
                 =1
10   10  0  0    =1      TYPE
                 =1        ConnectionPointer    = LongInt;
                 =1
11   13  0  0    =1        NodePointer          = LongInt;
                 =1
12   15  0  0    =1        PointerToNodePointer= ^NodePointer;
                 =1
13   17  0  0    =1        StateType            = (Hidden,
                 =1                                 Untagged,
                 =1                                 Selected,
                 =1                                 Written,
                 =1                                 SelectedAndWritten,
                 =1                                 Primitive,
                 =1                                 Reserved6,
                 =1                                 Reserved7);
                 =1
14   26  0  0    =1        StructureActionType = (DoNothing,
                 =1                                 AddToStructure,
                 =1                                 DeleteFromStructure);
                 =1
15   30  0  0    =1        TransitionMask       = PACKED ARRAY [Hidden..Reserved7] OF CHAR;
                 =1
16   32  0  0    =1        TypeOfNeighbor       = (Nodes, Lines, Edges);
                 =1
                 =1
                 =1
17   36  0  0    =1      FUNCTION  ConnectionTraversable (Connection : ConnectionPointer) : Boolean;
                 =1
18   38  0  0    =1      FUNCTION  CreateConnection (Node1           : NodePointer;
                 =1                                   Node2           : NodePointer;
                 =1                                   FilledAreaFlag  : Boolean;
                 =1                                   ConnectionState: StateType)
                 =1                                 : ConnectionPointer;
                 =1
19   44  0  0    =1      FUNCTION  CreateDuplicateNode (x,y : INTEGER)
                 =1                                      : NodePointer;
                 =1
20   47  0  0    =1      PROCEDURE DeleteConnection (Connection : ConnectionPointer);
                 =1
21   49  0  0    =1      PROCEDURE DeleteNode (Node : NodePointer);
                 =1
22   51  0  0    =1      PROCEDURE DeleteNodeAndConnections (Node : NodePointer);
                 =1
```

```
23   53  0  0 =1      PROCEDURE DeleteObject (Node  : NodePointer;
                  =1                        State : StateType);
                  =1
24   56  0  0 =1      FUNCTION  EdgeConnection (CurrentConnection : ConnectionPointer)
                  =1                          : ConnectionPointer;
                  =1
25   59  0  0  1      FUNCTION  EndNode (Connection : ConnectionPointer)
                  =1                   : NodePointer;
                  =1
26   62  0  0 =1      FUNCTION  ExamineNodeTraversedFlag (Node : NodePointer)
                  =1                                     : Boolean;
                  =1
27   65  0  0 =1      FUNCTION  FindNeighbors (     x,y                   : INTEGER;
                  =1                               Radius                : INTEGER;
                  =1                               MaximumNumber         : INTEGER;
                  =1                               NeighborMode          : TypeOfNeighbor;
                  =1                           VAR Neighbors             : BYTES;
                  =1                           VAR DistanceToNeighbors : BYTES)
                  =1                          : INTEGER;
                  =1
                  =1
28   74  0  0 =1      FUNCTION  FirstConnectionInPolyline (CurrentConnection : ConnectionPointer)
                  =1                                     : ConnectionPointer;
                  =1
29   77  0  0 =1      FUNCTION  FirstConnectionInTile (i,j        : INTEGER;
                  =1                                  xMin,yMin : INTEGER;
                  =1                                  xMax,yMax : INTEGER)
                  =1                                 : ConnectionPointer;
                  =1
30   82  0  0 =1      FUNCTION  FirstNodeInTile (i,j : INTEGER)
                  =1                          : NodePointer;
                  =1
31   85  0  0 =1      FUNCTION  FirstTraversedNode : NodePointer;
                  =1
32   87  0  0 =1      FUNCTION  FirstPolylineInObject (Node : NodePointer)
                  =1                                 : ConnectionPointer;
                  =1
33   90  0  0 =1      FUNCTION  GetConnection (Node             : NodePointer;
                  =1                           ConnectionNumber : INTEGER)
                  =1                          : ConnectionPointer;
                  =1
34   94  0  0 =1      PROCEDURE GetConnectionInformation (    Connection : ConnectionPointer;
                  =1                                      VAR Edge       : Boolean;
                  =1                                      VAR State      : StateType);
                  =1
35   98  0  0 =1      FUNCTION  GetConnectionNumber (Connection : ConnectionPointer)
                  =1                                : INTEGER;
                  =1
36  101  0  0 =1      FUNCTION  GetFirstTileContainingLine (x1,y1 : INTEGER;
                  =1                                       x2,y2 : INTEGER)
                  =1                                      : LONGINT;
                  =1
37  105  0  0 =1      FUNCTION  GetNextTileContainingLine : LONGINT;
                  =1
```

```
38  107  0  0 =1      PROCEDURE GetNodeLocation (     Node : NodePointer;
               =1                                 VAR x,y  : INTEGER);
               =1
39  110  0  0 =1      FUNCTION  GetNodePointer (x,y : INTEGER)
               =1                             : NodePointer;
               =1
40  113  0  0 =1      PROCEDURE GetTileIndex (    x,y : INTEGER;
               =1                             VAR I,J : INTEGER);
               =1
41  116  0  0 =1      FUNCTION  GetTilePointer (I,J : INTEGER)
               =1                             : PointerToNodePointer;
               =1
42  119  0  0 =1      PROCEDURE GetTileStructureParameters (VAR x1,y1    : INTEGER;
               =1                                           VAR x2,y2    : INTEGER;
               =1                                           VAR TileSize : INTEGER);
               =1
43  123  0  0 =1      PROCEDURE InitializeTileStructure (x1,y1    : INTEGER;
               =1                                        x2,y2    : INTEGER;
               =1                                        TileSize : INTEGER);
               =1
44  127  0  0 =1      FUNCTION  InsertNodeIntoConnection (Connection   : ConnectionPointer;
               =1                                         x,y          : INTEGER)
               =1                                        : ConnectionPointer;
               =1
45  131  0  0 =1      FUNCTION  MergeTwoNodes (Node1 : NodePointer;
               =1                              Node2 : NodePointer)
               =1                            : NodePointer;
               =1
46  135  0  0 =1      FUNCTION  MergeThreeNodes (Node1 : NodePointer;
               =1                                Node2 : NodePointer;
               =1                                Node3 : NodePointer)
               =1                              : NodePointer;
               =1
47  140  0  0 =1      FUNCTION  MoveNode ( Node       : NodePointer;
               =1                          NewX, NewY : INTEGER)
               =1                        : Boolean;
               =1
48  144  0  0 =1      FUNCTION  NextConnectionInPolyline (CurrentConnection : ConnectionPointer;
               =1                                          FirstConnection   : ConnectionPointer)
               =1                                         : ConnectionPointer;
               =1
49  148  0  0 =1      FUNCTION  NextConnectionInTile (CurrentConnection : ConnectionPointer)
               =1                                    : ConnectionPointer;
               =1
50  151  0  0 =1      FUNCTION  NextNodeInTile (CurrentNode : NodePointer)
               =1                              : NodePointer;
               =1
51  154  0  0 =1      FUNCTION  NextPolylineInObject : ConnectionPointer;
               =1
52  156  0  0 =1      FUNCTION  NextTraversedNode : NodePointer;
               =1
53  158  0  0 =1      FUNCTION  NumberOfConnections (Node : NodePointer)
               =1                                   : INTEGER;
               =1
```

```
54  161  0  0 =1     FUNCTION  NumberOfTilesContainingLine (x1,y1 : INTEGER;
                =1                                           x2,y2 : INTEGER)
                =1                                         : INTEGER;
                =1
55  165  0  0 =1     FUNCTION  ReciprocalConnection (Connection : ConnectionPointer)
                =1                                  : ConnectionPointer;
                =1
56  168  0  0 =1     PROCEDURE ReleaseTileStructure;
                =1
57  170  0  0 =1     PROCEDURE ResetNodeTraversedFlags;
                =1
58  172  0  0 =1     PROCEDURE SetDuplicateOutputEnabled (DuplicateOutput : Boolean);
                =1
59  174  0  0 =1     PROCEDURE SetNodeTraversedFlag (Node : NodePointer);
                =1
60  176  0  0 =1     PROCEDURE SetTransitionMask (VAR NextMask     : TransitionMask;
                =1                                  VAR PreviousMask : TransitionMask);
                =1
61  179  0  0 =1     FUNCTION  TransferConnection (CurrentConnection : ConnectionPointer;
                =1                                  NewNode           : NodePointer)
                =1                                : ConnectionPointer;
                =1
62  183  0  0 =1     FUNCTION TransferConnectionField ( CurrentConnection : ConnectionPointer;
                =1                                        NewNode           : NodePointer)
                =1                                      : ConnectionPointer;
                =1
63  187  0  0 =1     PROCEDURE UpdateConnectionStatus
                =1                         (     CurrentConnection        : ConnectionPointer;
                =1                          VAR SelectedStructureAction : StructureActionType;
                =1                          VAR WrittenStructureAction  : StructureActionType);

64   35  0  0       $INCLUDE (Support.Ext)
                =1
                =1  PUBLIC SupportLibrary;
                =1
65    4  0  0 =1     TYPE
                =1       ColorNameType = PACKED ARRAY [1..10] OF CHAR;
                =1
                =1
66    8  0  0 =1     PROCEDURE ActivateMenuHandler   { #include PushSelf.Inc };
                =1
67   10  0  0 =1     PROCEDURE CrosshairOff;
                =1
68   12  0  0 =1     PROCEDURE CrosshairOn (x, y : Integer);
                =1
69   14  0  0 =1     PROCEDURE DeactivateMenuHandler { #include PushSelf.Inc };
                =1
70   16  0  0 =1     FUNCTION  DualCursorAction
                =1                         (Stylus       : Char;
                =1                          CursorStatus : CursorStatusType) : CursorActionType;
                =1
71   20  0  0 =1     PROCEDURE EraseSurface (Surface : Integer);
                =1
72   22  0  0 =1     PROCEDURE Exit;
                =1
```

```
73   34  0  0 =1    PROCEDURE GetDrawingLimits (VAR xLow, yLow,    xHigh, yHigh : Integer);
                =1
74   36  0  0 =1    PROCEDURE GetFileName (     i                 : Integer;
                =1                          VAR OutputFileName : FileName;
                =1                          VAR NewExtension   : Bytes);
                =1
75   30  0  0 =1    PROCEDURE InitializeFileVariable (VAR FileVariable : Text);
                =1
76   32  0  0 =1    PROCEDURE InquireColor (    ColorNumber       : Integer;
                =1                          VAR ColorName         : ColorNameType;
                =1                          VAR Red, Green, Blue : Integer);
                =1
77   36  0  0 =1    PROCEDURE InquireDrawingWindow (VAR x1,y1,   x2,y2 : Integer);
                =1
78   38  0  0 =1    PROCEDURE IssueStatusMessage (     x, y    : Integer;
                =1                                 VAR Text    : Bytes;
                =1                                     Length : Integer);
                =1
79   42  0  0 =1    FUNCTION  LineDistance (x1,y1,   x2,y2,   x3,y3 : Integer) : Integer;
                =1
80   44  0  0 =1    PROCEDURE PixelDrawClipped (x, y : Integer);
                =1
81   46  0  0 =1    PROCEDURE PixelDrawTransformed (x, y : Integer);
                =1
82   48  0  0 =1    PROCEDURE PixelMoveClipped (x, y : Integer);
                =1
83   50  0  0 =1    PROCEDURE PixelMoveTransformed (x, y : Integer);
                =1
84   52  0  0 =1    PROCEDURE PixelToDrawingCoordinates (    xPixel,yPixel     : Integer;
                =1                                       VAR xDrawing,yDrawing : Integer);
                =1
85   55  0  0 =1    FUNCTION  PixelToDrawingSize (PixelSize : Integer) : Integer;
                =1
86   57  0  0 =1    FUNCTION  PointDistance (x1,y1,  x2,y2 : Integer) : Integer;
                =1
87   59  0  0 =1    FUNCTION  PollChar : Char;
                =1
88   61  0  0 =1    PROCEDURE ReadThumbwheels (VAR x. y : Integer);
                =1
89   63  0  0 =1    PROCEDURE RingBell;
                =1
90   65  0  0 =1    PROCEDURE SelectColorMap (MapNumber, Intensity : Integer);
                =1
91   67  0  0 =1    PROCEDURE SelectCursorSurface;
                =1
92   69  0  0 =1    PROCEDURE SelectGraphicsSurfaces;
                =1
93   71  0  0 =1    PROCEDURE SelectMenuSurface;
                =1
94   73  0  0 =1    PROCEDURE SetColor (ColorNumber,Red,Green,Blue : Integer);
                =1
95   75  0  0 =1    PROCEDURE SetDrawingWindow (x1,y1,   x2,y2 : Integer);
                =1
96   77  0  0 =1    PROCEDURE SetHostHandler;       {Called only from assembler by Host Header}
                =1
```

```
 97   79  0  0 =1        PROCEDURE SetIntensity (Intensity : Integer);
                =1
 98   81  0  0 =1        PROCEDURE SetKeyboardHandler;
 99   82  0  0 =1                                {Called only from assembler by Keyboard Header}
                =1
                =1        PROCEDURE SetLineIndex (LineIndex : Integer);
                =1
100   86  0  0 =1        PROCEDURE SetTabletHandler;
101   87  0  0 =1                                  {Called only from assembler by Tablet Header}
                =1
                =1        PROCEDURE SetThumbwheelHandler;
102   90  0  0 =1                              {Called only from assembler by Thumbwheel Header}
                =1
                =1        FUNCTION  SideDistance (Hypotenuse, OtherSide : Integer) : Integer;
                =1
103   94  0  0 =1        FUNCTION  SingleCursorAction
                =1                     (Stylus       : Char;
                =1                      CursorStatus : CursorStatusType) : CursorActionType;

104   37  0  0         $INCLUDE (TekMan.Ext)
                =1       PUBLIC TekMan;
                =1
105    3  0  0 =1       CONST
                =1         MaximumLengthOfFileName =   14;
106    5  0  0 =1         xMaxDisplayPixel        = 1279    {tk4115};
107    6  0  0 =1         xMaxViewportCoordinate  = 4095    {tk4113};
108    7  0  0 =1         xNumberOfDisplayPixels  = 1280    {tk4115};
109    8  0  0 =1         yMaxDisplayPixel        =  959    {tk4115};
110    9  0  0 =1         yMaxViewportCoordinate  = 3071    {tk4113};
111   10  0  0 =1         yNumberOfDisplayPixels  =  960    {tk4115};
                =1
112   12  0  0 =1       TYPE
                =1         CursorStatusType = (Limbo,
                =1                             WriteMode,
                =1                             LockMode,
                =1                             LockAndWriteMode);
                =1
113   18  0  0 =1         CursorActionType = (NoAction,
                =1                             EnterWriteMode,
                =1                             StayInWriteMode,
                =1                             EnterLimbo,
                =1                             EnterLockMode,
                =1                             StayInLockMode,
                =1                             EnterLockAndWriteMode,
                =1                             StayInLockAndWriteMode,
                =1                             ReturnToLockMode,
                =1                             ReturnToWriteMode);
                =1
114   29  0  0 =1         FileName         = PACKED ARRAY [1..MaximumLengthOfFilename] OF CHAR;
                =1
115   31  0  0 =1         GINType          = (ConstrainedGIN,
                =1                             UnconstrainedGIN,
                =1                             MenuSelection);

116   39  0  0         $SUBTITLE ('          Cursor Drawing Routines')
```

```
                PRIVATE CursorDrawing;

117   45  0  0       CONST
                       CursorColor    = 1;
118   47  0  0         Invisible      = 0;

119   50  0  0       VAR
                       CursorVisible : Boolean;          { Is cursor visible to user?      }

120   53  0  0         PriorMode     : TypeOfNeighbor;   { Mode last time cursor drawn     }

121   55  0  0         PriorRadius   : Integer;          { Radius last time cursor drawn }

122   57  0  0         PriorX        : Integer;          { x last time cursor drawn        }

123   59  0  0         PriorY        : Integer;          { y last time cursor drawn        }

124   62  0  0       {==========================================================================}

                     PROCEDURE DrawCane (x,y : Integer; Radius : Integer);

125   66  1  0         CONST
                         HandleSize = 5;

136   69  1  0         BEGIN { DrawCane }
126   70  1  1           PixelMoveClipped (x,               y - HandleSize);
127   71  1  1           PixelDrawClipped (x,               y + HandleSize);
128   72  1  1           PixelMoveClipped (x - HandleSize, y);
129   73  1  1           PixelDrawClipped (x + Radius,      y);
130   74  1  1         END   { DrawCane };

131   77  0  0       {==========================================================================}

                     PROCEDURE DrawCircle (x,y : Integer; Radius : Integer);

132   81  1  0         VAR
                         r          : ARRAY [0..4] OF Integer;

133   84  1  0         BEGIN { DrawCircle }
133   85  1  1           { We will approximate a circle with chords every 22.5 degrees, giving }
                         { sixteen vectors per circle.  In fact, we directly calculate the      }
                         { coordinates for the first quadrant and 'reflect' for the others.     }
                         { The sine function is used in the calculations, with the values       }
                         { approximated as rationals with a denominator of 256.  For example,   }
                         { sin (22.5) is represented as 181/256 (with a value of 0.70703125)    }
                         { whereas the floating representation is 0.70710678.                   }

                         r [0] := 0;                         { Radius * sin ( 0.0) }
134   94  1  1           r [1] := (Radius *  98) DIV 256;    { Radius * sin (22.5) }
```

```
      r [2] := (Radius * 181) DIV 256;    { Radius * sin (45.0) }
      r [3] := (Radius * 231) DIV 256;    { Radius * sin (67.5) }
      r [4] := Radius;                    { Radius * sin (90.0) }

      { And away we go -- using an algorithm known to computer scientists }
      { as ... BRUTE FORCE!                                               }

      PixelMoveClipped (x + r [4], y + r [0]);  { move to start }

      PixelDrawClipped (x + r [3], y + r [1]);
      PixelDrawClipped (x + r [2], y + r [2]);
      PixelDrawClipped (x + r [1], y + r [3]);
      PixelDrawClipped (x + r [0], y + r [4]);  { end of first quadrant }

      PixelDrawClipped (x - r [1], y + r [3]);
      PixelDrawClipped (x - r [2], y + r [2]);
      PixelDrawClipped (x - r [3], y + r [1]);
      PixelDrawClipped (x - r [4], y + r [0]);  { end of second quadrant }

      PixelDrawClipped (x - r [3], y - r [1]);
      PixelDrawClipped (x - r [2], y - r [2]);
      PixelDrawClipped (x - r [1], y - r [3]);
      PixelDrawClipped (x - r [0], y - r [4]);  { end of third quadrant }

      PixelDrawClipped (x + r [1], y - r [3]);
      PixelDrawClipped (x + r [2], y - r [2]);
      PixelDrawClipped (x + r [3], y - r [1]);
      PixelDrawClipped (x + r [4], y - r [0]);  { end of fourth quadrant }
    END   { DrawCircle };

{==================================================================}

PROCEDURE DrawCursor (Mode   : TypeOfNeighbor;
                      x,y    : Integer;
                      Radius : Integer);

    BEGIN { DrawCursor }
      EraseCursor;

      { Save the parameters passed in -- their next times 'priors' }
      PriorMode   := Mode;
      PriorX      := x;
      PriorY      := y;
      PriorRadius := Radius;

      SelectCursorSurface;
      SetLineIndex (CursorColor);

      CASE Mode OF
        Nodes : DrawDiamond (x,y,  Radius);
        Lines : DrawCircle  (x,y,  Radius);
        Edges : DrawCane    (x,y,  Radius);
      END { CASE Mode OF };
```

```
170  151  1  1          CursorVisible := True;
171  152  1  1          SelectGraphicsSurfaces;
172  153  1  1        END   { DrawCursor };

173  156  0  0     {=====================================================================}

                   PROCEDURE DrawDiamond (x,y : Integer; Radius : Integer);

174  160  1  0        BEGIN { DrawDiamond }
174  161  1  1          PixelMoveClipped (x + Radius, y);
175  162  1  1          PixelDrawClipped (x,          y + Radius);
176  163  1  1          PixelDrawClipped (x - Radius, y);
177  164  1  1          PixelDrawClipped (x,          y - Radius);
178  165  1  1          PixelDrawClipped (x + Radius, y);
179  166  1  1        END   { DrawDiamond };

180  169  0  0     {=====================================================================}

                   PROCEDURE EraseCursor;

181  173  1  0        BEGIN { EraseCursor }
181  174  1  1          IF CursorVisible
                           THEN
182  176  1  1              BEGIN
182  177  1  2                SelectCursorSurface;
183  178  1  2                SetLineIndex (Invisible);

184  180  1  2                CASE PriorMode OF
185  181  1  3                  Nodes : DrawDiamond (PriorX, PriorY, PriorRadius);
186  182  1  3                  Lines : DrawCircle  (PriorX, PriorY, PriorRadius);
187  183  1  3                  Edges : DrawCane    (PriorX, PriorY, PriorRadius);
188  184  1  3                END { CASE PriorMode OF };

190  186  1  2                CursorVisible := False;
191  187  1  2                SelectGraphicsSurfaces;
192  188  1  2              END;
194  189  1  1        END   { EraseCursor };

195  191  0  0     {=====================================================================}

                   PROCEDURE InitializeCursorDrawing;

196  196  1  0        VAR
                         TileSize : Integer;
197  198  1  0          xMax     : Integer;
198  199  1  0          xMin     : Integer;
199  200  1  0          yMax     : Integer;
200  201  1  0          yMin     : Integer;

201  203  1  0        BEGIN { InitializeCursorDrawing }
201  204  1  1          CursorVisible := False;
```

```
202  205  1  1           PriorMode      := Nodes;
203  206  1  1           GetTileStructureParameters (xMin, yMin,   xMax,yMax,   TileSize);
204  207  1  1           PriorX         := xMin;
205  208  1  1           PriorY         := yMin;
206  209  1  1           PriorRadius    := 1;
207  210  1  1         END   { InitializeCursorDrawing };

208  212  0  0        {==========================================================================}


541 Lines Read.
  0 Errors Detected.
61% Utilization of Memory.


Source File: A:NIBBLE.PAS
Object File: <none>
Controls Specified:  ERRORPRINT, NOOBJECT, PRINT(D:NIBBLE.LST[G9]), TITLE(            NIBBLE CURSOR).

STMT LINE NESTING       SOURCE TEXT: A:NIBBLE.PAS

   1    3  0  0         MODULE NibbleCursor;
   2    4  0  0                        {-----------------------------------------------}
                                       {                                               }
                                       {                                               }
                                       {                                               }
                                       {                                               }
                                       {                                               }
                                       { MODULE: Nibble Cursor                         }
                                       {    This module is for selecting segments and po-}
                                       {    lylines in the drawing. When nibble cursor is}
                                       {    called there are two modes that it runs in: }
                                       {        1) Line Mode - wherein the line segments }
                                       {           selected by the cursor will be process-}
                                       {           ed.                                 }
                                       {        2) Polyline Mode - wherein any set of   }
                                       {           lines attached together by nodes with 2}
                                       {           connections is processed  by selecting }
                                       {           any one of the nodes in the set.    }
                                       {                                               }
                                       { FUNCTIONS:                                    }
                                       {    InitializeCursor:       Setup initial values }
                                       {                            when cursor is loaded}
                                       {                                               }
                                       {    SecondaryMenuHandler    Called from Activate-}
                                       {                            MenuHandler to take }
                                       {                            care of secondary   }
                                       {                            menu choices.       }
                                       {                                               }
                                       {    SuspendTabletHander     Handles the case of }
                                       {                            the pen NOT being in }
                                       {                            close proximity to  }
                                       {                            the graphics area.  }
                                       {                                               }
```

```
            {    HandleTabletEvent        Does the actual sel- }
            {                             ection in the cursor }
            {                             and does the changing}
            {                             of states for the    }
            {                             selected connections.}
            {                                                  }
            {                                                  }
            { Globals:                                         }
            {    Xgin,Ygin                Position of cursor on}
            {                             the tablet in x,y co-}
            {                             ordinates.           }
            {                                                  }
            {    ContactRadius            The cursor radius da-}
            {                             ta structure units.  }
            {                                                  }
            {    PixelConnectRadius       The cursor radius in }
            {                             pixel count for draw-}
            {                             ing the cursor on the}
            {                             screen.              }
            {                                                  }
            {    SaveX, SaveY,                                 }
            {    SaveRadius               The old placement of }
            {                             cursor for when sur- }
            {                             faces are changed.   }
            {                                                  }
            {    CursorStatus             Whether the cursor   }
            {                             exists on the gra-   }
            {                             phics surface.       }
            {                                                  }
            {    CursorVisibility         Whether the cursor is}
            {                             visible when it is on}
            {                             the graphics.        }
            {                                                  }
            {    PolyLineMode             Whether we are look- }
            {                             ing for lines or po- }
            {                             lylines.             }
            {                                                  }
            { Authors:                                         }
            {        Herb Weiner                               }
            {        Dave Butler                               }
            {                                                  }
            { Date: 10/11/83                                   }
            {                                                  }
            { Modified:                                        }
            {   10 February 1984 by Jack Slingerland           }
            {     Changed to call CursorDrawing module for     }
            {     the drawing of the cursor.  (no more mouth)  }
            {                                                  }
            {--------------------------------------------------}
        $INCLUDE (CursDraw.Ext)
     =1 PUBLIC CursorDrawing;
     =1
3 3 0 0 =1   PROCEDURE DrawCursor (Mode   : TypeOfNeighbor;
     =1                            x,y    : Integer;
     =1                            Radius : Integer);
```

```
                =1
 4    7   0   0 =1       PROCEDURE EraseCursor;
                =1
 5    9   0   0 =1       PROCEDURE InitializeCursorDrawing;

 6   87   0   0        $INCLUDE (Spatial.Ext)
                =1                       { Spatial Data Structure Routines}
                =1
                =1     PUBLIC SpatialLibrary;
                =1
 7    5   0   0 =1       CONST
                =1         NilConnection       = 0;
 8    7   0   0 =1         NilNode             = 0;
 9    8   0   0 =1         MaxConnections      = 14;
                =1
10   10   0   0 =1       TYPE
                =1         ConnectionPointer   = LongInt;
                =1
11   13   0   0 =1         NodePointer         = LongInt:
                =1
12   15   0   0 =1         PointerToNodePointer= ^NodePointer;
                =1
13   17   0   0 =1         StateType           = (Hidden,
                =1                                Untagged,
                =1                                Selected,
                =1                                Written,
                =1                                SelectedAndWritten,
                =1                                Primitive,
                =1                                Reserved6,
                =1                                Reserved7);
                =1
14   26   0   0 =1         StructureActionType = (DoNothing,
                =1                                AddToStructure,
                =1                                DeleteFromStructure);
                =1
15   30   0   0 =1         TransitionMask      = PACKED ARRAY [Hidden..Reserved7] OF CHAR;
                =1
16   32   0   0 =1         TypeOfNeighbor      = (Nodes, Lines, Edges);
                =1
                =1
                =1
17   36   0   0 =1       FUNCTION  ConnectionTraversable (Connection : ConnectionPointer) : Boolean;
                =1
18   38   0   0 =1       FUNCTION  CreateConnection (Node1            : NodePointer;
                =1                                   Node2            : NodePointer;
                =1                                   FilledAreaFlag   : Boolean;
                =1                                   ConnectionState: StateType)
                =1                                 : ConnectionPointer;
                =1
19   44   0   0 =1       FUNCTION  CreateDuplicateNode (x,y : INTEGER)
                =1                                   : NodePointer;
                =1
20   47   0   0 =1       PROCEDURE DeleteConnection (Connection : ConnectionPointer);
                =1
```

```
21   49  0  0 =1      PROCEDURE DeleteNode (Node : NodePointer);
                =1
22   51  0  0 =1      PROCEDURE DeleteNodeAndConnections (Node : NodePointer);
                =1
23   53  0  0 =1      PROCEDURE DeleteObject (Node  : NodePointer;
                =1                             State : StateType);
                =1
24   56  0  0 =1      FUNCTION  EdgeConnection (CurrentConnection : ConnectionPointer)
                =1                              : ConnectionPointer;
                =1
25   59  0  0 =1      FUNCTION  EndNode (Connection : ConnectionPointer)
                =1                       : NodePointer;
                =1
26   62  0  0 =1      FUNCTION  ExamineNodeTraversedFlag (Node : NodePointer)
                =1                                         : Boolean;
                =1
27   65  0  0 =1      FUNCTION  FindNeighbors (     x,y                    : INTEGER;
                =1                                  Radius                 : INTEGER;
                =1                                  MaximumNumber          : INTEGER;
                =1                                  NeighborMode           : TypeOfNeighbor;
                =1                              VAR Neighbors              : BYTES;
                =1                              VAR DistanceToNeighbors    : BYTES)
                =1                             : INTEGER;
                =1
                =1
28   74  0  0 =1      FUNCTION  FirstConnectionInPolyline (CurrentConnection : ConnectionPointer)
                =1                                          : ConnectionPointer;
                =1
29   77  0  0 =1      FUNCTION  FirstConnectionInTile (i,j       : INTEGER;
                =1                                     xMin,yMin : INTEGER;
                =1                                     xMax,yMax : INTEGER)
                =1                                    : ConnectionPointer;
                =1
30   82  0  0 =1      FUNCTION  FirstNodeInTile (i,j : INTEGER)
                =1                               : NodePointer;
                =1
31   85  0  0 =1      FUNCTION  FirstTraversedNode : NodePointer;
                =1
32   87  0  0 =1      FUNCTION  FirstPolylineInObject (Node : NodePointer)
                =1                                    : ConnectionPointer;
                =1
33   90  0  0 =1      FUNCTION  GetConnection (Node             : NodePointer;
                =1                             ConnectionNumber : INTEGER)
                =1                            : ConnectionPointer;
                =1
34   94  0  0 =1      PROCEDURE GetConnectionInformation (    Connection : ConnectionPointer;
                =1                                        VAR Edge       : Boolean;
                =1                                        VAR State      : StateType);
                =1
35   98  0  0 =1      FUNCTION  GetConnectionNumber (Connection : ConnectionPointer)
                =1                                  : INTEGER;
                =1
36  101  0  0 =1      FUNCTION  GetFirstTileContainingLine (x1,y1 : INTEGER;
                =1                                          x2,y2 : INTEGER)
                =1                                         : LONGINT;
```

```
                =1
37  105  0  0 =1      FUNCTION  GetNextTileContainingLine : LONGINT;
                =1
38  107  0  0 =1      PROCEDURE GetNodeLocation (    Node : NodePointer;
                =1                                VAR x,y  : INTEGER);
                =1
39  110  0  0 =1      FUNCTION  GetNodePointer (x,y : INTEGER)
                =1                              : NodePointer;
                =1
40  113  0  0 =1      PROCEDURE GetTileIndex (    x,y : INTEGER;
                =1                            VAR I,J : INTEGER);
                =1
41  116  0  0 =1      FUNCTION  GetTilePointer (I,J : INTEGER)
                =1                              : PointerToNodePointer;
                =1
42  119  0  0 =1      PROCEDURE GetTileStructureParameters (VAR x1,y1    : INTEGER;
                =1                                           VAR x2,y2    : INTEGER;
                =1                                           VAR TileSize : INTEGER);
                =1
43  123  0  0 =1      PROCEDURE InitializeTileStructure (x1,y1    : INTEGER;
                =1                                       x2,y2    : INTEGER;
                =1                                       TileSize : INTEGER);
                =1
44  127  0  0 =1      FUNCTION  InsertNodeIntoConnection (Connection   : ConnectionPointer;
                =1                                         x,y          : INTEGER)
                =1                                       : ConnectionPointer;
                =1
45  131  0  0 =1      FUNCTION  MergeTwoNodes (Node1 : NodePointer;
                =1                               Node2 : NodePointer)
                =1                             : NodePointer;
                =1
46  135  0  0 =1      FUNCTION  MergeThreeNodes (Node1 : NodePointer;
                =1                                 Node2 : NodePointer;
                =1                                 Node3 : NodePointer)
                =1                               : NodePointer;
                =1
47  140  0  0 =1      FUNCTION  MoveNode ( Node       : NodePointer;
                =1                           NewX, NewY : INTEGER)
                =1                         : Boolean;
                =1
48  144  0  0 =1      FUNCTION  NextConnectionInPolyline (CurrentConnection : ConnectionPointer;
                =1                                         FirstConnection   : ConnectionPointer)
                =1                                       : ConnectionPointer;
                =1
49  148  0  0 =1      FUNCTION  NextConnectionInTile (CurrentConnection : ConnectionPointer)
                =1                                   : ConnectionPointer;
                =1
50  151  0  0 =1      FUNCTION  NextNodeInTile (CurrentNode : NodePointer)
                =1                             : NodePointer;
                =1
51  154  0  0 =1      FUNCTION  NextPolylineInObject : ConnectionPointer;
                =1
52  156  0  0 =1      FUNCTION  NextTraversedNode : NodePointer;
                =1
```

```
53  156  0  0 =1      FUNCTION   NumberOfConnections (Node : NodePointer)
                =1                                    : INTEGER;
                =1
54  161  0  0 =1      FUNCTION   NumberOfTilesContainingLine (x1,y1 : INTEGER;
                =1                                            x2,y2 : INTEGER)
                =1                                          : INTEGER;
                =1
55  155  0  0 =1      FUNCTION   ReciprocalConnection (Connection : ConnectionPointer)
                =1                                    : ConnectionPointer;
                =1
56  168  0  0 =1      PROCEDURE ReleaseTileStructure;
                =1
57  170  0  0 =1      PROCEDURE ResetNodeTraversedFlags;
                =1
58  172  0  0 =1      PROCEDURE SetDuplicateOutputEnabled (DuplicateOutput : Boolean);
                =1
59  174  0  0 =1      PROCEDURE SetNodeTraversedFlag (Node : NodePointer);
                =1
60  176  0  0 =1      PROCEDURE SetTransitionMask (VAR NextMask     : TransitionMask;
                =1                                 VAR PreviousMask : TransitionMask);
                =1
61  179  0  0 =1      FUNCTION   TransferConnection (CurrentConnection : ConnectionPointer;
                =1                                   NewNode           : NodePointer)
                =1                                 : ConnectionPointer;
                =1
62  183  0  0 =1      FUNCTION TransferConnectionField ( CurrentConnection : ConnectionPointer;
                =1                                      NewNode           : NodePointer)
                =1                                    : ConnectionPointer;
                =1
63  187  0  0 =1      PROCEDURE UpdateConnectionStatus
                =1                           (     CurrentConnection        : ConnectionPointer;
                =1                            VAR SelectedStructureAction : StructureActionType;
                =1                            VAR WrittenStructureAction  : StructureActionType);
64   89  0  0      $INCLUDE (TekMan.Ext)
               =1  PUBLIC TekMan;
               =1
65    3  0  0 =1   CONST
               =1    MaximumLengthOfFileName =   14;
66    5  0  0 =1     xMaxDisplayPixel        = 1279    {tk4115};
67    6  0  0 =1     xMaxViewportCoordinate  = 4095    {tk4113};
68    7  0  0 =1     xNumberOfDisplayPixels  = 1280    {tk4115};
69    8  0  0 =1     yMaxDisplayPixel        =  959    {tk4115};
70    9  0  0 =1     yMaxViewportCoordinate  = 3071    {tk4113};
71   10  0  0 =1     yNumberOfDisplayPixels  =  960    {tk4115};
               =1
72   12  0  0 =1   TYPE
               =1    CursorStatusType = (Limbo,
               =1                        WriteMode,
               =1                        LockMode,
               =1                        LockAndWriteMode);
               =1
73   18  0  0 =1     CursorActionType = (NoAction,
               =1                        EnterWriteMode,
```

```
                =1                         StayInWriteMode,
                =1                         EnterLimbo,
                =1                         EnterLockMode,
                =1                         StayInLockMode,
                =1                         EnterLockAndWriteMode,
                =1                         StayInLockAndWriteMode,
                =1                         ReturnToLockMode,
                =1                         ReturnToWriteMode);
                =1
74   29   0   0 =1      FileName        = PACKED ARRAY [1..MaximumLengthOfFilename] OF CHAR;
                =1
75   31   0   0 =1      GINType         = (ConstrainedGIN,
                =1                         UnconstrainedGIN,
                =1                         MenuSelection);

76   92   0   0       PUBLIC NibbleCursor;
77   93   0   0       PROCEDURE Initialize;
78   94   0   0       PROCEDURE SuspendTabletHandler;
79   95   0   0       PROCEDURE HandleTabletEvent(xPixelGin,yPixelGin:Integer;Stylus:Char);
80   96   0   0       PROCEDURE SecondaryMenuHandler(ItemNumber:Integer);

81   98   0   0       $INCLUDE(support.ext)
                =1
                =1    PUBLIC SupportLibrary;
                =1
82    4   0   0 =1      TYPE
                =1        ColorNameType = PACKED ARRAY [1..10] OF CHAR;
                =1
                =1
83    8   0   0 =1      PROCEDURE ActivateMenuHandler    { #include PushSelf.Inc };
                =1
84   10   0   0 =1      PROCEDURE CrosshairOff;
                =1
85   12   0   0 =1      PROCEDURE CrosshairOn (x, y : Integer);
                =1
86   14   0   0 =1      PROCEDURE DeactivateMenuHandler { #include PushSelf.Inc };
                =1
87   16   0   0 =1      FUNCTION  DualCursorAction
                =1                          (Stylus       : Char;
                =1                           CursorStatus : CursorStatusType) : CursorActionType;
                =1
88   20   0   0 =1      PROCEDURE EraseSurface (Surface : Integer);
                =1
89   22   0   0 =1      PROCEDURE Exit;
                =1
90   24   0   0 =1      PROCEDURE GetDrawingLimits (VAR xLow, yLow,    xHigh, yHigh : Integer);
                =1
91   26   0   0 =1      PROCEDURE GetFileName (    i                : Integer;
                =1                            VAR OutputFileName : FileName;
                =1                            VAR NewExtension   : Bytes);
                =1
92   30   0   0 =1      PROCEDURE InitializeFileVariable (VAR FileVariable : Text);
                =1
93   32   0   0 =1      PROCEDURE InquireColor (    ColorNumber      : Integer;
```

```
                 =1                                  VAR ColorName        : ColorNameType;
                 =1                                  VAR Red, Green, Blue : Integer);
                 =1
 94   36   0   0 =1       PROCEDURE InquireDrawingWindow (VAR x1,y1.   x2,y2 : Integer);
                 =1
 95   38   0   0 =1       PROCEDURE IssueStatusMessage (     x, y   : Integer;
                 =1                                    VAR Text   : Bytes;
                 =1                                        Length : Integer);
                 =1
 96   42   0   0 =1       FUNCTION  LineDistance (x1,y1.   x2,y2,   x3,y3 : Integer) : Integer;
                 =1
 97   44   0   0 =1       PROCEDURE PixelDrawClipped (x, y : Integer);
                 =1
 98   46   0   0 =1       PROCEDURE PixelDrawTransformed (x, y : Integer);
                 =1
 99   48   0   0 =1       PROCEDURE PixelMoveClipped (x, y : Integer);
                 =1
100   50   0   0 =1       PROCEDURE PixelMoveTransformed (x, y : Integer);
                 =1
101   52   0   0 =1       PROCEDURE PixelToDrawingCoordinates (    xPixel,vPixel     : Integer;
                 =1                                        VAR xDrawing,yDrawing : Integer);
                 =1
102   55   0   0 =1       FUNCTION  PixelToDrawingSize (PixelSize : Integer) : Integer;
                 =1
103   57   0   0 =1       FUNCTION  PointDistance (x1,y1,  x2,y2 : Integer) : Integer;
                 =1
104   59   0   0 =1       FUNCTION  PollChar : Char;
                 =1
105   61   0   0 =1       PROCEDURE ReadThumbwheels (VAR x, y : Integer);
                 =1
106   63   0   0 =1       PROCEDURE RingBell;
                 =1
107   65   0   0 =1       PROCEDURE SelectColorMap (MapNumber, Intensity : Integer);
                 =1
108   67   0   0 =1       PROCEDURE SelectCursorSurface;
                 =1
109   69   0   0 =1       PROCEDURE SelectGraphicsSurfaces;
                 =1
110   71   0   0 =1       PROCEDURE SelectMenuSurface;
                 =1
111   73   0   0 =1       PROCEDURE SetColor (ColorNumber,Red,Green,Blue : Integer);
                 =1
112   75   0   0 =1       PROCEDURE SetDrawingWindow (x1,y1,   x2,y2 : Integer);
                 =1
113   77   0   0 =1       PROCEDURE SetHostHandler;       {Called only from assembler by Host Header}
                 =1
114   79   0   0 =1       PROCEDURE SetIntensity (Intensity : Integer);
                 =1
115   81   0   0 =1       PROCEDURE SetKeyboardHandler;
116   82   0   0 =1                             {Called only from assembler by Keyboard Header}
                 =1
                 =1       PROCEDURE SetLineIndex (LineIndex : Integer);
                 =1
117   86   0   0 =1       PROCEDURE SetTabletHandler;
```

```
                                        {Called only from assembler by Tablet Header}

    PROCEDURE SetThumbwheelHandler;
                                 {Called only from assembler by Thumbwheel Header}

    FUNCTION  SideDistance (Hypotenuse, OtherSide : Integer) : Integer;

    FUNCTION  SingleCursorAction
                          (Stylus       : Char;
                           CursorStatus : CursorStatusType) : CursorActionType;
  PRIVATE NibbleCursor;

    VAR
      ContactRadius       : Integer;
      CursorStatus        : CursorStatusType;
      PixelContactRadius  : Integer;
      PolylineMode        : Boolean;
      SaveOpen            : Boolean;
      xGin                : Integer;
      yGin                : Integer;

  {========================================================================}
  { Initialize                  This procedure initializes the global      }
  {                             variables.                                 }
  {========================================================================}

    PROCEDURE Initialize;
      BEGIN
        CursorStatus := Limbo;
        PixelContactRadius := 5;
        PolylineMode := False;
        SaveOpen := True;
      END;

  {==========================================================================}
  { SecondaryMenuHandler           This procedure handles menu requests.     }
  {==========================================================================}

  PROCEDURE SecondaryMenuHandler(ItemNumber:Integer);
    BEGIN
      CASE ItemNumber OF
        1: PixelContactRadius := 10;
        2: PixelContactRadius := 5;
        3: PolylineMode := True;
        4: PolylineMode := False;
        OTHERWISE RingBell;
      END;
    END;

  {==========================================================================}
  { SuspendTabletHandler           This procedure erases the cursor.         }
  {==========================================================================}

  PROCEDURE SuspendTabletHandler;
    BEGIN
```

```
      EraseCursor;
    END;

  {==========================================================================}
  { ConnectLine                      This procedure connects the specified line   }
  {                                  segment or polyline.                          }
  {==========================================================================}

  PROCEDURE ConnectLine(Connection:ConnectionPointer);
    VAR
      PolylineBegin: ConnectionPointer;
      SellectAction, WrittenAction: StructureActionType;
    BEGIN
      IF PolylineMode THEN
        BEGIN
          PolylineBegin := FirstConnectionInPolyline(Connection):
          Connection := PolylineBegin;
          WHILE (Connection <> NilConnection) DO
            BEGIN
              UpdateConnectionStatus(Connection,SellectAction,WrittenAction);
            {This location in code reserved for logic to handle the return  }
            {variables SellectAction and WrittenAction, and actually change }
            {the status of the sellected segment.                           }
              Connection := NextConnectionInPolyline(Connection,
                                                     PolylineBegin);
            END {on while};
        END {on if}
      ELSE
        BEGIN
          UpdateConnectionStatus(Connection,SellectAction,WrittenAction);
        {This location in code reserved for logic to handle the return  }
        {variables SellectAction and WrittenAction, and actually change }
        {the status of the sellected segment.                           }
        END {on else};
    END;

  {==========================================================================}
  { UpdateNibbleCursor               This procedure finds the nodes or lines      }
  {                                  within ContactRadius and moves all connected }
  {                                  pieces to the destination layer.             }
  {==========================================================================}

  PROCEDURE UpdateNibbleCursor;
    CONST
      MaximumNumberOfNeighbors = 10;
    VAR
      I, NumberOfNeighbors: Integer;
      Neighbors: ARRAY [1..MaximumNumberOfNeighbors] OF ConnectionPointer;
      DistanceToNeighbor: ARRAY [1..MaximumNumberOfNeighbors] OF Integer;

    BEGIN
      NumberOfNeighbors := FindNeighbors(Xgin,Ygin,ContactRadius,
                                        MaximumNumberOfNeighbors,Lines,
                                        Neighbors,DistanceToNeighbor);
      FOR I := 1 TO NumberOfNeighbors DO
```

```
        BEGIN
          ConnectLine(Neighbors[I])
        END;
    END;

{========================================================================}
{ HandleTabletEvent                This procedure maintains the status of the  }
{                                  Nibble cursor and changes state when        }
{                                  necessary.                                  }
{========================================================================}

PROCEDURE HandleTabletEvent(xPixelGin,yPixelGin:Integer;Stylus:Char);
  BEGIN
    DrawCursor (Lines,    xPixelGin, yPixelGin,    PixelContactRadius);
    PixelToDrawingCoordinates(xPixelGin,yPixelGin,Xgin,Ygin);
    CASE SingleCursorAction(Stylus,CursorStatus) OF
        NoAction:                 CrosshairOn(xPixelGin,yPixelGin);
        EnterWriteMode:           BEGIN
                                    ResetNodeTraversedFlags;
                                    CrosshairOff;
                                    ContactRadius := PixelToDrawingSize(PixelContactRadius);
                                    CursorStatus := WriteMode;
                                    UpdateNibbleCursor;
                                  END;
        StayInWriteMode:          UpdateNibbleCursor;
        EnterLimbo:               BEGIN
                                    CrosshairOn(xPixelGin,yPixelGin);
                                    CursorStatus := Limbo;
                                  END;
     END {CASE SingleCursorAction} ;
   END;
```

```
1    3  0  0          MODULE ReadPix;

2    5  0  0

                  {----------------------------------------------------------------------}
                  {                                                                      }
                  {  MODULE: ReadPix                                                     }
                  {          Reads drawing file and stores drawing in spatial structure. }
                  {          As of SR1, uses the same format for picture files as that  }
                  {          used by the prototype system.                              }
                  {                                                                      }
                  {  ROUTINES CONTAINED IN ReadPix:                                     }
                  {                                                                      }
                  {     PUBLIC:                                                          }
                  {        GetDrawingLimits:   Returns coordinates of the lower-left and }
                  {                            upper-right extremes of the drawing.  (A box }
                  {                            with these corners would enclose the drawing.) }
                  {                                                                      }
                  {        InitializeDrawing:  Initializes variables used in ReadDrawing. }
                  {                            This is done in a separate routine so that it }
                  {                            will be possible to resume reading after  }
                  {                            a temporary suspension.                   }
                  {                                                                      }
                  {        ReadDrawing:        Reads a drawing, displaying the 'displayable' }
                  {                            nodes and connections on the screen.  Quits at }
                  {                            the end of the drawing, or when out of memory }
                  {                            in which to store the drawing.  In the latter }
                  {                            instance, information is retained so that  }
                  {                            it is possible to resume reading if additional }
                  {                            memory becomes available.                 }
                  {                                                                      }
                  {                                                                      }
                  {                                                                      }
                  {                                                                      }
                  {                                                                      }
                  {                                                                      }
                  {----------------------------------------------------------------------}

                  $INCLUDE (ReadPix.Ext)
              =1  PUBLIC ReadPix;
              =1
3    5  0  0  =1    PROCEDURE GetDrawingLimits (VAR xLow,yLow, xHigh,yHigh : Integer);
              =1
4    5  0  0  =1    PROCEDURE InitializeDrawing;
              =1
5    7  0  0  =1    PROCEDURE ReadDrawing (VAR InputFile    : Text;
              =1                              xMin,yMin    : Integer;
              =1                              xMax,yMax    : Integer;
              =1                          VAR xLow,yLow    : Integer;
              =1                          VAR xHigh,yHigh  : Integer);

6   46  0  0        $INCLUDE (Cursor.Ext)
```

```
              =1      PUBLIC Cursor;
 7   2  0  0 =1         PROCEDURE InitializeCursor:
              =1
 8   4  0  0 =1         PROCEDURE IssueStatusMessage (     x,y     : Integer;
              =1                                       VAR Text    : Bytes;
              =1                                           Length : Integer);
              =1
 9   8  0  0 =1         PROCEDURE SelectCursorSurface;
              =1
10  10  0  0 =1         PROCEDURE SelectGraphicsSurfaces;
              =1
11  12  0  0 =1         PROCEDURE SelectMenuSurface;
              =1
12  14  0  0 =1         PROCEDURE SetLineIndex (LineIndex : Integer);

13  48  0  0          $INCLUDE (LTI.Ext)
              =1      PUBLIC LTI;
              =1
14   3  0  0 =1       PROCEDURE LLBPXL (VAR Surface,ALU,Bits : INTEGER);   {Begin-Pixel-Operations}
15   4  0  0 =1       PROCEDURE LLCLMD (VAR Mode,Overlay,Grey : INTEGER);  {Set-Color-Mode}
16   5  0  0 =1       PROCEDURE LLCLMP (VAR Surface,Len : INTEGER;VAR Map : BYTES); {Set-Surface-Color-Map}
17   6  0  0 =1       PROCEDURE LLDAEN (VAR Enabled : INTEGER);            {Enable-Dialogue-Area}
18   7  0  0 =1       PROCEDURE LLDALN (VAR Lines : INTEGER);              {Set-Dialogue-Area-Lines}
19   8  0  0 =1       PROCEDURE LLDASF (VAR Surface : INTEGER);            {Set-Dialogue-Area-Surface}
20   9  0  0 =1       PROCEDURE LLDAVS (VAR Vis : INTEGER);                {Set-Dialogue-Area-Visibility}
21  10  0  0 =1       PROCEDURE LLDAXY (VAR X,Y : INTEGER);                {Set-Dialogue-Area-Position}
22  11  0  0 =1       PROCEDURE LLDLSG (VAR Seg : INTEGER);                {Delete-Segment}
23  12  0  0 =1       PROCEDURE LLDLVW (VAR View : INTEGER);               {Delete-View}
24  13  0  0 =1       PROCEDURE LLGPRC (VAR Precision: INTEGER);           {Set-Graphtext-Precision}
25  14  0  0 =1       PROCEDURE LLGSIZ (VAR Width,Height,Spacing:INTEGER); {Set-Graphtext-Size}
26  15  0  0 =1       PROCEDURE LLINIT (VAR TerminalType : INTEGER);       {LTI-Initialization}
27  16  0  0 =1       PROCEDURE LLLNIN (VAR Index: INTEGER);               {Set-Line-Index}
28  17  0  0 =1       PROCEDURE LLMOVE (VAR X,Y: INTEGER);                 {Move}
29  18  0  0 =1       PROCEDURE LLRCFL (VAR X1,Y1,X2,Y2,Pen : INTEGER);    {Rectangle-Fill}
30  19  0  0 =1       PROCEDURE LLSYNC;                                    {Synchronize Firmware}
31  20  0  0 =1       PROCEDURE LLTEXT (VAR Count:INTEGER;VAR Str:BYTES;Dummy:INTEGER); {Graphic-Text}
32  21  0  0 =1       PROCEDURE LLVISF (VAR Count : INTEGER;VAR Vis : BYTES); {Set-Surface-Visibility}
33  22  0  0 =1       PROCEDURE LLVKLK (VAR Lockmode : INTEGER);           {Lock-Viewing-Keys}
34  23  0  0 =1       PROCEDURE LLVWAT (VAR Surface,Wipe,Border:INTEGER);  {Set-View-Attributes}
35  24  0  0 =1       PROCEDURE LLVWPT (VAR X1,Y1,X2,Y2 : INTEGER);        {Set-Viewport}
36  25  0  0 =1       PROCEDURE LLWAIT (VAR TimerInterval : INTEGER);      {Pause for interval}
37  26  0  0 =1       PROCEDURE LLWIND (VAR X1,Y1,X2,Y2 : INTEGER);        {Set-Window}

38  50  0  0         $INCLUDE (PixelSys.Ext)
              =1      PUBLIC PixelSys;
39   2  0  0 =1         PROCEDURE SetPixelWindow (x1,y1, x2,y2 : INTEGER):
              =1
40   4  0  0 =1         PROCEDURE PixelMoveTransformed (x, y : INTEGER);
              =1
41   6  0  0 =1         PROCEDURE PixelDrawTransformed (x, y : INTEGER);
42  52  0  0          $INCLUDE (Spatial.Ext)
              =1                           { Spatial Data Structure Routines}
              =1
              =1      PUBLIC SpatialLibrary;
              =1
```

```
43     5  0  0 =1     CONST
                 =1       NilConnection        = 0;
44     7  0  0 =1       NilNode              = 0;
45     8  0  0 =1       MaxConnections       = 14;
                 =1
46    10  0  0 =1     TYPE
                 =1       ConnectionPointer    = LongInt;
                 =1
47    13  0  0 =1       NodePointer          = LongInt;
                 =1
48    15  0  0 =1       PointerToNodePointer= ^NodePointer;
                 =1
49    17  0  0 =1       StateType            = (Hidden,
                 =1                              Untagged,
                 =1                              Selected,
                 =1                              Written,
                 =1                              SelectedAndWritten,
                 =1                              Primitive,
                 =1                              Reserved6,
                 =1                              Reserved7);
                 =1
50    26  0  0 =1       StructureActionType = (DoNothing,
                 =1                              AddToStructure,
                 =1                              DeleteFromStructure);
                 =1
51    30  0  0 =1       TransitionMask       = PACKED ARRAY [Hidden..Reserved7] OF CHAR;
                 =1
52    32  0  0 =1       TypeOfNeighbor       = (Nodes, Lines, Edges);
                 =1
                 =1
                 =1
53    36  0  0 =1     FUNCTION  ConnectionTraversable (Connection : ConnectionPointer) : Boolean;
                 =1
54    38  0  0 =1     FUNCTION  CreateConnection (Node1           : NodePointer;
                 =1                                 Node2           : NodePointer;
                 =1                                 FilledAreaFlag : Boolean;
                 =1                                 ConnectionState: StateType)
                 =1                               : ConnectionPointer;
                 =1
55    44  0  0 =1     FUNCTION  CreateDuplicateNode (x,y : INTEGER)
                 =1                                   : NodePointer;
                 =1
56    47  0  0 =1     PROCEDURE DeleteConnection (Connection : ConnectionPointer);
                 =1
57    49  0  0 =1     PROCEDURE DeleteNode (Node : NodePointer);
                 =1
58    51  0  0 =1     PROCEDURE DeleteNodeAndConnections (Node : NodePointer);
                 =1
59    53  0  0 =1     PROCEDURE DeleteObject (Node  : NodePointer;
                 =1                            State : StateType);
                 =1
60    56  0  0 =1     FUNCTION  EdgeConnection (CurrentConnection : ConnectionPointer)
                 =1                             : ConnectionPointer;
                 =1
```

```
61   59   0   0 =1     FUNCTION  EndNode (Connection : ConnectionPointer)
                  =1                        : NodePointer;
                  =1
62   62   0   0 =1     FUNCTION  ExamineNodeTraversedFlag (Node : NodePointer)
                  =1                                      : Boolean;
                  =1
63   65   0   0 =1     FUNCTION  FindNeighbors (     x,y                    : INTEGER;
                  =1                                 Radius                 : INTEGER;
                  =1                                 MaximumNumber          : INTEGER;
                  =1                                 NeighborMode           : TypeOfNeighbor;
                  =1                             VAR Neighbors              : BYTES;
                  =1                             VAR DistanceToNeighbors    : BYTES)
                  =1                            : INTEGER;
                  =1
                  =1
64   74   0   0 =1     FUNCTION  FirstConnectionInPolyline (CurrentConnection : ConnectionPointer)
                  =1                                        : ConnectionPointer;
                  =1
65   77   0   0 =1     FUNCTION  FirstConnectionInTile (i,j         : INTEGER;
                  =1                                    xMin,yMin : INTEGER;
                  =1                                    xMax,yMax : INTEGER)
                  =1                                   : ConnectionPointer;
                  =1
66   82   0   0 =1     FUNCTION  FirstNodeInTile (i,j : INTEGER)
                  =1                             : NodePointer;
                  =1
67   85   0   0 =1     FUNCTION  FirstTraversedNode : NodePointer;
                  =1
68   87   0   0 =1     FUNCTION  FirstPolylineInObject (Node : NodePointer)
                  =1                                   : ConnectionPointer;
                  =1
69   90   0   0 =1     FUNCTION  GetConnection (Node               : NodePointer;
                  =1                            ConnectionNumber : INTEGER)
                  =1                           : ConnectionPointer;
                  =1
70   94   0   0 =1     PROCEDURE GetConnectionInformation (     Connection : ConnectionPointer;
                  =1                                      VAR Edge       : Boolean;
                  =1                                      VAR State      : StateType);
                  =1
71   98   0   0 =1     FUNCTION  GetConnectionNumber (Connection : ConnectionPointer)
                  =1                                  : INTEGER;
                  =1
72  101   0   0 =1     FUNCTION  GetFirstTileContainingLine (x1,y1 : INTEGER;
                  =1                                         x2,y2 : INTEGER)
                  =1                                        : LONGINT;
                  =1
73  105   0   0 =1     FUNCTION  GetNextTileContainingLine : LONGINT;
                  =1
74  107   0   0 =1     PROCEDURE GetNodeLocation (     Node : NodePointer;
                  =1                             VAR x,y  : INTEGER);
                  =1
75  110   0   0 =1     FUNCTION  GetNodePointer (x,y : INTEGER)
                  =1                            : NodePointer;
                  =1
76  113   0   0 =1     PROCEDURE GetTileIndex (     x,y : INTEGER;
                  =1                           VAR I,J : INTEGER);
```

```
                  =1
77  116  0  0  =1        FUNCTION   GetTilePointer (I,J : INTEGER)
                  =1                                   : PointerToNodePointer;
                  =1
78  119  0  0  =1        PROCEDURE GetTileStructureParameters (VAR x1,y1      : INTEGER;
                  =1                                             VAR x2,y2      : INTEGER;
                  =1                                             VAR TileSize : INTEGER);
                  =1
79  123  0  0  =1        PROCEDURE InitializeTileStructure (x1,y1      : INTEGER;
                  =1                                        x2,y2      : INTEGER;
                  =1                                        TileSize : INTEGER);
                  =1
80  127  0  0  =1        FUNCTION   InsertNodeIntoConnection (Connection    : ConnectionPointer;
                  =1                                         x,y            : INTEGER)
                  =1                                        : ConnectionPointer;
                  =1
81  131  0  0  =1        FUNCTION   MergeTwoNodes (Node1 : NodePointer;
                  =1                               Node2 : NodePointer)
                  =1                              : NodePointer;
                  =1
82  135  0  0  =1        FUNCTION   MergeThreeNodes (Node1 : NodePointer;
                  =1                                 Node2 : NodePointer;
                  =1                                 Node3 : NodePointer)
                  =1                                : NodePointer;
                  =1
83  140  0  0  =1        FUNCTION   MoveNode ( Node        : NodePointer;
                  =1                           NewX, NewY : INTEGER)
                  =1                         : Boolean;
                  =1
84  144  0  0  =1        FUNCTION   NextConnectionInPolyline (CurrentConnection : ConnectionPointer;
                  =1                                          FirstConnection    : ConnectionPointer)
                  =1                                         : ConnectionPointer;
                  =1
85  148  0  0  =1        FUNCTION   NextConnectionInTile (CurrentConnection : ConnectionPointer)
                  =1                                     : ConnectionPointer;
                  =1
86  151  0  0  =1        FUNCTION   NextNodeInTile (CurrentNode : NodePointer)
                  =1                                : NodePointer;
                  =1
87  154  0  0  =1        FUNCTION   NextPolylineInObject : ConnectionPointer;
                  =1
88  156  0  0  =1        FUNCTION   NextTraversedNode : NodePointer;
                  =1
89  158  0  0  =1        FUNCTION   NumberOfConnections (Node : NodePointer)
                  =1                                    : INTEGER;
                  =1
90  161  0  0  =1        FUNCTION   NumberOfTilesContainingLine (x1,y1 : INTEGER;
                  =1                                              x2,y2 : INTEGER)
                  =1                                            : INTEGER;
                  =1
91  165  0  0  =1        FUNCTION   ReciprocalConnection (Connection : ConnectionPointer)
                  =1                                     : ConnectionPointer;
                  =1
92  168  0  0  =1        PROCEDURE ReleaseTileStructure;
                  =1
```

```
 93  170  0  0 =1        PROCEDURE ResetNodeTraversedFlags;
                =1
 94  172  0  0 =1        PROCEDURE SetDuplicateOutputEnabled (DuplicateOutput : Boolean);
                =1
 95  174  0  0 =1        PROCEDURE SetNodeTraversedFlag (Node : NodePointer);
                =1
 96  176  0  0 =1        PROCEDURE SetTransitionMask (VAR NextMask     : TransitionMask;
                =1                                   VAR PreviousMask : TransitionMask);
                =1
 97  179  0  0 =1        FUNCTION  TransferConnection (CurrentConnection : ConnectionPointer;
                =1                                     NewNode           : NodePointer)
                =1                                    : ConnectionPointer;
                =1
 98  183  0  0 =1        FUNCTION TransferConnectionField ( CurrentConnection : ConnectionPointer;
                =1                                          NewNode           : NodePointer)
                =1                                        : ConnectionPointer;
                =1
 99  187  0  0 =1        PROCEDURE UpdateConnectionStatus
                =1                         (     CurrentConnection       : ConnectionPointer;
                =1                          VAR SelectedStructureAction : StructureActionType;
                =1                          VAR WrittenStructureAction  : StructureActionType);

100   54  0  0         $INCLUDE (TekMan.Ext)
                =1     PUBLIC TekMan;
                =1
101    3  0  0 =1      CONST
                =1       MaximumLengthOfFileName =   14;
102    5  0  0 =1        xMaxDisplayPixel         = 1279    {tk4115};
103    6  0  0 =1        xMaxViewportCoordinate   = 4095    {tk4113};
104    7  0  0 =1        xNumberOfDisplayPixels   = 1280    {tk4115};
105    8  0  0 =1        yMaxDisplayPixel         =  959    {tk4115};
106    9  0  0 =1        yMaxViewportCoordinate   = 3071    {tk4113};
107   10  0  0 =1        yNumberOfDisplayPixels   =  960    {tk4115};
                =1
108   12  0  0 =1      TYPE
                =1       CursorStatusType = (Limbo,
                =1                           WriteMode,
                =1                           LockMode,
                =1                           LockAndWriteMode);
                =1
109   18  0  0 =1        CursorActionType = (NoAction,
                =1                           EnterWriteMode,
                =1                           StayInWriteMode,
                =1                           EnterLimbo,
                =1                           EnterLockMode,
                =1                           StayInLockMode,
                =1                           EnterLockAndWriteMode,
                =1                           StayInLockAndWriteMode,
                =1                           ReturnToLockMode,
                =1                           ReturnToWriteMode);
                =1
110   29  0  0 =1        FileName         = PACKED ARRAY [1..MaximumLengthOfFilename] OF CHAR;
                =1
111   31  0  0 =1        GINType          = (ConstrainedGIN,
```

```
               =1                          UnconstrainedGIN,
               =1                          MenuSelection);

112   56  0  0          PRIVATE ReadPix;

113   58  0  0            TYPE
                            PointType = RECORD
113   60  0  1                            x : Integer;
114   61  0  1                            y : Integer;
115   62  0  1                          END;

116   65  0  0            VAR
                            CreateConnectionFailed    : Boolean;      {Flag indicating whether or not }
117   67  0  0                                                        {  the last attempt to create a }
                                                                      {  connection failed.            }

                            CurrentNode               : NodePointer;  {Node now being considered.      }

118   72  0  0              DrawingState              : StateType;    {Used as a parameter to Create   }
119   73  0  0                                                        {  Connection to indicate which }
                                                                      {  the state of the new         }
                                                                      {  connection.                  }
                            FirstNodeInDrawing        : Boolean;      {Is CurrentNode the first node   }
120   77  0  0                                                        {  encountered in the drawing   }

                            GetNodePointerFailed      : Boolean;      {Flag indicating whether or not }
121   80  0  0                                                        {  the last attemp to create a  }
                                                                      {  node failed.                  }

                            LowerLeftCorner           : PointType;    {Contains the least x and the    }
122   84  0  0                                                        {  least y of any node.         }

                            OutOfMemory               : Boolean;      {Flag indicating whetere or not }
123   87  0  0                                                        {  reading of the drawing ended }
                                                                      {  because there was no more    }
                                                                      {  memory.                      }

                            PreviousNode              : NodePointer;  {Last node considered.           }

124   93  0  0              UpperRightCorner          : PointType;    {Contains the largest x and the }
125   94  0  0                                                        {  largest y of any node.       }

                            xHighSave                 : Integer;      {Temporary storage for           }
126   97  0  0                                                        {  UpperRightCorner.x           }

                            xIn                       : Integer;      {The x value as read from the    }
127  100  0  0                                                        {  picture file.                 }

                            xLowSave                  : Integer;      {Temporary storage for           }
128  103  0  0                                                        {  LowerLeftCorner.x            }

                            xSave                     : Integer;      {Temporary storage for the x     }
129  106  0  0                                                        {  coordinate of the previous   }
                                                                      {  node.                         }
```

```
                    yHighSave              : Integer;      {Temporary storage for        }
130  110  0  0                                             {  UpperRightCorner.y         }

                    yIn                    : Integer;      {The y value as read from the }
131  113  0  0                                             {  picture file.              }

                    yLowSave               : Integer;      {Temporary storage for        }
132  116  0  0                                             {  LowerLeftCorner.y          }

                    ySave                  : Integer;      {Temporary storage for the y  }
133  119  0  0                                             {  coordinate of the previous }
                                                           {  node.                      }

                $subtitle ('              Get Drawing Limits')

                {=====================================================================}
                { GetDrawingLimits     Returns coordinates of lower-left and upper-right }
                {                      corners of the drawing                          }
                {=====================================================================}

                  PROCEDURE GetDrawingLimits (VAR xLow,yLow,  xHigh,yHigh : Integer);

134  131  1  0      BEGIN { GetDrawingLimits }
134  132  1  1        xLow  := LowerLeftCorner.x;
135  133  1  1        yLow  := LowerLeftCorner.y;
136  134  1  1        xHigh := UpperRightCorner.x;
137  135  1  1        yHigh := UpperRightCorner.y;
138  136  1  1      END   { GetDrawingLimits };

139  139  0  0  $subtitle ('              Initialize Drawing')

                {=====================================================================}
                { InitializeDrawing            Set up the 'overhead' variables        }
                {=====================================================================}

                  PROCEDURE InitializeDrawing;

140  147  1  0      VAR
                      InputFileName : FileName;

141  150  1  0      BEGIN { InitializeDrawing }
141  151  1  1        WITH LowerLeftCorner   DO
142  152  1  1          BEGIN
142  153  1  2            x := MaxInt;
143  154  1  2            y := MaxInt;
144  155  1  2          END;

146  157  1  1        WITH UpperRightCorner   DO
147  158  1  1          BEGIN
147  159  1  2            x := 0;
148  160  1  2            y := 0;
149  161  1  2          END;

151  163  1  1        FirstNodeInDrawing     := True;
```

```
152  164  1  1          CreateConnectionFailed := False;
153  165  1  1          GetNodePointerFailed   := False;
154  166  1  1          OutOfMemory            := False;

155  168  1  1          DrawingState := Untagged;

156  170  1  1          PreviousNode := NilNode;
157  171  1  1          CurrentNode  := NilNode;

158  173  1  1          SelectGraphicsSurfaces;
159  174  1  1        END   { InitializeDrawing };

160  176  0  0   $subtitle ('                    Read Drawing')
                 {======================================================================}
                 { ReadDrawing                    This procedure reads the drawing file and    }
                 {                                builds the memory-based data structure.      }
                 {======================================================================}

                 PROCEDURE ReadDrawing (VAR InputFile   : Text;
160  184  1  0                              xMin,yMin   : Integer;
                                            xMax,yMax   : Integer;
                                        VAR xLow,yLow   : Integer;
                                        VAR xHigh,yHigh : Integer);

161  189  1  0     VAR
                     DrawFlag                 : Char;
162  191  1  0       Error                    : Boolean;
163  192  1  0       OldMask                  : TransitionMask;
164  193  1  0       NewConnection            : ConnectionPointer;
165  194  1  0       NewNode                  : NodePointer;
166  195  1  0       SelectedStructureAction  : StructureActionType;
167  196  1  0       WrittenStructureAction   : StructureActionType;

168  199  1  0     FUNCTION  Max (TheOne, TheOther : Integer) : Integer;

169  201  2  0       BEGIN { Max }
169  202  2  1         IF TheOne > TheOther
                         THEN
170  204  2  1             Max := TheOne
                         ELSE
171  206  2  1             Max := TheOther;
172  207  2  1       END   { Max };

173  210  1  0     FUNCTION  Min (TheOne, TheOther : Integer) : Integer;

174  212  2  0       BEGIN { Min }
174  213  2  1         IF TheOne < TheOther
                         THEN
175  215  2  1             Min := TheOne
                         ELSE
176  217  2  1             Min := TheOther;
177  218  2  1       END   { Min };
```

```
178  221  1  0     {==========================================================================}
                   {  SaveCoordinates                 Saves the coordinates of the current    }
                   {                                  point and the drawing limits so that    }
                   {                                  we can un-do later if we fail in        }
                   {                                  creating a new node                     }
                   {==========================================================================}

                   PROCEDURE SaveCoordinates;

179  230  2  0       BEGIN { SaveCoordinates }
179  231  2  1         xSave     := xIn;
180  232  2  1         ySave     := yIn;

181  234  2  1         xLowSave  := LowerLeftCorner.x;
182  235  2  1         yLowSave  := LowerLeftCorner.y;

183  237  2  1         xHighSave := UpperRightCorner.x;
184  238  2  1         yHighSave := UpperRightCorner.y;
185  239  2  1       END   { SaveCoordinates };

186  242  1  0     {==========================================================================}
                   {  UnsaveCoordinates              Restores the picture parameters saved    }
                   {                                 by SaveCoordinates                       }
                   {==========================================================================}

                   PROCEDURE UnsaveCoordinates;

187  249  2  0       BEGIN { UnsaveCoordinates }
187  250  2  1         xIn   := xSave;
188  251  2  1         yIn   := ySave;

189  253  2  1         LowerLeftCorner.x  := xLowSave;
190  254  2  1         LowerLeftCorner.y  := yLowSave;

191  256  2  1         UpperRightCorner.x := xHighSave;
192  257  2  1         UpperRightCorner.y := yHighSave;
193  258  2  1       END   { UnsaveCoordinates };

194  261  1  0     {==========================================================================}
                   {  UpdatePictureBoundaries       Updates location of lower-left corner and }
                   {                                upper-right corner of drawing             }
                   {==========================================================================}

                   PROCEDURE UpdatePictureBoundaries (VAR x,y : Integer; VAR Error : Boolean);

195  268  2  0       BEGIN { UpdatePictureBoundaries }
195  269  2  1         Error := (    (x > xMax)
                                  OR (x < xMin)
                                  OR (y > yMax)
                                  OR (y < yMin));
```

```
      IF NOT Error
        THEN
          BEGIN
            x      := x A 4;
            y      := y A 4;

            LowerLeftCorner.x  := Min (x, LowerLeftCorner.x);
            LowerLeftCorner.y  := Min (y, LowerLeftCorner.y);

            UpperRightCorner.x := Max (x, UpperRightCorner.x);
            UpperRightCorner.y := Max (y, UpperRightCorner.y);
          END
        ELSE
          WriteLn ('Bad node found:  ', x:1, ',', y:1);
    END   { UpdatePictureBoundaries };


{=========================================================================}
{  MoveToPoint                     Insert the specified node              }
{=========================================================================}

PROCEDURE MoveToPoint (VAR x,y : Integer;  VAR Error : Boolean);


    BEGIN { MoveToPoint }
      SaveCoordinates;
      UpdatePictureBoundaries (x,y, Error);

      IF Error
        THEN
          UnsaveCoordinates
        ELSE
          BEGIN
            NewNode := GetNodePointer (x, y);
            GetNodePointerFailed := (NewNode <= NilNode);
            IF GetNodePointerFailed
              THEN
                BEGIN
                  Error := True;
                  OutOfMemory := True;
                END
              ELSE
                BEGIN
                  CurrentNode := NewNode;
                  FirstNodeInDrawing := False;
                END;
          END;
    END   { MoveToPoint };
```

```
226  324  1  0        {==========================================================================}
                      {  SetAppropriateTransitionMask    Sets transition mask based on 'layer'    }
                      {                                  number read from drawing file            }
                      {==========================================================================}

                      PROCEDURE SetAppropriateTransitionMask (StateNumber : Integer);

227  331  2  0          BEGIN { SetAppropriateTransitionMask }
227  332  2  1            DrawingState := Untagged;
228  333  2  1            SetLineIndex (1);

229  335  2  1            CASE StateNumber OF
230  336  2  2              0 : BEGIN
230  337  2  3                    DrawingState := Hidden;
231  338  2  3                    SetLineIndex (0);
232  339  2  3                  END;

234  341  2  2              1 : BEGIN
234  342  2  3                    DrawingState := Untagged;
235  343  2  3                    SetLineIndex (1);
236  344  2  3                  END;

238  346  2  2              2 : BEGIN
238  347  2  3                    DrawingState := Selected;
239  348  2  3                    SetLineIndex (2);
240  349  2  3                  END;

242  351  2  2              3 : BEGIN
242  352  2  3                    DrawingState := Written;
243  353  2  3                    SetLineIndex (3);
244  354  2  3                  END;

246  356  2  2              4 : BEGIN
246  357  2  3                    DrawingState := SelectedAndWritten;
247  358  2  3                    SetLineIndex (3);
248  359  2  3                  END;

250  361  2  2              5 : BEGIN
250  362  2  3                    DrawingState := Primitive;
251  363  2  3                    SetLineIndex (1);
252  364  2  3                  END;

254  366  2  2              6 : BEGIN
254  367  2  3                    DrawingState := Reserved6;
255  368  2  3                    SetLineIndex (1);
256  369  2  3                  END;

258  371  2  2              7 : BEGIN
258  372  2  3                    DrawingState := Reserved7;
259  373  2  3                    SetLineIndex (1);
260  374  2  3                  END;
262  375  2  2             END { CASE StateNumber }

263  377  2  1           END   { SetAppropriateTransitionMask };
```

```
264  380  1  0     {==========================================================================}
                   {  DrawToPoint        Creates connection between CurrentNode and          }
                   {                     PreviousNode                                         }
                   {==========================================================================}

                   PROCEDURE DrawToPoint (x2,y2 : Integer);

265  387  2  0       VAR
                       FilledAreaFlag : Boolean;
266  389  2  0         x1             : Integer;
267  390  2  0         y1             : Integer;

268  392  2  0       BEGIN { DrawToPoint }
268  393  2  1         FilledAreaFlag := False;  { =========== TEMPORARY ========== }

269  395  2  1         NewConnection := CreateConnection (PreviousNode,
                                                          CurrentNode,
                                                          FilledAreaFlag,
                                                          DrawingState);
270  399  2  1         IF NewConnection <= NilConnection
                         THEN  { we have an error creating the connection }
271  401  2  1             BEGIN
271  402  2  2               IF NewConnection = -1
                                THEN
272  404  2  2                    BEGIN
272  405  2  3                      OutOfMemory := True;
273  406  2  3                      CreateConnectionFailed := True;
274  407  2  3                      WriteLn ('Error: Out Of Memory');
275  408  2  3                    END
276  409  2  2                ELSE
277  410  2  2                    BEGIN
277  411  2  3                      CreateConnectionFailed := False;
278  412  2  3                              { CCF is only used for the OutOfMemory condition }
                                     WriteLn ('Error: Too many connections');
279  414  2  3                      PreviousNode := CurrentNode;  { Movin' right along }
280  415  2  3                    END
281  416  2  2             END
282  417  2  1           ELSE  { Connection created successfully }
283  418  2  1             BEGIN
283  419  2  2               GetNodeLocation (PreviousNode,  x1,y1);
284  420  2  2               PixelMoveTransformed (x1, y1);
285  421  2  2               PixelDrawTransformed (x2, y2);
286  422  2  2               CreateConnectionFailed := False;
287  423  2  2               PreviousNode := CurrentNode;
288  424  2  2             END;

290  426  2  1       END  { DrawToPoint };


291  429  1  0     BEGIN   { ReadDrawing }

291  431  1  1       IssueStatusMessage(0,8,'Reading Drawing',15);

292  433  1  1       WHILE (NOT EOF(InputFile)) AND (NOT OutOfMemory) DO
293  434  1  1         BEGIN
```

```
293  435  1  2      IF NOT (GetNodePointerFailed OR CreateConnectionFailed)
                      THEN
294  437  1  2          ReadLn(InputFile,  DrawFlag,  xIn,yIn);

295  439  1  2      CASE DrawFlag OF
296  440  1  3        'L' : SetAppropriateTransitionMask (xIn);

297  442  1  3        'P' : BEGIN
297  443  1  4                IF FirstNodeInDrawing
                                THEN
298  445  1  4                    WriteLn ('Error:  First node must be MOVE')
                                ELSE
299  447  1  4                    BEGIN
299  448  1  5                      MoveToPoint (xIn,yIn, Error);
300  449  1  5                      IF NOT Error
                                        THEN
301  451  1  5                          PreviousNode := CurrentNode;
302  452  1  5                    END;
304  453  1  4              END { Selection 'P' };

306  455  1  3        'M' : BEGIN
306  456  1  4                MoveToPoint (xIn,yIn, Error);
307  457  1  4                IF NOT Error
                                THEN
308  459  1  4                    PreviousNode := CurrentNode;
309  460  1  4              END { Selection 'M' };

311  462  1  3        'D' : BEGIN
311  463  1  4                IF FirstNodeInDrawing
                                THEN
312  465  1  4                    WriteLn ('Error: First node must be a MOVE')
                                ELSE
313  467  1  4                    BEGIN
313  468  1  5                      IF NOT CreateConnectionFailed
                                        THEN
314  470  1  5                          BEGIN
314  471  1  6                            MoveToPoint (xIn,yIn, Error);
315  472  1  6                            IF NOT Error
                                                THEN
316  474  1  6                                  DrawToPoint (xIn,yIn);
317  475  1  6                          END;
319  476  1  5                    END;
321  477  1  4              END { Selection 'D' };
323  478  1  3        OTHERWISE
324  479  1  3              WriteLn ('Error: Unexpected DrawFlag "', DrawFlag, '"');
325  480  1  3        END { CASE DrawFlag };
327  481  1  2      END { WHILE };

329  483  1  1    { Pass back the bounds of the drawing }
                  WITH LowerLeftCorner   DO
330  485  1  1      BEGIN
330  486  1  2        xLow  := x;
331  487  1  2        yLow  := y;
332  488  1  2      END;
```

```
334  490  1  1        WITH UpperRightCorner    DO
335  491  1  1          BEGIN
335  492  1  2            xHigh := x;
336  493  1  2            yHigh := y;
337  494  1  2          END;
339  495  1  1    {   WriteTemplateStatistics; }   { Need new routine! }

                      IssueStatusMessage(0,8,'                ',15);
340  498  1  1      END   { ReadDrawing };
341  499  0  0   '.
```

```
;*****************************************************************************
;*
;*       FILE NAME:        TABLETDR.ASM
;*
;*       MODULE NAME:      TabletHandler
;*
;*       SEGMENT NAME:     TabletHandler_Seg          (Code Segment)
;*                         TabletHandlerData_Seg      (Data Segment)
;*
;*       LINKAGE/ACCESS:   Linked with TEKMAN main module.  Accessed by direct
;*                         call within TEKMAN, Accessed through support vector
;*                         from external .LTL modules.
;*
;*       FUNCTIONS:        Contains routines which deal specifically with
;*                         the 4957 Graphics tablet.  Steals interrupt vector
;*                         1, and replaces it with a pointer to a 3ppi service
;*                         routine.
;*
;*
;*
;*
;*
;*       KNOWN BUGS:       None at SR1
;*
;*       ENHANCEMENTS:     Currently only supports a 4957 connected to 3ppi
;*                         port 2.  Could be enhanced by allowing the calling
;*                         routine to designate which port the tablet is connected
;*                         to.  This would allow user configurability via the
;*                         configuration file.[
;*
;*****************************************************************************


                 NAME      TabletHandler
```

```
                                PUBLIC  OpenTablet,
                  &                     CloseTablet,
                  &                     GetGin


                                EXTRN   llwait:FAR


                                ASSUME  CS:TabletHandler_Seg,
                  &                     DS:TabletHandlerData_Seg;addressability assumptions


0024              INT1_Offset       EQU     24H                 ;address of INT1 offset
0026              INT1_Segment      EQU     26H                 ;address of INT1 segment
00E8              Port_8259         EQU     0E8H                ;8259 interrupt controller port
0020              EndOfInt          EQU     020H                ;general 8259 end-of-interrupt opcode

                  ;
                  ;       8250 status register flag equ and port location equates
                  ;       port base address is at 0FB20H and (port_number*16)+0FB00H
                  ;       is the address of the transmitter and reciever
                  ;

FB20              Port              EQU     0FB20H              ;port number 2
FB20              Trans             EQU     Port                ;transmitter location
FB20              Recvr             EQU     Trans               ;reciever is at same i/o at trans
FB2A              Status            EQU     Trans+(5*2)         ;8250 line status register
FB26              Line_Control      EQU     Trans+(3*2)         ;8250 line control register
FB22              Interrupts        EQU     Trans+(1*2)         ;8250 interrupt enable register
FB24              Interrupt_ID      EQU     Trans+(2*2)         ;8250 interrupt status register
FB28              Modem_control     EQU     Trans+(4*2)         ;8250 modem control register
FB20              Divisor_latch     EQU     Trans               ;8250 divisor latch for baud rate
0020              Trans_ready       EQU     20H                 ;transmitter ready flag mask
0001              Data_ready        EQU     01H                 ;data (receiver) ready flag mask
0001              Rec_Data_Int      EQU     01H                 ;data ready interrupt bit
                  Interrupt_Pending
0001              &                 EQU     01H                 ;8250 interrupt pending
0002              OvrRun            EQU     02H                 ;Overrun error bit
0004              ParityErr         EQU     04H                 ;Parity error bit
0008              FrameErr          EQU     08H                 ;Framing error bit
0040              SyncFlag          EQU     40H                 ;First byte of 4957 report bit

                  ;
                  ;       8250 setup values
                  ;

0002              Word_length       EQU     10B                 ;eight bit word length
0000              Stop_bits         EQU     0                   ;one stop bit
0008              Parity_enable     EQU     1000B               ;enable parity checking
0000              Odd_parity        EQU     0                   ;odd parity flag
0010              Ninety_600        EQU     16                  ;divisor for 9600 baud

000A              Line_stat_flags EQU       Word_length+Stop_bits+Parity_enable+Odd_parity
```

```
0007            Modem_ctl_word  EQU     07              ;who knows why?

0080            Dlab            EQU     80H             ;divisor latch access flag


                ;
                ;       4957 graphic tablet report message equates
                ;


0001            Proximity       EQU     01H             ;proximity flag mask for tablet
001F            Keys            EQU     1FH             ;puck keys flag mask
002D            Noprox          EQU     '-'             ;no proximity flag for pascal-86
0020            NoKeys          EQU     ' '             ;no keys pressed flag for pascal-86
0021            Keystroke       EQU     '!'             ;key depressed



                TabletHandler_Seg
                &               SEGMENT                 ;Identify TabletHandler seg.

           +1   $TITLE('LOCAL SUPPORT PROCEDURES')
           +1   $EJECT


                ;
                ;       near (local) procedure init (4957 tablet initialization sequence)
                ;       after 3ppi (p0:) initialization, a space is sent to the 4957 to
                ;       set the autobaud rate (9600 baud), then a 10 tick wait (approx.
                ;       250 msec.) is executed to allow time for the tablet to set its rate.
                ;       after that, a reset command is issued, along with another 10 tick
                ;       wait, to allow the tablet time to initialize.
                ;

0000            Init            PROC    NEAR            ;just a stone's throw away

0000 BA28FB                     MOV     DX,Modem_control        ;load address of modem_control
0003 B80700                     MOV     AX,Modem_ctl_word       ;load modem_control
0006 EF                         OUT     DX,AX                   ;set modem control register
0007 BA26FB                     MOV     DX,Line_control         ;load address of line_control
000A B88000                     MOV     AX,Dlab                 ;load divisor latch access flag
000D EF                         OUT     DX,AX                   ;access the divisor latch
000E BA20FB                     MOV     DX,Divisor_latch        ;load address of divisor latch
0011 B81000                     MOV     AX,Ninety_600           ;load divisor for 9600 baud
0014 EF                         OUT     DX,AX                   ;set the divisor latch (lsb)...
0015 42                         INC     DX                      ;...and...
0016 42                         INC     DX                      ;...of course...
0017 33C0                       XOR     AX,AX                   ;...we can't forget...
0019 EF                         OUT     DX,AX                   ;...the divisor latch (msb)
001A BA26FB                     MOV     DX,Line_control         ;load address of line control
001D B80A00                     MOV     AX,Line_stat_flags      ;load flags for setup
0020 EF                         OUT     DX,AX                   ;setup parity, word length et al.
0021 BA22FB                     MOV     DX,Interrupts           ;load address of 8250 int. reg
0024 B80100                     MOV     AX,Rec_Data_Int         ;enable data rec'd interrupts
0027 EE                         OUT     DX,AL                   ;set data rec'd interrupts
```

```
0028 BB160090                   MOV     BX,OFFSET Autobaud_space;load pointer to autobaud space
002C B9010090                   MOV     CX,SIZE Autobaud_space  ;load length of autobaud space
0030 E82D00                     CALL    Send                    ;send the space
0033 BB140090                   MOV     BX,OFFSET Fourty_ticks  ;load pointer to wait parm
0037 1E                         PUSH    DS                      ;set up parm list....
0038 53                         PUSH    BX                      ;...for llwait...
0039 9A0000----    E            CALL    llwait                  ;....and wait 40 ticks for 4957.
003E BB170090                   MOV     BX,OFFSET Reset         ;load pointer to reset message
0042 B9090090                   MOV     CX,SIZE Reset           ;load length of reset message
0046 E81700                     CALL    Send                    ;send reset command to 4957
0049 BB140090                   MOV     BX,OFFSET Fourty_ticks  ;load pointer to wait parm
004D 1E                         PUSH    DS                      ;set up parm list....
004E 53                         PUSH    BX                      ;...for llwait...
004F 9A0000----    E            CALL    llwait                  ;...and wait 40 ticks for 4957.
0054 BB200090                   MOV     BX,OFFSET Setres        ;point to resolution set message
0058 B9110090                   MOV     CX,SIZE setres          ;load the size (length) of setres
005C E80100                     CALL    Send                    ;set resolution
005F C3                         RET                             ;go home

                     Init       ENDP                            ;end procedure init


                 +1  $EJECT

                     ;
                     ;       near (local) procedure send (send a sequence out the 3ppi)
                     ;         parms: [bx] -<> message
                     ;                cx :=   message length
                     ;

0060                 Send       PROC    NEAR                    ;within spittin' distance

0060 BA2AFB          Send_start: MOV    DX,Status               ;load the address of the status reg
0063 EC              sStatus:   IN      AL,DX                   ;check the status
0064 A820                       TEST    AL,Trans_ready          ;is the transmitter ready?
0066 74FB                       JZ      sStatus                 ;wait until it is
0068 8A07                       MOV     AL,[BX]                 ;else load a message byte
006A BA20FB                     MOV     DX,Trans                ;load address of transmitter
006D EE                         OUT     DX,AL                   ;....and jam it in the transmitter
006E 43                         INC     BX                      ;point to the next message byte
006F E2EF                       LOOP    Send_start              ;continue 'till cx count achieved
0071 C3                         RET                             ;return

                     Send       ENDP                            ;end near procedure send


                 +1  $EJECT

                     ;
                     ;       near (local) procedure compact3 (convert 4957 coordinates to 8086 integer)
                     ;         parms: [bx] -> 4957 coodinate sequence (3 bytes)
                     ;                ax := result
                     ;
                     ;
                     ;                       4957 universal input-output format
```

```
                    ;
                    ;       byte    bit 7   6       5       4       3       2       1       0
                    ;
                    ;        0      parity  1       0       type1   type2   id      ??      proximity
                    ;        1      parity  0       0       f4      f3      f2      f1      f0
                    ;        2      parity  0       x5      x4      x3      x2      x1      x0
                    ;        3      parity  0       x11     x10     x9      x8      x7      x6
                    ;        4      parity  0       0       xs      x15     x14     x13     x12
                    ;        5      parity  0       y5      y4      y3      y2      y1      y0
                    ;        6      parity  0       y11     y10     y9      y8      y7      y6
                    ;        7      parity  0       0       ys      y15     y14     y13     y12
                    ;
                    ;       the strategy of this algorithm is to load the high order bits into ah
                    ;       the low order bits into al, and the middle bits into dl.  using shifts,
                    ;       these bits are placed in their proper location in ax and dx. then ax
                    ;       and dx are 'or'ed together.  the result is in ax
                    ;

0072                Compact3        PROC    NEAR                    ;compact3 is just 'round the corner

0072 8A07                           MOV     AL,[BX]                 ;load the low order bits into al
0074 8A5701                         MOV     DL,[BX+1]               ;load the middle bits into dl
0077 8A6702                         MOV     AH,[BX+2]               ;load the high order bits into ah
007A 253F3F                         AND     AX,3F3FH                ;strip parity off of the ....
007D 81E23F00                       AND     DX,003FH                ;...parameters
0081 B103                           MOV     CL,3                    ;load the shift count and...
0083 D2E4                           SHL     AH,CL                   ;shift ah left 3 places (see chart)
0085 B106                           MOV     CL,6                    ;load shift count for dx...
0087 D3E2                           SHL     DX,CL                   ;...and position middle bits
0089 0BC2                           OR      AX,DX                   ;merge the bits
008B 8BD8                           MOV     BX,AX                   ;prepare to scale ax
008D D1E0                           SHL     AX,1                    ;ax := ax * 2
008F D1E0                           SHL     AX,1                    ;ax := ax * 2 (now ax * 4)
0091 03C3                           ADD     AX,BX                   ;ax := ax * 4 + ax (ax := ax * 5)
0093 D1F8                           SAR     AX,1                    ;ax := ax div 2
0095 D1F8                           SAR     AX,1                    ;ax := ax div 2 (now ax*5 div 4)
0097 C3                             RET                             ;please to be going home now

                    Compact3        ENDP                            ;end near procedure compact3



               +1   $TITLE('OPENTABLET -- MAIN PROGRAM')
               +1   $EJECT

                    ;***************************************************************************
                    ;*                                                                         *
                    ;*                      OPENTABLET -- MAIN PROGRAM                         *
                    ;*                                                                         *
                    ;***************************************************************************

009B                OpenTablet      PROC    FAR                     ;OpenTablet is a far proc

                    ;
                    ;       save registers and establish addressability
```

```
                  ;
0098 1E                     PUSH    DS                        ;save ds for pascal
0099 B8----      R          MOV     AX,TabletHandlerData_Seg;load data segment address
009C 8ED8                   MOV     DS,AX                     ;establish data addressability


                  ;
                  ;     prohibit interrupts while stealing interrupt 1 (INT1) vector
                  ;

009E 9C                     PUSHF                             ;save current int. status
009F FA                     CLI                               ;do not disturb!

                  ;
                  ;     swap interrupt vectors
                  ;

00A0 E85DFF                 CALL    Init                      ;call initialization sequence
00A3 33C9                   XOR     CX,CX                     ;vector in "segment 0"
00A5 8EC1                   MOV     ES,CX                     ;establish vector addressability
00A7 BB2400                 MOV     BX,INT1_offset            ;load vector offset
00AA 268B17                 MOV     DX,ES:[BX]                ;load vector offset
00AD 2E89162E01             MOV     CS:Vect_offset,DX         ;save vector offset
00B2 268B5702               MOV     DX,ES:[BX+2]              ;load vector segment
00B6 2E89163001             MOV     CS:Vect_segment,DX        ;save vector segment
00BB B9F00090               MOV     CX,OFFSET TabletHdlr      ;load pointer to new int hdlr
00BE 26890F                 MOV     ES:[BX],CX                ;save new handler offset
00C2 268C4F02               MOV     ES:[BX+2],CS              ;save new handler segment

                  ;
                  ;     restore registers and return to pascal
                  ;

00C6 9D                     POPF                              ;restore old interrupt status
00C7 1F                     POP     DS                        ;restore ds for pascal
00C8 CA0000                 RET     0                         ;thank you, and goodbye.

                  ;
                  ;     close off segments
                  ;

                  OpenTablet      ENDP                        ;end procedure

             +1   $TITLE('CLOSETABLET -- MAIN PROGRAM')
             +1   $EJECT

                  ;***********************************************************************
                  ;*                                                                     *
                  ;*                     CLOSETABLET -- MAIN PROGRAM                     *
                  ;*                                                                     *
                  ;***********************************************************************

00CB              CloseTablet     PROC    FAR                 ;CloseTablet is a far proc

                  ;
                  ;     save registers and establish addressability
```

```
                            ;
00CB 1E                                 PUSH    DS                      ;save ds for pascal
00CC B8----         R                   MOV     AX,TabletHandlerData_Seg;load data segment address
00CF 8ED8                               MOV     DS,AX                   ;establish data addressability


                            ;
                            ;       prohibit interrupts while restoring interrupt 1 (INT1) vector
                            ;

00D1 9C                                 PUSHF                           ;save current int. status
00D2 FA                                 CLI                             ;do not disturb!

                            ;
                            ;       swap interrupt vectors
                            ;

00D3 33C9                               XOR     CX,CX                   ;INT1 vector in 'segment 0'
00D5 8EC1                               MOV     ES,CX                   ;establish vector addressability
00D7 BB2400                             MOV     BX,INT1_offset          ;point to INT1 offset
00DA 2E8B162E01                         MOV     DX,CS:Vect_offset       ;load original vector offset ptr
00DE 268917                             MOV     ES:[BX],DX              ;restore vector offset
00E3 2E8B163001                         MOV     DX,CS:Vect_segment      ;load original vector segment ptr.
00E7 26895702                           MOV     ES:[BX+2],DX            ;restore vector segment

                            ;
                            ;       restore registers and return to pascal
                            ;

00EB 9D                                 POPF                            ;restore old interrupt status
00EC 1F                                 POP     DS                      ;restore ds for pascal
00ED CA0000                             RET     0                       ;thank you, and goodbye.

                            ;       close off segments

                            CloseTablet     ENDP                        ;end procedure


                      +1    $TITLE('TABLETHDLR -- MAIN PROGRAM')
                      +1    $EJECT

                            ;***********************************************************************
                            ;*                                                                     *
                            ;*                       TABLETHDLR -- MAIN PROGRAM                    *
                            ;*                                                                     *
                            ;***********************************************************************

00F0                        TabletHdlr      PROC    FAR             ;far proc (but not really a proc)

                            ;
                            ;       save registers, and establish addressability
                            ;

00F0 1E                                 PUSH    DS                      ;save int. proc's ds
```

```
00F1 50                        PUSH    AX                      ;save int. proc's ax
00F2 53                        PUSH    BX                      ;save int. proc's bx
00F3 52                        PUSH    DX                      ;save int. proc's dx
00F4 B8----      R             MOV     AX,TabletHandlerData_Seg;load the data seg addr.
00F7 8ED8                      MOV     DS,AX                   ;establish addressability

                      ;
                      ;        check to see if it was the 4957 that interrupted
                      ;

00F9 BA24FB                    MOV     DX,Interrupt_ID         ;load address of 8250 int. reg.
00FC ED                        IN      AX,DX                   ;load content's of 3ppi int. reg.
00FD A90100                    TEST    AX,Interrupt_Pending    ;check contents of 3ppi int. reg
0100 7527                      JNZ     Not_The_3ppi            ;if not our interrupt, leave.

                      ;
                      ;        check to see that it was a reciever interrupt: if not. flag error
                      ;

0102 BA2AFB                    MOV     DX,Status               ;load address of 8250 status reg.
0105 EC                        IN      AL,DX                   ;get contents of 3ppi status reg
0106 3D0100                    CMP     AX,Data_Ready           ;check for data ready
0109 09061200                  OR      StatusFlags,AX          ;save the boolean result
010D BA30FB                    MOV     DX.Recvr                ;load address of 8250 rec. reg.
0110 EC                        IN      AL,DX                   ;get contents of 3ppi rec. reg.

                      ;
                      ;        put received byte in circular buffer
                      ;

0111 8B1E1000                  MOV     BX.BufferPtr            ;get the current buffer pointer
0115 8807                      MOV     BYTE PTR [BX],AL        ;save the current report byte
0117 43                        INC     BX                      ;bump the pointer....
0118 81E30F00                  AND     BX,0FH                  ;....modulo 16 (circular buffer)
011C 891E1000                  MOV     BufferPtr,BX            ;save the buffer pointer
0120 B020                      MOV     AL,EndOfInt             ;load 8259 EOI signal
0122 E6E0                      OUT     Port_8259.AL            ;acknowlege interrupt

                      ;
                      ;        restore registers and return from interrupt
                      ;
0124 5A                        POP     DX                      ;restore DX
0125 5B                        POP     BX                      ;restore BX
0126 58                        POP     AX                      ;restore AX
0127 1F                        POP     DS                      ;restore DS
0128 CF                        IRET                            ;return from INT1


                      ;
                      ;        pass control to other interrupt handlers
                      ;

0129 5A               Not_The_3ppi:    POP     DX              ;restore DX
012A 5B                        POP     BX                      ;restore BX
```

```
012B 58                                    POP    AX                          ;restore AX
012C 1E                                    POP    DS                          ;restore DS
012D EA                 Long_Jump          DB     0EAH                        ;long jump instruction
012E 0000               Vect_Offset        DW     0                           ;offset of jump
0130 0000               Vect_Segment       DW     0                           ;segment of jump


                        TabletHdlr         ENDP                               ;end of procedure

                   +1   $eject

                        ;*************************************************************************
                        ;*                                                                       *
                        ;*                      GETGIN -- MAIN PROGRAM                           *
                        ;*                                                                       *
                        ;*              PROCEDURE GetGin(VAR X,Y,Z : INTEGER);                   *
                        ;*                                                                       *
                        ;*************************************************************************


                        ;
                        ;       tablet driver, main module
                        ;



0132                    GETGIN             PROC   FAR                         ;getgin is a *far* procedure


                        ;
                        ;       parameter passing structure, superimposed on stack
                        ;

----                    Parms              STRUC                              ;parameter structure

0000                    Old_bp             DW     ?                           ;old pascal BP
0002                    Old_ds             DW     ?                           ;old pascal DS
0004                    Return             DD     ?                           ;return address for far proc
0008                    Z                  DD     ?                           ;address of Z parm
000C                    Y                  DD     ?                           ;address of Y parm
0010                    X                  DD     ?                           ;address of X parm

----                    Parms              ENDS                               ;end parm structure


                        ;
                        ;       save registers, and establish addressibility
                        ;

0132 1E                                    PUSH   DS                          ;save DS for pascal
0133 55                                    PUSH   BP                          ;likewise for BP
0134 8BEC                                  MOV    BP,SP                       ;establish parm addressibility
0136 B8----         R                      MOV    AX,TabletHandlerData_Seg;load address of data segment
0139 8ED8                                  MOV    DS,AX                       ;establish data segment addressiblity
                                           TEST   StatusFlags.OvrRun+
```

```
013B F70612000E00    &                            ParityErr+
                     &                            FrameErr     ;Overrun, Parity or Framing error?
0141 7557                          JNZ    ReSync               ;if so, resyncronize the 4957

                     ;
                     ;       re-format the report into pascal-86 integer format. and
                     ;         convert the 'stylus' report into compatible format
                     ;       (interrupts temporarily disabled to prevent buffer update
                     ;        during routine)
                     ;


0143 9C              Test_prox:    PUSHF                       ;save flags (interrupt status)
0144 FA                            CLI                         ;no interrupts
0145 8B1E1000                      MOV    BX,BufferPtr         ;load the buffer pointer
0149 81E30800                      AND    BX,08H               ;which buffer is current?
014D 81F30800                      XOR    BX,08H               ;get the last full buffer
0151 83C30090                      ADD    BX,OFFSET Buffer     ;point to the buffer
0155 F60740                        TEST   BYTE PTR [BX],SyncFlag ;do we have sync?
0158 7440                          JZ     ReSync               ;if not, resyncronize
015A B82D00                        MOV    AX,Noprox            ;signal no proximity
015D 8A0F                          MOV    CL,BYTE PTR [BX]     ;load the proximity flag
015F F6C101                        TEST   CL,Proximity         ;is the stylus in proximity?
0162 752A                          JNZ    Stuff_it             ;if not, don't need to convert
0164 53                            PUSH   BX                   ;save buffer pointer
0165 83C302                        ADD    BX,2                 ;point to first x parm in report
0168 E807FF                        CALL   Compact3             ;convert report to integer 'x'
016B C45E10                        LES    BX,[BP].X            ;load effective address of 'x' parm
016E 268907                        MOV    ES:[BX],AX           ;store x parm
0171 5B                            POP    BX                   ;restore buffer pointer
0172 53                            PUSH   BX                   ;save buffer pointer
0173 83C305                        ADD    BX,5                 ;point to first y parm in report
0176 E8F9FE                        CALL   Compact3             ;convert report to integer 'y'
0179 C45E0C                        LES    BX,[BP].Y            ;load effective address of 'y' parm
017C 268907                        MOV    ES:[BX],AX           ;store y parm
017F 5B                            POP    BX                   ;restore buffer pointer
0180 B82000          Presence:     MOV    AX,Nokeys            ;signal 'no keys depressed'...
0183 43                            INC    BX                   ;point to key byte
0184 8A0F                          MOV    CL,BYTE PTR [BX]     ;...then check to see if any are
0186 F6C11F                        TEST   CL,Keys              ;mask out garbage
0189 7403                          JZ     Stuff_it             ;if no keys depressed,then we're set!
018B B82100                        MOV    AX,Keystroke         ;otherwise signal 'key(s) depressed'
018E C45E08          Stuff_it:     LES    BX,[BP].Z            ;load effective address of 'z' parm
0191 268807                        MOV    ES:[BX],AL           ;store 'z' parm

                     ;
                     ;       restore registers and return
                     ;

0194 9D                            POPF                        ;restore old intrrupt status
0195 5D                            POP    BP                   ;restore bp for pascal-86
0196 1F                            POP    DS                   ;restore ds for pascal-86
0197 CA0C00                        RET    12                   ;home again, home again....
```

```
                     ;
                     ;       Resynchronize the tablet, and wait for first complete report
                     ;

019A 9C              ReSync:         PUSHF                           ;save the flags
019B FA                              CLI                             ;no interrupts, please!
019C 33DB                            XOR     BX,BX                   ;clear bx to reset...
019E 891E1200                        MOV     StatusFlags,BX          ;...the status flags...
01A2 891E1000                        MOV     BufferPtr.BX            ;...and the buffer pointer
01A6 E857FE                          CALL    Init                    ;re-initialize the tablet
01A9 BA2AFB          WaitForReport:  MOV     DX,Status               ;load address of 8250 status reg.
01AC EC                              IN      AL,DX                   ;get contents of 3ppi status reg
01AD 3D0100                          CMP     AX,Data_Ready           ;check for data ready
01B0 75F7                            JNE     WaitForReport           ;wait for data ready
01B2 BA20FB                          MOV     DX,Recvr                ;load address of 8250 rec. reg.
01B5 EC                              IN      AL,DX                   ;get contents of 3ppi rec. reg.
01B6 A840                            TEST    AL,SyncFlag             ;are we at the first byte?
01B8 74EF                            JZ      WaitForReport           ;if not, check again.
01BA FF061000                        INC     BufferPtr               ;signal one byte in buffer
01BE FB                              STI                             ;allow interrupts
01BF F70610000800    WaitForBuffer:  TEST    BufferPtr,08H           ;full report yet?
01C5 74F8                            JZ      WaitForBuffer           ;if not, wait for it
01C7 9D                              POPF                            ;restore the flags,
01C8 E978FF                          JMP     Test_Prox               ;return to normal processing


                     Getgin          ENDP                            ;end procedure getgin




                     TabletHandler_Seg
----                 &               ENDS                            ;end segment






                 +1  $TITLE('TabletHandlerData_Seg')
                 +1  $EJECT
                     ;*************************************************************************
                     ;*                                                                       *
                     ;*                        Tablet Handler Data Segment                    *
                     ;*                                                                       *
                     ;*************************************************************************


                     TabletHandlerData_Seg
----                 &               SEGMENT                         ;data segment

                     ;
                     ;       buffer save area, and globals
                     ;
```

```
001B                 Escape           EQU     1BH                        ;ascii 'escape' character
000D                 CR               EQU     0DH                        ;ascii carraige return
0013                 CTL_S            EQU     13H                        ;ascii DC3
0011                 CTL_Q            EQU     11H                        ;ascii DC1


0000 (2              Buffer           DB      2 DUP
     41              &                        (41H,0,0,0,0,0,0,0)        ;Circular Buffer for 3ppi
     00
     00
     00
     00
     00
     00
     00
     )

0010 0000            BufferPtr        DW      0                          ;buffer pointer

0012 0000            StatusFlags      DW      0                          ;error flag for 3ppi overrun, etc.


0014 2800            Fourty_ticks     DW      40                         ;llwait parm (Fourty 'ticks')


0016 20              Autobaud_space   DB      ' '                        ;4957 autobaud 'sync' character
0017 13              Reset            DB      CTL_S,CTL_S,CTL_S,
0018 13
0019 13
001A 1B              &                        Escape,'Z',
001B 5A
001C 1B              &                        Escape,'Z',
001D 5A
001E 1B              &                        Escape,'Z'
001F 5A
0020 1B              Setres           DB      Escape,'CB',
0021 4342
0023 1B              &                        Escape,'MO'.
0024 4D30
0026 1B              &                        Escape,'R5',
0027 5235
0029 1B              &                        Escape,'I001',CTL_Q,CTL_Q,CTL_Q
002A 49303031
002E 11
002F 11
0030 11


                     TabletHandlerData_Seg
----                 &                ENDS                               ;end segment

                                      END                                ;end assembly
```

```
Source File: A:XHAIRDR.PAS
Object File: <none>
Controls Specified:  ERRORPRINT, NOOBJECT, PRINT(D:XHAIRDR.LST[G9]), TITLE(          CROSSHAIR DRIVER).

STMT LINE NESTING       SOURCE TEXT: A:XHAIRDR.PAS
  1    2   0   0
                        MODULE CrosshairDriver;
  2    4   0   0

                        PUBLIC PixelSys;
  3    8   0   0        PROCEDURE PixelMoveClipped(X,Y:INTEGER);
  4    9   0   0        PROCEDURE PixelDrawClipped(X,Y:INTEGER);

  5   11   0   0        PUBLIC Cursor;
  6   12   0   0        PROCEDURE SelectCursorSurface;
  7   13   0   0        PROCEDURE SelectGraphicsSurfaces;
  8   14   0   0        PROCEDURE SetLineIndex(LineIndex:INTEGER);

  9   16   0   0        PUBLIC CrosshairDriver;
 10   17   0   0        PROCEDURE CrosshairOn(X,Y:INTEGER);
 11   18   0   0        PROCEDURE CrosshairOff;

 12   20   0   0        PRIVATE CrosshairDriver;

 13   22   0   0        VAR
                          LastX, LastY: INTEGER;

 14   25   0   0        PROCEDURE CrosshairOn(X,Y:INTEGER);
 15   26   1   0          BEGIN
 15   27   1   1            SelectCursorSurface;
 16   28   1   1            SetLineIndex(0);
 17   29   1   1            PixelMoveClipped(LastX,0);
 18   30   1   1            PixelDrawClipped(LastX,32767);
 19   31   1   1            PixelMoveClipped(0,LastY);
 20   32   1   1            PixelDrawClipped(32767,LastY);
 21   33   1   1            LastX := X;
 22   34   1   1            LastY := Y;
 23   35   1   1            SetLineIndex(1);
 24   36   1   1            PixelMoveClipped(X,0);
 25   37   1   1            PixelDrawClipped(X,32767);
 26   38   1   1            PixelMoveClipped(0,Y);
 27   39   1   1            PixelDrawClipped(32767,Y);
 28   40   1   1            SelectGraphicsSurfaces;
 29   41   1   1          END;

 30   43   0   0        PROCEDURE CrosshairOff;
 31   44   1   0          BEGIN
 31   45   1   1            SelectCursorSurface;
 32   46   1   1            SetLineIndex(0);
 33   47   1   1            PixelMoveClipped(LastX,0);
 34   48   1   1            PixelDrawClipped(LastX,32767);
 35   49   1   1            PixelMoveClipped(0,LastY);
 36   50   1   1            PixelDrawClipped(32767,LastY);
 37   51   1   1            SelectGraphicsSurfaces;
 38   52   1   1          END;
```

```
 39   54  0  0

   54 Lines Read.
    0 Errors Detected.
  38% Utilization of Memory.
Source File: A:TABDEMUX.PAS
Object File: <none>
Controls Specified:  ERRORPRINT, NOOBJECT, PRINT(D:TABDEMUX.LST[G9]), TITLE(       GRAPHIC INPUT DEMULTIPLEXOR).

STMT LINE NESTING        SOURCE TEXT: A:TABDEMUX.PAS
  1     2  0  0          MODULE TabletDemux;

  2     4  0  0

                         PUBLIC TekMan;

                         TYPE
  3     9  0  0            GinType = (ConstrainedGIN, UnconstrainedGIN, MenuSelection);

  4    12  0  0          PUBLIC TabletDemux;
  5    13  0  0          FUNCTION TabletDemultiplexor(VAR Xgin,Ygin:INTEGER):GinType;

  6    15  0  0          PRIVATE TabletDemux;

  7    17  0  0          {======================================================================}
                         { TabletDemultiplexor              This procedure demultiplexes the tablet   }
                         {                                  input into constrained GIN, unconstrained  }
                         {                                  GIN, and TekMan menu input.                }
                         {======================================================================}

                         FUNCTION TabletDemultiplexor(VAR Xgin,Ygin:INTEGER):GinType;
  8    25  1  0           {-------------------------------------------------------}
                          {                                                       }
                          {                   Constrained GIN                     }
                          {                                                       }
                          {        Input                          Output          }
                          {      0 <= X <= 5119               0 <= X <= 1279      }
                          {   1280 <= Y <= 5119               0 <= Y <= 959       }
                          {                                                       }
                          {-------------------------------------------------------}

                          {--------------------}  {--------------------------}
                          {     TekMan Menu    }  {    Unconstrained GIN     }
                          { In:  0 <= X <= 1279 }  { In:  1600 <= X <= 5119  }
                          {      0 <= Y <= 959  }  {         0 <= Y <= 959   }
                          { Out: 0 <= X <= 1279 }  { Out:     0 <= X <= 3519  }
                          {      0 <= Y <= 959  }  {         0 <= Y <= 959   }
                          {--------------------}  {--------------------------}

                          BEGIN
  8    44  1  1            IF Ygin > 1119
                             THEN
                               BEGIN
  9    46  1  1                  Ygin := (Ygin - 1280) DIV 4;
  9    47  1  2                  IF Ygin < 0 THEN Ygin := 0;
 10    48  1  2                  Xgin := Xgin DIV 4;
 12    49  1  3
```

```
13   50  1  2              TabletDemultiplexor := ConstrainedGIN;
14   51  1  2            END
15   52  1  1         ELSE IF Xgin > 1439
16   53  1  1           THEN
17   54  1  1             BEGIN
17   55  1  2               Xgin := Xgin - 1600;
18   56  1  2               IF Xgin < 0 THEN Xgin := 0;
20   57  1  2               IF Ygin > 959 THEN Ygin := 959;
22   58  1  2               TabletDemultiplexor := UnconstrainedGIN;
23   59  1  2             END
24   60  1  1           ELSE
25   61  1  1             BEGIN
25   62  1  2               IF Xgin > 1279 THEN Xgin := 1279;
27   63  1  2               IF Ygin > 959 THEN Ygin := 959;
29   64  1  2               TabletDemultiplexor := MenuSelection;
30   65  1  2             END;
32   66  1  1       END;

33   68  0  0

 68 Lines Read.
  0 Errors Detected.
 39% Utilization of Memory.
4110 CP/M UDI2.1     8086/8087/8088 MACRO ASSEMBLER V1.1 ASSEMBLY OF MODULE POLLCH
NO OBJECT MODULE REQUESTED
ASSEMBLER INVOKED BY:  D:ASM86 A:POLLCH.ASM NOOJ EP PW(132) PR(D:POLLCH.LST[G9])

LOC  OBJ                  LINE     SOURCE

                            1 +1   $title (PollChar Function)
                            2      ;
                            3      ;
                            4      ;
                            5      ;
                            6      ;
                            7                 NAME     PollCh
                            8                 PUBLIC   PollChar
                            9      ;
----                       10      PollCh     SEGMENT
                           11                 ASSUME   CS:PollCh
                           12      ;
0000                       13      PollChar   PROC     FAR
                           14      ;
0000 B106                  15                 MOV      CL,6             ; Direct console I/O
0002 B2FE                  16                 MOV      DL,0FEH          ; Console status request
0004 CDE0                  17                 INT      224              ; Call CPM
0006 84C0                  18                 TEST     AL,AL            ; Is input character ready?
0008 7406                  19                 JZ       PollRet          ; No, return with zero in AL
                           20      ;
000A B106                  21                 MOV      CL,6             ; Direct console I/O
000C B2FF                  22                 MOV      DL,0FFH          ; Console input request
000E CDE0                  23                 INT      224              ; Call CPM
```

```
0010 CB                      24      ;
                             25      PollRet:  RET                         ; Return with zero or char in AL
                             26      ;
  -                          27      PollChar  ENDP
                             28      ;
  ----                       29      PollCh    ENDS
                             30      ;
                             31                END

Source File: A:TRANSFER.PAS
Object File: <none>
Controls Specified:  ERRORPRINT, NOOBJECT, PRINT(D:TRANSFER.LST[G9]), TITLE(          TRANSFER STRUCTURES

STMT LINE NESTING       SOURCE TEXT: A:TRANSFER.PAS

  1    4  0  0          MODULE TransferStructures;

  2    6  0  0



                        $INCLUDE (Transfer.Ext)
                =1      PUBLIC TransferStructures;
                =1
  3    3  0  0 =1         PROCEDURE TransferStructure (Mask : TransitionMask);

  4   15  0  0          $INCLUDE (ReadPix.Ext)
                =1      PUBLIC ReadPix;
                =1
  5    3  0  0 =1         PROCEDURE GetDrawingLimits (VAR xLow,yLow,  xHigh,yHigh : Integer);
                =1
  6    5  0  0 =1         PROCEDURE InitializeDrawing;
                =1
  7    7  0  0 =1         PROCEDURE ReadDrawing (VAR InputFile   : Text;
                =1                                  xMin,yMin   : Integer;
                =1                                  xMax,yMax   : Integer;
                =1                              VAR xLow,yLow   : Integer;
                =1                              VAR xHigh,yHigh : Integer);

  8   17  0  0          $INCLUDE (Spatial.Ext)
                =1                          { Spatial Data Structure Routines}
                =1
                =1      PUBLIC SpatialLibrary;
                =1
  9    5  0  0 =1         CONST
                =1          NilConnection       = 0;
 10    7  0  0 =1          NilNode             = 0;
 11    8  0  0 =1          MaxConnections      = 14;
                =1
 12   10  0  0 =1         TYPE
                =1          ConnectionPointer   = LongInt;
```

```
                 =1
13   13   0   0  =1      NodePointer          = LongInt;
                 =1
14   15   0   0  =1      PointerToNodePointer= ^NodePointer;
                 =1
15   17   0   0  =1      StateType            = (Hidden,
                 =1                               Untagged,
                 =1                               Selected,
                 =1                               Written,
                 =1                               SelectedAndWritten,
                 =1                               Primitive,
                 =1                               Reserved6,
                 =1                               Reserved7);
                 =1
16   26   0   0  =1      StructureActionType = (DoNothing,
                 =1                               AddToStructure,
                 =1                               DeleteFromStructure);
                 =1
17   30   0   0  =1      TransitionMask       = PACKED ARRAY [Hidden..Reserved7] OF CHAR;
                 =1
18   32   0   0  =1      TypeOfNeighbor       = (Nodes, Lines, Edges);
                 =1
                 =1
                 =1
19   36   0   0  =1    FUNCTION  ConnectionTraversable (Connection : ConnectionPointer) : Boolean;
                 =1
20   38   0   0  =1    FUNCTION  CreateConnection (Node1           : NodePointer;
                 =1                                Node2           : NodePointer;
                 =1                                FilledAreaFlag : Boolean;
                 =1                                ConnectionState: StateType)
                 =1                               : ConnectionPointer;
                 =1
21   44   0   0  =1    FUNCTION  CreateDuplicateNode (x,y : INTEGER)
                 =1                                   : NodePointer;
                 =1
22   47   0   0  =1    PROCEDURE DeleteConnection (Connection : ConnectionPointer);
                 =1
23   49   0   0  =1    PROCEDURE DeleteNode (Node : NodePointer);
                 =1
24   51   0   0  =1    PROCEDURE DeleteNodeAndConnections (Node : NodePointer);
                 =1
25   53   0   0  =1    PROCEDURE DeleteObject (Node  : NodePointer;
                 =1                           State : StateType);
                 =1
26   56   0   0  =1    FUNCTION  EdgeConnection (CurrentConnection : ConnectionPointer)
                 =1                             : ConnectionPointer;
                 =1
27   59   0   0  =1    FUNCTION  EndNode (Connection : ConnectionPointer)
                 =1                     : NodePointer;
                 =1
28   62   0   0  =1    FUNCTION  ExamineNodeTraversedFlag (Node : NodePointer)
                 =1                                       : Boolean;
                 =1
29   65   0   0  =1    FUNCTION  FindNeighbors (     x,y                : INTEGER;
                 =1                                 Radius             : INTEGER;
```

```
                =1                          MaximumNumber          : INTEGER;
                =1                          NeighborMode           : TypeOfNeighbor;
                =1                      VAR Neighbors              : BYTES;
                =1                      VAR DistanceToNeighbors    : BYTES)
                =1                    : INTEGER;
                =1
                =1
30   74   0  0 =1   FUNCTION  FirstConnectionInPolyline (CurrentConnection : ConnectionPointer)
                =1                                  : ConnectionPointer;
                =1
31   77   0  0 =1   FUNCTION  FirstConnectionInTile (i,j        : INTEGER;
                =1                                 xMin,yMin  : INTEGER;
                =1                                 xMax,yMax  : INTEGER)
                =1                               : ConnectionPointer;
                =1
32   82   0  0 =1   FUNCTION  FirstNodeInTile (i,j : INTEGER)
                =1                           : NodePointer;
                =1
33   85   0  0 =1   FUNCTION  FirstTraversedNode : NodePointer;
                =1
34   87   0  0 =1   FUNCTION  FirstPolylineInObject (Node : NodePointer)
                =1                               : ConnectionPointer;
                =1
35   90   0  0 =1   FUNCTION  GetConnection (Node               : NodePointer;
                =1                          ConnectionNumber   : INTEGER)
                =1                        : ConnectionPointer;
                =1
36   94   0  0 =1   PROCEDURE GetConnectionInformation (    Connection : ConnectionPointer;
                =1                                      VAR Edge       : Boolean;
                =1                                      VAR State      : StateType);
                =1
37   98   0  0 =1   FUNCTION  GetConnectionNumber (Connection : ConnectionPointer)
                =1                               : INTEGER;
                =1
38  101   0  0 =1   FUNCTION  GetFirstTileContainingLine (x1,y1 : INTEGER;
                =1                                        x2,y2 : INTEGER)
                =1                                      : LONGINT;
                =1
39  105   0  0 =1   FUNCTION  GetNextTileContainingLine : LONGINT;
                =1
40  107   0  0 =1   PROCEDURE GetNodeLocation (    Node : NodePointer;
                =1                             VAR x,y  : INTEGER);
                =1
41  110   0  0 =1   FUNCTION  GetNodePointer (x,y : INTEGER)
                =1                          : NodePointer;
                =1
42  113   0  0 =1   PROCEDURE GetTileIndex (    x,y : INTEGER;
                =1                          VAR I,J : INTEGER);
                =1
43  116   0  0 =1   FUNCTION  GetTilePointer (I,J : INTEGER)
                =1                          : PointerToNodePointer;
                =1
44  119   0  0 =1   PROCEDURE GetTileStructureParameters (VAR x1,y1    : INTEGER;
                =1                                        VAR x2,y2    : INTEGER;
                =1                                        VAR TileSize : INTEGER);
```

```
                  =1
45  122  0  0  =1      PROCEDURE InitializeTileStructure (x1,y1     : INTEGER;
                  =1                                      x2,y2     : INTEGER;
                  =1                                      TileSize  : INTEGER);
                  =1
46  127  0  0  =1      FUNCTION  InsertNodeIntoConnection (Connection   : ConnectionPointer;
                  =1                                        x,y          : INTEGER)
                  =1                                      : ConnectionPointer;
                  =1
47  131  0  0  =1      FUNCTION  MergeTwoNodes (Node1 : NodePointer;
                  =1                             Node2 : NodePointer)
                  =1                           : NodePointer;
                  =1
48  135  0  0  =1      FUNCTION  MergeThreeNodes (Node1 : NodePointer;
                  =1                               Node2 : NodePointer;
                  =1                               Node3 : NodePointer)
                  =1                             : NodePointer;
                  =1
49  140  0  0  =1      FUNCTION  MoveNode ( Node         : NodePointer;
                  =1                          NewX, NewY   : INTEGER)
                  =1                        : Boolean;
                  =1
50  144  0  0  =1      FUNCTION  NextConnectionInPolyline (CurrentConnection : ConnectionPointer;
                  =1                                          FirstConnection   : ConnectionPointer)
                  =1                                        : ConnectionPointer;
                  =1
51  148  0  0  =1      FUNCTION  NextConnectionInTile (CurrentConnection : ConnectionPointer)
                  =1                                    : ConnectionPointer;
                  =1
52  151  0  0  =1      FUNCTION  NextNodeInTile (CurrentNode : NodePointer)
                  =1                              : NodePointer;
                  =1
53  154  0  0  =1      FUNCTION  NextPolylineInObject : ConnectionPointer;
                  =1
54  156  0  0  =1      FUNCTION  NextTraversedNode : NodePointer;
                  =1
55  158  0  0  =1      FUNCTION  NumberOfConnections (Node : NodePointer)
                  =1                                   : INTEGER;
                  =1
56  161  0  0  =1      FUNCTION  NumberOfTilesContainingLine (x1,y1 : INTEGER;
                  =1                                             x2,y2 : INTEGER)
                  =1                                           : INTEGER;
                  =1
57  165  0  0  =1      FUNCTION  ReciprocalConnection (Connection : ConnectionPointer)
                  =1                                    : ConnectionPointer;
                  =1
58  168  0  0  =1      PROCEDURE ReleaseTileStructure;
                  =1
59  170  0  0  =1      PROCEDURE ResetNodeTraversedFlags;
                  =1
60  172  0  0  =1      PROCEDURE SetDuplicateOutputEnabled (DuplicateOutput : Boolean);
                  =1
61  174  0  0  =1      PROCEDURE SetNodeTraversedFlag (Node : NodePointer);
                  =1
```

```
62  176  0  0 =1      PROCEDURE SetTransitionMask (VAR NextMask     : TransitionMask;
                 =1                                VAR PreviousMask : TransitionMask);
                 =1
63  179  0  0 =1    FUNCTION  TransferConnection (CurrentConnection : ConnectionPointer;
                 =1                                NewNode           : NodePointer)
                 =1                               : ConnectionPointer;
                 =1
64  183  0  0 =1      FUNCTION TransferConnectionField ( CurrentConnection : ConnectionPointer;
                 =1                                        NewNode           : NodePointer)
                 =1                                      : ConnectionPointer;
                 =1
65  187  0  0 =1      PROCEDURE UpdateConnectionStatus
                 =1                       (     CurrentConnection          : ConnectionPointer;
                 =1                         VAR SelectedStructureAction : StructureActionType;
                 =1                         VAR WrittenStructureAction  : StructureActionType);

66   19  0  0        $INCLUDE (TekMan.Ext)
                 =1   PUBLIC TekMan;
                 =1
67    3  0  0 =1      CONST
                 =1     MaximumLengthOfFileName =   14;
68    5  0  0 =1        xMaxDisplayPixel        = 1279    (tk4115);
69    6  0  0 =1        xMaxViewportCoordinate  = 4095    (tk4113);
70    7  0  0 =1        xNumberOfDisplayPixels  = 1280    (tk4115);
71    8  0  0 =1        yMaxDisplayPixel        =  959    (tk4115);
72    9  0  0 =1        yMaxViewportCoordinate  = 3071    (tk4113);
73   10  0  0 =1        yNumberOfDisplayPixels  =  960    (tk4115);
                 =1
74   12  0  0 =1      TYPE
                 =1     CursorStatusType = (Limbo,
                 =1                         WriteMode,
                 =1                         LockMode,
                 =1                         LockAndWriteMode);
                 =1
75   10  0  0 =1      CursorActionType = (NoAction,
                 =1                         EnterWriteMode,
                 =1                         StayInWriteMode,
                 =1                         EnterLimbo,
                 =1                         EnterLockMode,
                 =1                         StayInLockMode,
                 =1                         EnterLockAndWriteMode,
                 =1                         StayInLockAndWriteMode,
                 =1                         ReturnToLockMode,
                 =1                         ReturnToWriteMode);
                 =1
76   29  0  0 =1      FileName         = PACKED ARRAY [1..MaximumLengthOfFilename] OF CHAR;
                 =1
77   31  0  0 =1      GINType          = (ConstrainedGIN,
                 =1                         UnconstrainedGIN,
                 =1                         MenuSelection);
78   20  0  0         $EJECT
79   25  0  0         {=========================================================================}
                      { TransferObject              This procedure traverses an object,        }
                      {                             transfering its contents to a new structure }
                      {                             according to the Transition Mask established }
                      {                             by its caller                               }
                      {=========================================================================}
```

```
 80  34 1 0        VAR
                     Connection                    : ConnectionPointer;
 81  36 1 0          FirstConnection               : ConnectionPointer;
 82  37 1 0          SelectedStructureAction       : StructureActionType;
 83  38 1 0          WrittenStructureAction        : StructureActionType;

 84  41 1 0        BEGIN { TransferObject }
 84  42 1 1          Connection := FirstPolylineInObject (Node);
 85  43 1 1          WHILE Connection <> NilConnection   DO
 86  44 1 1            BEGIN
 86  45 1 2              FirstConnection := Connection;
 87  46 1 2              WHILE Connection <> NilConnection   DO
 88  47 1 2                BEGIN
 88  46 1 3                  UpdateConnectionStatus (Connection, SelectedStructureAction,
                                                      WrittenStructureAction);

 89  50 1 3                  Connection := NextConnectionInPolyline
                                              (Connection, FirstConnection);

 90  52 1 3                END;
 92  53 1 2              Connection := NextPolylineInObject;
 93  54 1 2            END;
 95  55 1 1        END   {TransferObject} ;


 56  59 0 0       {================================================================}
                  { TransferStructure            This procedure transfers the specified   }
                  {                              structure according to the transition mask }
                  {================================================================}

                  PROCEDURE TransferStructure (Mask : TransitionMask);

 97  66 1 0         VAR
                      i              : Integer;
 98  68 1 0           j              : Integer;
 99  69 1 0           DummyMask      : TransitionMask;
100  70 1 0           Node           : NodePointer;
101  71 1 0           OldMask        : TransitionMask;
102  72 1 0           x1             : Integer;
103  73 1 0           x2             : Integer;
104  74 1 0           xHigh          : Integer;
105  75 1 0           xLow           : Integer;
106  76 1 0           y1             : Integer;
107  77 1 0           y2             : Integer;
108  78 1 0           yHigh          : Integer;
109  79 1 0           yLow           : Integer;

110  82 1 0         BEGIN { TransferStructure }
110  83 1 1           GetDrawingLimits (xLow, yLow,    xHigh, yHigh);
111  84 1 1           ResetNodeTraversedFlags;
112  85 1 1           SetTransitionMask (Mask, OldMask);

113  87 1 1           { Traverse the tile structure,                               }
```

```
                           {   writing complete objects as they are encountered. }
                           GetTileIndex (xLow,yLow,     x1,y1);
114    90  1  1            GetTileIndex (xHigh,yHigh,   x2,y2);

115    92  1  1            FOR i := x1 TO x2   DO
116    93  1  1              FOR j := y1 TO y2  DO
117    94  1  1                BEGIN
117    95  1  2                  Node := FirstNodeInTile (i,j);
118    96  1  2                  WHILE Node <> NilNode DO
119    97  1  2                    BEGIN
119    98  1  3                      TransferObject ({containing} Node {according to trans mask});
120    99  1  3                      Node := NextNodeInTile (Node);
121   100  1  3                    END;
123   101  1  2                END;
135   102  1  1            SetTransitionMask (OldMask, DummyMask);
126   103  1  1          END   { TransferStructure };


127   106  0  0          .

343 Lines Read.
  0 Errors Detected.
 54% Utilization of Memory.
Source File: A:WRITEPIX.PAS
Object File: <none>
Controls Specified:  ERRORPRINT, NOOBJECT, PRINT(D:WRITEPIX.LST[G9]), SUBTITLE(                PUBLIC DECLARATIONS), TITLE(
           WRITE DRAWING TO FILE).

STMT LINE NESTING       SOURCE TEXT: A:WRITEPIX.PAS

  1     4  0  0         MODULE WritePix;

  2     7  0  0         {===========================================================================}
                        {                                                                           }
                        {                                                                           }
                        {                                                                           }
                        {                                                                           }
                        {===========================================================================}
                        {                                                                           }
                        {  MODULE:  WritePix                                                        }
                        {             Saves drawings, or portions thereof, to an external file.     }
                        {                                                                           }
                        {                                                                           }
                        {  ROUTINES COONTAINED IN WritePix:                                         }
                        {                                                                           }
                        {     SaveDrawing:              Save entire drawing, including state        }
                        {                               information, to external file.              }
                        {                                                                           }
                        {                                                                           }
                        {     SaveSelectedStructure:  Save just the selected structure.             }
                        {                                                                           }
                        {                                                                           }
                        {===========================================================================}
                        $EJECT
```

```
STMT LINE NESTING         SOURCE TEXT: A:WRITEPIX.PAS
                          PUBLIC WritePix;
   3   39   0   0           PROCEDURE InitializeWritePix;
   4   40   0   0           PROCEDURE SaveDrawing;
   5   41   0   0           PROCEDURE SaveSelectedStructure;
   6   42   0   0           PROCEDURE TerminateWritePix;

   7   44   0   0         $INCLUDE (MaskDefs.Ext)
                 =1       PUBLIC MaskDefinitions;
   8    2   0   0 =1        VAR
                 =1           ClearSelectedStructureMask : TransitionMask;
   9    4   0   0 =1          CorrectModeMask : TransitionMask;
  10    5   0   0 =1          HideModeMask : TransitionMask;
  11    6   0   0 =1          RecoverHiddenStructureMask : TransitionMask;
  12    7   0   0 =1          SelectModeMask : TransitionMask;
  13    8   0   0 =1          WriteSelectedStructureMask : TransitionMask;
  14    9   0   0 =1          TraverseHiddenMask : TransitionMask;
  15   10   0   0 =1          TraversePrimitiveMask : TransitionMask;
  16   11   0   0 =1          TraverseReserved6Mask : TransitionMask;
  17   12   0   0 =1          TraverseReserved7Mask : TransitionMask;
  18   13   0   0 =1          TraverseSelectedMask : TransitionMask;
  19   14   0   0 =1          TraverseSelectedWrittenMask : TransitionMask;
  20   15   0   0 =1          TraverseUntaggedMask : TransitionMask;
  21   16   0   0 =1          TraverseWrittenMask : TransitionMask;

  22   46   0   0         $INCLUDE (Spatial.Ext)
                 =1                           { Spatial Data Structure Routines}
                 =1
                 =1       PUBLIC SpatialLibrary;
                 =1
  23    5   0   0 =1        CONST
                 =1           NilConnection         = 0;
  24    7   0   0 =1          NilNode               = 0;
  25    8   0   0 =1          MaxConnections        = 14;
                 =1
  26   10   0   0 =1        TYPE
                 =1           ConnectionPointer     = LongInt;
                 =1
  27   13   0   0 =1          NodePointer           = LongInt;
                 =1
  28   15   0   0 =1          PointerToNodePointer= ^NodePointer;
                 =1
  29   17   0   0 =1          StateType             = (Hidden,
                 =1                                    Untagged,
                 =1                                    Selected,
                 =1                                    Written,
                 =1                                    SelectedAndWritten,
                 =1                                    Primitive,
                 =1                                    Reserved6,
                 =1                                    Reserved7);
                 =1
  30   36   0   0 =1          StructureActionType = (DoNothing,
                 =1                                    AddToStructure,
                 =1                                    DeleteFromStructure);
                 =1
  31   30   0   0 =1          TransitionMask        = PACKED ARRAY [Hidden..Reserved7] OF CHAR;
```

```
32  32  0  0  =1     TypeOfNeighbor      = (Nodes, Lines, Edges);

33  36  0  0  =1     FUNCTION  ConnectionTraversable (Connection : ConnectionPointer) : Boolean;
34  38  0  0  =1     FUNCTION  CreateConnection (Node1            : NodePointer;
                                                Node2            : NodePointer;
                                                FilledAreaFlag   : Boolean;
                                                ConnectionState: StateType)
                                              : ConnectionPointer;
35  44  0  0  =1     FUNCTION  CreateDuplicateNode (x,y : INTEGER)
                                                  : NodePointer;
36  47  0  0  =1     PROCEDURE DeleteConnection (Connection : ConnectionPointer);
37  49  0  0  =1     PROCEDURE DeleteNode (Node : NodePointer);
38  51  0  0  =1     PROCEDURE DeleteNodeAndConnections (Node : NodePointer);
39  53  0  0  =1     PROCEDURE DeleteObject (Node  : NodePointer;
                                             State : StateType);
40  56  0  0  =1     FUNCTION  EdgeConnection (CurrentConnection : ConnectionPointer)
                                             : ConnectionPointer;
41  59  0  0  =1     FUNCTION  EndNode (Connection : ConnectionPointer)
                                     : NodePointer;
42  62  0  0  =1     FUNCTION  ExamineNodeTraversedFlag (Node : NodePointer)
                                                      : Boolean;
43  65  0  0  =1     FUNCTION  FindNeighbors (     x,y                    : INTEGER;
                                                  Radius                 : INTEGER;
                                                  MaximumNumber          : INTEGER;
                                                  NeighborMode           : TypeOfNeighbor;
                                              VAR Neighbors              : BYTES;
                                              VAR DistanceToNeighbors    : BYTES)
                                            : INTEGER;
44  74  0  0  =1     FUNCTION  FirstConnectionInPolyline (CurrentConnection : ConnectionPointer)
                                                       : ConnectionPointer;
45  77  0  0  =1     FUNCTION  FirstConnectionInTile (i,j        : INTEGER:
                                                     xMin,yMin : INTEGER;
                                                     xMax,yMax : INTEGER)
                                                   : ConnectionPointer;
46  82  0  0  =1     FUNCTION  FirstNodeInTile (i,j : INTEGER)
                                             : NodePointer;
47  85  0  0  =1     FUNCTION  FirstTraversedNode : NodePointer;
```

```
                =1
48   87  0  0   =1   FUNCTION   FirstPolylineInObject (Node : NodePointer)
                =1                                     : ConnectionPointer;
                =1
49   90  0  0   =1   FUNCTION   GetConnection (Node                : NodePointer;
                =1                             ConnectionNumber  : INTEGER)
                =1                            : ConnectionPointer;
                =1
50   94  0  0   =1   PROCEDURE GetConnectionInformation (     Connection : ConnectionPointer;
                =1                                        VAR Edge       : Boolean;
                =1                                        VAR State      : StateType);
                =1
51   98  0  0   =1   FUNCTION  GetConnectionNumber (Connection : ConnectionPointer)
                =1                                  : INTEGER;
                =1
52  101  0  0   =1   FUNCTION   GetFirstTileContainingLine (x1,y1 : INTEGER;
                =1                                          x2,y2 : INTEGER)
                =1                                         : LONGINT;
                =1
53  105  0  0   =1   FUNCTION   GetNextTileContainingLine : LONGINT;
                =1
54  107  0  0   =1   PROCEDURE GetNodeLocation (     Node : NodePointer;
                =1                              VAR x,y  : INTEGER);
                =1
55  110  0  0   =1   FUNCTION   GetNodePointer (x,y : INTEGER)
                =1                            : NodePointer;
                =1
56  113  0  0   =1   PROCEDURE GetTileIndex (     x,y : INTEGER;
                =1                           VAR I,J : INTEGER);
                =1
57  116  0  0   =1   FUNCTION   GetTilePointer (I,J : INTEGER)
                =1                            : PointerToNodePointer;
                =1
58  119  0  0   =1   PROCEDURE GetTileStructureParameters (VAR x1,y1    : INTEGER;
                =1                                         VAR x2,y2    : INTEGER;
                =1                                         VAR TileSize : INTEGER);
                =1
59  123  0  0   =1   PROCEDURE InitializeTileStructure (x1,y1    : INTEGER;
                =1                                     x2,y2    : INTEGER;
                =1                                     TileSize : INTEGER);
                =1
60  127  0  0   =1   FUNCTION   InsertNodeIntoConnection (Connection   : ConnectionPointer;
                =1                                       x,y         : INTEGER)
                =1                                      : ConnectionPointer;
                =1
61  131  0  0   =1   FUNCTION   MergeTwoNodes (Node1 : NodePointer;
                =1                              Node2 : NodePointer)
                =1                             : NodePointer;
                =1
62  135  0  0   =1   FUNCTION   MergeThreeNodes (Node1 : NodePointer;
                =1                                Node2 : NodePointer;
                =1                                Node3 : NodePointer)
                =1                               : NodePointer;
                =1
63  140  0  0   =1   FUNCTION   MoveNode ( Node        : NodePointer;
```

```
                                     NewX, NewY : INTEGER)
                                   : Boolean;
              =1
              =1
              =1
64  144  0  0 =1      FUNCTION  NextConnectionInPolyline (CurrentConnection : ConnectionPointer;
              =1                                           FirstConnection   : ConnectionPointer)
              =1                                         : ConnectionPointer;
              =1
65  148  0  0 =1      FUNCTION  NextConnectionInTile (CurrentConnection : ConnectionPointer)
              =1                                     : ConnectionPointer;
              =1
66  151  0  0 =1      FUNCTION  NextNodeInTile (CurrentNode : NodePointer)
              =1                               : NodePointer;
              =1
67  154  0  0 =1      FUNCTION  NextPolylineInObject : ConnectionPointer;
              =1
68  156  0  0 =1      FUNCTION  NextTraversedNode : NodePointer;
              =1
69  158  0  0 =1      FUNCTION  NumberOfConnections (Node : NodePointer)
              =1                                    : INTEGER;
              =1
70  161  0  0 =1      FUNCTION  NumberOfTilesContainingLine (x1,y1 : INTEGER;
              =1                                             x2,y2 : INTEGER)
              =1                                           : INTEGER;
              =1
71  165  0  0 =1      FUNCTION  ReciprocalConnection (Connection : ConnectionPointer)
              =1                                     : ConnectionPointer;
              =1
72  168  0  0 =1      PROCEDURE ReleaseTileStructure;
              =1
73  170  0  0 =1      PROCEDURE ResetNodeTraversedFlags;
              =1
74  172  0  0 =1      PROCEDURE SetDuplicateOutputEnabled (DuplicateOutput : Boolean);
              =1
75  174  0  0 =1      PROCEDURE SetNodeTraversedFlag (Node : NodePointer);
              =1
76  176  0  0 =1      PROCEDURE SetTransitionMask (VAR NextMask     : TransitionMask;
              =1                                   VAR PreviousMask : TransitionMask);
              =1
77  179  0  0 =1      FUNCTION  TransferConnection (CurrentConnection : ConnectionPointer;
              =1                                    NewNode           : NodePointer)
              =1                                  : ConnectionPointer;
              =1
78  183  0  0 =1      FUNCTION TransferConnectionField ( CurrentConnection : ConnectionPointer;
              =1                                         NewNode           : NodePointer)
              =1                                       : ConnectionPointer;
              =1
79  187  0  0 =1      PROCEDURE UpdateConnectionStatus
              =1                            (     CurrentConnection        : ConnectionPointer;
              =1                              VAR SelectedStructureAction : StructureActionType;
              =1                              VAR WrittenStructureAction  : StructureActionType);

80   48  0  0        $INCLUDE (Support.Ext)
              =1
              =1      PUBLIC SupportLibrary;
              =1
```

```
81     4  0  0 =1        TYPE
                  =1       ColorNameType = PACKED ARRAY [1..10] OF CHAR;
                  =1
                  =1
82     8  0  0 =1        PROCEDURE ActivateMenuHandler    { #include PushSelf.Inc };
                  =1
83    10  0  0 =1        PROCEDURE CrosshairOff;
                  =1
84    12  0  0 =1        PROCEDURE CrosshairOn (x, y : Integer);
                  =1
85    14  0  0 =1        PROCEDURE DeactivateMenuHandler { #include PushSelf.Inc };
                  =1
86    16  0  0 =1        FUNCTION  DualCursorAction
                  =1                       (Stylus       : Char;
                  =1                        CursorStatus : CursorStatusType) : CursorActionType;
                  =1
87    20  0  0 =1        PROCEDURE EraseSurface (Surface : Integer);
                  =1
88    22  0  0 =1        PROCEDURE Exit;
                  =1
89    24  0  0 =1        PROCEDURE GetDrawingLimits (VAR xLow, yLow,    xHigh, yHigh : Integer);
                  =1
90    26  0  0 =1        PROCEDURE GetFileName (     i                : Integer;
                  =1                        VAR OutputFileName : FileName;
                  =1                        VAR NewExtension   : Bytes);
                  =1
91    30  0  0 =1        PROCEDURE InitializeFileVariable (VAR FileVariable : Text);
                  =1
92    32  0  0 =1        PROCEDURE InquireColor (     ColorNumber       : Integer;
                  =1                         VAR ColorName         : ColorNameType;
                  =1                         VAR Red, Green, Blue  : Integer);
                  =1
93    36  0  0 =1        PROCEDURE InquireDrawingWindow (VAR x1,y1,    x2,y2 : Integer);
                  =1
94    38  0  0 =1        PROCEDURE IssueStatusMessage (     x, y   : Integer;
                  =1                                VAR Text   : Bytes;
                  =1                                    Length : Integer);
                  =1
95    42  0  0 =1        FUNCTION  LineDistance (x1,y1,    x2,y2,    x3,y3 : Integer) : Integer;
                  =1
96    44  0  0 =1        PROCEDURE PixelDrawClipped (x, y : Integer);
                  =1
97    46  0  0 =1        PROCEDURE PixelDrawTransformed (x, y : Integer);
                  =1
98    48  0  0 =1        PROCEDURE PixelMoveClipped (x, y : Integer);
                  =1
99    50  0  0 =1        PROCEDURE PixelMoveTransformed (x, y : Integer);
                  =1
100   52  0  0 =1        PROCEDURE PixelToDrawingCoordinates (     xPixel,yPixel     : Integer;
                  =1                                       VAR xDrawing,yDrawing : Integer);
                  =1
101   55  0  0 =1        FUNCTION  PixelToDrawingSize (PixelSize : Integer) : Integer;
                  =1
102   57  0  0 =1        FUNCTION  PointDistance (x1,y1,  x2,y2 : Integer) : Integer;
                  =1
```

```
103   59  0  0 =1      FUNCTION  PollChar : Char;
                =1
104   61  0  0 =1      PROCEDURE ReadThumbwheels (VAR x, y : Integer);
                =1
105   63  0  0 =1      PROCEDURE RingBell;
                =1
106   65  0  0 =1      PROCEDURE SelectColorMap (MapNumber, Intensity : Integer);
                =1
107   67  0  0 =1      PROCEDURE SelectCursorSurface;
                =1
108   69  0  0 =1      PROCEDURE SelectGraphicsSurfaces;
                =1
109   71  0  0 =1      PROCEDURE SelectMenuSurface;
                =1
110   73  0  0 =1      PROCEDURE SetColor (ColorNumber,Red,Green,Blue : Integer);
                =1
111   75  0  0 =1      PROCEDURE SetDrawingWindow (x1,y1,   x2,y2 : Integer);
                =1
112   77  0  0 =1      PROCEDURE SetHostHandler;      {Called only from assembler by Host Header}
                =1
113   79  0  0 =1      PROCEDURE SetIntensity (Intensity : Integer);
                =1
114   81  0  0 =1      PROCEDURE SetKeyboardHandler;
115   82  0  0 =1                        {Called only from assembler by Keyboard Header}
                =1
                =1     PROCEDURE SetLineIndex (LineIndex : Integer);
                =1
116   86  0  0 =1      PROCEDURE SetTabletHandler;
117   87  0  0 =1                          {Called only from assembler by Tablet Header}
                =1
                =1     PROCEDURE SetThumbwheelHandler;
118   90  0  0 =1                      {Called only from assembler by Thumbwheel Header}
                =1
                =1     FUNCTION  SideDistance (Hypotenuse, OtherSide : Integer) : Integer;
                =1
119   94  0  0 =1      FUNCTION  SingleCursorAction
                =1                        (Stylus       : Char;
                =1                         CursorStatus : CursorStatusType) : CursorActionType;

120   50  0  0       $INCLUDE (Tekman.Ext)
                =1   PUBLIC TekMan;
                =1
121    3  0  0 =1    CONST
                =1     MaximumLengthOfFileName =   14;
122    5  0  0 =1      xMaxDisplayPixel        = 1279    {tk4115};
123    6  0  0 =1      xMaxViewportCoordinate  = 4095    {tk4113};
124    7  0  0 =1      xNumberOfDisplayPixels  = 1280    {tk4115};
125    8  0  0 =1      yMaxDisplayPixel        =  959    {tk4115};
126    9  0  0 =1      yMaxViewportCoordinate  = 3071    {tk4113};
127   10  0  0 =1      yNumberOfDisplayPixels  =  960    {tk4115};
                =1
128   13  0  0 =1    TYPE
                =1     CursorStatusType = (Limbo,
                =1                         WriteMode,
                =1                         LockMode,
```

```
STMT LINE NESTING       SOURCE TEXT: TEKMAN.EXT
                 =1                            LockAndWriteMode);
                 =1
 129   18  0  0  =1       CursorActionType = (NoAction,
                 =1                            EnterWriteMode,
                 =1                            StayInWriteMode,
                 =1                            EnterLimbo,
                 =1                            EnterLockMode,
                 =1                            StayInLockMode,
                 =1                            EnterLockAndWriteMode,
                 =1                            StayInLockAndWriteMode,
                 =1                            ReturnToLockMode,
                 =1                            ReturnToWriteMode);
                 =1
 130   29  0  0  =1       FileName         = PACKED ARRAY [1..MaximumLengthOfFilename] OF CHAR;
                 =1
 131   31  0  0  =1       GINType          = (ConstrainedGIN,
                 =1                            UnconstrainedGIN,
                 =1                            MenuSelection);

 132   52  0  0         $SUBTITLE ('              Private Declarations')
 133   55  0  0           VAR
                            AbortRequested : Boolean;      { User requested temination of operation}

 134   58  0  0             BackUpFileName : FileName;     { Renamed input file                    }

 135   60  0  0             LayerCounter   : Integer;

 136   62  0  0             OutputFile     : Text;         { Contains the output picture           }

 137   64  0  0             OutputFileName : FileName;     { Name of file to receive output        }

 138   66  0  0             xOut           : Integer;      { x coordinate of node in external      }
 139   67  0  0                                            {     (scanner) coordinate system       }

                            yOut           : Integer;      { y coordinate of node in external      }
 140   70  0  0                                            {     (scanner) coordinate system       }


                        {=============================================================================}
                        { DeleteFile        Deletes named file from directory                         }
                        {=============================================================================}

                          PROCEDURE DeleteFile (NameOfFileToDelete : FileName);

 141   79  1  0             BEGIN { DeleteFile }

 141   81  1  1             END   { DeleteFile };


 142   85  0  0         {=============================================================================}
                        { RenameFile        Renames an existing file in the directory                 }
                        {=============================================================================}
```

```
                  PROCEDURE RenameFile (OldName, NewName : FileName);
143   91  1  0      BEGIN { RenameFile }
143   93  1  1      END   { RenameFile };

144   96  0  0    $SUBTITLE ('                    Write Object')

                  {=====================================================================}
                  { InitializeWritePix                                                  }
                  {=====================================================================}

                    PROCEDURE InitializeWritePix;

145  104  1  0        BEGIN { InitializeWritePix }
145  105  1  1          LayerCounter := 0;

146  107  1  1          InitializeFileVariable (OutputFile);
147  108  1  1          GetFileName (1, OutputFileName, 'OUT');
148  109  1  1          GetFileName (1, BackUpFileName, 'BAK');
149  110  1  1        END   { InitializeWritePix };


150  114  0  0    {=====================================================================}
                  { TerminateWritePix  Reset the output file to insure it is written to disk  }
                  {=====================================================================}

                  PROCEDURE TerminateWritePix;

151  120  1  0      BEGIN { TerminateWritePix }
151  121  1  1        IF LayerCounter > 0
                        THEN
152  123  1  1            Reset (OutputFile, OutputFileName);
153  124  1  1      END   { TerminateWritePix };


154  128  0  0    {=====================================================================}
                  { WriteObject                   This procedure outputs an object.     }
                  {=====================================================================}

                  PROCEDURE WriteObject (Node : NodePointer);

155  134  1  0      VAR
                      Connection                   : ConnectionPointer;
156  136  1  0        FirstConnection              : ConnectionPointer;
157  137  1  0        SelectedStructureAction      : StructureActionType;
158  138  1  0        WrittenStructureAction       : StructureActionType;
159  139  1  0        x                            : Integer;
160  140  1  0        y                            : Integer;
```

```
BEGIN { WriteObject }
  Connection := FirstPolylineInObject (Node);

  WHILE (Connection <> NilConnection) AND (NOT AbortRequested)   DO
    BEGIN
      IF PollChar = Chr (27)
        THEN
          AbortRequested := True
        ELSE
          BEGIN
            FirstConnection := Connection;
            GetNodeLocation (FirstConnection, x, y);

            xOut := x DIV 4;
            yOut := y DIV 4;

            WriteLn (OutputFile, 'M', xOut:5, yOut:6);

            WHILE Connection <> NilConnection   DO
              BEGIN
                GetNodeLocation (EndNode(Connection), x, y);

                xOut := x DIV 4;
                yOut := y DIV 4;

                WriteLn (OutputFile, 'D', xOut:5, yOut:6);

                UpdateConnectionStatus (Connection,
                                        SelectedStructureAction,
                                        WrittenStructureAction);
                Connection := NextConnectionInPolyline
                                       (Connection, FirstConnection);
              END { WHILE Connection <> NilConnection };
          END { IF PollChar = Chr (24) .... ELSE ... };
      Connection := NextPolylineInObject;
    END { WHILE Connection <> NilConnection };
END   { WriteObject };

$SUBTITLE ('                          Save Drawing')

{==========================================================================}
{ SaveDrawing                    This procedure saves the current state of  }
{                                the drawing in the drawing output file.    }
{==========================================================================}

PROCEDURE SaveDrawing;

  VAR
    DummyMask                 : TransitionMask;
    i                         : Integer;
    j                         : Integer;
    Node                      : NodePointer;
    OldMask                   : TransitionMask;
    State                     : StateType;
    x1                        : Integer;
```

```
193  197  1  0            x2                      : Integer;
194  198  1  0            xHigh                   : Integer;
195  199  1  0            xLow                    : Integer;
196  200  1  0            y1                      : Integer;
197  201  1  0            y2                      : Integer;
198  202  1  0            yHigh                   : Integer;
199  203  1  0            yLow                    : Integer;

200  206  1  0          BEGIN { SaveDrawing }
200  207  1  1            DeleteFile (BackUpFileName);
201  208  1  1            RenameFile (OutputFileName, BackUpFileName);
202  209  1  1            Rewrite (OutputFile, OutputFileName);

203  211  1  1            xOut := -1;
204  212  1  1            yOut := -1;
205  213  1  1            AbortRequested := False;

206  215  1  1            { Save the current transition mask so it can be restored later }
                          SetTransitionMask (TraverseUntaggedMask, OldMask);

207  218  1  1            FOR State := Hidden TO Reserved7   DO
208  219  1  1              BEGIN
208  220  1  2                WriteLn (OutputFile, 'L', Ord (State):5, 0:6);

209  222  1  2                CASE State OF
210  223  1  3                    Hidden             :  SetTransitionMask (TraverseHiddenMask,
                                                                          DummyMask);
211  225  1  3                    Untagged           :  SetTransitionMask (TraverseUntaggedMask,
                                                                          DummyMask);
212  227  1  3                    Selected           :  SetTransitionMask (TraverseSelectedMask,
                                                                          DummyMask);
213  229  1  3                    Written            :  SetTransitionMask (TraverseWrittenMask,
                                                                          DummyMask);
214  231  1  3                    SelectedAndWritten :  SetTransitionMask
                                                                   (TraverseSelectedWrittenMask,
                                                                          DummyMask);
215  234  1  3                    Primitive          :  SetTransitionMask (TraversePrimitiveMask,
                                                                          DummyMask);
216  236  1  3                    Reserved6          :  SetTransitionMask (TraverseReserved6Mask,
                                                                          DummyMask);
217  238  1  3                    Reserved7          :  SetTransitionMask (TraverseReserved7Mask,
                                                                          DummyMask);
218  240  1  3                  END { CASE State OF ... };

220  242  1  2                GetDrawingLimits (xLow,  yLow,
                                                 xHigh, yHigh);
221  244  1  2                GetTileIndex     (xLow,  yLow,  x1, y1);
222  245  1  2                GetTileIndex     (xHigh, yHigh, x2, y2);

223  247  1  2                ResetNodeTraversedFlags;

224  249  1  2                FOR i := x1 TO x2   DO
225  250  1  2                  FOR j := y1 TO y2   DO
226  251  1  2                    BEGIN
```

```
                IF NOT AbortRequested
                  THEN
                    BEGIN
                      Node := FirstNodeInTile (i, j);
                      WHILE Node <> NilNode    DO
                        BEGIN
                          WriteObject (Node);
                          Node := NextNodeInTile (Node);
                        END;
                    END;
              END;
          END { FOR State := ... };

        LayerCounter := 0;
        Reset (OutputFile, OutputFileName);
      END   { SaveDrawing };

$SUBTITLE ('              Save Selected Structure')

{=========================================================================}
{ SaveSelectedStructure        This procedure writes the selected structure }
{                              to the drawing output file and transfers     }
{                              the selected structure to the written        }
{                              structure.                                   }
{=========================================================================}

PROCEDURE SaveSelectedStructure;

  VAR
    DummyMask            : TransitionMask;
    i                    : Integer;
    j                    : Integer;
    Node                 : NodePointer;
    OldMask              : TransitionMask;
    x1                   : Integer;
    x2                   : Integer;
    xHigh                : Integer;
    xLow                 : Integer;
    y1                   : Integer;
    y2                   : Integer;
    yHigh                : Integer;
    yLow                 : Integer;

  BEGIN { SaveSelectedStructure }
    xOut := -1;
    yOut := -1;
    AbortRequested := False;

    IF LayerCounter = 0
      THEN
        BEGIN
          DeleteFile (BackUpFileName);
          RenameFile (OutputFileName, BackUpFileName);
          Rewrite (OutputFile, OutputFileName);
        END;
```

```
265  307  1  1         WriteLn (OutputFile, 'L', LayerCounter:5, 1:6);

266  309  1  1         LayerCounter := LayerCounter + 1;

267  311  1  1         ResetNodeTraversedFlags;
268  312  1  1         SetTransitionMask (WriteSelectedStructureMask, OldMask);

269  314  1  1         { Traverse the tile sturcture.  For each node returned, write the }
                       { entire object containing it to the file.                         }

                       GetDrawingLimits (xLow,  yLow,
                                         xHigh, yHigh);
270  319  1  1         GetTileIndex     (xLow,  yLow,    x1, y1);
271  320  1  1         GetTileIndex     (xHigh, yHigh,   x2, y2);

272  322  1  1         FOR i := x1 TO x2   DO
273  323  1  1           FOR j := y1 TO y2   DO
274  324  1  1             BEGIN
274  325  1  2               IF NOT AbortRequested
                                THEN
275  327  1  2                   BEGIN
275  328  1  3                     Node := FirstNodeInTile (i,j);
276  329  1  3                     WHILE Node <> NilNode DO
277  330  1  3                       BEGIN
277  331  1  4                         WriteObject (Node);
278  332  1  4                         Node := NextNodeInTile (Node);
279  333  1  4                       END;
281  334  1  3                   END;
283  335  1  2             END;

285  337  1  1         { Return the transition mask to its value at entry }
                       SetTransitionMask (OldMask, DummyMask);
286  339  1  1       END;

287  341  0  0     .
```

```
676 Lines Read.
  0 Errors Detected.
64% Utilization of Memory.
```

```
Source File: A:PIXELSYS.PAS
Object File: <none>
Controls Specified:  ERRORPRINT, NOOBJECT, PRINT(D:PIXELSYS.LST[G9]).

STMT LINE NESTING       SOURCE TEXT: A:PIXELSYS.PAS
   1     1  0  0
                        MODULE PixelSys;
   2     3  0  0


                        $INCLUDE(Tekman.Ext);
               =1       PUBLIC TekMan;
               =1
```

```
3     3  0  0 =1      CONST
                =1        MaximumLengthOfFileName =    14;
4     5  0  0 =1        xMaxDisplayPixel          = 1279    {tk4115};
5     6  0  0 =1        xMaxViewportCoordinate    = 4095    {tk4113};
6     7  0  0 =1        xNumberOfDisplayPixels    = 1280    {tk4115};
7     8  0  0 =1        yMaxDisplayPixel          =  959    {tk4115};
8     9  0  0 =1        yMaxViewportCoordinate    = 3071    {tk4113};
9    10  0  0 =1        yNumberOfDisplayPixels    =  960    {tk4115};
                =1
10   12  0  0 =1      TYPE
                =1        CursorStatusType = (Limbo,
                =1                            WriteMode,
                =1                            LockMode,
                =1                            LockAndWriteMode);
                =1
11   18  0  0 =1        CursorActionType = (NoAction,
                =1                            EnterWriteMode,
                =1                            StayInWriteMode,
                =1                            EnterLimbo,
                =1                            EnterLockMode,
                =1                            StayInLockMode,
                =1                            EnterLockAndWriteMode.
                =1                            StayInLockAndWriteMode,
                =1                            ReturnToLockMode,
                =1                            ReturnToWriteMode);
                =1
12   29  0  0 =1        FileName         = PACKED ARRAY [1..MaximumLengthOfFilename] OF CHAR;
                =1
13   31  0  0 =1        GINType          = (ConstrainedGIN,
                =1                            UnconstrainedGIN,
                =1                            MenuSelection);

14    8  0  0         PUBLIC PixelMD;
15    9  0  0         PROCEDURE PixelMove(X,Y:INTEGER);
16   10  0  0         PROCEDURE PixelDraw(X,Y:INTEGER);

17   12  0  0         PUBLIC PixelSys;
18   13  0  0         PROCEDURE SetPixelWindow(X1,Y1,X2,Y2:INTEGER);
19   14  0  0         PROCEDURE InquirePixelWindow(VAR X1,Y1,X2,Y2:INTEGER);
20   15  0  0         PROCEDURE PixelMoveTransformed(X,Y:INTEGER);
21   16  0  0         PROCEDURE PixelDrawTransformed(X,Y:INTEGER);
22   17  0  0         PROCEDURE PixelMoveClipped(X,Y:INTEGER);
23   18  0  0         PROCEDURE PixelDrawClipped(X,Y:INTEGER);
24   19  0  0         PROCEDURE PixelSavePosition;
25   20  0  0         PROCEDURE PixelRestorePosition;

26   22  0  0         PRIVATE PixelSys;

27   24  0  0         VAR
                        Xmin, Ymin, Xscale, Yscale, Xstart, Ystart, Xsave, Ysave: INTEGER;
28   26  0  0           MoveRequired: BOOLEAN;

29   28  0  0         PROCEDURE SetPixelWindow(X1,Y1,X2,Y2:INTEGER);
30   29  1  0           BEGIN
```

```
30  30  1  1          IF X1 < X2
                        THEN Xmin := X1
31  32  1  1            ELSE Xmin := X2;
33  33  1  1          IF Y1 < Y2
                        THEN Ymin := Y1
34  35  1  1            ELSE Ymin := Y2;
36  36  1  1          Xscale := ABS(X2 - X1);
37  37  1  1          Yscale := ABS(Y2 - Y1);
38  38  1  1        END;

39  40  0  0      PROCEDURE InquirePixelWindow(VAR X1,Y1,X2,Y2:INTEGER);
40  41  1  0        BEGIN
40  42  1  1          X1 := Xmin;
41  43  1  1          Y1 := Ymin;
42  44  1  1          X2 := Xmin + Xscale;
43  45  1  1          Y2 := Ymin + Yscale;
44  46  1  1        END;

45  48  0  0      PROCEDURE PixelMoveTransformed(X,Y:INTEGER);
46  49  1  0        BEGIN
46  50  1  1          PixelMoveClipped((X-Xmin)*xNumberOfDisplayPixels DIV Xscale,
                                       (Y-Ymin)*yNumberOfDisplayPixels DIV Yscale);
47  52  1  1        END;

48  54  0  0      PROCEDURE PixelDrawTransformed(X,Y:INTEGER);
49  55  1  0        BEGIN
49  56  1  1          PixelDrawClipped((X-Xmin)*xNumberOfDisplayPixels DIV Xscale,
                                       (Y-Ymin)*yNumberOfDisplayPixels DIV Yscale);
50  58  1  1        END;

51  60  0  0      PROCEDURE PixelMoveClipped(X,Y:INTEGER);
52  61  1  0        BEGIN
52  62  1  1          Xstart := X;
53  63  1  1          Ystart := Y;
54  64  1  1          MoveRequired := TRUE;
55  65  1  1        END;

56  67  0  0      PROCEDURE PixelDrawClipped(X,Y:INTEGER):
57  68  1  0        LABEL 100;
58  69  1  0        VAR
                      X1, Y1, X2, Y2, DeltaX, DeltaY, Temp: INTEGER;

59  73  1  0        { This procedure includes several statements of the form
                      'Result := Temp * Delta1 DIV Delta2 + Origin;'
                      The intermediate product (Temp * Delta1) often exceeds
                      16 bits.  We are therefore depending upon the fact that
                      the compiler generates the following code:
                        MOV     AX,Temp
                        IMUL    Delta1
                        IDIV    Delta2
                        ADD     AX,Origin
                        MOV     Result,A
                      Note that the compiler does not generate such efficient
                      code if the form of the statement changes.  For example,
                      'Result := (Value1 - Value2) * Delta1 DIV Delta2 + Origin;'
                      produces very inefficient code.}
```

```
                       BEGIN
 59   88  1  1           X1 := Xstart;
 60   89  1  1           Y1 := Ystart;
 61   90  1  1           X2 := X;
 62   91  1  1           Y2 := Y;
 63   92  1  1           DeltaX := X2 - X1;
 64   93  1  1           DeltaY := Y2 - Y1;
 65   94  1  1           IF X1 < 0
                           THEN
 66   96  1  1               BEGIN
 66   97  1  2                 IF X2 < 0
                                 THEN
 67   99  1  2                     BEGIN
 67  100  1  3                       MoveRequired := TRUE;
 68  101  1  3                       GOTO 100;
 69  102  1  3                     END;
 71  103  1  2                 Temp := -X2;
 72  104  1  2                 Y1 := Temp * DeltaY DIV DeltaX + Y2;
 73  105  1  2                 X1 := 0;
 74  106  1  2               END
 75  107  1  1             ELSE
 76  108  1  1               IF X1 > xMaxDisplayPixel
                               THEN
 77  110  1  1                   BEGIN
 77  111  1  2                     IF X2 > xMaxDisplayPixel
                                     THEN
 78  113  1  2                         BEGIN
 78  114  1  3                           MoveRequired := TRUE;
 79  115  1  3                           GOTO 100;
 80  116  1  3                         END;
 82  117  1  2                     Temp := xMaxDisplayPixel - X2;
 83  118  1  2                     Y1 := Temp * DeltaY DIV DeltaX + Y2;
 84  119  1  2                     X1 := xMaxDisplayPixel;
 85  120  1  2                   END;
 87  121  1  1           IF Y1 < 0
                           THEN
 88  123  1  1               BEGIN
 88  124  1  2                 IF Y2 < 0
                                 THEN
 89  126  1  2                     BEGIN
 89  127  1  3                       MoveRequired := TRUE;
 90  128  1  3                       GOTO 100;
 91  129  1  3                     END;
 93  130  1  2                 Temp := -Y2;
 94  131  1  2                 X1 := Temp * DeltaX DIV DeltaY + X2;
 95  132  1  2                 Y1 := 0;
 96  133  1  2               END
 97  134  1  1             ELSE
 98  135  1  1               IF Y1 > yMaxDisplayPixel
                               THEN
 99  137  1  1                   BEGIN
 99  138  1  2                     IF Y2 > yMaxDisplayPixel
                                     THEN
100  140  1  2                         BEGIN
```

```
100  141  1  3                  MoveRequired := TRUE;
101  142  1  3                  GOTO 100;
102  143  1  3                END;
104  144  1  2              Temp := yMaxDisplayPixel - Y2;
105  145  1  2              X1 := Temp * DeltaX DIV DeltaY + X2;
106  146  1  2              Y1 := yMaxDisplayPixel;
107  147  1  2            END;
109  148  1  1    IF X2 < 0
                    THEN
110  150  1  1        BEGIN
110  151  1  2          Temp := -X1;
111  152  1  2          Y2 := Temp * DeltaY DIV DeltaX + Y1;
112  153  1  2          X2 := 0;
113  154  1  2        END
114  155  1  1      ELSE
115  156  1  1        IF X2 > xMaxDisplayPixel
                        THEN
116  158  1  1            BEGIN
116  159  1  2              Temp := xMaxDisplayPixel - X1;
117  160  1  2              Y2 := Temp * DeltaY DIV DeltaX + Y1;
118  161  1  2              X2 := xMaxDisplayPixel;
119  162  1  2            END;
121  163  1  1    IF Y2 < 0
                    THEN
122  165  1  1        BEGIN
122  166  1  2          Temp := -Y1;
123  167  1  2          X2 := Temp * DeltaX DIV DeltaY + X1;
124  168  1  2          Y2 := 0;
125  169  1  2        END
126  170  1  1      ELSE
127  171  1  1        IF Y2 > yMaxDisplayPixel
                        THEN
128  173  1  1            BEGIN
128  174  1  2              Temp := yMaxDisplayPixel - Y1;
129  175  1  2              X2 := Temp * DeltaX DIV DeltaY + X1;
130  176  1  2              Y2 := yMaxDisplayPixel;
131  177  1  2            END;
133  178  1  1    IF MoveRequired OR (X1 <> Xstart) OR (Y1 <> Ystart) THEN PixelMove(X1,Y1);
135  179  1  1    PixelDraw(X2,Y2);
136  180  1  1    MoveRequired := FALSE;
137  181  1  1  100:
138  183  1  1    Xstart := X;
                  Ystart := Y;
139  184  1  1  END;

140  186  0  0  PROCEDURE PixelSavePosition;
141  187  1  0    BEGIN
141  188  1  1      Xsave := Xstart;
142  189  1  1      Ysave := Ystart;
143  190  1  1    END;

144  192  0  0  PROCEDURE PixelRestorePosition;
145  193  1  0    BEGIN
145  194  1  1      Xstart := Xsave;
```

```
146  195  1  1            Ystart := Ysave;
147  196  1  1            MoveRequired := TRUE;
148  197  1  1          END;

149  199  0  0

232 Lines Read.
  0 Errors Detected.
44% Utilization of Memory.
```

```
4110 CP/M UDI2.1     8086/8087/8088 MACRO ASSEMBLER V1.1 ASSEMBLY OF MODULE PIXELMD
NO OBJECT MODULE REQUESTED
ASSEMBLER INVOKED BY:  D:ASM86 A:PIXELMD.ASM NOOJ EP PW(132) PR(D:PIXELMD.LST[G9])

LOC  OBJ                 LINE     SOURCE

                           1 +1  $title (Pixel MOVE and DRAW Procedures)
                           2     ;
                           3     ;
                           4     ;
                           5     ;
                           6     ;
                           7               NAME     PixelMD
                           8     ;
                           9     ; PROCEDURES to MOVE and DRAW in Pixel (640 x 480) space
                          10     ;
                          11               PUBLIC   PixelMove,PixelDraw
                          12     ;
                          13               EXTRN    LLMOVE:FAR        ; PROCEDURE LLMOVE(VAR X,Y:INTEGER);
                          14               EXTRN    LLDRAW:FAR        ; PROCEDURE LLDRAW(VAR X,Y:INTEGER);
                          15     ;
----                      16     XYlist    STRUC
0000                      17               DW       ?                 ; Prologue code saves BP here
0002                      18               DW       ?                 ; Prologue code saves DS here
0004                      19               DD       ?                 ; Return address for FAR procedures
0008                      20     Y         DW       ?                 ; Y value (second parameter)
000A                      21     X         DW       ?                 ; X value (first parameter)
----                      22     XYlist    ENDS
                          23     ;
----                      24     PixelData SEGMENT
0000 0000                 25     Xprev     DW       0                 ; Previous X value
0002 0000                 26     Yprev     DW       0                 ; Previous Y value
0004 01                   27     MoveFlag  DB       1                 ; 1 if move required; otherwise 0
----                      28     PixelData ENDS
                          29     ;
----                      30     PixelMD   SEGMENT
                          31               ASSUME   CS:PixelMD,DS:PixelData
                          32 +1  $title (GetXY Subroutine)
                          33 +1  $eject
0000                      34     GetXY     PROC     NEAR
                          35     ;
```

```
0000 8B460A                       MOV    AX,[BP].X            ; X value
0003 3D0000                       CMP    AX,0                 ; Within range?
0006 7C0D                         JL     IgnoreX              ; No, ignore it
0008 3DFF04                       CMP    AX,1279              ; Within range?
000B 7F03                         JG     IgnoreX              ; No, ignore it
000D A30000                       MOV    Xprev,AX             ; Save it
                        ;
0010 8B4608             IgnoreX:  MOV    AX,[BP].Y            ; Y value
0013 3D0000                       CMP    AX,0                 ; Within range?
0016 7C08                         JL     IgnoreY              ; No, ignore it
0018 3DBF03                       CMP    AX,959               ; Within range?
001B 7F03                         JG     IgnoreY              ; No, ignore it
001D A30200                       MOV    Yprev,AX             ; Save it
                        ;
0020 C606040001         IgnoreY:  MOV    MoveFlag,1           ; Indicate Move Required
                        ;
0025 C3                           RET                         ; Return to Caller
                        GetXY     ENDP
                   +1   $title (PixelMove PROCEDURE)
                   +1   $eject
0026                    PixelMove PROC   FAR
0026 1E                           PUSH   DS                   ; Save DS for PASCAL
0027 B8----        R              MOV    AX,PixelData         ; Address of data segment
002A 8ED8                         MOV    DS,AX                ; Move it to DS register
002C 55                           PUSH   BP                   ; Save BP for PASCAL
002D 8BEC                         MOV    BP,SP                ; Establish addressability to parameters
                        ;
002F E8CEFF                       CALL   GetXY                ; Get (and Save) parameters
                        ;
0032 5D                           POP    BP                   ; Restore BP for PASCAL
0033 1F                           POP    DS                   ; Restore DS for PASCAL
0034 CA0400                       RET    4                    ; Return; remove 4 bytes from stack
                        PixelMove ENDP
                   +1   $title (PixelDraw PROCEDURE)
                   +1   $eject
0037                    PixelDraw PROC   FAR
0037 1E                           PUSH   DS                   ; Save DS for PASCAL
0038 B8----        R              MOV    AX,PixelData         ; Address of data segment
003B 8ED8                         MOV    DS,AX                ; Move it to DS register
003D 55                           PUSH   BP                   ; Save BP for PASCAL
003E 8BEC                         MOV    BP,SP                ; Establish addressability to parameters
                        ;
0040 F606040001                   TEST   MoveFlag,1           ; Is a Move Required?
0045 740F                         JZ     SkipMove             ; No, Skip it
                        ;
0047 BB0000                       MOV    BX,OFFSET Xprev      ; Address of Previous X
004A 1E                           PUSH   DS                   ; First parameter; second word
004B 53                           PUSH   BX                   ; First parameter; first word
004C BB0200                       MOV    BX,OFFSET Yprev      ; Address of Previous Y
004F 1E                           PUSH   DS                   ; Second parameter; second word
0050 53                           PUSH   BX                   ; Second parameter; first word
0051 9A0000----    E              CALL   LLMOVE               ; Move to the starting point
                        ;
0056 E8A7FF             SkipMove: CALL   GetXY                ; Get X and Y parameters
```

```
0059 BB0000            90      ;
                       91                  MOV     BX,OFFSET Xprev      ; Address of Target X
005C 1E                92                  PUSH    DS                   ; First parameter; second word
005D 53                93                  PUSH    BX                   ; First parameter; first word
005E BB0200            94                  MOV     BX,OFFSET Yprev      ; Address of Target Y
0061 1E                95                  PUSH    DS                   ; Second parameter; second word
0062 53                96                  PUSH    BX                   ; Second parameter; first word
0063 9A0000----    E   97                  CALL    LLDRAW               ; Draw the Vector
                       98      ;
0068 C606040000        99                  MOV     MoveFlag,0           ; Indicate Move Not Required
                      100      ;
006D 5D               101                  POP     BP                   ; Restore BP for PASCAL
006E 1F               102                  POP     DS                   ; Restore DS for PASCAL
006F CA0400           103                  RET     4                    ; Return; remove 4 bytes from stack
                      104      PixelDraw   ENDP
                      105      ;
----                  106      PixelMD     ENDS
                      107      ;
                      108                  END

ASSEMBLY COMPLETE, NO ERRORS FOUND
```

```
Source File: A:REDRAW.PAS
Object File: <none>
Controls Specified:  ERRORPRINT, NOOBJECT, PRINT(D:REDRAW.LST[G9]), TITLE(              REDRAW PROCEDURES).

STMT LINE NESTING       SOURCE TEXT: A:REDRAW.PAS
   1    2  0  0
                        MODULE Redraw;
   2    4  0  0


                        $INCLUDE (TekMan.Ext)
                  =1    PUBLIC TekMan;
                  =1
   3    3  0  0   =1    CONST
                  =1      MaximumLengthOfFileName =   14:
   4    5  0  0   =1      xMaxDisplayPixel        = 1279    (tk4115);
   5    6  0  0   =1      xMaxViewportCoordinate  = 4095    (tk4113);
   6    7  0  0   =1      xNumberOfDisplayPixels  = 1280    (tk4115);
   7    8  0  0   =1      yMaxDisplayPixel        =  959    (tk4115);
   8    9  0  0   =1      yMaxViewportCoordinate  = 3071    (tk4113);
   9   10  0  0   =1      yNumberOfDisplayPixels  =  960    (tk4115);
                  =1
  10   12  0  0   =1    TYPE
                  =1      CursorStatusType = (Limbo,
                  =1                          WriteMode,
                  =1                          LockMode.
                  =1                          LockAndWriteMode);
                  =1
  11   12  0  0   =1      CursorActionType = (NoAction,
                  =1                          EnterWriteMode,
```

```
                         StayInWriteMode,
                         EnterLimbo,
                         EnterLockMode,
                         StayInLockMode,
                         EnterLockAndWriteMode,
                         StayInLockAndWriteMode,
                         ReturnToLockMode,
                         ReturnToWriteMode);
                 =1
12  29  0  0 =1    FileName     = PACKED ARRAY [1..MaximumLengthOfFilename] OF CHAR;
                 =1
13  31  0  0 =1    GINType      = (ConstrainedGIN,
                 =1                 UnconstrainedGIN,
                 =1                 MenuSelection);

14  10  0  0                {=====> TEMP <=====}
                   $INCLUDE (LTI.Ext);
                 =1 PUBLIC LTI;
                 =1
15   3  0  0 =1    PROCEDURE LLBPXL (VAR Surface,ALU,Bits : INTEGER);   {Begin-Pixel-Operations}
16   4  0  0 =1    PROCEDURE LLCLMD (VAR Mode,Overlay,Grey : INTEGER);  {Set-Color-Mode}
17   5  0  0 =1    PROCEDURE LLCLMP (VAR Surface,Len : INTEGER;VAR Map : BYTES); {Set-Surface-Color-Map}
18   6  0  0 =1    PROCEDURE LLDAEN (VAR Enabled : INTEGER);            {Enable-Dialogue-Area}
19   7  0  0 =1    PROCEDURE LLDALN (VAR Lines : INTEGER);              {Set-Dialogue-Area-Lines}
20   8  0  0 =1    PROCEDURE LLDASF (VAR Surface : INTEGER);            {Set-Dialogue-Area-Surface}
21   9  0  0 =1    PROCEDURE LLDAVS (VAR Vis : INTEGER);                {Set-Dialogue-Area-Visibility}
22  10  0  0 =1    PROCEDURE LLDAXY (VAR X,Y : INTEGER);                {Set-Dialogue-Area-Position}
23  11  0  0 =1    PROCEDURE LLDLSG (VAR Seg : INTEGER);                {Delete-Segment}
24  12  0  0 =1    PROCEDURE LLDLVW (VAR View : INTEGER);               {Delete-View}
25  13  0  0 =1    PROCEDURE LLGPRC (VAR Precision: INTEGER);           {Set-Graphtext-Precision}
26  14  0  0 =1    PROCEDURE LLGSIZ (VAR Width,Height,Spacing:INTEGER); {Set-Graphtext-Size}
27  15  0  0 =1    PROCEDURE LLINIT (VAR TerminalType : INTEGER);       {LTI-Initialization}
28  16  0  0 =1    PROCEDURE LLLNIN (VAR Index: INTEGER);               {Set-Line-Index}
29  17  0  0 =1    PROCEDURE LLMOVE (VAR X,Y: INTEGER);                 {Move}
30  18  0  0 =1    PROCEDURE LLRCFL (VAR X1,Y1,X2,Y2,Pen : INTEGER);    {Rectangle-Fill}
31  19  0  0 =1    PROCEDURE LLSYNC;                                    {Synchronize Firmware}
32  20  0  0 =1    PROCEDURE LLTEXT (VAR Count:INTEGER;VAR Str:BYTES;Dummy:INTEGER); {Graphic-Text}
33  21  0  0 =1    PROCEDURE LLVISF (VAR Count : INTEGER;VAR Vis : BYTES); {Set-Surface-Visibility}
34  22  0  0 =1    PROCEDURE LLVKLK (VAR Lockmode : INTEGER);           {Lock-Viewing-Keys}
35  23  0  0 =1    PROCEDURE LLVWAT (VAR Surface,Wipe,Border:INTEGER);  {Set-View-Attributes}
36  24  0  0 =1    PROCEDURE LLVWPT (VAR X1,Y1,X2,Y2 : INTEGER);        {Set-Viewport}
37  25  0  0 =1    PROCEDURE LLWAIT (VAR TimerInterval : INTEGER);      {Pause for interval}
38  26  0  0 =1    PROCEDURE LLWIND (VAR X1,Y1,X2,Y2 : INTEGER);        {Set-Window}

39  13  0  0                {=====> TEMP <=====}
                   $INCLUDE (PixelSys.Ext);
                 =1 PUBLIC PixelSys;
40   2  0  0 =1      PROCEDURE SetPixelWindow (x1,y1, x2,y2 : INTEGER);
                 =1
41   4  0  0 =1      PROCEDURE PixelMoveTransformed (x, y : INTEGER);
                 =1
42   6  0  0 =1      PROCEDURE PixelDrawTransformed (x, y : INTEGER);

43  16  0  0                {=====> TEMP <=====}
```

```
                        $INCLUDE (Cursor.Ext);
               =1       PUBLIC Cursor;
44    2  0  0  =1         PROCEDURE InitializeCursor;
               =1
45    4  0  0  =1         PROCEDURE IssueStatusMessage (      x,y     : Integer;
               =1                                  VAR Text    : Bytes;
               =1                                      Length  : Integer);
               =1
46    8  0  0  =1         PROCEDURE SelectCursorSurface;
               =1
47   10  0  0  =1         PROCEDURE SelectGraphicsSurfaces;
               =1
48   12  0  0  =1         PROCEDURE SelectMenuSurface;
               =1
49   14  0  0  =1         PROCEDURE SetLineIndex (LineIndex : Integer);

50   19  0  0                       {=====> TEMP <=====}
                        $INCLUDE (Redraw.Ext)
               =1       PUBLIC Redraw;
               =1
51    3  0  0  =1       TYPE
               =1         ColorNameType = PACKED ARRAY [1..10] OF CHAR;
               =1
52    6  0  0  =1         PROCEDURE EraseSurface(Surface:INTEGER);
53    7  0  0  =1         PROCEDURE InitializeRedraw;
54    3  0  0  =1         PROCEDURE InquireColor(ColorNumber:INTEGER;VAR ColorName:ColorNameType;

               =1                              VAR Red,Green,Blue:INTEGER);
55   10  0  0  =1         PROCEDURE InquireDrawingWindow(VAR x1,y1, x2,y2 : INTEGER);
56   11  0  0  =1         PROCEDURE PixelToDrawingCoordinates(     xPixel,    yPixel:    INTEGER;
               =1                                         VAR xDrawing, yDrawing:  INTEGER);
57   13  0  0  =1         FUNCTION  PixelToDrawingSize(PixelSize:INTEGER):INTEGER;
58   14  0  0  =1         PROCEDURE SetColor(ColorNumber,Red,Green,Blue:INTEGER);
59   15  0  0  =1         PROCEDURE SetIntensity(Intensity:INTEGER);
60   16  0  0  =1         PROCEDURE SelectColorMap (MapNumber, Intensity : INTEGER);
61   17  0  0  =1         PROCEDURE SetDrawingWindow(x1,y1, x2,y2 : INTEGER);
62   18  0  0  =1         PROCEDURE SetWindowLimits(x1,y1, x2,y2 : INTEGER);

63   22  0  0           $INCLUDE (Spatial.Ext)
               =1                           { Spatial Data Structure Routines}
               =1
               =1       PUBLIC SpatialLibrary;
               =1
64    5  0  0  =1         CONST
               =1           NilConnection        = 0;
65    7  0  0  =1           NilNode              = 0;
66    8  0  0  =1           MaxConnections       = 14;
               =1
67   10  0  0  =1         TYPE
               =1           ConnectionPointer    = LongInt;
               =1
68   13  0  0  =1           NodePointer          = LongInt;
               =1
69   15  0  0  =1           PointerToNodePointer= ^NodePointer;
               =1
```

```
70   17  0  0 =1      StateType           = (Hidden,
                =1                           Untagged,
                =1                           Selected,
                =1                           Written,
                =1                           SelectedAndWritten,
                =1                           Primitive,
                =1                           Reserved6,
                =1                           Reserved7);
                =1
71   26  0  0 =1      StructureActionType = (DoNothing,
                =1                           AddToStructure,
                =1                           DeleteFromStructure);
                =1
72   30  0  0 =1      TransitionMask      = PACKED ARRAY [Hidden..Reserved7] OF CHAR;
                =1
73   32  0  0 =1      TypeOfNeighbor      = (Nodes, Lines, Edges);
                =1
                =1
                =1
74   36  0  0 =1    FUNCTION  ConnectionTraversable (Connection : ConnectionPointer) : Boolean;
                =1
75   38  0  0 =1    FUNCTION  CreateConnection (Node1            : NodePointer;
                =1                               Node2            : NodePointer;
                =1                               FilledAreaFlag   : Boolean;
                =1                               ConnectionState: StateType)
                =1                             : ConnectionPointer;
                =1
76   44  0  0 =1    FUNCTION  CreateDuplicateNode (x,y : INTEGER)
                =1                                  : NodePointer;
                =1
77   47  0  0 =1    PROCEDURE DeleteConnection (Connection : ConnectionPointer);
                =1
78   49  0  0 =1    PROCEDURE DeleteNode (Node : NodePointer);
                =1
79   51  0  0 =1    PROCEDURE DeleteNodeAndConnections (Node : NodePointer);
                =1
80   53  0  0 =1    PROCEDURE DeleteObject (Node  : NodePointer;
                =1                          State : StateType);
                =1
81   56  0  0 =1    FUNCTION  EdgeConnection (CurrentConnection : ConnectionPointer)
                =1                            : ConnectionPointer;
                =1
82   59  0  0 =1    FUNCTION  EndNode (Connection : ConnectionPointer)
                =1                     : NodePointer;
                =1
83   62  0  0 =1    FUNCTION  ExamineNodeTraversedFlag (Node : NodePointer)
                =1                                      : Boolean;
                =1
84   65  0  0 =1    FUNCTION  FindNeighbors (    x,y                    : INTEGER;
                =1                               Radius                 : INTEGER;
                =1                               MaximumNumber          : INTEGER;
                =1                               NeighborMode           : TypeOfNeighbor;
                =1                           VAR Neighbors              : BYTES;
                =1                           VAR DistanceToNeighbors    : BYTES)
                =1                         : INTEGER;
```

```
                =1
                =1
85 -  74  0  0  =1       FUNCTION  FirstConnectionInPolyline (CurrentConnection : ConnectionPointer)
                =1                                           : ConnectionPointer;
                =1
86    77  0  0  =1       FUNCTION  FirstConnectionInTile (i,j         : INTEGER;
                =1                                        xMin,yMin : INTEGER;
                =1                                        xMax,yMax : INTEGER)
                =1                                      : ConnectionPointer;
                =1
87    83  0  0  =1       FUNCTION  FirstNodeInTile (i,j : INTEGER)
                =1                              : NodePointer;
                =1
88    85  0  0  =1       FUNCTION  FirstTraversedNode : NodePointer;
                =1
89    87  0  0  =1       FUNCTION  FirstPolylineInObject (Node : NodePointer)
                =1                                      : ConnectionPointer;
                =1
90    90  0  0  =1       FUNCTION  GetConnection (Node             : NodePointer;
                =1                              ConnectionNumber : INTEGER)
                =1                            : ConnectionPointer;
                =1
91    94  0  0  =1       PROCEDURE GetConnectionInformation (    Connection : ConnectionPointer;
                =1                                          VAR Edge       : Boolean;
                =1                                          VAR State      : StateType);
                =1
92    98  0  0  =1       FUNCTION  GetConnectionNumber (Connection : ConnectionPointer)
                =1                                  : INTEGER;
                =1
93   101  0  0  =1       FUNCTION  GetFirstTileContainingLine (x1,y1 : INTEGER;
                =1                                           x2,y2 : INTEGER)
                =1                                         : LONGINT;
                =1
94   105  0  0  =1       FUNCTION  GetNextTileContainingLine : LONGINT;
                =1
95   107  0  0  =1       PROCEDURE GetNodeLocation (     Node : NodePointer;
                =1                                 VAR x,y  : INTEGER);
                =1
96   110  0  0  =1       FUNCTION  GetNodePointer (x,y : INTEGER)
                =1                               : NodePointer;
                =1
97   113  0  0  =1       PROCEDURE GetTileIndex (     x,y : INTEGER;
                =1                              VAR I,J : INTEGER);
                =1
98   116  0  0  =1       FUNCTION  GetTilePointer (I,J : INTEGER)
                =1                               : PointerToNodePointer;
                =1
99   119  0  0  =1       PROCEDURE GetTileStructureParameters (VAR x1,y1    : INTEGER;
                =1                                            VAR x2,y2    : INTEGER;
                =1                                            VAR TileSize : INTEGER);
                =1
100  123  0  0  =1       PROCEDURE InitializeTileStructure (x1,y1    : INTEGER;
                =1                                         x2,y2    : INTEGER;
                =1                                         TileSize : INTEGER);
```

```
                 =1
101  127  0  0   =1      FUNCTION  InsertNodeIntoConnection (Connection    : ConnectionPointer;
                 =1                                          x,y           : INTEGER)
                 =1                                        : ConnectionPointer;
                 =1
102  131  0  0   =1      FUNCTION  MergeTwoNodes (Node1 : NodePointer;
                 =1                               Node2 : NodePointer)
                 =1                             : NodePointer;
                 =1
103  135  0  0   =1      FUNCTION  MergeThreeNodes (Node1 : NodePointer;
                 =1                                 Node2 : NodePointer;
                 =1                                 Node3 : NodePointer)
                 =1                               : NodePointer;
                 =1
104  140  0  0   =1      FUNCTION  MoveNode ( Node        : NodePointer;
                 =1                           NewX, NewY : INTEGER)
                 =1                         : Boolean;
                 =1
105  144  0  0   =1      FUNCTION  NextConnectionInPolyline (CurrentConnection : ConnectionPointer;
                 =1                                          FirstConnection   : ConnectionPointer)
                 =1                                        : ConnectionPointer;
                 =1
106  148  0  0   =1      FUNCTION  NextConnectionInTile (CurrentConnection : ConnectionPointer)
                 =1                                    : ConnectionPointer;
                 =1
107  151  0  0   =1      FUNCTION  NextNodeInTile (CurrentNode : NodePointer)
                 =1                              : NodePointer;
                 =1
108  154  0  0   =1      FUNCTION  NextPolylineInObject : ConnectionPointer;
                 =1
109  156  0  0   =1      FUNCTION  NextTraversedNode : NodePointer;
                 =1
110  158  0  0   =1      FUNCTION  NumberOfConnections (Node : NodePointer)
                 =1                                  : INTEGER;
                 =1
111  161  0  0   =1      FUNCTION  NumberOfTilesContainingLine (x1,y1 : INTEGER;
                 =1                                             x2,y2 : INTEGER)
                 =1                                           : INTEGER;
                 =1
112  165  0  0   =1      FUNCTION  ReciprocalConnection (Connection : ConnectionPointer)
                 =1                                    : ConnectionPointer;
                 =1
113  168  0  0   =1      PROCEDURE ReleaseTileStructure;
                 =1
114  170  0  0   =1      PROCEDURE ResetNodeTraversedFlags;
                 =1
115  172  0  0   =1      PROCEDURE SetDuplicateOutputEnabled (DuplicateOutput : Boolean);
                 =1
116  174  0  0   =1      PROCEDURE SetNodeTraversedFlag (Node : NodePointer);
                 =1
117  176  0  0   =1      PROCEDURE SetTransitionMask (VAR NextMask     : TransitionMask;
                 =1                                   VAR PreviousMask : TransitionMask);
                 =1
118  179  0  0   =1      FUNCTION  TransferConnection (CurrentConnection : ConnectionPointer;
                 =1                                    NewNode           : NodePointer)
                 =1                                  : ConnectionPointer;
```

```
153   68  1  1        c1   :=   1;
154   69  1  1        c2   :=   2;
155   70  1  1        c3   :=   3;
156   71  1  1        c4   :=   4;
157   72  1  1        c11  :=  11;
158   73  1  1        c16  :=  16;

159   75  1  1        HalfSecond := 20;
160   76  1  1      END   { InitializeRedraw };

161   79  0  0    {=======================================================================}
                  { EraseSurface                  This procedure erases the specified surface, }
                  {                               regardless of which surface is selected.     }
                  {=======================================================================}

                  PROCEDURE EraseSurface (Surface : INTEGER);

162   86  1  0      VAR
                      VARxMaxDisplayPixel : INTEGER;
163   88  1  0        VARyMaxDisplayPixel : INTEGER;

164   90  1  0      BEGIN { EraseSurface }
164   91  1  1        LLBPXL (Surface, c11, c0);                   {$Begin-Pixel-Operations}
165   92  1  1        VARxMaxDisplayPixel := xMaxDisplayPixel;
166   93  1  1        VARyMaxDisplayPixel := yMaxDisplayPixel;
167   94  1  1        LLRCFL (c0, c0, VARxMaxDisplayPixel, VARyMaxDisplayPixel, c0);
168   95  1  1                                                     {$Rectangle-Fill}

                    END   { EraseSurface };

169   98  0  0    {=======================================================================}
                  { InquireColor                  This procedure returns the color indicies of }
                  {                               one of the colors on the display.            }
                  {=======================================================================}

                  PROCEDURE InquireColor(ColorNumber:INTEGER;VAR ColorName:ColorNameType;
                                         VAR Red,Green,Blue:INTEGER);
169  104  1  0      BEGIN
170  105  1  0        CASE ColorNumber OF
170  106  1  1          0:  BEGIN
171  107  1  2                ColorName := 'Background';
171  108  1  3                Red := FullIntensityGraphics[02];
172  109  1  3                Green := FullIntensityGraphics[03];
173  110  1  3                Blue := FullIntensityGraphics[04];
174  111  1  3              END;
175  112  1  3          1:  BEGIN
177  113  1  2                ColorName := 'Untagged  ';
177  114  1  3                Red := FullIntensityGraphics[06]:
178  115  1  3                Green := FullIntensityGraphics[07];
179  116  1  3                Blue := FullIntensityGraphics[08];
180  117  1  3              END;
181  118  1  3          2:  BEGIN
183  119  1  2                ColorName := 'Selected  ';
183  120  1  3                Red := FullIntensityGraphics[10]:
184  121  1  3
```

```
                 =1
119  183  0  0  =1      FUNCTION TransferConnectionField ( CurrentConnection : ConnectionPointer;
                 =1                                          NewNode           : NodePointer)
                 =1                                        : ConnectionPointer;
                 =1
120  187  0  0  =1      PROCEDURE UpdateConnectionStatus
                 =1                           (     CurrentConnection        : ConnectionPointer;
                 =1                            VAR SelectedStructureAction : StructureActionType;
                 =1                            VAR WrittenStructureAction  : StructureActionType);

121   24  0  0        PRIVATE Redraw;

122   26  0  0        TYPE
                        ColorMap               = ARRAY [1..16] OF INTEGER;
123   28  0  0          Colors                 = ARRAY [1..4] OF INTEGER;

124   30  0  0        VAR
                        c0                     : INTEGER;
125   32  0  0          c1                     : INTEGER;
126   33  0  0          c2                     : INTEGER;
127   34  0  0          c3                     : INTEGER;
128   35  0  0          c4                     : INTEGER;
129   36  0  0          c11                    : INTEGER;
130   37  0  0          c16                    : INTEGER;
131   38  0  0          CursorColor            : Colors;
132   39  0  0          FullIntensityGraphics  : ColorMap;
133   40  0  0          HalfIntensityGraphics  : ColorMap;
134   41  0  0          HalfSecond             : INTEGER;
135   42  0  0          MenuColor              : Colors;
136   43  0  0          xHigh                  : INTEGER;
137   44  0  0          xLow                   : INTEGER;
138   45  0  0          xScale                 : INTEGER;
139   46  0  0          xWindowHigh            : INTEGER;
140   47  0  0          xWindowLow             : INTEGER;
141   48  0  0          yHigh                  : INTEGER;
142   49  0  0          yLow                   : INTEGER;
143   50  0  0          yScale                 : INTEGER;
144   51  0  0          yWindowHigh            : INTEGER;
145   52  0  0          yWindowLow             : INTEGER;
146   53  0  0          xDrawingHigh           : INTEGER;
147   54  0  0          yDrawingHigh           : INTEGER;
148   55  0  0          xDrawingLow            : INTEGER;
149   56  0  0          yDrawingLow            : INTEGER;
150   57  0  0          TileSize               : INTEGER;

151   59  0  0        {==========================================================================}
                      { InitializeRedraw            This procedure initializes the local        }
                      {                             variables.                                  }
                      {==========================================================================}

                      PROCEDURE InitializeRedraw;

152   66  1  0          BEGIN { InitializeRedraw }
152   67  1  1            c0   :=   0;
```

```
185  122  1  3                Green := FullIntensityGraphics[11];
186  123  1  3                Blue := FullIntensityGraphics[12];
187  124  1  3              END;
189  125  1  2          3:  BEGIN
189  126  1  3                ColorName := 'Written   ';
190  127  1  3                Red := FullIntensityGraphics[14];
191  128  1  3                Green := FullIntensityGraphics[15];
192  129  1  3                Blue := FullIntensityGraphics[16];
193  130  1  3              END;
195  131  1  2          4:  BEGIN
195  132  1  3                ColorName := 'Cursor    ';
196  133  1  3                Red := CursorColor[2];
197  134  1  3                Green := CursorColor[3];
198  135  1  3                Blue := CursorColor[4];
199  136  1  3              END;
201  137  1  2          5:  BEGIN
201  138  1  3                ColorName := 'Menu      ';
202  139  1  3                Red := MenuColor[2];
203  140  1  3                Green := MenuColor[3];
204  141  1  3                Blue := MenuColor[4];
205  142  1  3              END;
207  143  1  2        END;
209  144  1  1      END;

210  146  0  0    {==========================================================================}
                  { SetColor                      This procedure changes the color indicies of }
                  {                               one of the colors on the display.           }
                  {==========================================================================}

STMT LINE NESTING  SOURCE TEXT: A:REDRAW.PAS
                   PROCEDURE SetColor(ColorNumber,Red,Green,Blue:INTEGER);
 211  152  1  0      BEGIN
 211  153  1  1        CASE ColorNumber OF
 212  154  1  2          0:  BEGIN
 212  155  1  3                FullIntensityGraphics[01] :=  0;       {Color Index of Background}
 213  156  1  3                FullIntensityGraphics[02] :=  Red;
 214  157  1  3                FullIntensityGraphics[03] :=  Green;
 215  158  1  3                FullIntensityGraphics[04] :=  Blue;
 216  159  1  3                HalfIntensityGraphics[01] :=  0;       {Color Index of Background}
 217  160  1  3              END;
 219  161  1  2          1:  BEGIN
 219  162  1  3                FullIntensityGraphics[05] :=  1;       {Color Index of Template}
 220  163  1  3                FullIntensityGraphics[06] :=  Red;
 221  164  1  3                FullIntensityGraphics[07] :=  Green;
 222  165  1  3                FullIntensityGraphics[08] :=  Blue;
 223  166  1  3                HalfIntensityGraphics[05] :=  1;       {Color Index of Template}
 224  167  1  3              END;
 226  168  1  2          2:  BEGIN
 226  169  1  3                FullIntensityGraphics[09] :=  2;       {Color Index of Buffer}
 227  170  1  3                FullIntensityGraphics[10] :=  Red;
 228  171  1  3                FullIntensityGraphics[11] :=  Green;
 229  172  1  3                FullIntensityGraphics[12] :=  Blue;
 230  173  1  3                HalfIntensityGraphics[09] :=  2;       {Color Index of Buffer}
 231  174  1  3              END;
```

```
        3:  BEGIN
              FullIntensityGraphics[13] :=  3;        {Color Index of Output}
              FullIntensityGraphics[14] :=  Red;
              FullIntensityGraphics[15] :=  Green;
              FullIntensityGraphics[16] :=  Blue;
              HalfIntensityGraphics[13] :=  3;        {Color Index of Output}
            END;
        4:  BEGIN
              CursorColor[1] := 1;                    {Color Index of Cursor}
              CursorColor[2] :=  Red;
              CursorColor[3] :=  Green;
              CursorColor[4] :=  Blue;
            END;
        5:  BEGIN
              MenuColor[1]   :=  1;                   {Color Index of Menu}
              MenuColor[2]   :=  Red;
              MenuColor[3]   :=  Green;
              MenuColor[4]   :=  Blue;
            END;
        OTHERWISE ;
      END;
    END;

{=============================================================================}
{ SetIntensity                This procedure changes the color indicies of    }
{                             all colors on the display to obtain the         }
{                             requested intensity.                            }
{=============================================================================}

PROCEDURE SetIntensity(Intensity:INTEGER);
  VAR
    I, J: INTEGER;
  BEGIN
    FOR I := 0 TO 3 DO
      FOR J := 2 TO 4 DO
        HalfIntensityGraphics [4 * I + J] :=
          (FullIntensityGraphics [4 * I + J]
                + 2 * FullIntensityGraphics [J]) DIV 3;
    LLCLMP (c3, c4, CursorColor);                      {$Set-Surface-Color-Map}
    LLCLMP (c1, c4, MenuColor);                        {$Set-Surface-Color-Map}
    IF Intensity = 2
      THEN LLCLMP (c2, c16, FullIntensityGraphics)     {$Set-Surface-Color-Map}
      ELSE LLCLMP (c2, c16, HalfIntensityGraphics);    {$Set-Surface-Color-Map}
  END;

{=============================================================================}
{ SelectColorMap              This procedure selects one of the ten color     }
{                             maps available on the prototype.                }
{=============================================================================}

PROCEDURE SelectColorMap (MapNumber, Intensity : INTEGER);
  VAR
    I, J: INTEGER;
  BEGIN
```

```
270  229  1  1   CASE MapNumber OF
271  230  1  2     1: BEGIN
271  231  1  3          SetColor(0, 50, 50,100);       {Background}
272  232  1  3          SetColor(1,  0,  0,100);       {Untagged Vectors}
273  233  1  3          SetColor(2,100,  0,100);       {Selected Vectors}
274  234  1  3          SetColor(3,100,100,100);       {Written Vectors}
275  235  1  3          SetColor(4,100,  0,  0);       {Cursor}
276  236  1  3          SetColor(5,  0,  0,  0);       {Menu}
277  237  1  3        END;
279  238  1  2     2: BEGIN
279  239  1  3          SetColor(0, 80, 30, 10);       {Background}
280  240  1  3          SetColor(1,  0,  0,  0);       {Untagged Vectors}
281  241  1  3          SetColor(2,  0,100,  0);       {Selected Vectors}
282  242  1  3          SetColor(3,100,100,100);       {Written Vectors}
283  243  1  3          SetColor(4,100,100,  0);       {Cursor}
284  244  1  3          SetColor(5,  0,  0,  0);       {Menu}
285  245  1  3        END;
287  246  1  2     3: BEGIN
287  247  1  3          SetColor(0, 25, 25, 50);       {Background}
288  248  1  3          SetColor(1,100,100, 20);       {Untagged Vectors}
289  249  1  3          SetColor(2, 10,100,100);       {Selected Vectors}
290  250  1  3          SetColor(3, 85, 85, 85);       {Written Vectors}
291  251  1  3          SetColor(4,100,  0,  0);       {Cursor}
292  252  1  3          SetColor(5, 85, 85, 85);       {Menu}
293  253  1  3        END;
295  254  1  2     4: BEGIN
295  255  1  3          SetColor(0, 50, 30, 10);       {Background}
296  256  1  3          SetColor(1,100,100, 20);       {Untagged Vectors}
297  257  1  3          SetColor(2, 10,100,100);       {Selected Vectors}
298  258  1  3          SetColor(3, 85, 85, 85);       {Written Vectors}
299  259  1  3          SetColor(4,100,100,  0);       {Cursor}
300  260  1  3          SetColor(5, 85, 85, 85);       {Menu}
301  261  1  3        END;
303  262  1  2     5: BEGIN
303  263  1  3          SetColor(0, 25, 25, 50);       {Background}
304  264  1  3          SetColor(1,100,100, 20);       {Untagged Vectors}
305  265  1  3          SetColor(2, 10,100,100);       {Selected Vectors}
306  266  1  3          SetColor(3, 85, 85, 85);       {Written Vectors}
307  267  1  3          SetColor(4,100,  0,  0);       {Cursor}
308  268  1  3          SetColor(5,100,100, 20);       {Menu}
309  269  1  3        END;
311  270  1  2     6: BEGIN
311  271  1  3          SetColor(0, 50, 30, 10);       {Background}
312  272  1  3          SetColor(1,100,100, 20);       {Untagged Vectors}
313  273  1  3          SetColor(2, 10,100,100);       {Selected Vectors}
314  274  1  3          SetColor(3, 85, 85, 85);       {Written Vectors}
315  275  1  3          SetColor(4,100,100,  0);       {Cursor}
316  276  1  3          SetColor(5,100,100, 20);       {Menu}
317  277  1  3        END;
319  278  1  2     7: BEGIN
319  279  1  3          SetColor(0, 25, 25, 50);       {Background}
320  280  1  3          SetColor(1,100,100, 20);       {Untagged Vectors}
321  281  1  3          SetColor(2,100,100,100);       {Selected Vectors}
322  282  1  3          SetColor(3, 10,100,100);       {Written Vectors}
```

```
323  283  1  3            SetColor(4,100,  0,  0);          {Cursor}
324  284  1  3            SetColor(5, 85, 85, 85);          {Menu}
325  285  1  3          END;
327  286  1  2       8: BEGIN
327  287  1  3            SetColor(0, 50, 30, 10);          {Background}
328  288  1  3            SetColor(1,100,100, 20);          {Untagged Vectors}
329  289  1  3            SetColor(2,100,100,100);          {Selected Vectors}
330  290  1  3            SetColor(3, 10,100,100);          {Written Vectors}
331  291  1  3            SetColor(4,100,100,  0);          {Cursor}
332  292  1  3            SetColor(5, 85, 85, 85);          {Menu}
333  293  1  3          END;
335  294  1  2       9: BEGIN
335  295  1  3            SetColor(0, 10, 10, 10);          {Background}
336  296  1  3            SetColor(1,100,100, 20);          {Untagged Vectors}
337  297  1  3            SetColor(2,100,  0,  0);          {Selected Vectors}
338  298  1  3            SetColor(3, 85, 85, 85);          {Written Vectors}
339  299  1  3            SetColor(4,100,  0,  0);          {Cursor}
340  300  1  3            SetColor(5, 85, 85, 55);          {Menu}
341  301  1  3          END;
343  302  1  2      10: BEGIN
343  303  1  3            SetColor(0, 25, 25, 50);          {Background}
344  304  1  3            SetColor(1,100,100, 20);          {Untagged Vectors}
345  305  1  3            SetColor(2, 10,100,100);          {Selected Vectors}
346  306  1  3            SetColor(3, 85, 85, 85);          {Written Vectors}
347  307  1  3            SetColor(4,100,100,  0);          {Cursor}
348  308  1  3            SetColor(5, 85, 85, 55);          {Menu}
349  309  1  3          END;
351  310  1  2       OTHERWISE ;
353  311  1  2     END {CASE} ;
355  312  1  1     LLWait (HalfSecond);                   {Avoid Stylus Bounce}
356  313  1  1     SetIntensity(Intensity);
357  314  1  1   END;
358  316  0  0 {=======================================================================}
               { SetDrawingWindow           This procedure initializes the transform   }
               {                            variables based upon the specified window.  }
               {=======================================================================}

               PROCEDURE SetDrawingWindow (x1,Y1, X2,Y2:INTEGER);
359  322  1  0   VAR
                    xScaleMinimum, yScaleMinimum, DeltaScale: INTEGER;
360  324  1  0   BEGIN
360  325  1  1     IF X2 > x1
                      THEN
361  327  1  1          BEGIN
361  328  1  2            xWindowLow := x1;
362  329  1  2            xWindowHigh := X2;
363  330  1  2          END
364  331  1  1        ELSE
365  332  1  1          BEGIN
365  333  1  2            xWindowLow := X2;
366  334  1  2            xWindowHigh := x1;
367  335  1  2          END;
369  336  1  1     IF Y2 > Y1
                      THEN
```

```
370  338  1  1            BEGIN
370  339  1  2              yWindowLow := Y1;
371  340  1  2              yWindowHigh := Y2;
372  341  1  2            END
373  342  1  1          ELSE
374  343  1  1            BEGIN
374  344  1  2              yWindowLow := Y2;
375  345  1  2              yWindowHigh := Y1;
376  346  1  2            END;
378  347  1  1        GetTileStructureParameters(xDrawingLow,yDrawingLow,xDrawingHigh,yDrawingHigh,TileSize);
379  348  1  1        IF   (LORD(LORD(X2) - LORD(X1)) > LORD(MAXINT))
                          OR (LORD(LORD(Y2) - LORD(Y1)) > LORD(MAXINT))
                          OR (LORD(LORD(X2) - LORD(X1)) < LORD(-MAXINT))
                          OR (LORD(LORD(Y2) - LORD(Y1)) < LORD(-MAXINT))
                          THEN
380  353  1  1            BEGIN
380  354  1  2              X1 := xDrawingLow;
381  355  1  2              X2 := xDrawingHigh;
382  356  1  2              Y1 := yDrawingLow;
383  357  1  2              Y2 := yDrawingHigh;
384  358  1  2            END;
386  359  1  1        IF yWindowLow < yDrawingLow
                          THEN
387  361  1  1            BEGIN
387  362  1  2              yWindowHigh := yDrawingLow + ABS(yWindowHigh - yWindowLow);
388  363  1  2              yWindowLow := yDrawingLow;
389  364  1  2            END;
391  365  1  1        IF xWindowLow < xDrawingLow
                          THEN
392  367  1  1            BEGIN
392  368  1  2              xWindowHigh := xDrawingLow + ABS(xWindowHigh - xWindowLow);
393  369  1  2              xWindowLow := xDrawingLow;
394  370  1  2            END;
396  371  1  1        IF yWindowHigh > yDrawingHigh
                          THEN
397  373  1  1            BEGIN
397  374  1  2              yWindowLow := yDrawingHigh - ABS(yWindowHigh - yWindowLow);
398  375  1  2              yWindowHigh := yDrawingHigh;
399  376  1  2            END;
401  377  1  1        IF xWindowHigh > xDrawingHigh
                          THEN
402  379  1  1            BEGIN
403  380  1  2              xWindowLow := xDrawingHigh - ABS(xWindowHigh - xWindowLow);
403  381  1  2              xWindowHigh := xDrawingHigh;
404  382  1  2            END;
406  383  1  1        xScale := xWindowHigh - xWindowLow;
407  384  1  1        yScale := yWindowHigh - yWindowLow;
408  385  1  1        xScaleMinimum := yScale * 4 DIV 3;
409  386  1  1        yScaleMinimum := xScale * 3 DIV 4;
410  387  1  1        IF xScaleMinimum > xScale
                          THEN
411  389  1  1            BEGIN
411  390  1  2              DeltaScale := (xScaleMinimum - xScale) DIV 2;
412  391  1  2              xScale := xScaleMinimum;
```

```
        xWindowLow := xWindowLow - DeltaScale;
        xWindowHigh := xWindowHigh + DeltaScale;
      END
    ELSE IF yScaleMinimum > yScale
      THEN
        BEGIN
          DeltaScale := (yScaleMinimum - yScale) DIV 2;
          yScale := yScaleMinimum;
          yWindowLow := yWindowLow - DeltaScale;
          yWindowHigh := yWindowHigh + DeltaScale;
        END;
  IF xWindowHigh < xLow
    THEN
      BEGIN
        IF xLow < xHigh
          THEN
            BEGIN
              xWindowHigh := xLow;
              xWindowLow := xWindowHigh - xScale;
            END;
      END
    ELSE IF xWindowLow > xHigh
      THEN
        BEGIN
          xWindowLow := xHigh;
          xWindowHigh := xWindowLow + xScale;
        END;
  IF yWindowHigh < yLow
    THEN
      BEGIN
        IF yLow < yHigh
          THEN
            BEGIN
              yWindowHigh := yLow;
              yWindowLow := yWindowHigh - yScale;
            END;
      END
    ELSE IF yWindowLow > yHigh
      THEN
        BEGIN
          yWindowLow := yHigh;
          yWindowHigh := yWindowLow + yScale;
        END;
  SetPixelWindow(xWindowLow,yWindowLow,xWindowHigh,yWindowHigh);
END;

{=============================================================================}
{ InquireDrawingWindow             This procedure returns the current drawing  }
{                                  window to the caller.                       }
{=============================================================================}

PROCEDURE InquireDrawingWindow(VAR x1,Y1,X2,Y2:INTEGER);
  BEGIN
    x1 := xWindowLow;
```

```
454  446  1  1          Y1 := yWindowLow;
455  447  1  1          X2 := xWindowHigh;
456  448  1  1          Y2 := yWindowHigh;
457  449  1  1        END;

458  451  0  0     {==============================================================================}
                   { SetWindowLimits                  This procedure sets the window limits for     }
                   {                                  subsequent zoom and pan requests.             }
                   {==============================================================================}

                   PROCEDURE SetWindowLimits(x1,y1, x2,y2 : INTEGER);
459  457  1  0       BEGIN
459- 458  1  1         IF x1 < x2
                         THEN
460  460  1  1            BEGIN
460  461  1  2              xLow := x1;
461  462  1  2              xHigh := x2;
462  463  1  2            END
463  464  1  1          ELSE
464  465  1  1            BEGIN
464  466  1  2              xLow := x2;
465  467  1  2              xHigh := x1;
466  468  1  2            END;
468  469  1  1         IF y1 < y2
                         THEN
469  471  1  1            BEGIN
469  472  1  2              yLow := y1;
470  473  1  2              yHigh := y2;
471  474  1  2            END
472  475  1  1          ELSE
473  476  1  1            BEGIN
473  477  1  2              yLow := y2;
474  478  1  2              yHigh := y1;
475  479  1  2            END;
477  480  1  1         SetDrawingWindow (xLow,yLow, xHigh,yHigh);
478  481  1  1       END;

479  483  0  0     {==========================================================================}
                   { PixelToDrawingCoordinates     This procedure converts coordinates from     }
                   {                               pixel units to drawing units.                }
                   {==========================================================================}

                   PROCEDURE PixelToDrawingCoordinates (     xPixel,yPixel : INTEGER;
479  489  1  0                                          VAR xDrawing,yDrawing : INTEGER);

480  491  1  0       BEGIN { PixelToDrawingCoordinates }
480  492  1  1         xDrawing := (xPixel * xScale DIV xNumberOfDisplayPixels) + xWindowLow;
481  493  1  1         yDrawing := (yPixel * yScale DIV yNumberOfDisplayPixels) + yWindowLow;
482  494  1  1       END   { PixelToDrawingCoordinates };


483  497  0  0     {==========================================================================}
                   { PixelToDrawingSize             This function converts a distance from pixel }
                   {                                units to drawing units.                      }
                   {==========================================================================}
```

```
                     FUNCTION PixelToDrawingSize (PixelSize : INTEGER) : INTEGER;
484  503  1  0         BEGIN
484  504  1  1           PixelToDrawingSize := (PixelSize * xScale DIV xNumberOfDisplayPixels);
485  505  1  1         END;
486  506  0  0       .

793 Lines Read.
  0 Errors Detected.
64% Utilization of Memory.

4110 CP/M UDI2.1      8086/8087/8088 MACRO ASSEMBLER V1.1 ASSEMBLY OF MODULE MASKDEFINITIONS
NO OBJECT MODULE REQUESTED
ASSEMBLER INVOKED BY:  D:ASM86 A:MASKDEFS.ASM NOOJ EP PW(132) PR(D:MASKDEFS.LST[G9])

LOC  OBJ                LINE     SOURCE

                          1               NAME    MaskDefinitions
                          2
 0000                     3      Hidden               EQU 0*16
 0010                     4      Untagged             EQU 1*16
 0020                     5      Selected             EQU 2*16
 0030                     6      Written              EQU 3*16
 0040                     7      Sel_Writ             EQU 4*16
 0050                     8      Primitive            EQU 5*16
 0060                     9      Reserved6            EQU 6*16
 0070                    10      Reserved7            EQU 7*16
                         11
 0000                    12      Traversable          EQU 0
 0001                    13      TraversableIFFDupOut EQU 1
 0002                    14      NotTraversable       EQU 2
 0003                    15      Reserved3            EQU 3
                         16
----                     17      MaskDefinitions SEGMENT BYTE PUBLIC
                         18
                         19        PUBLIC ClearSelectedStructureMask
                         20        PUBLIC CorrectModeMask
                         21        PUBLIC HideModeMask
                         22        PUBLIC RecoverHiddenStructureMask
                         23        PUBLIC SelectModeMask
                         24        PUBLIC WriteSelectedStructureMask
                         25        PUBLIC TraverseHiddenMask
                         26        PUBLIC TraversePrimitiveMask
                         27        PUBLIC TraverseReserved6Mask
                         28        PUBLIC TraverseReserved7Mask
                         29        PUBLIC TraverseSelectedMask
                         30        PUBLIC TraverseSelectedWrittenMask
                         31        PUBLIC TraverseUntaggedMask
                         32        PUBLIC TraverseWrittenMask
                         33
0000 02                  34        ClearSelectedStructureMask DB Hidden    + NotTraversable; { Hidden }
0001 12                  35                                   DB Untagged  + NotTraversable; { Untagged }
0002 10                  36                                   DB Untagged  +    Traversable; { Selected }
```

```
0003 32                      DB Written   + NotTraversable; { Written }
0004 30                      DB Written   +    Traversable; { Sel+Writ }
0005 52                      DB Primitive + NotTraversable; { Primitive }
0006 62                      DB Reserved6 + NotTraversable; { Reserved6 }
0007 72                      DB Reserved7 + NotTraversable; { Reserved7 }

0008 02      CorrectModeMask DB Hidden    + NotTraversable;           { Hidden }
0009 12                      DB Untagged  + NotTraversable;           { Untagged }
000A 10                      DB Untagged  +    Traversable;           { Selected }
000B 31                      DB Written   +    TraversableIFFDupOut;  { Written }
000C 30                      DB Written   +    Traversable;           { Sel+Writ }
000D 52                      DB Primitive + NotTraversable;           { Primitive }
000E 62                      DB Reserved6 + NotTraversable;           { Reserved6 }
000F 72                      DB Reserved7 + NotTraversable;           { Reserved7 }

0010 02      HideModeMask DB Hidden    + NotTraversable; { Hidden }
0011 00                   DB Hidden    +    Traversable; { Untagged }
0012 22                   DB Selected  + NotTraversable; { Selected }
0013 32                   DB Written   + NotTraversable; { Written }
0014 42                   DB Sel_Writ  + NotTraversable; { Sel+Writ }
0015 52                   DB Primitive + NotTraversable; { Primitive }
0016 62                   DB Reserved6 + NotTraversable; { Reserved6 }
0017 72                   DB Reserved7 + NotTraversable; { Reserved7 }

0018 10      RecoverHiddenStructureMask DB Untagged  +    Traversable; { Hidden }
0019 12                                 DB Untagged  + NotTraversable; { Untagged }
001A 22                                 DB Selected  + NotTraversable; { Selected }
001B 32                                 DB Written   + NotTraversable; { Written }
001C 42                                 DB Sel_Writ  + NotTraversable; { Sel+Writ }
001D 52                                 DB Primitive + NotTraversable; { Primitive }
001E 62                                 DB Reserved6 + NotTraversable; { Reserved6 }
001F 72                                 DB Reserved7 + NotTraversable; { Reserved7 }

0020 02      SelectModeMask DB Hidden    + NotTraversable;        { Hidden }
0021 20                     DB Selected  +    Traversable;        { Untagged }
0022 21                     DB Selected  + TraversableIFFDupOut;  { Selected }
0023 41                     DB Sel_Writ  + TraversableIFFDupOut;  { Written }
0024 41                     DB Sel_Writ  + TraversableIFFDupOut;  { Sel+Writ }
0025 52                     DB Primitive + NotTraversable;        { Primitive }
0026 62                     DB Reserved6 + NotTraversable;        { Reserved6 }
0027 72                     DB Reserved7 + NotTraversable;        { Reserved7 }

0028 02      WriteSelectedStructureMask DB Hidden    + NotTraversable; { Hidden }
0029 12                                 DB Untagged  + NotTraversable; { Untagged }
002A 30                                 DB Written   +    Traversable; { Selected }
002B 32                                 DB Written   + NotTraversable; { Written }
002C 30                                 DB Written   +    Traversable; { Sel+Writ }
002D 52                                 DB Primitive + NotTraversable; { Primitive }
002E 62                                 DB Reserved6 + NotTraversable; { Reserved6 }
002F 72                                 DB Reserved7 + NotTraversable; { Reserved7 }

0030 02      TraverseSelectedMask DB Hidden    + NotTraversable; { Hidden }
0031 12                           DB Untagged  + NotTraversable; { Untagged }
0032 20                           DB Selected  +    Traversable; { Selected }
```

```
0033 32                                DB Written    + NotTraversable; { Written }
0034 42                                DB Sel_Writ   + NotTraversable; { Sel+Writ }
0035 52                                DB Primitive  + NotTraversable; { Primitive }
0036 62                                DB Reserved6  + NotTraversable; { Reserved6 }
0037 72                                DB Reserved7  + NotTraversable; { Reserved7 }

0038 00            TraverseHiddenMask  DB Hidden     +    Traversable; { Hidden }
0039 12                                DB Untagged   + NotTraversable; { Untagged }
003A 22                                DB Selected   + NotTraversable; { Selected }
003B 32                                DB Written    + NotTraversable; { Written }
003C 42                                DB Sel_Writ   + NotTraversable; { Sel+Writ }
003D 52                                DB Primitive  + NotTraversable; { Primitive }
003E 62                                DB Reserved6  + NotTraversable; { Reserved6 }
003F 72                                DB Reserved7  + NotTraversable; { Reserved7 }

0040 02            TraversePrimitiveMask DB Hidden     + NotTraversable; { Hidden }
0041 12                                  DB Untagged   + NotTraversable; { Untagged }
0042 22                                  DB Selected   + NotTraversable; { Selected }
0043 32                                  DB Written    + NotTraversable; { Written }
0044 42                                  DB Sel_Writ   + NotTraversable; { Sel+Writ }
0045 50                                  DB Primitive  +    Traversable; { Primitive }
0046 62                                  DB Reserved6  + NotTraversable; { Reserved6 }
0047 72                                  DB Reserved7  + NotTraversable; { Reserved7 }

0048 02            TraverseReserved6Mask DB Hidden     + NotTraversable; { Hidden }
0049 12                                  DB Untagged   + NotTraversable; { Untagged }
004A 22                                  DB Selected   + NotTraversable; { Selected }
004B 32                                  DB Written    + NotTraversable; { Written }
004C 42                                  DB Sel_Writ   + NotTraversable; { Sel+Writ }
004D 52                                  DB Primitive  + NotTraversable; { Primitive }
004E 60                                  DB Reserved6  +    Traversable; { Reserved6 }
004F 72                                  DB Reserved7  + NotTraversable; { Reserved7 }

0050 02            TraverseReserved7Mask DB Hidden     + NotTraversable; { Hidden }
0051 12                                  DB Untagged   + NotTraversable; { Untagged }
0052 22                                  DB Selected   + NotTraversable; { Selected }
0053 32                                  DB Written    + NotTraversable; { Written }
0054 42                                  DB Sel_Writ   + NotTraversable; { Sel+Writ }
0055 52                                  DB Primitive  + NotTraversable; { Primitive }
0056 60                                  DB Reserved6  +    Traversable; { Reserved6 }
0057 72                                  DB Reserved7  + NotTraversable; { Reserved7 }

0058 02            TraverseSelectedWrittenMask DB Hidden     + NotTraversable; { Hidden }
0059 12                                        DB Untagged   + NotTraversable; { Untagged }
005A 22                                        DB Selected   + NotTraversable; { Selected }
005B 32                                        DB Written    + NotTraversable; { Written }
005C 40                                        DB Sel_Writ   +    Traversable; { Sel+Writ }
005D 52                                        DB Primitive  + NotTraversable; { Primitive }
005E 62                                        DB Reserved6  + NotTraversable; { Reserved6 }
005F 72                                        DB Reserved7  + NotTraversable; { Reserved7 }

0060 02            TraverseUntaggedMask DB Hidden     + NotTraversable; { Hidden }
0061 10                                 DB Untagged   +    Traversable; { Untagged }
0062 22                                 DB Selected   + NotTraversable; { Selected }
0063 32                                 DB Written    + NotTraversable; { Written }
```

```
0064 42            146                  DB Sel_Writ   + NotTraversable; { Sel+Writ }
0065 52            147                  DB Primitive  + NotTraversable; { Primitive }
0066 62            148                  DB Reserved6  + NotTraversable; { Reserved6 }
0067 72            149                  DB Reserved7  + NotTraversable; { Reserved7 }
                   150
0068 02            151   TraverseWrittenMask DB Hidden     + NotTraversable; { Hidden }
0069 12            152                  DB Untagged   + NotTraversable; { Untagged }
006A 22            153                  DB Selected   + NotTraversable; { Selected }
006B 30            154                  DB Written    +    Traversable; { Written }
006C 42            155                  DB Sel_Writ   + NotTraversable; { Sel+Writ }
006D 52            156                  DB Primitive  + NotTraversable; { Primitive }
006E 62            157                  DB Reserved6  + NotTraversable; { Reserved6 }
006F 72            158                  DB Reserved7  + NotTraversable; { Reserved7 }
                   159
----               160  MaskDefinitions ENDS
                   161
                   162  END

ASSEMBLY COMPLETE, NO ERRORS FOUND

Source File: A:MENU.PAS
Object File: <none>
Controls Specified:  ERRORPRINT, NOOBJECT, PRINT(D:MENU.LST[G9]), SUBTITLE(          PUBLIC DECLARATIONS), TITLE(
              MENU PROCEDURES).

STMT LINE NESTING       SOURCE TEXT: A:MENU.PAS
  1    3  0  0
                        MODULE Menu;
  2    5  0  0


                        $INCLUDE(Menu.Ext);
               =1       PUBLIC Menu;
               =1
  3    3  0  0 =1       CONST
               =1         NumberOfRows = 18                    {Number of rows of menu positions} ;
  4    5  0  0 =1         NumberOfColumns = 6                  {Number of columns of menu positions} ;
  5    6  0  0 =1         NumberOfMenuPositions = 108          {Total Number of Menu Positions} ;
  6    7  0  0 =1         PixelTotalWidth = 218                {Total width of each menu position} ;
  7    8  0  0 =1         PixelTotalHeight = 49                {Total height of each menu position} ;
  8    9  0  0 =1         PixelBoxWidth = 189                  {Width of each menu box} ;
  9   10  0  0 =1         PixelBoxHeight = 35                  {Height of each menu box} ;
 10   11  0  0 =1         PixelHorizontalOrigin = 0            {X origin for first menu box} ;
 11   12  0  0 =1         PixelVerticalOrigin = 78             {Y origin for first menu box} ;
 12   13  0  0 =1         TextHorizontalOffset = 8             {X offset for text} ;
 13   14  0  0 =1         TextVerticalOffset = 6               {Y offset for text} ;
 14   15  0  0 =1         MenuTextPrecision = 2                {Stroke Precision} ;
 15   16  0  0 =1         AlphaHeightBelowCharacter = 6        {Height below each character in pixels} ;
 16   17  0  0 =1         AlphaHeightAboveCharacter = 4        {Height above each character in pixels} ;
 17   18  0  0 =1         AlphaTextHeight = 28                 {Total Height of each character in pixels} ;
 18   19  0  0 =1         AlphaSpaceBetweenCharacters = 2      {Space between characters in pixels} ;
 19   20  0  0 =1         AlphaTextWidth = 16                  {Total Width of each character in pixels} ;
 20   21  0  0 =1         GraphicHeightBelowCharacter = 3      {Height below each character in pixels} ;
 21   22  0  0 =1         GraphicHeightAboveCharacter = 2      {Height above each character in pixels} ;
```

```
23  0  0 =1    GraphicTextHeight = 14          {Total Height of each character in pixels} ;
24  0  0 =1    GraphicSpaceBetweenCharacters = 2 {Space between characters in pixels} ;
25  0  0 =1    GraphicTextWidth = 9            {Total Width of each character in pixels} ;
 9  0  0     PROCEDURE InitializeMenu;
10  0  0     PROCEDURE LabelMenuItem(N:INTEGER;VAR Line1,Line2:CHAR);
11  0  0     PROCEDURE EraseMenuItem(N:INTEGER);
12  0  0     PROCEDURE HilightMenuItem(N:INTEGER);
13  0  0     FUNCTION PickMenuItem(X,Y:INTEGER):INTEGER;

15  0  0     $INCLUDE (LTI.EXT);
         =1  PUBLIC LTI;
         =1
 3  0  0 =1  PROCEDURE LLBPXL (VAR Surface,ALU,Bits : INTEGER);   {Begin-Pixel-Operations}
 4  0  0 =1  PROCEDURE LLCLMD (VAR Mode,Overlay,Grey : INTEGER);  {Set-Color-Mode}
 5  0  0 =1  PROCEDURE LLCLMP (VAR Surface,Len : INTEGER;VAR Map : BYTES): {Set-Surface-Color-Map}
 6  0  0 =1  PROCEDURE LLDAEN (VAR Enabled : INTEGER);           {Enable-Dialogue-Area}
 7  0  0 =1  PROCEDURE LLDALN (VAR Lines : INTEGER);             {Set-Dialogue-Area-Lines}
 8  0  0 =1  PROCEDURE LLDASF (VAR Surface : INTEGER);           {Set-Dialogue-Area-Surface}
 9  0  0 =1  PROCEDURE LLDAVS (VAR Vis : INTEGER);               {Set-Dialogue-Area-Visibility}
10  0  0 =1  PROCEDURE LLDAXY (VAR X,Y : INTEGER);               {Set-Dialogue-Area-Position}
11  0  0 =1  PROCEDURE LLDLSG (VAR Seg : INTEGER);               {Delete-Segment}
12  0  0 =1  PROCEDURE LLDLVW (VAR View : INTEGER);              {Delete-View}
13  0  0 =1  PROCEDURE LLGPRC (VAR Precision: INTEGER);          {Set-Graphtext-Precision}
14  0  0 =1  PROCEDURE LLGSIZ (VAR Width,Height,Spacing:INTEGER); {Set-Graphtext-Size}
15  0  0 =1  PROCEDURE LLINIT (VAR TerminalType : INTEGER);      {LTI-Initialization}
16  0  0 =1  PROCEDURE LLLNIN (VAR Index: INTEGER);              {Set-Line-Index}
17  0  0 =1  PROCEDURE LLMOVE (VAR X,Y: INTEGER);                {Move}
18  0  0 =1  PROCEDURE LLRCFL (VAR X1,Y1,X2,Y2,Pen : INTEGER);   {Rectangle-Fill}
19  0  0 =1  PROCEDURE LLSYNC;                                   {Synchronize Firmware}
20  0  0 =1  PROCEDURE LLTEXT (VAR Count:INTEGER;VAR Str:BYTES;Dummy:INTEGER); {Graphic-Text}
21  0  0 =1  PROCEDURE LLVISF (VAR Count : INTEGER;VAR Vis : BYTES); {Set-Surface-Visibility}
22  0  0 =1  PROCEDURE LLVKLK (VAR Lockmode : INTEGER);          {Lock-Viewing-Keys}
23  0  0 =1  PROCEDURE LLVWAT (VAR Surface,Wipe,Border:INTEGER); {Set-View-Attributes}
24  0  0 =1  PROCEDURE LLVWPT (VAR X1,Y1,X2,Y2 : INTEGER);       {Set-Viewport}
25  0  0 =1  PROCEDURE LLWAIT (VAR TimerInterval : INTEGER);     {Pause for interval}
26  0  0 =1  PROCEDURE LLWIND (VAR X1,Y1,X2,Y2 : INTEGER);       {Set-Window}

17  0  0     PUBLIC PixelMD;
18  0  0     PROCEDURE PixelMove(X,Y:INTEGER);
19  0  0     PROCEDURE PixelDraw(X,Y:INTEGER);

21  0  0     PRIVATE Menu;

23  0  0     VAR
               c0, c1, c2, c7, c11, c18, c22, c29, c35, c64: INTEGER;
25  0  0       CurrentHilightedMenuItem: INTEGER;
26  0  0       NotImplementedMessageIssued: BOOLEAN;
27  0  0     $subtitle('              Menu PROCEDUREs')

             {=====================================================================}
             { InitializeMenu                This procedure initializes the private   }
             {                               variables declared in this module.       }
             {=====================================================================}
```

```
PROCEDURE InitializeMenu;
  BEGIN
    CurrentHilightedMenuItem := 0;
    NotImplementedMessageIssued := FALSE;
    c0 := 0; c1 := 1; c2 := 2; c7 := 7; c11 := 11; c18 := 18; c22 := 22;
    c29 := 29; c35 := 35; c64 := 64;
  END;

{===========================================================================}
{ DrawMenuBox                  This procedure draws a box specified by the }
{                              minimum and maximum X and Y coordinates.    }
{===========================================================================}

PROCEDURE DrawMenuBox(Xmin,Xmax,Ymin,Ymax:INTEGER);
  BEGIN
    PixelMove(Xmin,Ymin);
    PixelDraw(Xmin,Ymax);
    PixelDraw(Xmax,Ymax);
    PixelDraw(Xmax,Ymin);
    PixelDraw(Xmin,Ymin);
  END;

{===========================================================================}
{ WriteMenuText                This procedure writes the specified text in }
{                              the specified position.                     }
{===========================================================================}

PROCEDURE WriteMenuText(X,Y:INTEGER;VAR String:CHAR);
  BEGIN
    LLMOVE(X,Y);
    LLTEXT(c18,String,18);                {$Graphic-Text}
  END;

{===========================================================================}
{ LabelMenuItem                This procedure writes the text and draws the }
{                              box corresponding to the specified menu item.}
{===========================================================================}

PROCEDURE LabelMenuItem(N:INTEGER:VAR Line1.Line2:CHAR);
  VAR
    Column, Row, Xmin, Ymin, Xtext, VARwidth, VARheight, VARspacing, VARprecision: INTEGER;
  BEGIN
    VARwidth := GraphicTextWidth - GraphicSpaceBetweenCharacters;
    VARheight := GraphicTextHeight
           - GraphicHeightBelowCharacter - GraphicHeightAboveCharacter;
    VARspacing := GraphicSpaceBetweenCharacters;
    VARprecision := MenuTextPrecision;
    LLGSIZ(VARwidth,VARheight,VARspacing);
    LLGPRC(VARprecision);
    Column := (N - 1) DIV NumberOfRows;
    Row := (N - 1) - (Column * NumberOfRows);
    Xmin := Column * PixelTotalWidth + PixelHorizontalOrigin;
    Ymin := Row * PixelTotalHeight + PixelVerticalOrigin;
    Xtext := Xmin + TextHorizontalOffset;
```

```
100   88  1  1        DrawMenuBox(Xmin,Xmin+PixelBoxWidth,Ymin,Ymin+PixelBoxHeight);
101   89  1  1        WriteMenuText(Xtext,Ymin+TextVerticalOffset+GraphicTextHeight,Line1);
102   90  1  1        WriteMenuText(Xtext,Ymin+TextVerticalOffset,Line2);
103   91  1  1      END;

104   93  0  0    {==========================================================================}
                  { EraseMenuItem                    This procedure erases the text and box   }
                  {                                  corresponding to a menu item.            }
                  {                                  to invert the video in a menu box.       }
                  {==========================================================================}

                  PROCEDURE EraseMenuItem(N:INTEGER);
105  100  1  0      VAR
                      Column, Row, Xmin, Xmax, Ymin, Ymax: INTEGER;
106  102  1  0      BEGIN
106  103  1  1        Column := (N - 1) DIV NumberOfRows;
107  104  1  1        Row := (N - 1) - (Column * NumberOfRows);
108  105  1  1        Xmin := Column * PixelTotalWidth + PixelHorizontalOrigin;
109  106  1  1        Xmax := Xmin + PixelBoxWidth;
110  107  1  1        Ymin := Row * PixelTotalHeight + PixelVerticalOrigin;
111  108  1  1        Ymax := Ymin + PixelBoxHeight;
112  109  1  1        LLBPXL(c1,c11,c0);                  {$Begin-Pixel-Operations}
113  110  1  1        LLRCFL(Xmin,Ymin,Xmax,Ymax,c0);     {$Rectangle-Fill}
114  111  1  1      END;

115  113  0  0    {==========================================================================}
                  { XORmenuItem                      This procedure uses the XOR pixel operation }
                  {                                  to invert the video in a menu box.       }
                  {==========================================================================}

                  PROCEDURE XORmenuItem(N:INTEGER);
116  119  1  0      VAR
                      Column, Row, Xmin, Xmax, Ymin, Ymax: INTEGER;
117  121  1  0      BEGIN
117  122  1  1        Column := (N - 1) DIV NumberOfRows;
118  123  1  1        Row := (N - 1) - (Column * NumberOfRows);
119  124  1  1        Xmin := Column * PixelTotalWidth + PixelHorizontalOrigin + 1;
120  125  1  1        Xmax := Xmin + PixelBoxWidth - 2;
121  126  1  1        Ymin := Row * PixelTotalHeight + PixelVerticalOrigin + 1;
122  127  1  1        Ymax := Ymin + PixelBoxHeight - 2;
123  128  1  1        LLBPXL(c1,c7,c0);                   {$Begin-Pixel-Operations}
124  129  1  1        LLRCFL(Xmin,Ymin,Xmax,Ymax,c1);     {$Rectangle-Fill}
125  130  1  1      END;

126  132  0  0    {==========================================================================}
                  { HilightMenuItem                  This procedure turns off the reverse video  }
                  {                                  in the previous menu item and turns on the  }
                  {                                  reverse video on the current menu item.     }
                  {==========================================================================}
```

```
STMT LINE NESTING       SOURCE TEXT: A:MENU.PAS
                        PROCEDURE HilightMenuItem(N:INTEGER);
 127  139  1  0           BEGIN
 127  140  1  1             IF N <> CurrentHilightedMenuItem
                              THEN
 128  142  1  1                 BEGIN
 128  143  1  2                   IF CurrentHilightedMenuItem <> 0
                                    THEN XORmenuItem(CurrentHilightedMenuItem);
 130  145  1  2                   CurrentHilightedMenuItem := N;
 131  146  1  2                   IF CurrentHilightedMenuItem <> 0
                                    THEN XORmenuItem(CurrentHilightedMenuItem);
 133  148  1  2                 END;
 135  149  1  1           END;

 136  151  0  0         {===========================================================================}
                        { PickMenuItem                     This function a value between 0 (nothing    }
                        {                                  picked) and 40 indicating which menu item   }
                        {                                  has been picked.                             }
                        {===========================================================================}

                        FUNCTION PickMenuItem(X,Y:INTEGER):INTEGER;
 137  158  1  0           VAR
                            Row, Column, PickMenuItemValue: INTEGER;
 138  160  1  0           BEGIN
 138  161  1  1             Column := (X - PixelHorizontalOrigin) DIV PixelTotalWidth;
 139  162  1  1             Row := (Y - PixelVerticalOrigin) DIV PixelTotalHeight;
 140  163  1  1             IF (X < PixelHorizontalOrigin)
                            OR (X - Column * PixelTotalWidth > PixelHorizontalOrigin + PixelBoxWidth)
                            OR (Y < PixelVerticalOrigin)
                            OR (Y - Row * PixelTotalHeight > PixelVerticalOrigin + PixelBoxHeight)
                              THEN PickMenuItemValue := 0
 141  168  1  1               ELSE PickMenuItemValue := Row + Column * NumberOfRows + 1;
 143  169  1  1             HilightMenuItem(PickMenuItemValue);
 144  170  1  1             PickMenuItem := PickMenuItemValue;
 145  171  1  1           END;

 146  173  0  0

 224 Lines Read.
   0 Errors Detected.
 47% Utilization of Memory.


Source File: A:NEIGHBOR.PAS
Object File: <none>
Controls Specified:  ERRORPRINT, NOOBJECT, PRINT(D:NEIGHBOR.LST[G9]), TITLE(
               SUBROUTINES TO SEARCH FOR NEIGHBORS).

STMT LINE NESTING       SOURCE TEXT: A:NEIGHBOR.PAS
   1    2  0  0
```

```
                  MODULE Neighbor;

 2    9  0  0     $INCLUDE (TekMan.Ext)
               =1 PUBLIC TekMan;
               =1
 3    3  0  0  =1 CONST
               =1   MaximumLengthOfFileName  =   14;
 4    5  0  0  =1   xMaxDisplayPixel'        = 1279    {tk4115};
 5    6  0  0  =1   xMaxViewportCoordinate   = 4095    {tk4113};
 6    7  0  0  =1   xNumberOfDisplayPixels   = 1280    {tk4115};
 7    8  0  0  =1   yMaxDisplayPixel         =  959    {tk4115};
 8    9  0  0  =1   yMaxViewportCoordinate   = 3071    {tk4113};
 9   10  0  0  =1   yNumberOfDisplayPixels   =  960    {tk4115};
               =1
10   12  0  0  =1 TYPE
               =1   CursorStatusType = (Limbo,
               =1                       WriteMode,
               =1                       LockMode,
               =1                       LockAndWriteMode);
               =1
11 - 18  0  0  =1   CursorActionType = (NoAction,
               =1                       EnterWriteMode,
               =1                       StayInWriteMode,
               =1                       EnterLimbo,
               =1                       EnterLockMode,
               =1                       StayInLockMode,
               =1                       EnterLockAndWriteMode,
               =1                       StayInLockAndWriteMode,
               =1                       ReturnToLockMode,
               =1                       ReturnToWriteMode);
               =1
12   29  0  0  =1   FileName         = PACKED ARRAY [1..MaximumLengthOfFilename] OF CHAR;
               =1
13   31  0  0  =1   GINType          = (ConstrainedGIN,
               =1                       UnconstrainedGIN,
               =1                       MenuSelection);

14   11  0  0     $INCLUDE (Distance.Ext)
               =1 PUBLIC Distance;
               =1
15    3  0  0  =1   FUNCTION LineDistance (x1,y1,  x2,y2,  x3,y3 : Integer) : Integer;
               =1
16    5  0  0  =1   FUNCTION SideDistance (LengthOfHypotenuse : Integer;
               =1                          LengthOfSide       : Integer) : Integer;
17   13  0  0     $INCLUDE (Neighbor.Ext)
               =1 PUBLIC Neighbor;
               =1
18    3  0  0  =1   TYPE
               =1     Virtual                  = 1..1;
19    5  0  0  =1     ConnectionPointerArray   = ARRAY [Virtual] OF ConnectionPointer;
20    6  0  0  =1     DistanceArray            = ARRAY [Virtual] OF Integer;
               =1
               =1
21    9  0  0  =1   FUNCTION FindNeighbors
               =1           (     x,y                  : Integer;
```

```
              =1                    Radius               : Integer;
              =1                    MaximumNumber        : Integer;
              =1                    NeighborMode         : TypeOfNeighbor {(Nodes, Lines, Edges)};
              =1                VAR Neighbors            : ConnectionPointerArray;
              =1                VAR DistanceToNeighbors  : DistanceArray) : Integer;

22   15  0  0         $INCLUDE (LTI.Ext)
              =1      PUBLIC LTI;
              =1
23    3  0  0 =1      PROCEDURE LLBPXL (VAR Surface,ALU,Bits : INTEGER);   {Begin-Pixel-Operations}
24    4  0  0 =1      PROCEDURE LLCLMD (VAR Mode,Overlay,Grey : INTEGER);  {Set-Color-Mode}
25    5  0  0 =1      PROCEDURE LLCLMP (VAR Surface,Len : INTEGER;VAR Map : BYTES); {Set-Surface-Color-Map}
26    6  0  0 =1      PROCEDURE LLDAEN (VAR Enabled : INTEGER);            {Enable-Dialogue-Area}
27    7  0  0 =1      PROCEDURE LLDALN (VAR Lines : INTEGER);              {Set-Dialogue-Area-Lines}
28    8  0  0 =1      PROCEDURE LLDASF (VAR Surface : INTEGER);            {Set-Dialogue-Area-Surface}
29    9  0  0 =1      PROCEDURE LLDAVS (VAR Vis : INTEGER);                {Set-Dialogue-Area-Visibility}
30   10  0  0 =1      PROCEDURE LLDAXY (VAR X,Y : INTEGER);                {Set-Dialogue-Area-Position}
31   11  0  0 =1      PROCEDURE LLDLSG (VAR Seg : INTEGER);                {Delete-Segment}
32   12  0  0 =1      PROCEDURE LLDLVW (VAR View : INTEGER);               {Delete-View}
33   13  0  0 =1      PROCEDURE LLGPRC (VAR Precision: INTEGER);           {Set-Graphtext-Precision}
34   14  0  0 =1      PROCEDURE LLGSIZ (VAR Width,Height,Spacing:INTEGER); {Set-Graphtext-Size}
35   15  0  0 =1      PROCEDURE LLINIT (VAR TerminalType : INTEGER);       {LTI-Initialization}
36   16  0  0 =1      PROCEDURE LLLNIN (VAR Index: INTEGER);               {Set-Line-Index}
37   17  0  0 =1      PROCEDURE LLMOVE (VAR X,Y: INTEGER);                 {Move}
38   18  0  0 =1      PROCEDURE LLRCFL (VAR X1,Y1,X2,Y2,Pen : INTEGER);    {Rectangle-Fill}
39   19  0  0 =1      PROCEDURE LLSYNC;                                    {Synchronize Firmware}
40   20  0  0 =1      PROCEDURE LLTEXT (VAR Count:INTEGER;VAR Str:BYTES;Dummy:INTEGER); {Graphic-Text}
41   21  0  0 =1      PROCEDURE LLVISE (VAR Count : INTEGER;VAR Vis : BYTES); {Set-Surface-Visibility}
42   22  0  0 =1      PROCEDURE LLVKLK (VAR Lockmode : INTEGER);           {Lock-Viewing-Keys}
43   23  0  0 =1      PROCEDURE LLVWAT (VAR Surface,Wipe,Border:INTEGER);  {Set-View-Attributes}
44   24  0  0 =1      PROCEDURE LLVWPT (VAR X1,Y1,X2,Y2 : INTEGER);        {Set-Viewport}
45   25  0  0 =1      PROCEDURE LLWAIT (VAR TimerInterval : INTEGER);      {Pause for interval}
46   26  0  0 =1      PROCEDURE LLWIND (VAR X1,Y1,X2,Y2 : INTEGER);        {Set-Window}

47   17  0  0         {trace} public ddt;
48   18  0  0         {trace} procedure ddtbreakpoint;
49   19  0  0         {trace} PUBLIC expt;
50   20  0  0         {trace} PROCEDURE Hexout(parml : INTEGER);

51   23  0  0                             { Spatial Data Structure Routines}

                      PUBLIC SpatialLibrary;
52   27  0  0          CONST
                          NilConnection       = 0;
53   29  0  0             NilNode             = 0;

54   31  0  0          TYPE
                          ConnectionPointer   = LongInt;

55   34  0  0             NodePointer         = LongInt;

56   36  0  0             PointerToNodePointer= ^NodePointer;

57   38  0  0             StateType           = (Hidden,
```

```
                                     Untagged,
                                     Selected,
                                     Written,
                                     SelectedAndWritten,
                                     Primitive,
                                     Reserved6,
                                     Reserved7);
58   47  0  0      StructureActionType = (DoNothing,
                                     AddToStructure,
                                     DeleteFromStructure);

59   51  0  0      TransitionMask      = PACKED ARRAY [Hidden..Reserved7] OF CHAR;

60   53  0  0      TypeOfNeighbor      = (Nodes, Lines, Edges);

61   56  0  0     FUNCTION  EndNode (Connection : ConnectionPointer)
                            : NodePointer;

62   59  0  0     FUNCTION  FirstConnectionInTile (i,j        : Integer;
                                                  xMin,yMin : Integer;
                                                  xMax,yMax : Integer) : ConnectionPointer;

63   63  0  0     FUNCTION  FirstNodeInTile (i,j : Integer) : NodePointer;

64   65  0  0     PROCEDURE GetNodeLocation (Node : NodePointer;  VAR x,y : Integer);

65   67  0  0     PROCEDURE GetTileStructureParameters (VAR x1,y1     : Integer;
                                                      VAR x2,y2     : Integer;
                                                      VAR Tilesize : Integer);

66   71  0  0     FUNCTION  GetNodePointer (x,y : Integer) : NodePointer;

67   73  0  0     PROCEDURE GetTileIndex (     x,y : Integer;
                                        VAR I,J : Integer);

68   76  0  0     FUNCTION  NextConnectionInTile (CurrentConnection : ConnectionPointer)
                                                : ConnectionPointer;

69   79  0  0     FUNCTION  NextNodeInTile (CurrentNode : NodePointer)
                                          : NodePointer;
70   83  0  0    PRIVATE Neighbor;

71   86  0  0    {==========================================================================}
                 { DiagonalDistance              This function returns the sum of the      }
                 {                               horizontal and vertical distance between  }
                 {                               two points (NOT a true distance).         }
                 {==========================================================================}

                 FUNCTION DiagonalDistance (DeltaX, DeltaY : Integer) : Integer;
72   93  1  0      BEGIN
72   94  1  1        DiagonalDistance := ABS (DeltaX) + ABS (DeltaY);
73   95  1  1      END;
```

```
74   99  0  0     {=========================================================================}
                  { FindNeighboringNodesInTile    This procedure searches the specified tile  }
                  {                               or portion thereof and locates the nodes    }
                  {                               close to the specified X-Y position.        }
                  {=========================================================================}

                  PROCEDURE FindNeighboringNodesInTile
74  106  1  0                              (    Node                  : NodePointer;
                                                x,y                   : Integer;
                                                MaximumNumber         : Integer;
                                            VAR NumberOfNeighbors     : Integer;
                                            VAR Neighbors             : ConnectionPointerArray;
                                            VAR DistanceToNeighbor    : DistanceArray);

75  113  1  0       VAR
                      i            : Integer;
76  115  1  0         ThisDistance : Integer;
77  116  1  0         xNode        : Integer;
78  117  1  0         yNode        : Integer;

79  119  1  0       BEGIN { FindNeighboringNodesInTile }
79  120  1  1         WHILE Node <> NilNode   DO
80  121  1  1           BEGIN
80  122  1  2             GetNodeLocation (Node, xNode, yNode);
81  123  1  2             ThisDistance := DiagonalDistance(x - xNode, { DeltaX }
                                                          y - yNode  { DeltaY });

82  125  1  2             IF ThisDistance < DistanceToNeighbor [MaximumNumber]
                            THEN
83  127  1  2                BEGIN
83  128  1  3                  IF NumberOfNeighbors < MaximumNumber
                                  THEN
84  130  1  3                      NumberOfNeighbors := NumberOfNeighbors + 1;

85  132  1  3                  i := NumberOfNeighbors - 1;
86  133  1  3                  WHILE (i > 0) AND (ThisDistance < DistanceToNeighbor[i]) DO
87  134  1  3                    BEGIN { Insertion sort by distance }
87  135  1  4                      Neighbors [i + 1] := Neighbors [i]:
88  136  1  4                      DistanceToNeighbor [I + 1] := DistanceToNeighbor [i];
89  137  1  4                      I := I - 1;
90  138  1  4                    END;

92  140  1  3                  { 'i' now points to spot to insert new node in list }
                                Neighbors [i + 1] := node;
93  142  1  3                  DistanceToNeighbor [i + 1] := ThisDistance;
94  143  1  3                END;
96  144  1  2             Node := NextNodeInTile (Node);
97  145  1  2           END { WHILE Node <> NilNode  DO ... };
99  146  1  1       END   { Find NeighboringNodsInTiles };

100 150  0  0     {=========================================================================}
                  { FindNeighboringLinesInTile    This procedure searches the specified tile  }
                  {                               and locates the lines close to the specified }
                  {                               X-Y position.                               }
                  {=========================================================================}
```

```
PROCEDURE FindNeighboringLinesInTile
                         (    Connection           : ConnectionPointer;
                              x,y                  : Integer;
                              MaximumNumber        : Integer;
                          VAR NumberOfNeighbors    : Integer;
                          VAR Neighbors            : ConnectionPointerArray;
                          VAR DistanceToNeighbor   : DistanceArray);

  VAR
    i            : Integer;
    ThisDistance : Integer;
    x1,y1        : Integer;
    x2,y2        : Integer;

  BEGIN { FindNeighboringLinesInTile }

    WHILE Connection <> NilConnection   DO
      BEGIN
        GetNodeLocation (Connection,  x1,y1);
        GetNodeLocation (EndNode (Connection),  x2,y2);
        ThisDistance := LineDistance (x1,y1,  x,y,  x2,y2);

        IF ThisDistance < DistanceToNeighbor [MaximumNumber]
          THEN { its close enough, record it -- if there is room }
            BEGIN
              IF NumberOfNeighbors < MaximumNumber
                THEN
                  NumberOfNeighbors := NumberOfNeighbors + 1;

              { Do insertion sort by distance, to find insertion point }
              i := NumberOfNeighbors - 1;
              WHILE (i > 0) AND (ThisDistance < DistanceToNeighbor [i]) DO
                BEGIN
                  Neighbors [i + 1] := Neighbors [i];
                  DistanceToNeighbor [i + 1] := DistanceToNeighbor [i];
                  i := i - 1;
                END;

              { We found the location, copy in the information }
              Neighbors [i + 1] := Connection;
              DistanceToNeighbor [i + 1] := ThisDistance;
            END;
        Connection := NextConnectionInTile (Connection);
      END;
  END;

{===========================================================================}
{ FindNeighboringEdgesInTile    This procedure searches the specified tile  }
{                               and locates the edges to the right of the   }
{                               specified X-Y position.                     }
{===========================================================================}

PROCEDURE FindNeighboringEdgesInTile
                         (    Connection           : ConnectionPointer;
```

```
                  x,y                 : Integer;
                  MaximumNumber       : Integer;
              VAR NumberOfNeighbors   : Integer;
              VAR Neighbors           : ConnectionPointerArray;
              VAR DistanceToNeighbor  : DistanceArray);
VAR
  DeltaX        : Integer;
  DeltaY        : Integer;
  DeltaYGIN     : Integer;
  i             : Integer;
  ThisDistance  : Integer;
  x1,y1         : Integer;
  x2,y2         : Integer;
  xIntersection : Integer;
BEGIN { FindNeighboringEdgesInTile }

  WHILE Connection <> NilConnection   DO
    BEGIN
      GetNodeLocation (Connection,  x1,y1);
      GetNodeLocation (EndNode (Connection),  x2,y2);

    IF    ((y1 <> y2)                       { if the line is not horizontal,}
        AND (    ((y1 <= y) AND (y <= y2))   { and 'y' is between 'y1' and }
             OR ((y2 <= y) AND (y <= y1))))  { 'y2', then ...              }
        THEN
          BEGIN
            DeltaX    := x2 - x1;
            DeltaY    := y2 - y1;
            DeltaYGIN := y  - y1;

            xIntersection := (DeltaX * DeltaYGIN DIV DeltaY) + x1;
            ThisDistance := xIntersection - x;
            IF     (ThisDistance > 0)
               AND (ThisDistance < DistanceToNeighbor [MaximumNumber])
              THEN
                BEGIN
                  IF NumberOfNeighbors < MaximumNumber   { Is there room? }
                    THEN { Get ready to add the edge }
                      NumberOfNeighbors := NumberOfNeighbors + 1;

                  { Insertion sort (ascending) on distance }
                  i := NumberOfNeighbors - 1;
                  WHILE     (I > 0)
                        AND (ThisDistance < DistanceToNeighbor [i])   DO
                    BEGIN
                      Neighbors [i + 1] := Neighbors [i];
                      DistanceToNeighbor [i + 1] := DistanceToNeighbor [i];
                      i := i - 1;
                    END;

                  { We found the rightful location -- insert edge }
                  Neighbors [i + 1] := Connection;
                  DistanceToNeighbor [i + 1] := ThisDistance;

          END;
```

```
        Connection := NextConnectionInTile (Connection);
      END; { WHILE Connection <> NilConnection }
  END;

{===========================================================================}
{ FindNeighbors                    This procedure locates the nodes, lines, or  }
{                                  edges within the specified radius of the     }
{                                  specified X and Y coordinates.               }
{===========================================================================}

FUNCTION  FindNeighbors
          (    x,y                    : Integer;
               Radius                 : Integer;
               MaximumNumber          : Integer;
               NeighborMode           : TypeOfNeighbor {(Nodes, Lines, Edges)};
           VAR Neighbors              : ConnectionPointerArray;
           VAR DistanceToNeighbors    : DistanceArray) : Integer;

  VAR
    DeltaX              : Integer;
    i                   : Integer;
    iMax                : Integer;
    iMin                : Integer;
    j                   : Integer;
    jMax                : Integer;
    jMin                : Integer;
    NumberOfNeighbors   : Integer;
    RightRadius         : Integer;
    TileSize            : Integer;
    XMin                : Integer;
    YMin                : Integer;
    yTile               : Integer;
  BEGIN { FindNeighbors }
    GetTileStructureParameters (i,i,  i,i,  TileSize);
    NumberOfNeighbors := 0;

    { Save the upper bound as the last possible distance }
    DistanceToNeighbors [MaximumNumber] := Radius + 1;

    RightRadius := Radius;
    IF NeighborMode = Edges
      THEN Radius := 0;

    IF (Y < 0) THEN
      Y := 0;
    IF (X < Radius) THEN
      XMin := 0
    ELSE
      XMin := X - Radius;
    IF (Y < Radius) THEN
      YMin := 0
    ELSE
      YMin := Y - Radius;

    yTile := y DIV TileSize;
```

```
194  326  1  1    FOR j := (YMin) DIV TileSize TO (y + Radius) DIV TileSize DO
195  327  1  1      BEGIN
195  328  1  2        IF j = yTile
                        THEN
196  330  1  2            BEGIN
196  331  1  3              iMin := (XMin) DIV TileSize;
197  332  1  3              iMax := (x + RightRadius) DIV TileSize;
198  333  1  3            END
199  334  1  2          ELSE
200  335  1  2            BEGIN
200  336  1  3              IF j < yTile
                                THEN
201  338  1  3                  DeltaX := SideDistance(Radius,y - (j + 1) * TileSize)
                                ELSE
202  340  1  3                  DeltaX := SideDistance(Radius,j * TileSize - y);
203  341  1  3              iMin := (x - DeltaX) DIV TileSize;
204  342  1  3              iMax := (x + DeltaX) DIV TileSize;
205  343  1  3            END;

207  345  1  2        FOR i := iMin TO iMax DO
208  346  1  2          CASE NeighborMode OF
209  347  1  3            Nodes: FindNeighboringNodesInTile
                                          (FirstNodeInTile (i,j),
                                           x,y,
                                           MaximumNumber.
                                           NumberOfNeighbors,
                                           Neighbors.
                                           DistanceToNeighbors);

210  355  1  3            Lines: FindNeighboringLinesInTile
                                          (FirstConnectionInTile
                                                  (i,j,
                                                   XMin, YMin,
                                                   x + Radius, y + Radius),
                                          x,y,
                                          MaximumNumber,
                                          NumberOfNeighbors,
                                          Neighbors,
                                          DistanceToNeighbors);

211  366  1  3            Edges: IF NumberOfNeighbors < MaximumNumber
                                     THEN FindNeighboringEdgesInTile
212  368  1  3                        (FirstConnectionInTile
                                                (i,j,
                                                 i * TileSize , j * TileSize,
                                                 (i + 1) * TileSize - 1,
                                                 (j + 1) * TileSize - 1),
                                          x,y,
                                          MaximumNumber,
                                          NumberOfNeighbors,
                                          Neighbors,
                                          DistanceToNeighbors);

213  378  1  3          END {CASE} ;
215  379  1  2      END;
217  380  1  1    FindNeighbors := NumberOfNeighbors;
218  381  1  1  END;
```

```
219  383  0  0

463 Lines Read.
- 0 Errors Detected.
54% Utilization of Memory.


8086/8087/8088 MACRO ASSEMBLER    DISTANCE COMPUTATION ROUTINES


4110 CP/M UDI2.1      8086/8087/8088 MACRO ASSEMBLER V1.1 ASSEMBLY OF MODULE DISTANCE
NO OBJECT MODULE REQUESTED
ASSEMBLER INVOKED BY:  D:ASM86 A:DISTANCE.ASM NOOJ EP PW(132) PR(D:DISTANCE.LST[G9])

LOC  OBJ                LINE     SOURCE

                          1 +1  $title (Distance Computation Routines)
                          2
                          3
                          4
                          5
                          6    ;
                          7              NAME    Distance
                          8              PUBLIC  LineDistance,PointDistance,SideDistance
                          9    ;
----                     10    DistList  STRUC
0000                     11              DW      ?                  ; Prologue code saves BP here
0002                     12              DW      ?                  ; Prologue code saves DS here
0004                     13              DD      ?                  ; Return address for FAR procedures
0008                     14    Y3        DW      ?                  ; Y3 (sixth parameter)
000A                     15    X3        DW      ?                  ; X3 (fifth parameter)
000C                     16    Y2        DW      ?                  ; Y2 (fourth parameter)
000E                     17    X2        DW      ?                  ; X2 (third parameter)
0010                     18    Y1        DW      ?                  ; Y1 (second parameter)
0012                     19    X1        DW      ?                  ; X1 (first parameter)
----                     20    DistList  ENDS
                         21    ;
----                     22    DistData  SEGMENT
0000 0000                23    IntLower  DW      0                  ; Low order 16 bits of 32 bit integer
0002 0000                24    IntUpper  DW      0                  ; High order 16 bits of 32 bit integer
----                     25    DistData  ENDS
                         26    ;
----                     27    DistCode  SEGMENT
                         28              ASSUME  CS:DistCode,DS:DistData
                         29    ;
                         30    ; FUNCTION LineDistance(X1,Y1,X2,Y2,X3,Y3:INTEGER):INTEGER;
                         31    ;   Returns the the distance between point (X2,Y2) and line segment
                         32    ;   (X1,Y1),(X3,Y3) if less than 32767; otherwise returns 32767.
                         33    ;
                         34    ;   Notation:
                         35    ;     S1 is the distance between point (X2,Y2) and the point (X3,Y3)
                         36    ;     S2 is the distance between point (X1,Y1) and the point (X3,Y3).
                         37    ;     S3 is the distance between point (X1,Y1) and the point (X2,Y2).
                         38    ;
```

```
                    ;   Algorithm:
                    ;     There are three cases:
                    ;       (1) (X1,Y1) and (X3,Y3) are the same point (S2 = 0).  In this
                    ;           case, distance = S1 = S3.
                    ;       (2) The angle at point (X1,Y1) or the angle at point (X3,Y3) is
                    ;           greater than 90 degrees.  The distance is MIN(S1,S3).
                    ;           ((((MIN(S1,S3)) ** 2) + (S2 ** 2)) > ((MAX(S1,S3)) ** 2))
                    ;       (3) The distance is the altitude of the triangle = 2 * Area / S2
                    ;           (Area = 1/2 * base * altitude).  The area is determined using
                    ;           a formula from the HP45 Application book:
                    ;           Area = 1/2 * [X1 * (Y2 - Y3) + X2 * (Y3 - Y1) + X3 * (Y1 - Y2)]
                    ;
0000                LineDistance PROC FAR
0000 1E                     PUSH    DS                      ; Save DS for PASCAL
0001 B8----     R           MOV     AX,DistData             ; Address of data segment
0004 8ED8                   MOV     DS,AX                   ; Move it to DS register
0006 55                     PUSH    BP                      ; Save BP for PASCAL
0007 8BEC                   MOV     BP,SP                   ; Establish addressability to parameters
                    ;
                    ; Compute (S2 ** 2) = (X3 - X1) ** 2 + (Y3 - Y1) ** 2 (32 bits) in DI:SI
                    ;
0009 8B460A                 MOV     AX,[BP].X3              ; X3
000C 2B4612                 SUB     AX,[BP].X1              ; X3 - X1
000F 7D02                   JGE     $+4                     ; Skip if positive
0011 F7D8                   NEG     AX                      ; ABS(X3 - X1)
0013 F7E0                   MUL     AX                      ; (X3 - X1) ** 2
0015 8BFA                   MOV     DI,DX                   ; Save upper 16 bits
0017 8BF0                   MOV     SI,AX                   ; Save lower 16 bits
0019 8B4608                 MOV     AX,[BP].Y3              ; Y3
001C 2B4610                 SUB     AX,[BP].Y1              ; Y3 - Y1
001F 7D02                   JGE     $+4                     ; Skip if positive
0021 F7D8                   NEG     AX                      ; ABS(Y3 - Y1)
0023 F7E0                   MUL     AX                      ; (Y3 - Y1) ** 2
0025 03F0                   ADD     SI,AX                   ; Add lower 16 bits
0027 13FA                   ADC     DI,DX                   ; Add upper 16 bits and carry
                    ;
                    ; Compute (S1 ** 2) = (X3 - X2) ** 2 + (Y3 - Y2) ** 2 (32 bits) in DX:AX
                    ;
0029 8B460A                 MOV     AX,[BP].X3              ; X3
002C 2B460E                 SUB     AX,[BP].X2              ; X3 - X2
002F 7D02                   JGE     $+4                     ; Skip if positive
0031 F7D8                   NEG     AX                      ; ABS(X3 - X2)
0033 F7E0                   MUL     AX                      ; (X3 - X2) ** 2
0035 8BCA                   MOV     CX,DX                   ; Save upper 16 bits
0037 8BD8                   MOV     BX,AX                   ; Save lower 16 bits
0039 8B4608                 MOV     AX,[BP].Y3              ; Y3
003C 2B460C                 SUB     AX,[BP].Y2              ; Y3 - Y2
003F 7D02                   JGE     $+4                     ; Skip if positive
0041 F7D8                   NEG     AX                      ; ABS(Y3 - Y2)
0043 F7E0                   MUL     AX                      ; (Y3 - Y2) ** 2
0045 03C3                   ADD     AX,BX                   ; Add lower 16 bits
0047 13D1                   ADC     DX,CX                   ; Add upper 16 bits and carry
                    ;
                    ; Save S1 ** 2
                    ;
```

```
0049 A30000                  MOV     IntLower,AX        ; Save lower 16 bits
004C 89160200                MOV     IntUpper,DX        ; Save upper 16 bits
                 ;
                 ; If S2 ** 2 = 0 Then Dist ** 2 = S1 ** 2 = S3 ** 2
                 ;
0050 85F6                    TEST    SI,SI              ; Low order 16 bits = 0?
0052 750C                    JNZ     Triangle           ; No, process triangle
0054 85FF                    TEST    DI,DI              ; High order 16 bits = 0?
0056 7508                    JNZ     Triangle           ; No, process triangle
0058 9BDB060000              FILD    DWORD PTR IntLower ; 8087 Integer Load 32 bits
005D E99500                  JMP     LineSQRT           ; extract square root
                 ;
                 ; Compute (S3 ** 2) = (X2 - X1) ** 2 + (Y2 - Y1) ** 2 (32 bits) in DX:AX
                 ;
0060 8B460E      Triangle:   MOV     AX,[BP].X2         ; X2
0063 2B4612                  SUB     AX,[BP].X1         ; X2 - X1
0066 7D02                    JGE     $+4                ; Skip if positive
0068 F7D8                    NEG     AX                 ; ABS(X2 - X1)
006A F7E0                    MUL     AX                 ; (X2 - X1) ** 2
006C 8BCA                    MOV     CX,DX              ; Save upper 16 bits
006E 8BD8                    MOV     BX,AX              ; Save lower 16 bits
0070 8B460C                  MOV     AX,[BP].Y2         ; Y2
0073 2B4610                  SUB     AX,[BP].Y1         ; Y2 - Y1
0076 7D02                    JGE     $+4                ; Skip if positive
0078 F7D8                    NEG     AX                 ; ABS(Y2 - Y1)
007A F7E0                    MUL     AX                 ; (Y2 - Y1) ** 2
007C 03C3                    ADD     AX,BX              ; Add lower 16 bits
007E 13D1                    ADC     DX,CX              ; Add upper 16 bits and carry
                 ;
                 ; If (S3 ** 2) < (S1 ** 2) then exchange (S1 ** 2) and (S3 ** 2)
                 ;
0080 3B160200                CMP     DX,IntUpper        ; Compare upper 16 bits
0084 7710                    JA      NoExch             ; If higher, no exchange
0086 7206                    JB      Exchange           ; If lower, exchange
0088 3B060000                CMP     AX,IntLower        ; Compare lower 16 bits
008C 7708                    JA      NoExch             ; If higher, no exchange
008E 87160200    Exchange:   XCHG    DX,IntUpper        ; Exchange upper 16 bits
0092 87060000                XCHG    AX,IntLower        ; Exchange lower 16 bits
                 ;
                 ; If (S3 ** 2) - (S2 ** 2) > (S1 ** 2) Then Dist ** 2 = S1 ** 2 (Obtuse)
                 ;
0096 2BC6        NoExch:     SUB     AX,SI              ; Subtract lower 16 bits
0098 1BD7                    SBB     DX,DI              ; Subtract upper 16 bits and borrow
009A 7C16                    JL      Continue           ; Continue if negative (S2 > S3)
009C 3B160200                CMP     DX,IntUpper        ; Compare upper 16 bits
00A0 7210                    JB      Continue           ; If lower, continue with calculations
00A2 7706                    JA      RetS1              ; If higher, return S1
00A4 3B060000                CMP     AX,IntLower        ; Compare lower 16 bits
00A8 7208                    JB      Continue           ; If lower, continue with calculations
00AA 9BDB060000  RetS1:      FILD    DWORD PTR IntLower ; 8087 Integer Load 32 bits
00AF EB4490                  JMP     LineSQRT           ; extract square root
                 ;
                 ; Compute (X1 * (Y2 - Y3) + X2 * (Y3 - Y1) + X3 * (Y1 - Y2)) in DX:AX
                 ;
00B2 8B460C      Continue:   MOV     AX,[BP].Y2         ; Y2
```

```
00B5 2B4608                  SUB     AX,[BP].Y3           ; (Y2 - Y3)
00B8 F76E12                  IMUL    [BP].X1              ; X1 * (Y2 - Y3)
00BB 8BD8                    MOV     BX,AX                ; Save lower 16 bits
00BD 8BCA                    MOV     CX,DX                ; Save upper 16 bits
                     ;
00BF 8B4608                  MOV     AX,[BP].Y3           ; Y3
00C2 2B4610                  SUB     AX,[BP].Y1           ; (Y3 - Y1)
00C5 F76E0E                  IMUL    [BP].X2              ; X2 * (Y3 - Y1)
00C8 03D8                    ADD     BX,AX                ; Add lower 16 bits
00CA 13CA                    ADC     CX,DX                ; Add upper 16 bits and carry
                     ;
00CC 8B4610                  MOV     AX,[BP].Y1           ; Y1
00CF 2B460C                  SUB     AX,[BP].Y2           ; (Y1 - Y2)
00D2 F76E0A                  IMUL    [BP].X3              ; X3 * (Y1 - Y2)
00D5 03C3                    ADD     AX,BX                ; Add lower 16 bits
00D7 13D1                    ADC     DX,CX                ; Add upper 16 bits and carry
                     ;
                     ; Compute distance = SQRT((DX:AX) ** 2 / DI:SI)
                     ;
00D9 89160200                MOV     IntUpper,DX          ; Save upper 16 bits in memory
00DD A30000                  MOV     IntLower,AX          ; Save lower 16 bits in memory
00E0 9BDB060000              FILD    DWORD PTR IntLower   ; 8087 Integer Load 32 bits
00E5 9BDCC8                  FMUL    ST,ST                ; Square stack top
00E8 893E0200                MOV     IntUpper,DI          ; Save upper 16 bits in memory
00EC 89360000                MOV     IntLower,SI          ; Save lower 16 bits in memory
00F0 9BDA360000              FIDIV   DWORD PTR IntLower   ; 8087 Integer Divide 32 bits
00F5 9BD9FA          LineSQRT: FSQRT                      ; 8087 Square Root
00F8 9BDB1E0000              FISTP   DWORD PTR IntLower   ; 8087 Integer Store and Pop
00FD 9B                      FWAIT                        ; Wait for 8087 Not Busy
00FE 8B160200                MOV     DX,IntUpper          ; Load upper 16 bits of quotient
0102 A10000                  MOV     AX,IntLower          ; Load lower 16 bits of quotient
                     ;
0105 85D2                    TEST    DX,DX                ; Upper 16 bits of distance 0?
0107 7504                    JNZ     LineRetM             ; No, return maximum
0109 85C0                    TEST    AX,AX                ; Sign bit of distance 0?
010B 7903                    JNS     LineRet              ; Yes, return distance
010D B8FF7F          LineRetM: MOV   AX,32767             ; Maximum value
0110 5D              LineRet:  POP   BP                   ; Restore BP for PASCAL
0111 1F                      POP     DS                   ; Restore DS for PASCAL
0112 CA0C00                  RET     12                   ; Return; remove 12 bytes from stack
                     LineDistance ENDP
                     ;
                     ; FUNCTION PointDistance(X2,Y2,X3,Y3:INTEGER):INTEGER;
                     ;   Returns the distance between point (X2,Y2) and point (X3,Y3).
                     ;
0115                 PointDistance PROC FAR
0115 1E                      PUSH    DS                   ; Save DS for PASCAL
0116 B8---- R                MOV     AX,DistData          ; Address of data segment
0119 8ED8                    MOV     DS,AX                ; Move it to DS register
011B 55                      PUSH    BP                   ; Save BP for PASCAL
011C 8BEC                    MOV     BP,SP                ; Establish addressability to parameters
                     ;
                     ; Compute (X3 - X2) ** 2 + (Y3 - Y2) ** 2 (32 bits) in DX:AX
                     ;
011E 8B460A                  MOV     AX,[BP].X3           ; X3
```

```
0121 2B460E             SUB     AX,[BP].X2          ; X3 - X2
0124 7D02               JGE     $+4                 ; Skip if positive
0126 F7D8               NEG     AX                  ; ABS(X3 - X2)
0128 F7E0               MUL     AX                  ; (X3 - X2) ** 2
012A 8BCA               MOV     CX,DX               ; Save upper 16 bits
012C 8BD8               MOV     BX,AX               ; Save lower 16 bits
012E 8B4608             MOV     AX,[BP].Y3          ; Y3
0131 2B460C             SUB     AX,[BP].Y2          ; Y3 - Y2
0134 7D02               JGE     $+4                 ; Skip if positive
0136 F7D8               NEG     AX                  ; ABS(Y3 - Y2)
0138 F7E0               MUL     AX                  ; (Y3 - Y2) ** 2
013A 03C3               ADD     AX,BX               ; Add lower 16 bits
013C 13D1               ADC     DX,CX               ; Add upper 16 bits and carry
                ;
                ; Compute SQRT(DX:AX) in AX
                ;
013E 89160200           MOV     IntUpper,DX         ; Save upper 16 bits in memory
0142 A30000             MOV     IntLower,AX         ; Save lower 16 bits in memory
0145 9BDB060000         FILD    DWORD PTR IntLower  ; 8087 Integer Load 32 bits
014A 9BD9FA             FSQRT                       ; 8087 SQRT
014D 9BDB1E0000         FISTP   DWORD PTR IntLower  ; 8087 Integer Store and Pop
0152 9B                 FWAIT                       ; Wait for 8087 Not Busy
0153 A10000             MOV     AX,IntLower         ; Load lower 16 bits of square root
0156 5D                 POP     BP                  ; Restore BP for PASCAL
0157 1F                 POP     DS                  ; Restore DS for PASCAL
0158 CA0800             RET     8                   ; Return; remove 8 bytes from stack
                PointDistance ENDP
                ;
                ; FUNCTION SideDistance(X3,Y3:INTEGER):INTEGER;
                ;   Returns the length of the side of a right triangle with hypotenuse X3
                ;   and side Y3 (X3 >= Y3 >= 0).
                ;
015B            SideDistance PROC FAR
015B 1E                 PUSH    DS                  ; Save DS for PASCAL
015C B8----    R        MOV     AX,DistData         ; Address of data segment
015F 8ED8               MOV     DS,AX               ; Move it to DS register
0161 55                 PUSH    BP                  ; Save BP for PASCAL
0162 8BEC               MOV     BP,SP               ; Establish addressability to parameters
                ;
                ; Compute X3 ** 2 - Y3 ** 2 (32 bits) in DX:AX
                ;
0164 8B4608             MOV     AX,[BP].Y3          ; Y3
0167 F7E0               MUL     AX                  ; Y3 ** 2
0169 8BCA               MOV     CX,DX               ; Save upper 16 bits
016B 8BD8               MOV     BX,AX               ; Save lower 16 bits
016D 8B460A             MOV     AX,[BP].X3          ; X3
0170 F7E0               MUL     AX                  ; X3 ** 2
0172 2BC3               SUB     AX,BX               ; Subtract lower 16 bits
0174 1BD1               SBB     DX,CX               ; Subtract upper 16 bits with borrow
                ;
                ; Compute SQRT(DX:AX) in AX
                ;
0176 89160200           MOV     IntUpper,DX         ; Save upper 16 bits in memory
017A A30000             MOV     IntLower,AX         ; Save lower 16 bits in memory
017D 9BDB060000         FILD    DWORD PTR IntLower  ; 8087 Integer Load 32 bits
```

```
0182 9BD9FA          259            FSQRT                        ; 8087 SQRT
0185 9BDB1E0000      260            FISTP   DWORD PTR IntLower   ; 8087 Integer Store and Pop
018A 9B              261            FWAIT                        ; Wait for 8087 Not Busy
018B A10000          262            MOV     AX,IntLower          ; Load lower 16 bits of square root
018E 5D              263            POP     BP                   ; Restore BP for PASCAL
018F 1F              264            POP     DS                   ; Restore DS for PASCAL
0190 CA0400          265            RET     4                    ; Return; remove 4 bytes from stack
                     266        SideDistance ENDP
                     267        ;
----                 268        DistCode  ENDS
                     269                  END

ASSEMBLY COMPLETE, NO ERRORS FOUND

Source File: A:FRSTNXTP.PAS
Object File: <none>
Controls Specified:  ERRORPRINT, NOOBJECT, PRINT(D:FRSTNXTP.LST[G9]), SUBTITLE(                FIRST AND NEXT FUNCTIONS), TITLE
            OBJECT AND LINE FUNCTIONS).

STMT LINE NESTING       SOURCE TEXT: A:FRSTNXTP.PAS
  1     3  0  0         MODULE FirstNextFunctions;
  2     4  0  0                  {                                                  }
                                 {                                                  }
                                 {                                                  }
                                 {                                                  }
                                 {                                                  }
                                 {                                                  }
                                 { MODULE: FirstNextFunctions                       }
                                 {    This module contains all the pascal           }
                                 {    subroutines to traverse an object or          }
                                 {    polyline. These functions are called          }
                                 {    from the cursors.                             }
                                 {                                                  }
                                 { FUNCTIONS:                                       }
                                 {    FirstPolylineInObject                         }
                                 {    NextPolylineInObject                          }
                                 {    FirstConnectionInPolygon                      }
                                 {    NextConnectionInPolygon                       }
                                 {                                                  }
                                 {                                                  }
                                 { Globals:                                         }
                                 {    FirstrConnection          First Connection of }
                                 {                              present polyline be-}
                                 {                              ing trasversed.     }
                                 {    ListOfNodesToBeChecked    Array of nodes to be}
                                 {                              traversed for find- }
                                 {                              all polylines in an }
                                 {                              object.             }
                                 {    ListOfNodesIndex          Index for above ar- }
                                 {                              ray                 }
                                 {                                                  }
                                 {                                                  }
                                 {                                                  }
                                 {                                                  }
                                 {                                                  }
```

```
                      {                                                      }
                      {                                                      }
                      { Authors:                                             }
                      {         David Butler                                 }
                      {                                                      }
                      { Date: 1/14/84                                        }
                      {                                                      }
                      {------------------------------------------------------}

                 $INCLUDE (Tekman.ext);
            =1   PUBLIC TekMan;
            =1
 3   3  0  0 =1   CONST
            =1     MaximumLengthOfFileName =   14;
 4   5  0  0 =1     xMaxDisplayPixel        = 1279    {tk4115};
 5   6  0  0 =1     xMaxViewportCoordinate  = 4095    {tk4113};
 6   7  0  0 =1     xNumberOfDisplayPixels  = 1280    {tk4115};
 7   8  0  0 =1     yMaxDisplayPixel        =  959    {tk4115};
 8   9  0  0 =1     yMaxViewportCoordinate  = 3071    {tk4113};
 9  10  0  0 =1     yNumberOfDisplayPixels  =  960    {tk4115};
            =1
10  12  0  0 =1   TYPE
            =1     CursorStatusType = (Limbo,
            =1                         WriteMode,
            =1                         LockMode,
            =1                         LockAndWriteMode);
            =1
11  18  0  0 =1     CursorActionType = (NoAction,
            =1                         EnterWriteMode,
            =1                         StayInWriteMode.
            =1                         EnterLimbo,
            =1                         EnterLockMode,
            =1                         StayInLockMode,
            =1                         EnterLockAndWriteMode.
            =1                         StayInLockAndWriteMode,
            =1                         ReturnToLockMode,
            =1                         ReturnToWriteMode);
            =1
12  29  0  0 =1     FileName        = PACKED ARRAY [1..MaximumLengthOfFilename] OF CHAR;
            =1
13  31  0  0 =1     GINType         = (ConstrainedGIN.
            =1                         UnconstrainedGIN.
            =1                         MenuSelection);
14  50  0  0      $INCLUDE (LTI.EXT);
            =1    PUBLIC LTI;
            =1
15   3  0  0 =1   PROCEDURE LLBPXL (VAR Surface,ALU,Bits : INTEGER);   {Begin-Pixel-Operations}
16   4  0  0 =1   PROCEDURE LLCLMD (VAR Mode,Overlay,Grey : INTEGER);  {Set-Color-Mode}
17   5  0  0 =1   PROCEDURE LLCLMP (VAR Surface,Len : INTEGER;VAR Map : BYTES); {Set-Surface-Color-Map}
18   6  0  0 =1   PROCEDURE LLDAEN (VAR Enabled : INTEGER);            {Enable-Dialogue-Area}
19   7  0  0 =1   PROCEDURE LLDALN (VAR Lines : INTEGER);              {Set-Dialogue-Area-Lines}
20   8  0  0 =1   PROCEDURE LLDASF (VAR Surface : INTEGER);            {Set-Dialogue-Area-Surface}
21   9  0  0 =1   PROCEDURE LLDAVS (VAR Vis : INTEGER);                {Set-Dialogue-Area-Visibility}
22  10  0  0 =1   PROCEDURE LLDAXY (VAR X,Y : INTEGER);                {Set-Dialogue-Area-Position}
```

```
11  0  0 =1   PROCEDURE LLDLSG (VAR Seg : INTEGER);                  {Delete-Segment}
12  0  0 =1   PROCEDURE LLDLVW (VAR View : INTEGER);                 {Delete-View}
13  0  0 =1   PROCEDURE LLGPRC (VAR Precision: INTEGER);             {Set-Graphtext-Precision}
14  0  0 =1   PROCEDURE LLGSIZ (VAR Width,Height,Spacing:INTEGER);   {Set-Graphtext-Size}
15  0  0 =1   PROCEDURE LLINIT (VAR TerminalType : INTEGER);         {LTI-Initialisation}
16  0  0 =1   PROCEDURE LLLNIN (VAR Index: INTEGER);                 {Set-Line-Index}
17  0  0 =1   PROCEDURE LLMOVE (VAR X,Y: INTEGER);                   {Move}
18  0  0 =1   PROCEDURE LLRCFL (VAR X1,Y1,X2,Y2,Pen : INTEGER);      {Rectangle-Fill}
19  0  0 =1   PROCEDURE LLSYNC;                                      {Synchronize Firmware}
20  0  0 =1   PROCEDURE LLTEXT (VAR Count:INTEGER;VAR Str:BYTES;Dummy:INTEGER); {Graphic-Text}
21  0  0 =1   PROCEDURE LLVISF (VAR Count : INTEGER;VAR Vis : BYTES); {Set-Surface-Visibility}
22  0  0 =1   PROCEDURE LLVKLK (VAR Lockmode : INTEGER);             {Lock-Viewing-Keys}
33  0  0 =1   PROCEDURE LLVWAT (VAR Surface,Wipe,Border:INTEGER);    {Set-View-Attributes}
34  0  0 =1   PROCEDURE LLVWPT (VAR X1,Y1,X2,Y2 : INTEGER);          {Set-Viewport}
25  0  0 =1   PROCEDURE LLWAIT (VAR TimerInterval : INTEGER);        {Pause for interval}
26  0  0 =1   PROCEDURE LLWIND (VAR X1,Y1,X2,Y2 : INTEGER);          {Set-Window}

52  0  0                          { Spatial Data Structure Routines}

              PUBLIC SpatialLibrary;

56  0  0        CONST
                  NilConnection        = 0;
58  0  0          NilNode              = 0;

60  0  0        TYPE
                  ConnectionPointer    = LongInt;

63  0  0          NodePointer          = LongInt;

65  0  0          PointerToNodePointer= ^NodePointer;

67  0  0          StateType            = (Hidden,
                                           Untagged,
                                           Selected,
                                           Written,
                                           SelectedAndWritten,
                                           Primitive,
                                           Reserved6,
                                           Reserved7);

76  0  0          StructureActionType = (DoNothing,
                                           AddToStructure,
                                           DeleteFromStructure);

80  0  0          TransitionMask       = PACKED ARRAY [Hidden..Reserved7] OF Char;

84  0  0        FUNCTION  ConnectionTraversable (Connection : ConnectionPointer) : Boolean;

86  0  0        FUNCTION  EndNode (Connection : ConnectionPointer)
                                    : NodePointer;

89  0  0        FUNCTION  ExamineNodeTraversedFlag (Node : NodePointer)
                                                    : Boolean;
```

```
51   92  0  0     FUNCTION  GetConnection (Node             : NodePointer;
                                          ConnectionNumber : Integer) : ConnectionPointer;

52   95  0  0     FUNCTION  GetConnectionNumber (Connection : ConnectionPointer) : Integer;

53   97  0  0     PROCEDURE GetNodeLocation (    Node : NodePointer;
                                             VAR x,y  : Integer);

54  100  0  0     FUNCTION  GetNodePointer (x,y : Integer) : NodePointer;

55  102  0  0     FUNCTION  NumberOfConnections (Node : NodePointer)
                                               : Integer;
56  105  0  0     FUNCTION  ReciprocalConnection (Connection : ConnectionPointer)
                                                : ConnectionPointer;

57  108  0  0     PROCEDURE SetNodeTraversedFlag (Node : NodePointer);

58  111  0  0   PUBLIC FirstNextFunctions;

59  113  0  0   FUNCTION FirstPolylineInObject (CurrentNode  : NodePointer)
                                               : ConnectionPointer;

60  116  0  0   FUNCTION NextPolylineInObject  : ConnectionPointer;

61  118  0  0   FUNCTION FirstConnectionInPolyline (CurrentConnection : ConnectionPointer)
                                                  : ConnectionPointer;

62  121  0  0   FUNCTION NextConnectionInPolyline (CurrentConnection, BeginConnection
                                                  : ConnectionPointer) : ConnectionPointer;



63  127  0  0   PRIVATE FirstNextFunctions;

64  129  0  0   CONST
                  ListOfNodeLimit = 512;

65  132  0  0   VAR
                  ListOfNodesIndex : INTEGER;

66  135  0  0     FirstConnection : ConnectionPointer;

67  137  0  0     ListOfNodesToCheck : ARRAY [1..ListOfNodeLimit] OF Nodepointer;

68  139  0  0   $eject
                {-------------------------------------------------------------------}
                {                                                                   }
                {  FUNCTION:                                                        }
                {        NumberOfTraversableConnections:                           }
                {                                Returns the number of traversable con- }
                {                                nections attached to a node.      }
                {                                                                   }
```

```
{  ASSUMPTIONS: NONE.                                                    }
{                                                                        }
{        1) This subroutine will expect a valid Node and if a nonexist-  }
{           ant node is entered, the results will be unpredictable.      }
{                                                                        }
{  DATA STORAGE:                                                         }
{                                                                        }
{        NumberOfConn              The number of connections attached to }
{                                  to a node.                            }
{                                                                        }
{        TotalTraversable          Count of traversable connection attach-}
{                                  ed to a node.                         }
{                                                                        }
{  RETURN ASSUMPTIONS AND ERROR CONDITIONS: NONE.                        }
{                                                                        }
{                                                                        }
{                                                                        }
{                                                                        }
{                                                                        }
{------------------------------------------------------------------------}

FUNCTION NumberOfTraversableConnections(CurrentNode :
                                          NodePointer): INTEGER;
VAR
  I, NumOfConn. TotalTraversable : INTEGER;

BEGIN

  TotalTraversable := 0;
  NumOfConn := NumberOfConnections(CurrentNode);
  FOR I := 1 TO NumOfConn DO
    BEGIN

      IF (ConnectionTraversable(GetConnection(CurrentNode,I))) THEN
        TotalTraversable := TotalTraversable + 1;

    END;

  NumberOfTraversableConnections := TotalTraversable;
END;{For NumberOfTraversableConnections}
$eject
{------------------------------------------------------------------------}
{                                                                        }
{  FUNCTION:                                                             }
{        OtherTraversableConnectionFromNode:                             }
{                                  Returns the next connection on a de-  }
{                                  facto polyline.                       }
{                                                                        }
{  ASSUMPTIONS: NONE.                                                    }
{                                                                        }
{        1) This subroutine will expect a valid connection and beginning}
{           connection, otherwise the results will be unpredictable.     }
{                                                                        }
{  DATA STORAGE:                                                         }
{                                                                        }
```

```
{        NumberOfConn             The number of connections attached to }
{                                 to the next node in the polyline.     }
{                                                                       }
{        ValidCount               Count of traverable connection attach-}
{                                 ed to the next node.                  }
{                                                                       }
{        ReverseConnection        Reciprocal of inputed connection.     }
{                                                                       }
{        CheckConnection          Connection being checked for travers- }
{                                 ability.                              }
{                                                                       }
{        NextConnection           Connection returned.                  }
{                                                                       }
{                                                                       }
{  RETURN ASSUMPTIONS AND ERROR CONDITIONS:                             }
{                                                                       }
{        1) Value [ 0]           Means that the node has no traversable }
{                                polylines or many.                     }
{                                                                       }
{                                                                       }
{                                                                       }
{                                                                       }
{                                                                       }
{-----------------------------------------------------------------------}

FUNCTION OtherTraversableConnectionFromNode(CurrentConnection : ConnectionPointer):
              ConnectionPointer;
VAR
  I, NumOfConn, ValidCount : INTEGER;
  ReverseConnection, CheckConnection, NextConnection : ConnectionPointer;

BEGIN
  ReverseConnection := ReciprocalConnection(CurrentConnection);
  NumOfConn := NumberOfConnections(ReverseConnection);
  ValidCount := 0;
  I := 0;
  WHILE (I < NumOfConn) AND (ValidCount < 2) DO
    BEGIN
      I := I + 1;
      CheckConnection := GetConnection(ReverseConnection, I);
      IF (ConnectionTraversable(CheckConnection)) AND
         (CheckConnection <> ReverseConnection) THEN
        BEGIN

          NextConnection := CheckConnection;
          ValidCount := ValidCount + 1;
        END;{For IF}
    END;{For While}

  IF (ValidCount <> 1) THEN
    NextConnection := NilConnection;

  OtherTraversableConnectionFromNode := NextConnection;
END;{OtherTraversableConnectionFromNode}
$eject
```

```
{-----------------------------------------------------------------------}
{                                                                       }
{ FUNCTION:                                                             }
{       EndConnectionOfPolyline:                                        }
{                                 Returns the end connection on a defac-}
{                                 to polyline.                          }
{                                                                       }
{ ASSUMPTIONS:                                                          }
{                                                                       }
{       1) This subroutine will expect a valid connection, otherwise    }
{          the results will be unpredictable.                           }
{                                                                       }
{ DATA STORAGE:                                                         }
{                                                                       }
{       StartingNode               The node at the first end of input   }
{                                  connection.                          }
{                                                                       }
{       CurrentNode                The node at the far end of current   }
{                                  connection.                          }
{                                                                       }
{       CurrentConnection          Next connection to be checked.       }
{                                                                       }
{       SaveConnection             Last connection verified on the poly-}
{                                  line.                                }
{                                                                       }
{                                                                       }
{ RETURN ASSUMPTIONS AND ERROR CONDITIONS:                              }
{                                                                       }
{       1) Value [ 0]             Means that the polyline is not travers-}
{                                 able.                                 }
{                                                                       }
{                                                                       }
{                                                                       }
{                                                                       }
{                                                                       }
{-----------------------------------------------------------------------}

FUNCTION EndConnectionOfPolyline(StartingConnection : ConnectionPointer) :
         ConnectionPointer;
VAR
  CurrentConnection, SavedConnection : ConnectionPointer;
  CurrentNode, StartingNode : NodePointer;

BEGIN

  CurrentConnection := StartingConnection;
  StartingNode := GetConnection(StartingConnection,0);
  SavedConnection := NilConnection;
  IF (NOT ConnectionTraversable(CurrentConnection)) OR
     (ExamineNodeTraversedFlag(Endnode(CurrentConnection))) THEN
     CurrentConnection := NilConnection;
  WHILE (CurrentConnection <> NilConnection) DO
    BEGIN
      SavedConnection := CurrentConnection;
      CurrentConnection := OtherTraversableConnectionFromNode(SavedConnection);
```

```
111  318  1  2           IF (CurrentConnection <> NilConnection) THEN
112  319  1  2             BEGIN

112  321  1  3               CurrentNode := EndNode(CurrentConnection);
113  322  1  3               IF (CurrentNode = StartingNode) THEN
114  323  1  3                 BEGIN

114  325  1  4                   SavedConnection := StartingConnection;
115  336  1  4                   CurrentConnection := NilConnection;
116  337  1  4                 END{For If}

117  329  1  3               ELSE IF (ExamineNodeTraversedFlag(CurrentNode)) THEN
119  330  1  3                 BEGIN

119  332  1  4                   SavedConnection := NilConnection;
120  333  1  4                   CurrentConnection := NilConnection;
121  334  1  4                 END{For Else If}

122  336  1  3             END{For If}

123  338  1  2           ELSE
124  339  1  2             SavedConnection := ReciprocalConnection(SavedConnection);

125  341  1  2         END;{For While}

127  343  1  1       EndConnectionOfPolyline := SavedConnection;

128  345  1  1     END;{EndConnectionOfPolyline}
129  346  0  0     $eject
                   {-----------------------------------------------------------------------}
                   {                                                                       }
                   {  FUNCTION:                                                            }
                   {        FirstTraversableConnectionFromNode:                            }
                   {                                Returns the first connection on the    }
                   {                                first traversable polyline attached to }
                   {                                the node passed in.                    }
                   {                                                                       }
                   {  ASSUMPTIONS:                                                         }
                   {        1) This subroutine will expect a valid node or connection,     }
                   {           otherwise the results will be unpredictable.                }
                   {                                                                       }
                   {  DATA STORAGE:                                                        }
                   {        NumberOfConn                The number of connections attached to }
                   {                                    the node inputed                   }
                   {                                                                       }
                   {        FarEnd                      The node at the far end of current }
                   {                                    polyline.                          }
                   {                                                                       }
                   {        NextConnection              Connection chosen.                 }
                   {                                                                       }
                   {  RETURN ASSUMPTIONS AND ERROR CONDITIONS:                             }
                   {                                                                       }
                   {        1) Value [ 0]               Means that no traversable polyline is }
                   {                                    attached to the node.              }
                   {-----------------------------------------------------------------------}
```

```
FUNCTION FirstTraversableConnectionFromNode(CurrentNode : NodePointer) : ConnectionPointer;
VAR
  I, NumberOfConn : Integer;
  FarEnd : NodePointer;
  NextConnection : ConnectionPointer;

BEGIN

  NextConnection := NilConnection;
  FarEnd := NilNode;
  NumberOfConn := NumberOfConnections(CurrentNode);
  I := GetConnectionNumber(CurrentNode);
  WHILE (I < NumberOfConn) AND (FarEnd = NilNode) DO
    BEGIN

      I := I + 1;
      FarEnd := EndConnectionOfPolyline(GetConnection(CurrentNode,I));
    END;{For While}
  FarEnd := GetConnection(FarEnd,0);
  IF (FarEnd <> NilNode) THEN
    BEGIN

      IF (FarEnd <> CurrentNode) AND
         (ListOfNodesIndex < ListOfNodeLimit) AND
         (NumberOfTraversableConnections(FarEnd) >= 1) THEN
        BEGIN

          ListOfNodesIndex := ListOfNodesIndex + 1;
          ListOfNodesToCheck[ListOfNodesIndex] := FarEnd;
        END;{For If}

      NextConnection := Getconnection(CurrentNode,I);
    END;

  FirstTraversableConnectionFromNode := NextConnection;

END;{FirstTraversableConnectionFromNode}
$eject
{-----------------------------------------------------------------------}
{                                                                       }
{  FUNCTION:                                                            }
{        FirstConnectionInPolyline :  Returns the Connection at one end }
{                                     of the polyline which contains the con-}
{                                     nection selected.                 }
{                                                                       }
{  ASSUMPTIONS:                                                         }
{                                                                       }
{        1) This subroutine will expect a valid Connection.            }
{                                                                       }
{  DATA STORAGE:                                                        }
{                                                                       }
{       ReverseConnect          Reciprocal of passed in connection.    }
{                                                                       }
{                                                                       }
```

```
                {  RETURN ASSUMPTIONS AND ERROR CONDITIONS:                             }
                {                                                                       }
                {       1) Value [ 0]             Means that the polyline has already   }
                {                                 been traversed.                       }
                {                                                                       }
                {                                                                       }
                {                                                                       }
                {                                                                       }
                {                                                                       }
                {-----------------------------------------------------------------------}

                FUNCTION FirstConnectionInPolyline(CurrentConnection : ConnectionPointer)
154 451  1  0                                    : ConnectionPointer;
155 452  1  0   VAR
                  ReverseConnection : ConnectionPointer;

156 455  1  0   Begin

156 457  1  1     ReverseConnection := ReciprocalConnection(CurrentConnection);
157 458  1  1     FirstConnectionInPolyline := EndConnectionOfPolyline(ReverseConnection);

158 460  1  1   END {FirstConnectionInPolyline}
159 461  0  0   select
                {-----------------------------------------------------------------------}
                {                                                                       }
                {  FUNCTION:                                                            }
                {       NextConnectionInPolyline :  Returns the next Connection in a   }
                {                                  polyline                             }
                {                                                                       }
                {  ASSUMPTIONS:                                                         }
                {                                                                       }
                {       1) This subroutine will expect a valid Connection.              }
                {                                                                       }
                {  DATA STORAGE:                                                        }
                {                                                                       }
                {       NextConnection            This is the next connection in the    }
                {                                 polyline.                             }
                {                                                                       }
                {       BeginNode                 Node at begining of polyline.         }
                {                                                                       }
                {       NextNode                  Node at end of current connection.    }
                {                                                                       }
                {  RETURN ASSUMPTIONS AND ERROR CONDITIONS:                             }
                {                                                                       }
                {       1) Value [ 0]             Means that the polyline has already   }
                {                                 been traversed.                       }
                {                                                                       }
                {                                                                       }
                {                                                                       }
                {                                                                       }
                {                                                                       }
                {-----------------------------------------------------------------------}

                FUNCTION NextConnectionInPolyline(CurrentConnection, BeginConnection :
159 494  1  0                                     ConnectionPointer) : ConnectionPointer;
```

```
VAR
  NextConnection : ConnectionPointer;
  NextNode, BeginNode : NodePointer;

BEGIN

  NextConnection := OtherTraversableConnectionFromNode(CurrentConnection);
  BeginNode := GetConnection(BeginConnection,0);
  NextNode := GetConnection(NextConnection,0);
  IF (NextNode = BeginNode) THEN
    NextConnection := NilConnection;

  IF (NextConnection <> NilConnection) THEN
    SetNodeTraversedFlag(NextConnection);

  NextConnectionInPolyline := NextConnection;

END;{NextConnectionInPolyline}
$eject
{--------------------------------------------------------------------}
{                                                                    }
{  FUNCTION:                                                         }
{        FirstPolylineInObject:  Returns the first connection in the }
{                                first polyline in an object and sets up}
{                                the stack and initializes Firstconnec-}
{                                tion.                               }
{                                                                    }
{  ASSUMPTIONS:                                                      }
{                                                                    }
{        1) This subroutine will expect a valid Node and if a nonexist-}
{           ant node is entered, the results will be unpredictable.  }
{                                                                    }
{  DATA STORAGE:                                                     }
{                                                                    }
{        FirstEnd                Node at the first end of the polyline.}
{                                                                    }
{  RETURN ASSUMPTIONS AND ERROR CONDITIONS:                          }
{                                                                    }
{        1) Value [ 0]           Means that the node has no traversable}
{                                polylines.                          }
{                                                                    }
{                                                                    }
{--------------------------------------------------------------------}

FUNCTION FirstPolylineInObject(CurrentNode : NodePointer) :
                                ConnectionPointer;
VAR
  FirstEnd : NodePointer;

BEGIN
  CurrentNode := GetConnection(CurrentNode,0);
```

```
174  550  1  1        ListOfNodesIndex := 0;
175  551  1  1        FirstConnection := FirstTraversableConnectionFromNode(CurrentNode);
176  552  1  1        ListOfNodesIndex := 0;
177  553  1  1        IF (FirstConnection <> NilConnection) THEN
178  554  1  1          BEGIN

178  556  1  2            FirstEnd := EndConnectionOfPolyline(FirstConnection);
179  557  1  2            FirstEnd := GetConnection(FirstEnd,0);
180  558  1  2            IF (FirstEnd <> NilNode) THEN
181  559  1  2              BEGIN

181  561  1  3                SetNodeTraversedFlag(FirstEnd);
182  562  1  3                FirstConnection := FirstTraversableConnectionFromNode(FirstEnd);
183  563  1  3              END;{For Node If}

185  565  1  2          END;{For Connection If}

187  567  1  1        FirstPolylineInObject := FirstConnection;
188  568  1  1      END;{FirstPolylineInObject}
189  569  0  0      $eject
                   {-------------------------------------------------------------------}
                   {                                                                   }
                   {  FUNCTION:                                                        }
                   {        NextPolylineInObject:   Returns the first connection in the }
                   {                                next polyline in an object and adjusts }
                   {                                the stack if necessary.            }
                   {                                                                   }
                   {  ASSUMPTIONS: NONE.                                               }
                   {                                                                   }
                   {  DATA STORAGE:                                                    }
                   {                                                                   }
                   {        CurrentNode              The next node from the stack to be }
                   {                                 checked.                          }
                   {                                                                   }
                   {  RETURN ASSUMPTIONS AND ERROR CONDITIONS:                         }
                   {                                                                   }
                   {        1) Value [ 0]           Means that the no more polyline can be }
                   {                                gotten from that choice of FirstPoly- }
                   {                                lineInObject.                      }
                   {                                                                   }
                   {                                                                   }
                   {                                                                   }
                   {                                                                   }
                   {                                                                   }
                   {-------------------------------------------------------------------}

                   FUNCTION NextPolylineInObject : ConnectionPointer;
190  598  1  0      VAR
                     CurrentNode : NodePointer;

191  602  1  0      BEGIN

191  604  1  1        IF (FirstConnection <> NilConnection ) THEN
```

```
192  605  1  1            BEGIN

192  607  1  2              FirstConnection := FirstTraversableConnectionFromNode(FirstConnection);
193  608  1  2              WHILE (FirstConnection = NilConnection) AND
                               (ListOfNodesIndex > 0) DO
194  610  1  2                BEGIN

194  612  1  3                  CurrentNode :=ListOfNodesToCheck[ListOfNodesIndex];
195  613  1  3                  ListOfNodesIndex := ListOfNodesIndex - 1;
196  614  1  3                  FirstConnection := FirstTraversableConnectionFromNode(CurrentNode);
197  615  1  3                END;{For While}

199  617  1  2              IF (FirstConnection <> Nilconnection) THEN
200  618  1  2                SetNodeTraversedFlag(FirstConnection);

201  620  1  2              NextPolylineInObject := FirstConnection;
202  621  1  2            END;

204  623  1  1          END;{NextPolylineInObject}
205  624  0  0          .
683 Lines Read.
  0 Errors Detected.
51% Utilisation of Memory.

4110 CP/M UDI2.1     8086/8087/8088 MACRO ASSEMBLER V1.1 ASSEMBLY OF MODULE CONNECTIONS
NO OBJECT MODULE REQUESTED
ASSEMBLER INVOKED BY:  D:ASM86 A:CONNECTA.ASM NOOJ EP PW(132) PR(D:CONNECTA.LST[G9]) WF(C:)

LOC  OBJ                  LINE     SOURCE

                             1 +1  $title('Connection Routines')
                             2
                             3
                             4
                             5
                             6
                             7
                             8
                             9
                            10     ;***************************************************************************
                            11     ;*
                            12     ;*        FILE NAME:        CONNECT.ASM
                            13     ;*
                            14     ;*        MODULE NAME:      Connections
                            15     ;*
                            16     ;*        SEGMENT NAME:     ConnectionSegment  (Code Segment)
                            17     ;*                          Nothing  (Data Segment)
                            18     ;*
                            19     ;*        LINKAGE/ACCESS:   Linked with TEKMAN main module.  Accessed by direct
                            20     ;*                          call within TEKMAN, Accessed through support vector
                            21     ;*                          from external .LTL modules.
                            22     ;*
                            23     ;*        FUNCTIONS:        Contains routines which deal specifically with
```

```
;*                      connections between nodes, such as connection traversal
;*                      and connection manipulation.
;*
;*
;*
;*
;*
;*      KNOWN BUGS:     None at SR1
;*
;*      ENHANCEMENTS:   Possibly streamline parts of code to use a
;*                      possible GetReciprocalConnFieldAddress.
;*
;*****************************************************************************
;
;
;                  Connection Routines
;

                   name          Connections


                   assume        cs:ConnectionSegment,
;                                ds:Nothing
;                                (note - some data is stored in the code segment)


                   public        CreateConnection,
;                                DeleteConnection,
;                                EdgeConnection,
;                                EndNode,
;                                GetConnectionInformation,
;                                InsertNodeIntoConnection,
;                                NumberOfConnections,
;                                ReciprocalConnection,
;                                GetConnFieldAddress,
;                                TransferConnectionField


              extrn              AllocateParagraph:far,
;                                DisposeParagraph:far,
;                                DeleteNode:far,
;                                GetConnectionField:far,
;                                GetFirstTileContainingLine:far,
;                                GetNextTileContainingLine:far,
;                                GetNodePointer:far,
;                                GetParagraphLink:far,
;                                GetTilePointer:far,
;                                NumberOfAvailableParagraphs:far,
;                                NumberOfTilesContainingLine:far,
;                                PixelMoveTransformed:far,
;                                PixelDrawTransformed:far,
;                                SetLineIndex:far
```

```
----      ConnectionSegment  segment

0080      AdditionalParaFlag      equ     80H
000F      BankFieldMask           equ     0FH
0090      BankSwitch              equ     90H
008F      ClearStatusMask         equ     8FH
00F0      ConnFieldMask           equ     0F0H
0003      ConnInPrimaryNode       equ     3
0001      ConnNumber1             equ     1
0070      ConnStateMask           equ     70H
0080      EdgeFlagMask            equ     80H
0003      LastConnInPara          equ     0011B
000E      MaxConnections          equ     14
0000      NilPointer              equ     0
0020      PseudoFlag              equ     20H
0010      VisibleUntaggedState    equ     10H

     +1   $eject

          ;FUNCTION CreateConnection ( Node1, Node2   : NodePointer;
          ;                             FilledAreaFlag : BOOLEAN;
          ;                             ConnectionState: StateType)
          ;                           : ConnectionPointer;
          ;
          ;    This function creates a Connection from Node1 to Node2 and a connection from
          ;    Node2 to Node1.
          ;        ERROR CODES: -1          - Insufficient memory to create the node
          ;                     -2          - Either or both nodes already have max number
          ;                                   of connections
          ;                     -3          - Either or both nodes are Pseudo nodes
          ;
          ;               entry:  sp                  pointer to parameters
          ;               exit:   dx:ax               ConnectionPointer or error code
          ;               blows:
          ;
          ;               AUTHOR: Rich Knowles
          ;
----      CCParameters    Struc
                                              ;TEMP STORAGE
0000      Num_pseudo_nodes dw    ?            ;count of pseudo-nodes needed
0002      Conn_Node1      db     ?            ;# of connections in node 1
0003      Conn_Node2      db     ?            ;# of connections in node 2
0004      Swap_flag       dw     ?            ;indicates proper x-major order
          ;
0006      CCold_bp        dw     ?
0008      CCold_ds        dw     ?
000A      CCret_addr      dd     ?
          ;
000E      CCConn_State    db     ?            ;state in which to place the connection
000F      CCfiller1       db     ?            ;unused space on the stack
0010      CCFilledAreaFlag db    ?            ;set if filled area to the right
0011      CCfiller2       db     ?            ;used space on the stack
0012      CCNode2_addr    dw     ?            ;node pointer ...
```

```
0014                 CCNode2_bank     dw      ?                       ;... to node 2
0016                 CCNode1_addr     dw      ?                       ;node pointer ...
0018                 CCNode1_bank     dw      ?                       ;... to node 1

----                 CCParameters     Ends
                     ;
0000                 CreateConnection Proc    Far

0000 1E                               push    ds                      ;save for Pascal
0001 55                               push    bp                      ;save for Pascal
0002 83EC06                           sub     sp,6                    ;reserve stack space for temp storage
0005 8BEC                             mov     bp,sp                   ;establish addressability to parameters
                     ;
                     ;Check to see if either node has the Pseudo flag set
                     ;
0007 8B4614                           mov     ax,[bp].CCNode2_bank    ;get bank #
000A 250F00                           and     ax,BankFieldMask        ;and only bank#
000D 894614                           mov     [bp].CCNode2_bank,ax    ;save so we don't keep masking
0010 E790                             out     BankSwitch,ax           ;switch to proper bank
0012 8E5E12                           mov     ds,[bp].CCNode2_addr    ;get paragraph address
0015 8A1E0000                         mov     bl,ds:byte ptr 0        ;get flag byte of node storage
0019 F6C320                           test    bl,PseudoFlag           ;is Pseudo flag set
001C 7517                             jnz     Ret_3                   ;Yes, return error 3
                     ;
001E 8B4618                           mov     ax,[bp].CCNode1_bank    ;get bank #
0021 250F00                           and     ax,BankFieldMask        ;and only bank#
0024 894618                           mov     [bp].CCNode1_bank,ax    ;save so we don't keep masking
0027 E790                             out     BankSwitch,ax           ;switch to proper bank
0029 8E5E16                           mov     ds,[bp].CCNode1_addr    ;get paragraph address
002C 8A1E0000                         mov     bl,ds:byte ptr 0        ;get flag byte of node storage
0030 F6C320                           test    bl,PseudoFlag           ;is Pseudo flag set
0033 740C                             jz      Check_max_conn          ;No, go check max connections
                     ;
0035 B8FFFF          Ret_3:           mov     ax,-1                   ;set up return ...
0038 99                               cwd                             ;... code of -3
0039 83C406                           add     sp,6                    ;clean up temp data storage
003C 5D                               pop     bp                      ;restore for Pascal
003D 1F                               pop     ds                      ;restore for Pascal
003E CA0A00                           ret     10                      ;return and remove 10 bytes from the stack
                     ;
                     ;Find out how many connections already exist in each of the nodes and
                     ;check to see if the connection already exists and so wouldn't need to be created
                     ;
0041 50              Check_max_conn:  push    ax                      ;set up arguments...
0042 1E                               push    ds                      ;...for following call
0043 9A0403----    R                  call    Far ptr NumberOfConnections ;returns ax
0048 884602                           mov     [bp].Conn_node1,al      ;save # of Connections
                     ;
004B 33DB                             xor     bx,bx                   ;init conn # variable
004D 3A5E02          Check_exist:     cmp     bl,[bp].Conn_node1      ;have we looked at all of them?
0050 7433                             je      Does_not_exist          ;if so then it doesn't exist
0052 43                               inc     bx                      ;look at next connection
0053 53                               push    bx                      ;save value for after call
0054 8B5618                           mov     dx,[bp].CCNode1_bank    ;paramter to ...
0057 8B4616                           mov     ax,[bp].CCNode1_addr    ;... following call
```

```
005A 9A0000----   E                          call    Far Ptr GetConnectionField ;returns dx:ax
005F 5B                                      pop     bx                       ;recover conn #
0060 3B4612                                  cmp     ax,[bp].CCNode2_addr     ;same as node 2?
0063 75E8                                    jne     Check_exist              ;nope - try next one
0065 81E20F00                                and     dx,BankFieldMask         ;clear unwanted bits
0069 3B5614                                  cmp     dx,[bp].CCNode2_bank     ;same as node 2?
006C 75DF                                    jne     Check_exist              ;nope - try next one
                                ;
006E D0E3                       Conn_exists: shl     bl,1                     ;shift ...
0070 D0E3                                    shl     bl,1                     ;... connection ...
0072 D0E3                                    shl     bl,1                     ;... number into ...
0074 D0E3                                    shl     bl,1                     ;... the high order nibble
0076 8B5618                                  mov     dx,[bp].CCNode1_bank     ;combine proper ...
0079 81E20F00                                and     dx,BankFieldMask         ;... connection number ...
007D 0AD3                                    or      dl,bl                    ;... with proper bank number
007F 8B4616                                  mov     ax,[bp].CCNode1_addr     ;para address to node 1
0082 E91301                                  jmp     CC_return                ;already exists - return
                                ;
0085 807E020E                   Does_not_exist: cmp  [bp].Conn_Node1.MaxConnections ;max connections?
0089 7313                                    jae     Ret_2                    ;Yes, return error 2
                                ;
008B FF7614                                  push    [bp].CCNode2_bank        ;set up arguments...
008E FF7612                                  push    [bp].CCNode2_addr        ;...for following call
0091 9AD403----   R                          call    Far ptr NumberOfConnections ;returns ax
0096 884603                                  mov     [bp].Conn_node2,al       ;save # of Connections
0099 3D0E00                                  cmp     ax,MaxConnections        ;max connections?
009C 720C                                    jb      Count_pseudo             ;Yes, return error 2
                                ;
009E B8FFFF                     Ret_2:       mov     ax,-1                    ;set up return ...
00A1 99                                      cwd                              ;... code of -2
00A2 83C406                                  add     sp,6                     ;clean up temp data storage
00A5 5D                                      pop     bp                       ;restore for Pascal
00A6 1F                                      pop     ds                       ;restore for Pascal
00A7 CA0A00                                  ret     10                       ;return and remove 10 bytes from the stack
                                ;
                                ;Count number of pseudo-nodes that will need to be created and set the
                                ;coordinate swap flag depending on whether the nodes are in X-major order or not
                                ;
00AA 8B4618                     Count_pseudo: mov    ax,[bp].CCNode1_bank     ;get to...
00AD E790                                    out     BankSwitch,ax            ;... node 1's ...
00AF 8E5E16                                  mov     ds,[bp].CCNode1_addr     ;... information
00B2 FF360C00                                push    ds:word ptr 12           ;get x value
00B6 FF360E00                                push    ds:word ptr 14           ;get y value
                                ;
00BA 8B4614                                  mov     ax,[bp].CCNode2_bank     ;get to...
00BD E790                                    out     BankSwitch,ax            ;... node 2's ...
00BF 8E5E12                                  mov     ds,[bp].CCNode2_addr     ;... information
00C2 FF360C00                                push    ds:word ptr 12           ;get x value
00C6 FF360E00                                push    ds:word ptr 14           ;get y value
                                ;
00CA 33F6                                    xor     si,si                    ;init swap indicator
00CC 9A0000----   E                          call    Far ptr NumberOfTilesContainingLine ;returns ax
00D1 3D0000                                  cmp     ax,0                     ;is ax < 0?
00D4 7D03                                    jge     $+5                      ;skip next two instructions if so
00D6 46                                      inc     si                       ;set flag value
```

```
00D7 F7D8                          neg      ax                        ;make positive
00D9 897604                        mov      [bp].Swap_flag,si         ;save swap flag
00DC 2D0200                        sub      ax,2                      ;don't want end point tiles
00DF 7302                          jnc      $+4                       ;if ax >= 2 then skip next instruction
00E1 33C0                          xor      ax,ax                     ;make it 0
00E3 894600                        mov      [bp].Num_pseudo_nodes,ax;init count of tiles returned

                   ;
                   ;Check to see if another paragraph will be needed for the added connection to either
                   ;node1 or node2.  Another paragraph is needed when the current connection count is
                   ;3, 7, or 11 (all of which uniquely have both lowest order bits set)
                   ;
00E6 8BC8          CheckConnSpace: mov      cx,ax                     ;init count of memory needed so far
00E8 8A4602                        mov      al,[bp].Conn_node1        ;recover # of connections for node 1
00EB 250300                        and      ax,LastConnInPara         ;extract last 2 bits of #
00EE 3D0300                        cmp      ax,LastConnInPara         ;are both bits set?
00F1 7501                          jne      $+3                       ;No, then another paragraph not needed
00F3 41                            inc      cx                        ;count of needed paragraphs
                   ;
00F4 8A4603                        mov      al,[bp].Conn_node2        ;recover # of connections for node 2
00F7 250300                        and      ax,LastConnInPara         ;extract last 2 bits of #
00FA 3D0300                        cmp      ax,LastConnInPara         ;are both bits set?
00FD 7501                          jne      $+3                       ;No, then another paragraph not needed
00FF 41                            inc      cx                        ;count of needed paragraphs
                   ;
                   ;Do we have enough memory to create the connecton? (cx contains the number of
                   ;paragraphs we need - one for each pseudo-node and each additional connection paragraph)
                   ;
0100 51                            push     cx                        ;save count
0101 9A0000----    E               call     Far ptr NumberOfAvailableParagraphs ;returns dx:ax
0106 59                            pop      cx                        ;recover count
0107 2BC1                          sub      ax,cx                     ;subtract amount needed ...
0109 83DA00                        sbb      dx,0                      ;... from amount available
010C 730C                          jnc      Go_do_links               ;memory is fine, go set up links
                   ;
010E B8FFFF                        mov      ax,-1                     ;Not enough memory, so set up ...
0111 99                            cwd               ;... return code of -1
0112 83C406                        add      sp,6                      ;clean up temp data storage
0115 5D                            pop      bp                        ;restore for Pascal
0116 1F                            pop      ds                        ;restore for Pascal
0117 CA0A00                        ret      10                        ;return and remove 10 bytes from the stack
                   ;
011A 837E0000      Go_do_links:    cmp      [bp].Num_pseudo_nodes,0 ;Are there any Pseudo-nodes to create?
011E 7E34                          jle      Create_connections        ;No, go create connections
                   ;
0120 8B7616        Create_pseudos: mov      si,[bp].CCNode1_addr      ;get Node 1's ...
0123 8B5E18                        mov      bx,[bp].CCNode1_bank      ;... node pointerv
0126 8A4602                        mov      al,[bp].Conn_node1        ;get node 1's connection count
0129 FEC0                          inc      al                        ;add 1 for connection being created
012B D0E0                          shl      al,1                      ;shift ...
012D D0E0                          shl      al,1                      ;... connection ...
012F D0E0                          shl      al,1                      ;... count ...
0131 D0E0                          shl      al,1                      ;... to high order nibble
0133 0AD8                          or       bl,al                     ;create connection pointer from node pointer
                   ;
```

```
0135 8B7E12          mov    di,[bp].CCNode2_addr     ;get Node 2's ...
0138 8B5614          mov    dx,[bp].CCNode2_bank     ;... node pointer
013B 8A4603          mov    al,[bp].Conn_node2       ;get node 2's connection count
013E FEC0            inc    al                       ;add 1 for connection being created
0140 D0E0            shl    al,1                     ;shift ...
0142 D0E0            shl    al,1                     ;... connection ...
0144 D0E0            shl    al,1                     ;... count ...
0146 D0E0            shl    al,1                     ;... to high order nibble
0148 0AD0            or     dl,al                    ;create connection pointer fron node pointer
                ;
014A 53              push   bx                       ;connection pointer ...
014B 56              push   si                       ;... to node 1
014C 52              push   dx                       ;connection pointer ...
014D 57              push   di                       ;... to node 2
014E FF7604          push   [bp].Swap_flag           ;
0151 E87C07          call   Near Ptr AllocatePseudos;create any needed pseudo nodes
                ;
                ;Put the state info into the proper format
                ;
                Create_connections:
0154 8A460E          mov    al,[bp].CCConn_state     ;get state ...
0157 D0E0            shl    al,1                     ;... and shift ...
0159 D0E0            shl    al,1                     ;... it into the ...
015B D0E0            shl    al,1                     ;... high order nibble ...
015D D0E0            shl    al,1                     ;... for use later
015F 88460E          mov    [bp].CCConn_state,al     ;save state in proper format
                ;
                ;Create connection from node 2 to node 1
                ;
0162 FF7614          push   [bp].CCnode2_bank        ;node pointer ...
0165 FF7612          push   [bp].CCnode2_addr        ;... to node 2
0168 8A4603          mov    al,[bp].Conn_node2       ;number of connections
016B 50              push   ax                       ;
016C FF7618          push   [bp].CCnode1_bank        ;node pointer ...
016F FF7616          push   [bp].CCnode1_addr        ;... to node 1
0172 8A560E          mov    dl,[bp].CCConn_State     ;set appropriate flags
0175 52              push   dx                       ;connection state information
0176 E8FF07          call   Near Ptr CreateConnectionField ;returns dx:ax (ignored)
                ;
                ;Create connection from node 1 to node 2
                ;
0179 FF7618          push   [bp].CCnode1_bank        ;node pointer ...
017C FF7616          push   [bp].CCnode1_addr        ;... to node 1
017F 8A4602          mov    al,[bp].Conn_node1       ;number of connections
0182 50              push   ax                       ;
0183 FF7614          push   [bp].CCnode2_bank        ;node pointer ...
0186 FF7612          push   [bp].CCnode2_addr        ;... to node 2
0189 8A560E          mov    dl,[bp].CCConn_State     ;set appropriate flags
018C 8A5E10          mov    bl,[bp].CCFilledAreaFlag ;set appropriate ...
018F D0CB            ror    bl,1                     ;... filled area flag ...
0191 0AD3            or     dl,bl                    ;... in connection
0193 52              push   dx                       ;connection state information
0194 E8E107          call   Near Ptr CreateConnectionField ;returns dx:ax
                ;
                ;All finished now, so clean up and return connection number from node 1 to node 2
```

```
                      ;
0197 83C406           CC_return:      add     sp,6                    ;clean up temp data storage
019A 5D                               pop     bp                      ;restore for Pascal
019B 1F                               pop     ds                      ;restore for Pascal
019C CA0A00                           ret     10                      ;return and remove 10 bytes from the stack

                      CreateConnection Endp

                 +1   $eject

                      ;PROCEDURE DeleteConnection (ConnectionPointer);
                      ;
                      ;               entry:  sp              pointer to parameters
                      ;               exit:   none
                      ;               blows:
                      ;
----                  DCparameters    STRUC

0000                  DCend_node_ptr  dw      ?,?

0004                  DCold_ds        dw      ?
0006                  DCold_bp        dw      ?
0008                  DCret_addr      dd      ?

000C                  DCconn_addr     dw      ?
000E                  DCconn_bank     dw      ?

----                  DCparameters    ENDS


019F                  DeleteConnection        Proc    Far

019F 55                               push    bp                      ;save value for calling routine
01A0 1E                               push    ds                      ;save value for calling routine
01A1 83EC04                           sub     sp,4                    ;make room for temp storage
01A4 8BEC                             mov     bp,sp                   ;addressability
                      ;
01A6 FF760E                           push    [bp].DCconn_bank        ;
01A9 FF760C                           push    [bp].DCconn_addr        ;
01AC 9A3704----*   R                  call    Far Ptr ReciprocalConnection ;returns dx:ax
                      ;
01B1 3D0000                           cmp     ax,NilPointer           ;does recip conn exist?
01B4 743E                             je      DC_finished             ;if not, then quit
                      ;
                      ;Set up parameters to delete a connection entry - Delete the reciprocal
                      ;connection first since already set up
                      ;
01B6 895602                           mov     [bp].DCend_node_ptr+2,dx ;save recip conn info
01B9 894600                           mov     [bp].DCend_node_ptr,ax  ;
01BC 8ED8                             mov     ds,ax                   ;
01BE FF360C00                         push    ds:Word Ptr 12          ;push X value and Y ...
01C2 FF360E00                         push    ds:Word Ptr 14          ;... for later call to PixelMove
01C6 52                               push    dx                      ;
01C7 50                               push    ax                      ;
01C8 E81C06                           call    Near Ptr DeleteConnectionField
                      ;
```

```
                               ;Set up parameters to delete original connection field
                               ;
01CB 8B460E                                    mov     ax,[bp].DCconn_bank       ;
01CE 8BD0                                      mov     dx,ax                     ;
01D0 250F00                                    and     ax,BankFieldMask          ;
01D3 E790                                      out     BankSwitch,ax             ;
01D5 8E5E0C                                    mov     ds,[bp].DCconn_addr       ;
01D8 FF360C00                                  push    ds:Word Ptr 12            ;push X value and Y ...
01DC FF360E00                                  push    ds:Word Ptr 14            ;... for later call to PixelDraw
01E0 52                                        push    dx                        ;
01E1 1E                                        push    ds                        ;
01E2 E80206                                    call    Near Ptr DeleteConnectionField
                               ;
                               ;Now must delete any pseudo nodes that belong with that connection
                               ;
01E5 FF760E                                    push    [bp].DCconn_bank          ;
01E8 FF760C                                    push    [bp].DCconn_addr          ;
01EB FF7602                                    push    [bp].DCend_node_ptr+2     ;
01EE FF7600                                    push    [bp].DCend_node_ptr       ;
01F1 E88905                                    call    Near Ptr DeletePseudoNodes ;
                               ;
01F4 33C9                      DC_finished:    xor     cx,cx                     ;clear high-order for call
01F6 51                                        push    cx                        ;parameter to call
01F7 9A0000----         E                      call    far ptr SetLineIndex      ;set color to invisible
                               ;next two calls use values that were placed on the stack earlier.
01FC 9A0000----         E                      call    far ptr PixelMoveTransformed ;move beam to first location
0201 9A0000----         E                      call    far ptr pixelDrawTransformed ;draw line to second location
                               ;
0206 83C404                                    add     sp,4                      ;clean up temp storage
0209 1F                                        pop     ds                        ;restore value for calling routine
020A 5D                                        pop     bp                        ;restore value for calling routine
020B CA0400                                    ret     4                         ;return, pop 4 bytes

                               DeleteConnection        Endp

                           +1  $eject

                               ;
                               ;FUNCTION EdgeConnection (CurrentConnection : ConnectionPointer) : ConnectionPointer;
                               ;
                               ;     If the current connection is an edge of a filled area, this function returns
                               ;     the connection with the proper directionality to conform to the right hand
                               ;     rule; otherwise, NilConnection is returned.  The returned connection is either
                               ;     the CurrentConnection, the ReciprocalConnection, or NilConnection.
                               ;
                               ;               entry:  sp               pointer to parameters
                               ;               exit:   dx:ax            conection pointer
                               ;               blows:
                               ;
                               ;               AUTHOR: Rich Knowles
                               ;
----                           ECParameters    Struc

0000                           ECold_ds        dw      ?
0002                           ECold_bp        dw      ?
```

```
0004                    ECret_addr      dd      ?
0008                    ECconn_addr     dw      ?
000A                    ECconn_bank     dw      ?

----                    ECParameters    Ends
                        ;
020E                    EdgeConnection  Proc    Far

020E 55                                 push    bp                  ;save for Pascal
020F 1E                                 push    ds                  ;save for Pascal
0210 8BEC                               mov     bp,sp               ;establish addressability to parameters
0212 B8----        R                    mov     ax,Conn_Info        ;establish addressability ...
0215 8ED8                               mov     ds,ax               ;... to storage variables
                        ;
                        ;Find out if the CurrentConnection is an edge
                        ;
0217 1E                                 push    ds                          ;save for after call
0218 FF760A                             push    [bp].ECconn_bank            ;push connection pointer...
021B FF7608                             push    [bp].ECconn_addr            ;...onto stack for call
021E 1E                                 push    ds                          ;push address of ...
021F B80000                             mov     ax,offset Edge_flag         ;
0222 50                                 push    ax                          ;... returned variable
0223 1E                                 push    ds                          ;push address of ...
0224 B80100                             mov     ax,offset State_Flags       ;
0227 50                                 push    ax                          ;... returned variable
0228 9A9E02----    R                    call    Far ptr GetConnectionInformation
                                                                            ;returns conn flags
022D 1E                                 pop     ds                          ;restore es register
022E 3D0000                             cmp     ax,NilPointer               ;bad connection?
0231 743B                               je      Finished                    ;if so, return nil
                        ;
0233 803E000000                         cmp     ds:Edge_Flag,0              ;was it an edge?
0238 7409                               je      Try_Reciprocal              ;No, try recip connection
                        ;
023A 8B560A                             mov     dx,[bp].ECconn_bank         ;Yes, pass back ...
023D 8B4608                             mov     ax,[bp].ECconn_addr         ;... CurrentConnection
0240 EB2C90                             jmp     Finished
                        ;
                        ;Since current connection was not an edge we will try the reciprocal connection
                        ;
0243 FF760A             Try_Reciprocal: push    [bp].ECconn_bank            ;push connection pointer...
0246 FF7608                             push    [bp].ECconn_addr            ;...onto stack for call
0249 9A3704----    R                    call    Far ptr ReciprocalConnection
                                                                            ;returns dx:ax
024E 52                                 push    dx                          ;save reciprocal connection...
024F 50                                 push    ax                          ;...pointer for later
0250 52                                 push    dx                          ;push reciprocal connection...
0251 50                                 push    ax                          ;...pointer for call
0252 1E                                 push    ds                          ;push address of ...
0253 B80000                             mov     ax,offset Edge_Flag         ;
0256 50                                 push    ax                          ;... returned variable
0257 1E                                 push    ds                          ;push address of...
0258 B80100                             mov     ax,offset State_Flags       ;
025B 50                                 push    ax                          ;... returned variable
025C 9A9E02----    R                    call    Far ptr GetConnectionInformation
```

```
                                                                 ;returns flags
0261 58                                 pop     ax               ;restore regs to reciprocal...
0262 5A                                 pop     dx               ;...connection pointer
0263 803E000001                         cmp     ds:Edge_Flag,1   ;was it an edge?
0268 7404                               je      Finished         ;yes, return reciprocal conn
                 ;
                 ;Neither CurrentConnection nor ReciprocalConnection were edges so return nil
                 ;
026A 33C0                               xor     ax,ax            ;set returned pointer...
026C 33D2                               xor     dx,dx            ;... to NilConnection
                 ;
026E 1F          Finished:              pop     ds               ;restore for Pascal
026F 5D                                 pop     bp               ;restore for Pascal
0270 CA0400                             ret     4                ;remove 4 byte from stack and return
                 ;
                 EdgeConnection         Endp

----             Conn_Info              Segment

0000 ??          Edge_Flag              db      ?
0001 ??          State_Flags            db      ?

----             Conn_Info              Ends

                 $eject

                 ;FUNCTION EndNode (Connection : ConnectionPointer) : NodePointer;
                 ;
                 ;     This function returns the node at the end of the specified connection.
                 ;     NilNode will be returned in case of error.
                 ;     NOTE: A NODE pointer is returned, not a CONNECTION.
                 ;
                 ;                      entry:  sp                       pointer to paramters
                 ;                      exit:   dx:ax                    node pointer
                 ;                      blows:
                 ;
                 ;                      AUTHOR: Rich Knowles
                 ;
----             ENParameters           Struc

0000             ENold_bp               dw      ?
0002             ENold_ds               dw      ?
0004             ENret_addr             dd      ?
0008             ENconn_addr            dw      ?                ;pointer to ...
000A             ENconn_bank            dw      ?                ;...current connection

----             ENParameters           Ends
                 ;
0273             EndNode                Proc    Far

0273 1E                                 push    ds               ;save for Pascal
0274 55                                 push    bp               ;save for Pascal
0275 8BEC                               mov     bp,sp            ;establish addressablity to parameters
                 ;
0277 8B560A                             mov     dx,[bp].ENconn_bank      ;conn# and bank# of connection
```

```
027A 8B4608          mov     ax,[bp].ENconn_addr       ;paragraph address of connection
027D 3D0000          cmp     ax,NilPointer             ;were we passed in a nil?
0280 7417            je      EN_return                 ;if so then pass it back out
                ;
0282 8ADA            mov     bl,dl                     ;move conn# and bank#
0284 81E3F000        and     bx,ConnFieldMask          ;pick out Conn#
0288 D1EB            shr     bx,1                      ;shift ...
028A D1EB            shr     bx,1                      ;... conn # ...
028C D1EB            shr     bx,1                      ;... to low order ...
028E D1EB            shr     bx,1                      ;... nibble
0290 9A0000----  E   call    Far ptr GetConnectionField ;Near Call - returns dx:ax
0295 81E20F00        and     dx,BankFieldMask          ;just leave bank#
                ;
0299 5D         EN_return:   pop     bp                ;restore for Pascal
029A 1E              pop     ds                        ;restore for Pascal
029B CA0400          ret     4                         ;remove 4 bytes from stack and return
                ;
                EndNode      Endp

                $eject

                ;PROCEDURE GetConnectionInformation (Connection : ConnectionPointer;
                ;                                   VAR Edge    : BOOLEAN;
                ;                                   VAR State   : StateType);
                ;
                ;    This procedure extracts information about the specified connection.
                ;
                ;            entry:  sp             pointer to parameters
                ;            exit:   none           values are stored directly
                ;            blows:
                ;
                ;            AUTHOR: Rich Knowles
                ;
----            GCIParameters   Struc

0000            GCIold_bp       dw      ?
0002            GCIold_ds       dw      ?
0004            GCIret_addr     dd      ?
0008            GCIconn_state_O dw      ?               ;address of ...
000A            GCIconn_state_S dw      ?               ;... state variable
000C            GCIconn_edge_O  dw      ?               ;address of ...
000E            GCIconn_edge_S  dw      ?               ;... edge variable
0010            GCIconn_addr    dw      ?               ;value of ...
0012            GCIconn_bank    dw      ?               ;... connection pointer

----            GCIParameters   Ends
                ;
029E            GetConnectionInformation Proc   Far

029E 1E              push    ds                        ;save for Pascal
029F 55              push    bp                        ;save for Pascal
02A0 8BEC            mov     bp,sp                     ;establish addressablility to parameters
                ;
02A2 8B5612          mov     dx,[bp].GCIconn_bank      ;desired conn# and bank#
02A5 8B4610          mov     ax,[bp].GCIconn_addr      ;paragraph address of connection
```

```
02A8 8BDA                     mov     bx,dx                   ;
02AA 81E3F000                 and     bx,ConnFieldMask        ;extract conn #
02AE D1EB                     shr     bx,1                    ;shift ...
02B0 D1EB                     shr     bx,1                    ;... conn # ...
02B2 D1EB                     shr     bx,1                    ;... to low order ...
02B4 D1EB                     shr     bx,1                    ;... nibble
02B6 9A0000----     E         call    Far ptr GetConnectionField ;returns dx:ax
02BB 8AC2                     mov     al,dl                   ;
02BD 2480                     and     al,EdgeFlagMask         ;pick out edge flag bit
02BF D0C0                     rol     al,1                    ;shift high-order bit to low-order
02C1 8E5E0E                   mov     ds,[bp].GCIconn_edge_S  ;segment address of edge variable
02C4 8B5E0C                   mov     bx,[bp].GCIconn_edge_O  ;offset address of edge varialbe
02C7 8807                     mov     [bx],al                 ;store edge flag at variable's address
02C9 80E270                   and     dl,ConnStateMask        ;pick out state bits
02CC D0EA                     shr     dl,1                    ;shift ...
02CE D0EA                     shr     dl,1                    ;... state bits ...
02D0 D0EA                     shr     dl,1                    ;... to low order ...
02D2 D0EA                     shr     dl,1                    ;... nibble
02D4 8E5E0A                   mov     ds,[bp].GCIconn_state_S ;segment address of state variable
02D7 8B5E08                   mov     bx,[bp].GCIconn_state_O ;offset address of state variable
02DA 8817                     mov     [bx],dl                 ;store state flags at variable's address
                      ;
02DC 5D                       pop     bp                      ;restore for Pascal
02DD 1F                       pop     ds                      ;restore for Pascal
02DE CA0C00                   ret     12                      ;remove 12 bytes from stack and return
                      ;
                      GetConnectionInformation Endp

                   +1 $eject

                      ;FUNCTION InsertNodeIntoConnection ( Connection   : ConnectionPointer;
                      ;                                   X, Y          : INTEGER)
                      ;                                 : ConnectionPointer;
                      ;
                      ;    This function creates a new node and inserts it into # connection.
                      ;       ERROR CODES: NilConnection - connection does not exist
                      ;                    -1            - Insufficient memory to create the node
                      ;                    -2            - connection not visible and/or untagged
                      ;                    -3            - Node already exists at specified position
                      ;
                      ;             entry:  sp                   pointer to parameters
                      ;             exit:   dx:ax                ConnectionPointer or error code
                      ;             blows:
                      ;
                      ;             AUTHOR: Rich Knowles
                      ;
----                  INICParameters  Struc

0000                  INICrecip_addr  dw      ?
0002                  INICrecip_bank  dw      ?

0004                  INICold_bp      dw      ?
0006                  INICold_ds      dw      ?
0008                  INICret_addr    dd      ?
```

```
000C                  INICy_pos          dw      ?
000E                  INICx_pos          dw      ?
0010                  INICconn_addr      dw      ?
0012                  INICconn_bank      dw      ?

----                  INICParameters   Ends
                      ;
02E1                  InsertNodeIntoConnection Proc   Far

02E1 1E                                push    ds                     ;save for Pascal
02E2 55                                push    bp                     ;save for Pascal
02E3 83EC04                            sub     sp,4                   ;reserve TEMP storage
02E6 8BEC                              mov     bp,sp                  ;establish addressablility to parameters
                      ;
                      ;Check to see if the connection is in the proper state
                      ;
02E8 8B5612                            mov     dx,[bp].INICconn_bank   ;load conn # and bank #
02EB 8B4610                            mov     ax,[bp].INICconn_addr   ;load node segment address
02EE 8BDA                              mov     bx,dx                  ;
02F0 32FF                              xor     bh,bh                  ;make sure high order is zero
02F2 D1EB                              shr     bx,1                   ;shift ...
02F4 D1EB                              shr     bx,1                   ;... conn # ...
02F6 D1EB                              shr     bx,1                   ;... to the low order ...
02F8 D1EB                              shr     bx,1                   ;... nibble
02FA 9A8F04---- R                      call    Far ptr GetConnFieldAddress ;returns es:si
02FF 268A14                            mov     dl,es:[si]             ;get flags and bank #
0302 80E210                            and     dl,VisibleUntaggedState ;is connection ...
0305 80FA10                            cmp     dl,VisibleUntaggedState ;... visible and untagged?
0308 740C                              je      VisibleUntagged        ;Yes, it is in proper state
                      ;
030A B8FFFF                            mov     ax,-1                  ;set up error ...
030D 99                                cwd                            ;... code of -2
030E 83C404                            add     sp,4                   ;clean up TEMP storage
0311 5D                                pop     bp                     ;restore for Pascal
0312 1F                                pop     ds                     ;restore for Pascal
0313 CA0A00                            ret     10                     ;remove 10 bytes from stack and return
                      ;
                      VisibleUntagged:
                      %
0316 06                                push    es                     ;save conn field ...
0317 56                                push    si                     ;... address
0318 268B4401                          mov     ax,es:[si+1]           ;get node pointer
031C 50                                push    ax                     ;save conn field ...
031D 52                                push    dx                     ;... value
                      ;
                      ;
                      ;Get the connection at the end node and save it - use ReciprocalConnection
                      ;
031E FF7612                            push    [bp].INICconn_bank     ;push start ...
0321 FF7610                            push    [bp].INICconn_addr     ;... connection value
0324 9A3704---- R                      call    Far ptr ReciprocalConnection ;returns dx:ax
0329 895602                            mov     [bp].INICrecip_bank,dx ;save pointer to ...
032C 894600                            mov     [bp].INICrecip_addr,ax ;... reciprocal connection
                      ;
                      ;Create the new node
                      ;
```

```
032F FF760E                     push    [bp].INICx_pos          ;set up parameters ...
0332 FF760C                     push    [bp].INICy_pos          ;... for following call
0335 9A0000----      E          call    Far ptr GetNodePointer  ;returns dx:ax
033A 3D0000                     cmp     ax,NilPointer           ;was node successfully allocated?
033D 750F                       jne     Allocated               ;Yes, check further though
                        ;
033F B8FFFF                     mov     ax,-1                   ;set up error ...
0342 99                         cwd                             ;... code of -1
0343 83C408                     add     sp,8                    ;clean up the stack
0346 83C404                     add     sp,4                    ;clean up TEMP storage
0349 5D                         pop     bp                      ;restore for Pascal
034A 1F                         pop     ds                      ;restore for Pascal
034B CA0A00                     ret     10                      ;remove 10 bytes from stack and return
                        ;
                        ;Did the node already exist - a non-nil first connection field will tell us
                        ;
034E 8EC0               Allocated:      mov     es,ax
0350 26A10200                   mov     ax,es:word ptr 2        ;get value of first pointer field
0354 3D0000                     cmp     ax,NilPointer           ;is it a NilPointer?
0357 740E                       je      SetConnections          ;Yes, go set up the connections
                        ;
0359 B8FDFF                     mov     ax,-3                   ;set up error ...
035C 99                         cwd                             ;... code of -3
035D 83C408                     add     sp,8                    ;clean up the stack
0360 83C404                     add     sp,4                    ;clean up TEMP storage
0363 5D                         pop     bp                      ;restore for Pascal
0364 1F                         pop     ds                      ;restore for Pascal
0365 CA0A00                     ret     10                      ;remove 10 bytes from stack and return
                        ;
                        ;Create Connection from new node to end node (copy information from start node)
                        ;    |----------------------------------------->|
                        ;    |start          new------------------->end|    will be like this
                        ;    |<-----------------------------------------|
                        ;
0368 58                 SetConnections: pop     ax              ;bank & flags in start node conn field
0369 26A20300                   mov     es:byte ptr 3,al        ;store connection info (to end node) ...
036D 268F060400                 pop     es:word ptr 4           ;... into 1st connection of new node
                        ;
                        ;Create connection from start node to new node (overwrite connection from start
                        ;node to end node).
                        ;    |--------------->| |--------------------->|
                        ;    |start            new                 end|    will be like this
                        ;    |<-----------------------------------------|
                        ;
0372 5E                         pop     si                      ;recover address of connection...
0373 1F                         pop     ds                      ;... field in start node
0374 8B4612                     mov     ax,[bp].INICconn_bank   ;get proper bank # of the start ...
0377 250F00                     and     ax,BankFieldMask        ;... node and insure we are-...
037A E790                       out     BankSwitch,ax           ;... in the proper memory bank
037C 8024F0                     and     ds:byte ptr[si],ConnFieldMask ;save conn flags and ...
037F 0814                       or      ds:[si],dl              ;... combine it with new node's bank
0381 8C4401                     mov     ds:[si+1],es            ;replace end node ptr with new node ptr
0384 52                         push    dx                      ;save bank# of new node
0385 06                         push    es                      ;save paragraph address of new node
                        ;
```

```
                          ;get the address of the connection field returned by ReciprocalConnection
                          ;
0386 8B5602                        mov     dx,[bp].INI[recip_bank    ;recover the pointer to ...
0389 8B4600                        mov     ax,[bp].INI[recip_addr    ;... the reciprocal connection
038C 8BDA                          mov     bx,dx                     ;break out ...
038E 32FF                          xor     bh,bh                     ;... the ...
0390 D1EB                          shr     bx,1                      ;... connection ...
0392 D1EB                          shr     bx,1                      ;... number ...
0394 D1EB                          shr     bx,1                      ;... for ...
0396 D1EB                          shr     bx,1                      ;... call
0398 9A8F04----      R             call    Far ptr GetConnFieldAddress ;returns es:si
                          ;
                          ;Replace connection to start node with connection to new node
                          ;    |---------------->| |--------------------->|
                          ;    |start             new                 end|   will be like this
                          ;    |                   |<---------------------|
                          ;
039D 58                            pop     ax                        ;recover node pointer ...
039E 5A                            pop     dx                        ;... to new node
039F 268A1C                        mov     bl,byte ptr es:[si]       ;save node ...
03A2 53                            push    bx                        ;... pointer to ...
03A3 26FF7401                      push    word ptr es:[si+1]        ;... start node
03A7 26894401                      mov     es:[si+1],ax              ;replace old pointer with new pointer
03AB 268024F0                      and     byte ptr es:[si],ConnFieldMask ;get conn flags
03AF 260814                        or      es:[si],dl                ;combine old flags with new bank #
                          ;
                          ;Create connection from new node to start node
                          ;    |---------------->| |--------------------->|
                          ;    |start             new                 end|   will be like this
                          ;    |<----------------| |<---------------------|
                          ;
03B2 81E20F00                      and     dx,BankFieldMask          ;get bank # of ...
03B6 92                            xchg    ax,dx                     ;... new node and ...
03B7 E790                          out     BankSwitch,ax             ;... switch to proper bank
03B9 8EDA                          mov     ds,dx                     ;seg reg now points to new node
03BB 8F060700                      pop     ds:Word Ptr 7             ;store node pointer ...
03BF 5A                            pop     dx                        ;... to start node into ...
03C0 88160600                      mov     ds:Byte Ptr 6,dl          ;... connection 2 of new node
                          ;
                          ;all connections created and flags set, so we are done now!
                          ;
03C4 8BD0                          mov     dx,ax                     ;return pointer to ...
03C6 81CA1000                      or      dx,10H                    ;... connection 1 of ...
03CA 8CD8                          mov     ax,ds                     ;... new node
03CC 83C404                        add     sp,4                      ;clean up TEMP storage
03CF 5D                            pop     bp                        ;restore for Pascal
03D0 1F                            pop     ds                        ;restore for Pascal
03D1 CA0A00                        ret     10                        ;remove 10 bytes from stack and return

                          InsertNodeIntoConnection Endp

                     +1   $eject
```

```
                      ;FUNCTION NumberOfConnections ( Node : NodePointer) : INTEGER;
                      ;
                      ;    This function returns the number of connections to a specified node.
                      ;
                      ;              entry:  sp                        pointer to parameters
                      ;              exit:   ax                        number of connections
                      ;              blows:
                      ;
                      ;              AUTHOR: Rich Knowles
                      ;
----                  NOCParameters  Struc

0000                  NOCold_bp      dw      ?
0002                  NOCold_ds      dw      ?
0004                  NOCret_addr    dd      ?
0008                  NOCnode_addr   dw      ?
000A                  NOCnode_bank   dw      ?

----                  NOCParameters  Ends
                      ;
03D4                  NumberOfConnections    Proc    Far

03D4 1E                              push    ds                        ;save for Pascal
03D5 55                              push    bp                        ;save for Pascal
03D6 8BEC                            mov     bp,sp                     ;establish addressability to parameters
                      ;
03D8 8B460A                          mov     ax,[bp].NOCnode_bank      ;get bank #
03DB 250F00                          and     ax,BankFieldMask          ;make sure just bank #
03DE E790                            out     BankSwitch,ax             ;switch to proper memory bank
03E0 8E4608                          mov     es,[bp].NOCnode_addr      ;set segment address to node paragraph
03E3 33C9                            xor     cx,cx                     ;initialize connection count
03E5 26F606000080                    test    es:byte ptr 0,AdditionalParaFlag
                                                                       ;more than 1 paragraph?
03EB 7426                            jz      FinalCount                ;No, then count ones in this para
                      ;
03ED 83C102                          add     cx,2                      ;Yes, then count the 3 in this para
03F0 26A00900                        mov     al,es:byte ptr 9          ;bank # of next paragraph
03F4 268E060A00                      mov     es,es:word ptr 10         ;paragraph address
                      ;
03F9 E790             LinkLoop:      out     BankSwitch,ax             ;switch to proper memory bank
03FB 26F6060F0080                    test    es:byte ptr 15,AdditionalParaFlag
                                                                       ;more paragraphs?
0401 7410                            jz      FinalCount                ;No, then count ones in this paragraph
                      ;
0403 83C104                          add     cx,4                      ;Yes, then count the 4 in this para
0406 26A00C00                        mov     al,es:byte ptr 12         ;bank # of next paragraph
040A 268B1E0D00                      mov     bx,es:word ptr 13         ;paragraph pointer ...
040F 8EC3                            mov     es,bx                     ;... of next paragraph
0411 EBE6                            jmp     LinkLoop                  ;loop till all paragraph gottenm
                      ;
0413 8BC1             FinalCount:    mov     ax,cx                     ;put current count into final register
0415 BB0100                          mov     bx,1                      ;set offset to para pointer address
0418 B90500                          mov     cx,5                      ;set max pointer count
```

```
041B 3D0000                            cmp     ax,0                   ;Primary paragraph only?
041E 7506                              jne     ThisParaCount          ;No, then factors set right
0420 B90300                            mov     cx,ConnInPrimaryNode   ;max pointers in primary paragraph
0423 BB0400                            mov     bx,4                   ;pointer offset in primary paragraph
0426 26833F00           ThisParaCount: cmp     word ptr es:[bx],NilPointer ;field contain NilPointer?
042A 7406                              je      AllCounted             ;if so then we've counted them all
042C 40                                inc     ax                     ;if not then count it
042D 83C303                            add     bx,3                   ;bump offset to next pointer
0430 E2F4                              loop    ThisParaCount          ;count all pointers (until cx=0 or NilPointer)
                        ;
0432 5D                 AllCounted:    pop     bp                     ;restore for Pascal
0433 1F                                pop     ds                     ;restore for Pascal
0434 CA0400                            ret     4                      ;remove 4 bytes from stack and return

                        NumberOfConnections    Endp

                    +1  $eject

                        ;FUNCTION ReciprocalConnection ( Connection : ConnectionPointer)
                        ;                               : ConnectionPointer;
                        ;
                        ;    This function returns the reciprocal connection (the connection starting at
                        ;    the opposite node and having the opposite directionality) of the specified
                        ;    connection.
                        ;
                        ;               entry:  sp                    pointer to parameters
                        ;               exit:   dx:ax                 reciprocal connection or NilPointer
                        ;               blows:
                        ;
                        ;               AUTHOR: Rich Knowles
                        ;
----                    RCParameters    Struc

0000                    RCold_ds        dw      ?
0002                    RCold_bp        dw      ?
0004                    RCret_addr      dd      ?
0008                    RCconn_addr     dw      ?
000A                    RCconn_bank     dw      ?

----                    RCParameters    Ends
                        ;
0437                    ReciprocalConnection    Proc    Far

0437 55                                push    bp                     ;save for Pascal
0438 1E                                push    ds                     ;save for Pascal
0439 8BEC                              mov     bp,sp                  ;establish addressablity to parameters
                        ;
043B FF760A                            push    [bp].RCconn_bank       ;pass parameter ...
043E FF7608                            push    [bp].RCconn_addr       ;... into EndNode
0441 9A7302----     R                  call    Far ptr EndNode        ;returns dx:ax
0446 3D0000                            cmp     ax,NilPointer          ;does End Node exist?
0449 743F                              je      Ret_Nil                ;No, so return NilPointer
                        ;
044B 81660A0F00                        and     [bp].RCconn_bank,BankFieldMask
                                                                      ;remove conn # from argument
```

```
0450 33DB                           xor     bx,bx                    ;init conn # register
0452 52                             push    dx                       ;save end nodes ...
0453 50                             push    ax                       ;... node pointer
0454 43             FindConn:       inc     bx                       ;increment conn #
0455 53                             push    bx                       ;save current # for after call
0456 9A0000----   E                 call    Far ptr GetConnectionField ;get pointer at connection [bx]
045B 3D0000                         cmp     ax,NilPointer            ;did that connection exist?
045E 7427                           je      Ret_Nil_Cleanup          ;no, means we've looked at them ...
                                                                     ;... all and didn't find right one, ...
                                                                     ;... so return NilPointer
0460 3B4608                         cmp     ax,[bp].RCconn_addr      ;same paragraph address?
0463 7509                           jne     NextConn.                ;No, get next connection
                    ;
0465 81E20F00                       and     dx,BankFieldMask         ;pick out bank #
0469 3B560A                         cmp     dx,[bp].RCconn_bank      ;same bank address?
046C 7407                           je      FoundConn                ;Yes, then found it!
                    ;
046E 5B             NextConn:       pop     bx                       ;restore connection count
046F 58                             pop     ax                       ;restore ax to end node pointer
0470 5A                             pop     dx                       ;restore dx to end node bank #
0471 52                             push    dx                       ;save ds for next time
0472 50                             push    ax                       ;save ax for next time
0473 EBDF                           jmp     FindConn                 ;try next conn field in end node
                    ;
                    ;Found proper connection - pack in connection number and return
                    ;
0475 5B             FoundConn:      pop     bx                       ;restore connection count
0476 58                             pop     ax                       ;restore end node pointer
0477 5A                             pop     dx                       ;restore end node bank #
0478 D1E3                           shl     bx,1                     ;shift ...
047A D1E3                           shl     bx,1                     ;... conn count ...
047C D1E3                           shl     bx,1                     ;... to high order ...
047E D1E3                           shl     bx,1                     ;... nibble
0480 0BD3                           or      dx,bx                    ; combine bank # and Conn #
0482 1F                             pop     ds                       ;restore for Pascal
0483 5D                             pop     bp                       ;restore for Pascal
0484 CA0400                         ret     4                        ;remove 4 byte from stack and return
                    ;
0487 83C406         Ret_Nil_Cleanup:add     sp,6                     ;remove 6 bytes from stack
048A 1F             Ret_Nil:        pop     ds                       ;restore for Pascal
048B 5D                             pop     bp                       ;restore for Pascal
048C CA0400                         ret     4                        ;remove 4 bytes from stack and returen
                    ;
                    ReciprocalConnection    Endp

               +1   $eject
                    ;
                    ; WARNING! NON-STANDARD LINKAGE!
                    ;
                    ;       GetConnFieldAddress (*** NOT CALLABLE FROM PASCAL!  ASM-86 ONLY! ***)
                    ;               entry:
                    ;                       dx:ax := primary node pointer
                    ;                       bx    := desired connection number
                    ;               blows:
```

```
                  ;                 all registers
                  ;          returns:
                  ;                 es:si := address of connection pointer (nil if non-existant)
                  ;                 NO BANK IS RETURNED, however the address returned will be
                  ;                 in the current bank (not necessarily in the one at entry time).
                  ;
                  ;          AUTHOR: Rich Knowles
                  ;
                  GetConnFieldAddress
048F              &          proc    far                          ;far call

048F 8EC0                    mov     es,ax                        ;establish node addressibility
0491 8BC2                    mov     ax,dx                        ;load bank number
0493 250F00                  and     ax,BankFieldMask             ;mask out garbage
0496 E790                    out     BankSwitch,ax                ;set bank
0498 43                      inc     bx                           ;connection no. is offset by 1...
                                                                  ;...for primary node.
0499 268A2E0000              mov     ch,es:byte ptr 0             ;load node flags

                  ;
                  ;     Check to see if the desired connection is in the current paragraph
                  ;

049E B80400                  mov     ax,4                         ;load max avail conn primary node
                  IsNodeInThisPara?:
04A1 F6C580       &          test    ch,AdditionalParaFlag        ;check for additional paragraph
04A4 7401                    jz      CompareAvailibleConn         ;if not, check range
04A6 48                      dec     ax                           ;one less availible conn, otherwise

                  ;
                  ;     Check to see if the number of availible connections in this
                  ;     paragraph contains the desired connection
                  ;

                  CompareAvailibleConn:
04A7 3BC3         &          cmp     ax,bx                        ;avail conn >= desired conn?
04A9 7327                    jae     ReturnConnection             ;if so, it's in this paragraph
04AB F6C580                  test    ch,AdditionalParaFlag        ;if not, is there another para?
04AE 742A                    jz      ReturnNil                    ;if not, return a nil

04B0 53                      push    bx                           ;save desired connection no.
04B1 50                      push    ax                           ;save availible connections
04B2 40                      inc     ax                           ;link := availible conn + 1
04B3 52                      push    dx                           ;establish para pointer parm...
04B4 06                      push    es                           ;...for GetParagraphLink
04B5 50                      push    ax                           ;push link number parm
04B6 9A0000----   E          call    GetParagraphLink             ;find the secondary node - returns dx:ax
04BB 8EC0                    mov     es,ax                        ;point to node paragraph
04BD 8BC2                    mov     ax,dx                        ;load bank number
04BF 250F00                  and     ax,BankFieldMask             ;mask flags out
04C2 E790                    out     BankSwitch,ax                ;set bank
04C4 58                      pop     ax                           ;restore availible connections
04C5 5B                      pop     bx                           ;restore desired connection

04C6 2BD8                    sub     bx,ax                        ;Desired := Desired - Availible
```

```
04C8 268A2E0F00                 mov     ch,es:byte ptr 15       ;load flags
04CD B80500                     mov     ax,5                    ;load max availible conn
04D0 EBCF                       jmp     IsNodeInThisPara?       ;see if we've found it

                ;
                ;       If the connection is within the paragraph currently being examined,
                ;       return the connection pointer (which can be accessed using
                ;       GetParagraphLink, with the proper displacment)
                ;

                ReturnConnection:
04D2 4B         &               dec     bx                      ;align with zero offset
04D3 8BF3                       mov     si,bx                   ;move offset to return var
04D5 03F3                       add     si,bx                   ;offset * 2
04D7 03F3                       add     si,bx                   ;offset * 3
04D9 CB                         ret                             ;all done

                ;
                ;       This section of code returns a nil, indicating that the desired
                ;       connection is not in the current structure
                ;

04DA 33F6       ReturnNil:      xor     si,si                   ;load nil connection ...
04DC 8EC6                       mov     es,si                   ;... pointer address
04DE CB                         ret                             ;all done

                GetConnFieldAddress
                &               endp                            ;end far proc

            +1  $eject

----            TCFparameters   STRUC

0000            TCFconn_state   dw      ?
0002            TCFnew_node_X   dw      ?
0004            TCFnew_node_Y   dw      ?
0006            TCFrecip_X      dw      ?
0008            TCFrecip_Y      dw      ?
000A            TCFrecip        dw      ?,?

000E            TCFold_ds       dw      ?
0010            TCFold_bp       dw      ?
0012            TCFret_addr     dd      ?

0016            TCFnew_node     dw      ?,?
001A            TCFold_conn     dw      ?,?

----            TCFparameters   ENDS

04DF            TransferConnectionField         PROC    FAR

04DF 55                         push    bp
04E0 1E                         push    ds
04E1 83EC0E                     sub     sp,14
04E4 8BEC                       mov     bp,sp
```

```
                              ;
04E6 8B461A                       mov     ax,[bp].TCFold_conn      ;
04E9 8B561C                       mov     dx,[bp].TCFold_conn+2    ;
04EC 8BDA                         mov     bx,dx                    ;
04EE 81E3F000                     and     bx,ConnFieldMask         ;
04F2 D1EB                         shr     bx,1                     ;
04F4 D1EB                         shr     bx,1                     ;
04F6 D1EB                         shr     bx,1                     ;
04F8 D1EB                         shr     bx,1                     ;
04FA 9A0000----        E          call    Far Ptr GetConnectionField ;returns dx:ax
                              ;
04FF 81E27000                     and     dx,ConnStateMask         ;
0503 895600                       mov     [bp].TCFconn_state,dx    ;
                              ;
0506 FF761C                       push    [bp].TCFold_conn+2       ;
0509 FF761A                       push    [bp].TCFold_conn         ;
050C 9A3704----        R          call    Far Ptr ReciprocalConnection ;returns dx:ax
                              ;
0511 89460A                       mov     [bp].TCFrecip,ax         ;
0514 89560C                       mov     [bp].TCFrecip+2,dx       ;
0517 8BDA                         mov     bx,dx                    ;
0519 81E3F000                     and     bx,ConnFieldMask         ;
051D D1EB                         shr     bx,1                     ;
051F D1EB                         shr     bx,1                     ;
0521 D1EB                         shr     bx,1                     ;
0523 D1EB                         shr     bx,1                     ;
0525 9A6F04----        R          call    Far Ptr GetConnFieldAddress ;returns es:si
                              ;
052A 8B4616                       mov     ax,[bp].TCFnew_node      ;
052D 26894401                     mov     es:Word Ptr [si+1],ax    ;
0531 268024F0                     and     es:Byte Ptr [si],NOT BankFieldMask ;
0535 8B4618                       mov     ax,[bp].TCFnew_node+2    ;
0538 250F00                       and     ax,BankFieldMask         ;
053B 894618                       mov     [bp].TCFnew_node+2,ax    ;save so don't keep masking
053E 260804                       or      es:Byte Ptr [si],al      ;
                              ;
0541 FF761C                       push    [bp].TCFold_conn+2       ;
0544 FF761A                       push    [bp].TCFold_conn         ;
0547 FF760C                       push    [bp].TCFrecip+2          ;
054A FF760A                       push    [bp].TCFrecip            ;
054D E82D02                       call    Near Ptr DeletePseudoNodes ;
                              ;
0550 33C9                         xor     cx,cx                    ;
0552 51                           push    cx                       ;
0553 9A0000----        E          call    Far Ptr SetLineIndex     ;
                              ;
0558 8B461C                       mov     ax,[bp].TCFold_conn+2    ;
055B 250F00                       and     ax,BankFieldMask         ;
055E E790                         out     BankSwitch,ax            ;
0560 8E5E1A                       mov     ds,[bp].TCFold_conn      ;
0563 FF360C00                     push    ds:Word Ptr 12           ;
0567 FF360E00                     push    ds:Word Ptr 14           ;
056B 9A0000----        E          call    Far Ptr PixelMoveTransformed ;
                              ;
0570 8B460C                       mov     ax,[bp].TCFrecip+2       ;
```

```
0573 250E00                        and     ax,BankFieldMask        ;
0576 E790                          out     BankSwitch,ax           ;
0578 8E5E0A                        mov     ds,[bp].TCFrecip        ;
057B 8B360C00                      mov     si,ds:Word Ptr 12       ;
057E 8B3E0E00                      mov     di,ds:Word Ptr 14       ;
0583 897606                        mov     [bp].TCFrecip_X,si      ;
0586 897E08                        mov     [bp].TCFrecip_Y,di      ;
0589 56                            push    si                      ;
058A 57                            push    di                      ;
058B 9A0000----     E              call    Far Ptr PixelDrawTransformed ;
                    ;
0590 FF761C                        push    [bp].TCFold_conn+2      ;
0593 FF761A                        push    [bp].TCFold_conn        ;
0596 E84E02                        call    Near Ptr DeleteConnectionField ;
                    ;
0599 FF7618                        push    [bp].TCFnew_node+2      ;
059C FF7616                        push    [bp].TCFnew_node        ;
059F 9AD403----     R              call    Far Ptr NumberOfConnections ;returns ax
                    ;
                    ;Check to see if the connection already exists, and if so then
                    ;return the one that exists.  This will avoid duplicate connections
                    ;and has the same effect as actually transfering the connection (with the
                    ;exception of the state of the connection - may not be the same).
                    ;
05A4 50                            push    ax                      ;
05A5 8BC8                          mov     cx,ax                   ;
05A7 33DB                          xor     bx,bx                   ;
05A9 3BD9           TCF_exist_loop: cmp    bx,cx                   ;
05AB 7423                          je      TCF_does_not_exist      ;
                    ;
05AD 43                            inc     bx                      ;
05AE 53                            push    bx                      ;
05AF 51                            push    cx                      ;
05B0 8B5618                        mov     dx,[bp].TCFnew_node+2   ;
05B3 8B4616                        mov     ax,[bp].TCFnew_node     ;
05B6 9A0000----     E              call    Far Ptr GetConnectionField ;returns dx:ax
                    ;
05BB 59                            pop     cx                      ;
05BC 5B                            pop     bx                      ;
05BD 3B460A                        cmp     ax,[bp].TCFrecip        ;
05C0 75E7                          jne     TCF_exist_loop          ;
05C2 81E20F00                      and     dx,BankFieldMask        ;
05C6 8B460C                        mov     ax,[bp].TCFrecip+2      ;
05C9 250F00                        and     ax,BankFieldMask        ;
05CC 3BD0                          cmp     dx,ax                   ;
05CE 75D9                          jne     TCF_exist_loop          ;
                    ;
05D0 58             TCF_conn_exists:pop    ax                      ;clean up
05D1 D0E3                          shl     bl,1                    ;
05D3 D0E3                          shl     bl,1                    ;
05D5 D0E3                          shl     bl,1                    ;
05D7 D0E3                          shl     bl,1                    ;
05D9 095E18                        or      [bp].TCFnew_node+2,bx   ;
05DC EB7C90                        jmp     TCF_return              ;
                    ;
                    TCF_does_not_exist:
```

```
05DF 58                        pop     ax                          ;recover value
05E0 FF7618                    push    [bp].TCFnew_node+2          ;
05E3 FF7616                    push    [bp].TCFnew_node            ;
05E6 50                        push    ax                          ;
05E7 FF760C                    push    [bp].TCFrecip+2             ;
05EA FF760A                    push    [bp].TCFrecip               ;
05ED FF7600                    push    [bp].TCFconn_state          ;
05F0 E88503                    call    Near Ptr CreateConnectionField ;returns dx:ax
                     ;
05F3 895618                    mov     [bp].TCFnew_node+2,dx       ;
                     ;
05F6 8BC2                      mov     ax,dx                       ;
05F8 250F00                    and     ax,BankFieldMask            ;
05FB E790                      out     BankSwitch,ax               ;
05FD 8E5E16                    mov     ds,[bp].TCFnew_node         ;
0600 A10C00                    mov     ax,ds:Word Ptr 12           ;
0603 8B1E0E00                  mov     bx,ds:Word Ptr 14           ;
0607 894602                    mov     [bp].TCFnew_node_X,ax       ;
060A 895E04                    mov     [bp].TCFnew_node_Y,bx       ;
                     ;
060D 50                        push    ax                          ;
060E 53                        push    bx                          ;
060F FF7606                    push    [bp].TCFrecip_X             ;
0612 FF7608                    push    [bp].TCFrecip_Y             ;
0615 9A0000----      E         call    Far Ptr NumberOfTilesContainingLine ;returns ax
                     ;
061A 33F6                      xor     si,si                       ;
061C 3D0000                    cmp     ax,0                        ;
061F 7303                      jae     $+5                         ;
0621 46                        inc     si                          ;
0622 F7D8                      neg     ax                          ;
0624 2D0200                    sub     ax,2                        ;
0627 3D0000                    cmp     ax,0                        ;
062A 7410                      je      TCF_no_pseudos              ;
                     ;
062C FF7618                    push    [bp].TCFnew_node+2          ;
062F FF7616                    push    [bp].TCFnew_node            ;
0632 FF760C                    push    [bp].TCFrecip+2             ;
0635 FF760A                    push    [bp].TCFrecip               ;
0638 56                        push    si                          ;
0639 E89402                    call    Near Ptr AllocatePseudos    ;
                     ;
063C FF7600          TCF_no_pseudos: push [bp].TCFconn_state       ;
063F 9A0000----      E         call    Far Ptr SetLineIndex        ;
                     ;
0644 FF7602                    push    [bp].TCFnew_node_X          ;
0647 FF7604                    push    [bp].TCFnew_node_Y          ;
064A 9A0000----      E         call    Far Ptr PixelMoveTransformed ;
                     ;
064F FF7606                    push    [bp].TCFrecip_X             ;
0652 FF7608                    push    [bp].TCFrecip_Y             ;
0655 9A0000----      E         call    Far Ptr PixelDrawTransformed ;
                     ;
065A 8B4616          TCF_return:  mov  ax,[bp].TCFnew_node         ;
065D 8B5618                    mov     dx,[bp].TCFnew_node+2       ;
```

```
0660 83C40E                  add     sp,14               ;
0663 1F                      pop     ds                  ;
0664 5D                      pop     bp                  ;
0665 CA0400                  ret     4                   ;

          TransferConnectionField         ENDP

     +1   $eject

          ;*********************************************************************
          ;************************ LOCAL PROCEDURES **************************
          ;*********************************************************************
          ;
          ;
0668 90                      nop             ;NOP code to set data off
0669 90                      nop
          ;
066A ????  Original_node1    dw      ?,?     ;data storage in code segment ...
066C ????
066E ????  Original_node2    dw      ?,?     ;... due to high use off ...
0670 ????
0672 ????  LastTile_x        dw      ?       ;... all the registers.  Done ...
0674 ????  LastTile_y        dw      ?       ;... for conveience and speed
0676 ????  PreviousPseudo    dw      ?,?     ;
0678 ????
067A ??    FirstPseudoFlag   db      ?       ;
          ;
067B 90                      nop             ;NOP code to set data off
067C 90                      nop
          ;
          ;
067D       GetFirstPseudo            PROC    NEAR

          ;This procedure will find the first pseudo node associated with a
          ;specified connection, if any exist.  Given the nodes at both ends of the
          ;connection, GFP will insure that they conform to the x-major rule.  Then
          ;the tile indexies of the first pseudo-node will be determined.  The pseudo
          ;node is actually found by the call to GetNextPseudo.
          ;
          ;NOTE - The first and last tiles will not contain any appropriate pseudo
          ;nodes, as these tiles contain the begining and ending points themselves.
          ;Therefore, the first tile is ignored, and the next tile is buffered so that
          ;GetNextPseudo can determine if it was the last tile and not use it.
          ;
067D 58                      pop     ax                  ;get return address
067E 07                      pop     es                  ;addr of node 2
067F 5E                      pop     si                  ;bank & conn of node 2
0680 5B                      pop     bx                  ;addr of node 1
0681 5F                      pop     di                  ;bank & conn of node 1
0682 50                      push    ax                  ;put return address
0683 1E                      push    ds                  ;save value
0684 8EDB                    mov     ds,bx               ;addr of node 1
0686 8BC6                    mov     ax,si               ;
0688 250F00                  and     ax,BankFieldMask    ;just want bank #
068B E790                    out     BankSwitch,ax       ;switch to proper bank
```

```
068D 268B0E0C00           mov   cx,es:Word Ptr 12       ;get x value of node 2
0692 268B160E00           mov   dx,es:Word Ptr 14       ;get y value of node 2
0697 8BC7                 mov   ax,di                   ;
0699 250F00               and   ax,BankFieldMask        ;just want bank #
069C E790                 out   BankSwitch,ax           ;switch to proper bank
069E A10C00               mov   ax,ds:Word Ptr 12       ;get x value of node 1
06A1 8B1E0E00             mov   bx,ds:Word Ptr 14       ;get y value of node 1
                  ;
06A5 3BC1                 cmp   ax,cx                   ;Is x1 < x2?
06A7 720F                 jb    GFP_okay                ;already in x-major order
06A9 7704                 ja    GFP_swap                ;not in order - go swap them
06AB 3BDA                 cmp   bx,dx                   ;x1=x2. Is y1 < y2?
06AD 7609                 jbe   GFP_okay                ;in an okay order
                  ;
06AF 91           GFP_swap:   xchg  ax,cx               ;swap x values
06B0 87DA                 xchg  bx,dx                   ;swap y values
06B2 06                   push  es                      ;swap ...
06B3 1E                   push  ds                      ;... node ...
06B4 07                   pop   es                      ;... addresses
06B5 1F                   pop   ds                      ;
06B6 87F7                 xchg  si,di                   ;swap node banks
                  ;
06B8 2E8C1E6A06   GFP_okay:   mov   cs:Original_node1,ds    ;save ...
06BD 2E893E6C06           mov   cs:Original_node1+2,di  ;... node ...
06C2 2E8C066E06           mov   cs:Original_node2,es    ;... pointer ...
06C7 2E89367006           mov   cs:Original_node2+2,si  ;... information
                  ;
06CC 50                   push  ax                      ;
06CD 53                   push  bx                      ;
06CE 51                   push  cx                      ;
06CF 52                   push  dx                      ;
06D0 9A0000----     E     call  Far Ptr GetFirstTileContainingLine ;returns dx:ax - unused
06D5 9A0000----     E     call  Far Ptr GetNextTileContainingLine  ;returns dx:ax
06DA 2E89167206           mov   cs:LastTile_x,dx        ;buffer xTile value
06DF 2EA37406             mov   cs:LastTile_y,ax        ;buffer yTile value
06E3 E80200               call  Near Ptr GetNextPseudo  ;go find the pseudo
                  ;
06E6 1F                   pop   ds                      ;restore value
06E7 C3                   ret                           ;GNP returns proper value

                  GetFirstPseudo          ENDP

                  $eject

                  ;NOTE - this routine uses values that were saved by GetFirstPseudo.  The values
                  ;reside in the code segment due to the high register usage and the need to be as
                  ;efficient as possible since these will be highly used routines.

06E8              GetNextPseudo           PROC    NEAR

06E8 1E                   push  ds                      ;save value
                  ;
06E9 9A0000----     E     call  Far Ptr GetNextTileContainingLine ;returns dx:ax
06EE 3D0000               cmp   ax,0                    ;valid index?
06F1 7D06                 jge   GNP_look_for_next       ;if not then quit
                  ;
```

```
                        GNP_scanned_all:
06E3 B8FFFF             &               mov     ax,-1                   ;return ...
06E6 99                                 cwd                             ;... error code
06E7 1F                                 pop     ds                      ;restore value
06E8 C3                                 ret                             ;
                        ;
                        GNP_look_for_next:
06E9 2E8B1E7206         &               mov     bx,cs:LastTile_x        ;get previous xTile value
06EE 2E8B0E7406                         mov     cx,cs:LastTile_y        ;get previous yTile value
0703 2E89167206                         mov     cs:LastTile_x,dx        ;save this tiles x value
0708 2EA37406                           mov     cs:LastTile_y,ax        ;save this tiles y value
                        ;
070C 53                                 push    bx                      ;xtile value
070D 51                                 push    cx                      ;ytile value
070E 9A0000----    E                    call    Far Ptr GetTilePointer  ;returns es:bx
                        ;
0713 2EC6067A0601                       mov     cs:FirstPseudoFlag,1    ;init flag
0719 2E8C067806                         mov     cs:PreviousPseudo+2,es  ;
071E 2E891E7606                         mov     cs:PreviousPseudo,bx    ;
                        ;
0723 26C507                             lds     ax,es:Dword Ptr [bx]    ;node ptr of first node in tile
0726 2E8B366E06                         mov     si,cs:Original_node2    ;
072B 2E8A167006                         mov     dl,Byte Ptr cs:Original_node2+2 ;
0730 2E8B3E6A06                         mov     di,cs:original_node1    ;
0735 2E8A366C06                         mov     dh,Byte Ptr cs:Original_node1+2 ;
073A EB1790                             jmp     GNP_first_time
                        ;
                        ;Loop through all the pseudo nodes in this tile until the proper node is found
                        ;(or until all of the pseudo nodes have been examined - which should not occur)
                        ;
073D 2EC6067A0600       GNP_scan_loop:  mov     cs:FirstPseudoFlag,0    ;init flag
0743 2E8C1E7806                         mov     cs:PreviousPseudo+2,ds  ;
0748 2EA37606                           mov     cs:PreviousPseudo,ax    ;
074C A00000                             mov     al,ds:Byte Ptr 0        ;bank # of next node in tile
074F 8E1E0100                           mov     ds,ds:Word ptr 1        ;addr of next node in tile
                        ;
0753 250F00             GNP_first_time: and     ax,BankFieldMask        ;switch to ...
0756 E790                               out     BankSwitch,ax           ;... proper bank
0758 F606000020                         test    ds:Byte Ptr 0,PseudoFlag;Is it a Pseudo node?
075D 7494                               jz      GNP_scanned_all         ;if not then scanned them all
                        ;
075F 393E0400                           cmp     ds:Word Ptr 4,di        ;node 1 addr's match?
0763 75D8                               jne     GNP_scan_loop           ;No, get next node
0765 38360300                           cmp     ds:Byte Ptr 3,dh        ;node 1 bank match?
0769 75D2                               jne     GNP_scan_loop           ;No, get next node
076B 39360700                           cmp     ds:Word Ptr 7,si        ;node 2 addr's match?
076F 75CC                               jne     GNP_scan_loop           ;No, get next node
0771 38160600                           cmp     ds:Byte Ptr 6,dl        ;node 2 bank match?
0775 75C6                               jne     GNP_scan_loop           ;No. get next node
                        ;
0777 8BD0                               mov     dx,ax                   ;return a node pointer ...
0779 8CD8                               mov     ax,ds                   ;... to the pseudo node
077B 1F                                 pop     ds                      ;restore value
077C C3                                 ret                             ;
```

```
                       GetNextPseudo            ENDP

                       $eject

----                   DPNparameters            STRUC

0000                   DPNold_ds        dw      ?
0002                   DPNold_bp        dw      ?
0004                   DPNret_addr      dw      ?        ;NEAR call

0006                   DPNconnection2   dw      ?,?
000A                   DPNconnection1   dw      ?,?

----                   DPNparameters            ENDS


077D                   DeletePseudoNodes        PROC     NEAR

077D 55                                 push    bp
077E 1E                                 push    ds
077F 8BEC                               mov     bp,sp
                       ;
                       ;Now must find all of the pseudo nodes (if any) that belonged to that
                       ;connection and delete them also
                       ;
07B1 FF760C                             push    [bp].DPNconnection1+2   ;
07B4 FF760A                             push    [bp].DPNconnection1     ;
07B7 FF7608                             push    [bp].DPNconnection2+2   ;
07BA FF7606                             push    [bp].DPNconnection2     ;
07BD E8EDFE                             call    Near Ptr GetFirstPseudo ;returns dx:ax
                       ;
0790 83FA00            DPN_loop:        cmp     dx,0                    ;do we have a pseudo node?
0793 7C4D                               jl      DPN_return              ;if not, then all done
0795 52                                 push    dx                      ;save pointer for ...
0796 50                                 push    ax                      ;... later call to DisposePara
                       ;
0797 8ED8                               mov     ds,ax                   ;addressability
0799 A00000                             mov     al,ds:Byte Ptr 0        ;save next ...
079C 50                                 push    ax                      ;... node in tile ...
079D FF360100                           push    ds:Word Ptr 1           ;... information
07A1 2E803E7A0601                       cmp     cs:FirstPseudoFlag,1    ;first node in tile?
07A7 7425                               je      DPN_delete_first        ;if so the special case
07A9 2EC5067606                         lds     ax,cs:Dword Ptr PreviousPseudo ;get previous node in tile
07AE 250F00                             and     ax,BankFieldMask        ;switch to ...
07B1 E790                               out     BankSwitch,ax           ;... proper bank
07B3 8F060100                           pop     ds:Word Ptr 1           ;store proper link addr
07B7 58                                 pop     ax                      ;get link bank
07B8 80260000F0                         and     ds:Byte Ptr 0,NOT BankFieldMask ;preserve any node flags
07BD 250F00                             and     ax,BankFieldMask        ;destroy node flags
07C0 08060000                           or      ds:Byte Ptr 0,al        ;store bank
07C4 9A0000----      E                  call    Far Ptr DisposeParagraph;
                       ;
07C9 E81CFF                             call    Near Ptr GetNextPseudo  ;returns dx:ax
07CC EBC2                               jmp     DPN_loop                ;process next pseudo
                       ;
```

```
                         DPN_delete_first:
07CE 2EC51E7606          &          lds     bx,cs:Dword Ptr PreviousPseudo ;get tile pointer offset and base
07D3 8F4702                         pop     ds:Word Ptr [bx+2]      ;save new first ...
07D6 8F07                           pop     ds:Word Ptr [bx]        ;... node in tile
07D8 9A0000----     E               call    Far Ptr DisposeParagraph;
                         ;
07DD E808FF                         call    Near Ptr GetNextPseudo  ;returns dx:ax
07E0 EBAE                           jmp     DPN_loop                ;process next pseudo
                         ;
07E2 1F                  DPN_return:  pop   ds                      ;
07E3 5D                             pop     bp                      ;
07E4 C20800                         ret     8                       ;

                         DeletePseudoNodes          ENDP

                     +1  $eject
----                     DCFparameters   STRUC

0000                     DCFconn_to_del  db       ?       ;number of connection that is to be deleted
0001                     DCFnum_of_conns db       ?       ;total number of connections at the node

0002                     DCFold_ds       dw       ?
0004                     DCFold_bp       dw       ?
0006                     DCFret_addr     dw       ?       ;REM:  near call

0008                     DCFconn_ptr     dw       ?,?     ;connection pointer of connection to delete

----                     DCFparameters   ENDS

07E7                     DeleteConnectionField    PROC    NEAR

07E7 55                             push    bp                      ;save value for calling routine
07E8 1E                             push    ds                      ;save value for calling routine
07E9 83EC02                         sub     sp,2                    ;make room for temp storage
07EC 8BEC                           mov     bp,sp                   ;addressability
                         ;
07EE 8B5E0A                         mov     bx,[bp].DCFconn_ptr+2   ;get ...
07F1 D0EB                           shr     bl,1                    ;... connection ...
07F3 D0EB                           shr     bl,1                    ;... number ...
07F5 D0EB                           shr     bl,1                    ;... into low ...
07F7 D0EB                           shr     bl,1                    ;... order nibble ...
07F9 885E00                         mov     [bp].DCFconn_to_del,bl  ;... and save it for later
                         ;
07FC FF760A                         push    [bp].DCFconn_ptr+2      ;parameters to ...
07FF FF7608                         push    [bp].DCFconn_ptr        ;... following call
0802 9A0403----     R               call    Far Ptr NumberOfConnections ;returns ax
0807 884601                         mov     [bp].DCFnum_of_conns,al ;save for later
                         ;
                         ;Connections are deleted by shifting following connections down by one.
                         ;
080A 8BD8                           mov     bx,ax                   ;init for loop
080C 33C0                           xor     ax,ax                   ;init last ...
080E 50                             push    ax                      ;... conn field ...
080F 50                             push    ax                      ;... for loop
0810 53                             push    bx                      ;save for loop
```

```
                          ;
0811 8B560A               DCF_shift_conn: mov   dx,[bp].DCFconn_ptr+2    ;parameters to ...
0814 8B4608                               mov   ax,[bp].DCFconn_ptr      ;... following ...
0817 5B                                   pop   bx                       ;... call
0818 53                                   push  bx                       ;save value for after call
0819 9A8F04----      R                    call  Far Ptr GetConnFieldAddress ;returns es:si
                          ;
                          ;Save the current info and put previous info in its place
                          ;
081E 268A14                               mov   dl,es:[si]               ;get flags and bank
0821 268B4401                             mov   ax,es:[si+1]             ;get para pointer
0825 5B                                   pop   bx                       ;recover current conn #
0826 268F4401                             pop   es:Word Ptr [si+1]       ;store previous para pointer
082A 59                                   pop   cx                       ;get previous flags and bank ...
082B 26880C                               mov   es:[si],cl               ;... and store them
082E 52                                   push  dx                       ;save current connection info ...
082F 50                                   push  ax                       ;... for next time around
                          ;
0830 FECB                                 dec   bl                       ;point to next conn field #
0832 3A5E00                               cmp   bl,[bp].DCFconn_to_del   ;have we gotten to the proper conn?
0835 7222                                 jb    DCF_finished_packing     ;yes - then jump out of loop
                          ;
                          ;Must realign any pseudo nodes that were associated with the connection that
                          ;was just overwritten.  The connection info is on the top of the stack.
                          ;
0837 53                                   push  bx                       ;save loop index for next time around
0838 FF760A                               push  [bp].DCFconn_ptr+2       ;parameters to ...
083B FF7608                               push  [bp].DCFconn_ptr         ;... GetFirstPseudo (node 1)
083E 52                                   push  dx                       ;parameters to ...
083F 50                                   push  ax                       ;... GetFirstPseudo (node 2)
0840 E83AFE                               call  Near Ptr GetFirstPseudo  ;returns dx:ax
                          ;
                          DCF_pseudo_loop:
0843 83FA00               &               cmp   dx,0                     ;does pseudo exist?
0846 7CC9                                 jl    DCF_shift_conn           ;no - go process next conn field
0848 8ED8                                 mov   ds,ax                    ;addressability
084A 802E030001                           sub   ds:Byte Ptr 3,ConnNumber1 ;decrease conn # by one ...
084F 802E060001                           sub   ds:Byte Ptr 6,ConnNumber1 ;... to reflect shifted state
0854 E891FE                               call  Near Ptr GetNextPseudo   ;returns dx:ax
0857 EBEA                                 jmp   DCF_pseudo_loop          ;go do it again
                          ;
                          ;Check to see if a secondary node can be returned to the free pool due to a
                          ;connection being deleted.  A secondary node with only one field with information
                          ;can be freed by moving that information into the link field of the preceeding
                          ;node (primary or secondary) and then disposing of the paragraph.
                          ;
                          DCF_finished_packing:
0859 83C404               &               add   sp,4                     ;clean up the stack (temp values)
085C 8A5E01                               mov   bl,[bp].DCFnum_of_conns  ;get number of connections
085F 32FF                                 xor   bh,bh                    ;clear high order byte
0861 4B                                   dec   bx                       ;decrement to reflect deletion
0862 8BC3                                 mov   ax,bx                    ;save for set node state code
0864 81E30300                             and   bx,LastConnInPara        ;is it a boundary ...
0868 83FB03                               cmp   bx,LastConnInPara        ;... condition (deletable node ?
```

```
086B 7411                        je      DCF_del_secondary_node  ;Yes - then delete node
                          ;
                          ;Just in case the one and only connection is being deleted, we set the state
                          ;flags (in the first connection field) node visible but leaves the connection
                          ;as a nil node pointer.  This won't effect any routines looking for connections
                          ;since they only look at the node pointer information and not the state.
                          ;
086D 3D0000                      cmp     ax,0                    ;deleted last connection?
0870 7704                        ja      DCF_return              ;if not then return
0872 26800C10                    or      es:Byte Ptr [si],VisibleUntaggedState ;init flags to proper state
                          ;
0876 83C402               DCF_return:    add     sp,2            ;clean up stack - temp storage
0879 1F                          pop     ds                      ;restore value for calling routine
087A 5D                          pop     bp                      ;restore value for calling routine
087B C20400                      ret     4                       ;all finished - remove parameters
                          ;
                          DCF_del_secondary_node:
087E 8B560A                      mov     dx,[bp].DCFconn_ptr+2   ;parameters for ...
0881 8B4608                      mov     ax,[bp].DCFconn_ptr     ;... following call
0884 9A0000----     E            call    Far Ptr GetConnectionField : returns dx:ax
0889 52                          push    dx                      ;save last connection ...
088A 50                          push    ax                      ;... fields value
088B 32FF                        xor     bh,bh                   ;clear high order
088D 8A5E01                      mov     bl,[bp].DCFnum_of_conns ;get number of connections
                          ;
0890 4B                          dec     bx                      ;decrement to reflect deletion
0891 4B                          dec     bx                      ;point to last conn - 1
0892 8B560A                      mov     dx,[bp].DCFconn_ptr+2   ;parameters for ...
0895 8B4608                      mov     ax,[bp].DCFconn_ptr     ;... following call
0898 9A8E04----     R            call    Far Ptr GetConnFieldAddress ;returns es:si
089D 83C603                      add     si,3                    ;point to link field
08A0 268A14                      mov     dl,es:[si]              ;get bank number and ...
08A3 81E20F00                    and     dx,BankFieldMask        ;... paragraph pointer of ...
08A7 268B4401                    mov     ax,es:[si+1]            ;... node to be deleted
                          ;
08AB 268F4401                    pop     es:Word Ptr [si+1]      ;overwrite link info ...
08AF 5B                          pop     bx                      ;... with value of ...
08B0 26881C                      mov     es:[si],bl              ;... last connection field
08B3 33DB                        xor     bx,bx                   ;ptr to AddParaFlag in primary node
08B5 83FE0C                      cmp     si,12                   ;(secondary node link field offset)
08B8 7503                        jne     $+5                     ;skip next instruction if primary
08BA BB0F00                      mov     bx,15                   ;ptr to AddParaFlag in secondary
08BD 2680277F                    and     es:Byte Ptr [bx],NOT AdditionalParaFlag ;clear flag
                          ;
08C1 52                          push    dx                      ;parameter to ...
08C2 50                          push    ax                      ;... following call
08C3 9A0000----     E            call    Far Ptr DisposeParagraph ;dispose of secondary node
                          ;
08C8 83C402                      add     sp,2                    ;clean up stack - temp storage
08CB 1F                          pop     ds                      ;restore value for calling routine
08CC 5D                          pop     bp                      ;restore value for calling routine
08CD C20400                      ret     4                       ;all finished - remove parameters

                          DeleteConnectionField   ENDP

                     +1   $eject
```

```
----                 APparameters    STRUC

0000                 APold_ds        dw      ?
0002                 APold_bp        dw      ?
0004                 APret_addr      dw      ?                      ;NEAR CALL

0006                 APswap_flag     dw      ?
0008                 APconnection2   dw      ?,?
000C                 APconnection1   dw      ?,?

----                 APparameters    ENDS

                     ;Allocate and link in the paragraphs needed for the pseudo-nodes.  Pseudo-nodes
                     ;do not have the same structure as normal nodes.  They have the Pseudo flag set,
                     ;and do not have any x-y position associated with them.  There are only three
                     ;connections: 1) ^Next node in tile,  2) ^Node 1 (beginning node),  3) ^Node 2
                     ;(ending node).  Also the 2nd and 3rd connections have a connection number explicitly
                     ;stored instead of having connection flags.  This connection number points to the
                     ;connection field that contains the true connection.  If Node 1 and Node 2 are not in
                     ;X-major order then they are put that way for the purposes of pseudo-nodes (and only
                     ;the pseudo-nodes).

08D0                 AllocatePseudos         PROC    NEAR

08D0 55                              push    bp
08D1 1E                              push    ds
08D2 8BEC                            mov     bp,sp
                     ;
08D4 837E0600                        cmp     [bp].APswap_flag,0      ;Are nodes in x-major order?
08D8 7412                            je      AP_Find_Tiles           ;Yes, then don't swap nodes
08DA 8B460C                          mov     ax,[bp].APconnection1   ;swap node 1 ...
08DD 8B5E0E                          mov     bx,[bp].APconnection1+2 ;... connection pointer ...
08E0 874608                          xchg    ax,[bp].APconnection2   ;... with node 2 ...
08E3 875E0A                          xchg    bx,[bp].APconnection2+2 ;... connection pointer ...
08E6 89460C                          mov     [bp].APconnection1,ax   ;... so that pseudo nodes ...
08E9 895E0E                          mov     [bp].APconnection1+2,bx ;... can guarantee proper order
                     ;
08EC 8B460E          AP_Find_Tiles:  mov     ax,[bp].APconnection1+2 ;
08EF 250F00                          and     ax,BankFieldMask        ;
08F2 E790                            out     BankSwitch,ax           ;
08F4 8E5E0C                          mov     ds,[bp].APconnection1   ;
08F7 FF360C00                        push    ds:Word Ptr 12          ;X value of Node 1
08FB FF360E00                        push    ds:Word Ptr 14          ;Y value of Node 1
08FE 8B460A                          mov     ax,[bp].APconnection2+2 ;
0902 250F00                          and     ax,BankFieldMask        ;
0905 E790                            out     BankSwitch,ax           ;
0907 8E5E08                          mov     ds,[bp].APconnection2   ;
090A FF360C00                        push    ds:Word Ptr 12          ;X value of Node 2
090E FF360E00                        push    ds:Word Ptr 14          ;Y value of Node 2
0912 9A0000----      E               call    Far ptr GetFirstTileContainingLine ;returns dx:ax
0917 9A0000----      E               call    Far ptr GetNextTileContainingLine ;returns dx:ax
091C 52                              push    dx                      ;push I tile value
091D 50                              push    ax                      ;push J tile value
                     ;
```

```
                        ;The first tile is ignored since the beginning node is in that tile and a
                        ;pseudo node is not needed.  The same goes for the last tile and end node.
                        ;The last tile is ignored by buffering a tiles I-J values to be used on the
                        ;next time through the loop.  If the current value of NextTile returns a
                        ;negative number then we don't bother to user the last buffered value.
                        ;
                        Allocate_pseudos:
091E 9A0000----    E    &               call    Far ptr GetNextTileContainingLine ;returns dx:ax
0923 59                                 pop     cx                      ;old J tile value
0924 5B                                 pop     bx                      ;old I tile value
0925 3D0000                             cmp     ax,0                    ;current value valid?
0928 7C49                               jl      AP_return               ;No, then don't use last value
                        ;
092A 52                                 push    dx                      ;save I tile value for next time
092B 50                                 push    ax                      ;save J tile value for next time
092C 53                                 push    bx                      ;push old I tile value for call
092D 51                                 push    cx                      ;push old J tile value for call
092E 9A0000----    E                    call    Far ptr GetTilePointer  ;returns es:bx
                        ;
0933 06                                 push    es                      ;save tile ...
0934 53                                 push    bx                      ;... pointer's address
0935 26FF37                             push    es:word ptr [bx]        ;save tile ...
0938 26FF7702                           push    es:word ptr [bx+2]      ;... pointer
                        ;
093C 9A0000----    E                    call    Far ptr AllocateParagraph ;returns dx:ax
0941 8ED8                               mov     ds,ax                   ;load new paragraph's address
0943 58                                 pop     ax                      ;get old pointer (address field)
0944 A30100                             mov     ds:word ptr 1,ax        ;store in link field of new paragraph
0947 58                                 pop     ax                      ;get old pointer (bank field)
0948 A20000                             mov     ds:byte ptr 0,al        ;store in link field of new paragraph
094B 800E000020                         or      ds:byte ptr 0,PseudoFlag ;Set Pseudo flag
                        ;
0950 8B460E                             mov     ax,[bp].APconnection1+2 ;Create ...
0953 A20300                             mov     ds:byte ptr 3,al        ;... connection ...
0956 8B460C                             mov     ax,[bp].APconnection1   ;... to ...
0959 A30400                             mov     ds:word ptr 4,ax        ;... Node 1
095C 8B460A                             mov     ax,[bp].APconnection2+2 ;Create ...
095F A20600                             mov     ds:byte ptr 6,al        ;... Connection ...
0962 8B4608                             mov     ax,[bp].APconnection2   ;... to ...
0965 A30700                             mov     ds:word ptr 7,ax        ;... Node 2
                        ;
0968 8CD8                               mov     ax,ds                   ;
096A 5B                                 pop     bx                      ;recover tile ...
096B 1F                                 pop     ds                      ;... pointer's address
096C 8917                               mov     ds:word ptr [bx],dx     ;save pointer ...
096E 894702                             mov     ds:word ptr [bx+2],ax   ;... to new paragraph
                        ;
0971 EBAB                               jmp     Allocate_pseudos        ;go do another one.
                        ;
0973 1F                 AP_return:      pop     ds
0974 5D                                 pop     bp
0975 C20A00                             ret     10

                        AllocatePseudos         ENDP
```

```
                +1  $eject

----                CCFparameters   STRUC

0000                CCFold_ds       dw      ?
0002                CCFold_bp       dw      ?
0004                CCFret_addr     dw      ?                           ;NEAR CALL

0006                CCFconn_state   db      ?,?
0008                CCFnode2        dw      ?,?
000C                CCFconn_node1   db      ?,?
000E                CCFnode1        dw      ?,?

----                CCFparameters   ENDS

0978                CreateConnectionField   PROC    NEAR

0978 55                             push    bp
0979 1E                             push    ds
097A 8BEC                           mov     bp,sp
                    ;
                    ;Check to see if we need to link in another paragraph for node 1.
                    ;
097C 8A460C                         mov     al,[bp].CCFconn_node1   ;get node 1 connection count
097F 250300                         and     ax,LastConnInPara       ;does node 1 need another ...
0982 3D0300                         cmp     ax,LastConnInPara       ;... paragraph for this connection
0985 7545                           jne     Connect_to_node2        ;No, establish connection to node 2
                    ;
0987 9A0000----   E                 call    Far ptr AllocateParagraph ;returns dx:ax
                    ;
                    ;Get address of last connection so we can replace it  with link to new paragraph
                    ;
098C 52                             push    dx                      ;save address of ...
098D 50                             push    ax                      ;... of new paragraph
098E 8A5E0C                         mov     bl,[bp].CCFconn_node1   ;get connection count for node 1
0991 32FF                           xor     bh,bh                   ;get node 1 count only
0993 8B5610                         mov     dx,[bp].CCFnode1+2      ;set up parameters ...
0996 8B460E                         mov     ax,[bp].CCFnode1        ;... for following call
0999 9A8F04----   R                 call    Far ptr GetConnFieldAddress ;returns es:si
                    ;
                    ;Link in the new paragraph - must save connection information that is in the link field
                    ;
099E 58                             pop     ax                      ;recover address to...
099F 5A                             pop     dx                      ;... to new paragraph
09A0 268614                         xchg    dl,es:[si]              ;replace conn info with link info ...
09A3 26874401                       xchg    ax,es:[si+1]            ;... but saving conn info
                    ;
                    ;Set additional paragraph flag
                    ;
09A7 33FF                           xor     di,di                   ;set offset to flag field in primary node
09A9 80FB03                         cmp     bl,ConnInPrimaryNode    ;is node 1 only a primary node?
09AC 7603                           jbe     $+5                     ;skip next instruction if primary
09AE BF0F00                         mov     di,15                   ;offset to flag field for secondaries
09B1 26800D80                       or      es:Byte ptr [di],AdditionalParaFlag
                    ;
                    ;Swap to new paragraph
```

```
                   ;
09B5 268A0C                          mov     cl,es:[si]              ;recover bank # and ...
09B8 268E4401                        mov     es,es:[si+1]            ;... paragraph address of new para
09BC 91                              xchg    ax,cx                   ;put bank number in ax reg
09BD 250F00                          and     ax,BankFieldMask        ;only want bank number
09C0 E790                            out     BankSwitch,ax           ;switch to proper memory bank
                   ;
                   ;Load the connection taken from the previous paragraph (link field) into the new paragrasph
                   ;
09C2 2688160000                      mov     es:byte ptr 0,dl        ;load flags and bank # into first conn field
09C7 26890E0100                      mov     es:word ptr 1,cx        ;load paragraph address
                   ;
                   ;Now actually create the connection from Node 1 to Node 2
                   ;
                   Connect_to_node2:
09CC 8A5E0C        ;                 mov     bl,[bp].CCFconn_node1   ;set up ...
09CF 32FF                            xor.    bh,bh                   ;... parameters ...
09D1 8B5610                          mov     dx,[bp].CCFnode1+2      ;... for following ...
09D4 8B460E                          mov     ax,[bp].CCFnode1        ;... call
09D7 83FB00                          cmp     bx,0                    ;creating first connection?
09DA 740B                            je      CCF_first_conn          ;if so then do things differently
09DC 9A8F04----    R                 call    Far ptr GetConnFieldAddress ;returns es:si
09E1 83C603                          add     si,3                    ;point to offset of new connection
09E4 EB0D90                          jmp     CCF_do_conn             ;connect them!
                   ;
09E7 8EC0          CCF_first_conn:   mov     es,ax                   ;set addressability
09E9 BE0300                          mov     si,3                    ;set offset to 1st conn field
09EC 8BC2                            mov     ax,dx                   ;insure the ...
09EE 250F00                          and     ax,BankFieldMask        ;... proper bank
09F1 E790                            out     BankSwitch,ax           ;
                   ;
09F3 8B560A        CCF_do_conn:      mov     dx,[bp].CCFnode2+2      ;get node ptr ...
09F6 8B4608                          mov     ax,[bp].CCFnode2        ;... to node 2
09F9 80E20F                          and     dl,BankFieldMask        ;clear out any old info - preserve bank
09FC 0A5606                          or      dl,[bp].CCFconn_state   ;set appropriate flags
09FF 268814                          mov     es:byte ptr [si],dl     ;create connection pointer ...
0A02 26894401                        mov     es:word ptr [si+1],ax   ;... to node 2
                   ;
0A06 8B460E                          mov     ax,[bp].CCFnode1        ;return node para pointer
0A09 8B5610                          mov     dx,[bp].CCFnode1+2      ;return node bank
0A0C 81E20F00                        and     dx,BankFieldMask        ;remove garbage
0A10 8A5E0C                          mov     bl,[bp].CCFconn_node1   ;get conn count
0A13 FEC3                            inc     bl                      ;add 1 to reflect created conn
0A15 D0E3                            shl     bl,1                    ;mov ...
0A17 D0E3                            shl     bl,1                    ;... count ...
0A19 D0E3                            shl     bl,1                    ;... into high ...
0A1B D0E3                            shl     bl,1                    ;... order nibble
0A1D 0AD3                            or      dl,bl                   ;create conn ptr from node ptr
                   ;
0A1F 1F                              pop     ds
0A20 5D                              pop     bp
0A21 C20C00                          ret     12

                   CreateConnectionField     ENDP
```

```
;*****************************************************************************
;************************* LOCAL PROCEDURES END ******************************
;*****************************************************************************


ConnectionSegment       Ends
                    end;
```

ASSEMBLY COMPLETE, NO ERRORS FOUND

```
+1  $TITLE('TILE ROUTINES')








;***************************************************************************
;*
;*      FILE NAME:        TILES.ASM
;*
;*      MODULE NAME:      TileStructure
;*
;*      SEGMENT NAME:     TileSegment  (Code Segment)
;*                        TileGlobals  (Data Segment)
;*
;*      LINKAGE/ACCESS:   Linked with TEKMAN main module.  Accessed by direct
;*                        call within TEKMAN, Accessed through support vector
;*                        from external .LTL modules.
;*
;*      FUNCTIONS:        Contains routines which deal specifically with
;*                        tiles, such as node access routines and manipulation
;*                        of the tile structure.
;*
;*
;*
;*
;*
;*
;*
;*      ENHANCEMENTS:     Possible cleanup for INITIALIZETILESTRUCTURE (?)
;*                        Test INITIALIZETILESTRUCTURE for non-zero x1, y1
;*
;***************************************************************************


;
;
;                 TILE ROUTINES
;

```

```
                     name          TileStructure

                     assume        cs:TileSegment,
         &                         ds:TileGlobals

                     public        InitializeTileStructure.
         &                         ReleaseTileStructure,
         &                         GetTileStructureParameters,
         &                         FirstNodeInTile,
         &                         NextNodeInTile,
         &                         GetConnection,
         &                         GetNodeLocation,
         &                         GetNodePointer,
         &                         GetTilePointer,
         &                         GetTileIndex,
         &                         ExamineNodeTraversedFlag,
         &                         SetNodeTraversedFlag,
         &                         ResetNodeTraversedFlags,
         &                         GetConnectionNumber,
         &                         DeleteNode,
         &                         CreateDuplicateNode,
         &                         FirstTraversedNode,
         &                         NextTraversedNode


                     extrn         dqAllocate:far,
         &                         dqFree:far,
         &                         AllocateParagraph:far,
         &                         DisposeParagraph:far




----     TileSegment     segment


000A     TileSizeIncrement     equ   10             ;increment when tilesize is
                                                    ; too small
0100     DefaultTileSize       equ   256            ;default tile size

0008     NoOfTileBlockPtrs     equ   8              ;eight tileblock ptrs

0090     BankSwitch            equ   90H            ;address of bank switch

000F     BankFieldMask         equ   0FH            ;mask to extract just the bank #

0040     NodeTraversedFlag     equ   40H            ;node traversed flag mask

0040     TileTraversedFlag     equ   NodeTraversedFlag ;same, but different context

0020     PseudonodeFlag        equ   20H            ;pseudonode flag

00F0     NodeFlagsMask         equ   0F0H           ;node flag field mask

0000     NilPointer            equ     0            ;Nil Pointer value
```

```
0010                            VisibleUntaggedState    equ     10H             ;State field untagged value

                           +1   $eject

                                ;
                                ;       LOCAL PROCEDURES
                                ;


                                ;
                                ;       Allocate memory
                                ;               entry:
                                ;                       ax := number of bytes to be Allocated (0 means 64K)
                                ;               blows:
                                ;                       ax,dx,es
                                ;               returns:
                                ;                       [es] := first paragraph of Allocated memory
                                ;
                                ;       AUTHOR: Joe Maybee
                                ;

0000                            Allocate        proc    near                    ;local procedure

0000 51                                         push    cx                      ;save count
0001 53                                         push    bx                      ;save tileblockpointer
0002 50                                         push    ax                      ;set mem size parm
0003 B93C0090           R                       mov     cx,offset ErrorFlag     ;set error flag offset
0007 1E                                         push    ds                      ;establish seg parm
0008 51                                         push    cx                      ;establish offset parm
0009 9A0000----         E                       call    dqAllocate              ;Allocate memory
000E 5B                                         pop     bx                      ;restore tileblock pointer
000F 59                                         pop     cx                      ;restore count
0010 C3                                         ret                             ;return to calling sequence

                                Allocate        endp                            ;end procedure Allocate

                           +1   $eject

                                ;
                                ;       PROCEDURE InitializeTileStructure(x1,y1,x2,y2,tilesize: INTEGER);
                                ;
                                ;
                                ;
                                ;       AUTHOR: Joe Maybee
                                ;


0011                            InitializeTileStructure PROC    FAR

----                            parm            struc

0000                            old_ds          dw      ?
0002                            old_bp          dw      ?
0004                            return          dd      ?
```

```
0008                  tilesize        dw      ?
000A                  y2              dw      ?
000C                  x2              dw      ?
000E                  y1              dw      ?
0010                  x1              dw      ?

----                  parm            ENDS


                      ;
                      ;       save registers for pascal, and establish addressability
                      ;

0011 55                               push    bp                      ;save bp for pascal
0012 1E                               push    ds                      ;save ds for pascal
0013 8BEC                             mov     bp,sp                   ;establish parm address
0015 B8----       R                   mov     ax,TileGlobals          ;load global pointer
0018 8ED8                             mov     ds,ax                   ;address globals
                      ;
001A BB2A0090     R                   mov     bx,OFFSET TileBlockPtrs ;point to last ptr
001E B9080090                         mov     cx,LENGTH TileBlockPtrs ;number of ptrs
0022 C7070000         ClearPtrs:      mov     Word Ptr [bx],0         ;clear the pointer
0026 43                               inc     bx                      ;point to ...
0027 43                               inc     bx                      ;... next pointer
0028 E2F8                             loop    ClearPtrs               ;loop till all cleared

                      ;
                      ;       calculate number of tiles needed, and number of words needed for
                      ;       tile structure
                      ;
                      ;       xTiles := Ceiling(x2 DIV TileSize) * Ceiling(x1 DIV TileSize)
                      ;
                      ;       yTiles := Ceiling(y2 DIV TileSize) * Ceiling(y1 DIV TileSize)
                      ;
                      ;       totaltilespaceneeded := xTiles*yTiles*(4 bytes/tile)
                      ;                            := (xTiles*2)*(yTiles*2)
                      ;




                      ;
                      ;       make sure some joker didn't give you a zero TileSize!
                      ;       if so, adjust tile size
                      ;
                      ;

002A                  ComputeStructure:
002A 8B4E08                           mov     cx,[bp].TileSize        ;load the TileSize
002D 83F900                           cmp     cx,0                    ;is it zero?
0030 7506                             jne     TileSizeOk              ;if not, we're set
0032 B90001                           mov     cx,DefaultTileSize      ;otherwise set to default
0035 894E08                           mov     [bp].TileSize,cx        ;save. may need to modify.

                      ;
```

```
                        ;       compute yTiles
                        ;               entry:
                        ;                       cx := TileSize
                        ;               blows:
                        ;                       ax,bx,dx
                        ;

0038 890E0C00       R   TileSizeOk:     mov     SaveTileSize,cx         ;save the TileSize
003C 8B5E0A                             mov     bx,[bp].y2              ;load y2
003F 8B460E                             mov     ax,[bp].y1              ;load y1
0042 3BD8                               cmp     bx,ax                   ;y2 > y1?
0044 7704                               ja      y2Ok                    ;if so, we're Ok
0046 93                                 xchg    ax,bx                   ;otherwise, exchange them
0047 7501                               jne     y2Ok                    ;if <> we're Ok
0049 43                                 inc     bx                      ;y2 must be greater than y1
004A A31200         R   y2Ok:           mov     SaveY1,ax               ;save the Y1 Parm
004D 891E0E00       R                   mov     SaveY2,bx               ;save the Y2 Parm
0051 33D2                               xor     dx,dx                   ;zero dx
0053 F7F1                               div     cx                      ;y1 DIV TileSize
                        ;****           cmp     dx,0                    ;no remainder?
                        ;****           je      SaveY1Tiles             ;no need for round up
                        ;****           inc     ax                      ;else round up
0055 A30600         R   SaveY1Tiles:    mov     yTileBegin,ax           ;save number of y1 tiles
0058 8BC3                               mov     ax,bx                   ;load y2 parm into ax for DIV
005A 33D2                               xor     dx,dx                   ;zero dx for divide
005C F7F1                               div     cx                      ;divide by TileSize
                        ;****           cmp     dx,0                    ;any remainder?
                        ;****           je      ComputeyTiles           ;if not, we are set
                        ;****           inc     ax                      ;otherwise round up
005E A30A00         R   ComputeyTiles:  mov     yTileEnd,ax             ;save last y tile index
0061 2B060600       R                   sub     ax,yTileBegin           ;take the differential
0065 40                                 inc     ax                      ;account for tile 0
0066 D1E0                               shl     ax,1                    ;multiply by 2 (see header)
0068 A30000         R                   mov     yTiles,ax               ;save the total y tiles needed

                        ;
                        ;       compute xTiles
                        ;               entry:
                        ;                       cx := TileSize
                        ;               blows:
                        ;                       ax,bx,dx
                        ;

006B 8B5E0C                             mov     bx,[bp].x2              ;load x2
006E 8B4610                             mov     ax,[bp].x1              ;load x1
0071 3BD8                               cmp     bx,ax                   ;x2 > x1?
0073 7704                               ja      x2Ok                    ;if so, we're Ok
0075 93                                 xchg    ax,bx                   ;otherwise, exchange them
0076 7501                               jne     x2Ok                    ;if <> we're Ok
0078 43                                 inc     bx                      ;x2 must be greater than x1
0079 A31400         R   x2Ok:           mov     SaveX1,ax               ;save the x1 Parm
007C 891E1000       R                   mov     SaveX2,bx               ;save the x2 Parm
0080 33D2                               xor     dx,dx                   ;zero dx for divide
0082 F7F1                               div     cx                      ;x1 DIV TileSize
                        ;****           cmp     dx,0                    ;no remainder?
```

```
                     ;****             je      SaveX1Tiles              ;no need for round up
                     ;****             inc     ax                       ;else round up
0084 A30400      R   SaveX1Tiles:      mov     xTileBegin,ax            ;save number of x1 tiles
0087 8BC3                              mov     ax,bx                    ;load x2 parm into ax for DIV
0089 33D2                              xor     dx,dx                    ;zero dx for divide
008B F7F1                              div     cx                       ;divide by TileSize
                     ;****             cmp     dx,0                     ;any remainder?
                     ;****             je      ComputexTiles            ;if not, we are set
                     ;****             inc     ax                       ;otherwise round up
008D A30800      R   ComputexTiles:    mov     xTileEnd,ax              ;save last x tile index
0090 2B060400    R                     sub     ax,xTileBegin            ;take the differential
0094 40                                inc     ax                       ;account for tile 0
0095 D1E0                              shl     ax,1                     ;multiply by 2 (see header)
0097 A30200      R                     mov     xTiles,ax                ;save the total x tiles needed

                     ;
                     ;        compute total number of bytes needed
                     ;                 entry:
                     ;                         ax := xTiles * 2
                     ;                 blows:
                     ;                         ax,bx
                     ;

009A F7260000    R                     mul     yTiles                   ;compute total tiles needed
009E 83FA0B90                          cmp     dx,length TileBlockPtrs  ;can we allocate enough ptrs?
00A2 7739                              ja      IncreaseTileSize         ;if not, try a larger TileSize
00A4 A32800      R                     mov     Partial64KBlockSize,ax   ;save the size of the partial
00A7 BB2A0090    R                     mov     bx,offset TileBlockPtrs  ;point to block table
00AB 89163A00    R                     mov     NumberOfPtrs,dx          ;save # of 64K block ptrs
00AF 83FA00                            cmp     dx,0                     ;Allocate block > 64K?
00B2 7435                              je      AllocPartial64K          ;then no problem
00B4 8BCA                              mov     cx,dx                    ;move # of 64K's to count req.

                     ;
                     ;        Allocate 64K blocks, and set pointers in tileblockptr table
                     ;                 entry:
                     ;                         [bx] := next tileblockptr to be set
                     ;                         cx := number of 64K blocks to be Allocated
                     ;                 blows:
                     ;                         ax,bx(advanced wordwise)
                     ;

00B6 33C0            Allocate64K:      xor     ax,ax                    ;signal Allocate 64K block
00B8 E845FF                            call    Allocate                 ;Allocate a 64k block
00BB 8EC0                              mov     es,ax                    ;load the paragraph pointer
00BD 3DFFFF                            cmp     ax,0ffffh                ;did it fail?
00C0 7416                              je      CleanupAndTryLarger      ;if so, cleanup and try again
00C2 8C07                              mov     [bx],es                  ;save pointer to block
00C4 43                                inc     bx                       ;bump bx....
00C5 43                                inc     bx                       ;to point to next block pointer
00C6 E2EE                              loop    Allocate64K              ;continue till 64K's are done
00C8 A12800      R                     mov     ax,Partial64KBlockSize   ;load partial 64k block size
00CB 3D0000                            cmp     ax,0                     ;is the partial block zero?
00CE 7519                              jne     AllocPartial64K          ;Allocate a partial block
00D0 B9FFFF                            mov     cx,0ffffh                ;load a 64K count for Init
```

```
00D3 4B                      dec     bx                      ;point to the last...
00D4 4B                      dec     bx                      ;...valid block pointer
00D5 EB2290                  jmp     Init                    ;Initialize the blocks

              CleanupAndTryLarger:
00D8 9A2301----    R  &            call    Far Ptr ReleaseTileStructure ;
              IncreaseTileSize:
00DD 8B4608           &            mov     ax,[bp].TileSize        ;load previous TileSize
00E0 050A00                  add     ax,TileSizeIncrement    ;bump the TileSize
00E3 894608                  mov     [bp].TileSize,ax        ;reset the TileSize
00E6 E941FF                  jmp     ComputeStructure        ;try it with the new TileSize

              ;
              ;       Allocate the partial block (if there is one)
              ;               entry:
              ;                       ax := number of bytes in partial block
              ;               blows:
              ;                       ax,ck(loaded for initialize sequence)
              ;

00E9 E814FF          AllocPartial64K:call    Allocate                ;Allocate the partial block
00EC 8EC0                    mov     es,ax                   ;get result
00EE 3DFFFF                  cmp     ax,0ffffh               ;fail?
00F1 74E5                    je      CleanupAndTryLarger     ;if so try smaller tile size
00F3 8C07                    mov     [bx],es                 ;save the paragraph pointer
00F5 8B0E2800      R         mov     cx,Partial64KBlockSize  ;load partial block count

              ;
              ;       Initialize the tile structure
              ;               entry:
              ;                       [bx] := last completed table entry
              ;                       es -> last Allocated paragraph
              ;                       cx := byte count for the last Allocated block
              ;                            (cx will be FFFFH if last block was 64K!)
              ;               blows:
              ;                       ax,bx(saves),cx,dx
              ;

00F9 8BD3            Init:   mov     dx,bx                   ;save table pointer
00FB 33DB                    xor     bx,bx                   ;zero the block pointer
00FD 1E                      push    ds                      ;save ds
00FE 8CC0                    mov     ax,es                   ;this saves override prefix
0100 8ED8                    mov     ds,ax                   ;....when initializing
0102 33C0                    xor     ax,ax                   ;load nil pointer
0104 D1E9                    shr     cx,1                    ;number of words to be init'd
0106 8907            Initloop:mov    [bx],ax                 ;zero word in tile table
0108 43                      inc     bx                      ;bump pointer...
0109 43                      inc     bx                      ;...to point to next word
010A E2FA                    loop    Initloop                ;continue till block Init'ed
010C 8BDA                    mov     bx,dx                   ;restore tileblockptr pointer
010E 4B                      dec     bx                      ;back up....
010F 4B                      dec     bx                      ;...to previous pointer
0110 1F                      pop     ds                      ;restore ds
0111 81FB2A00      R         cmp     bx,offset TileBlockPtrs ;check to see if we are done
0115 7207                    jb      exit                    ;if done, exit
```

```
0117 8E07                            mov     es,[bx]                  ;else load next block pointer
0119 B9FFFF                          mov     cx,0ffffh                ;load 64k block count
011C EBDB                            jmp     Init                     ;"go back, Jack, do it again"

                    ;
                    ;       everything is Ok.  Cleanup stack and return to calling sequence
                    ;

011E 1F             exit:            pop     ds                       ;restore ds
011F 5D                              pop     bp                       ;restore bp
0120 CA0A00                          ret     10                       ;cleanup stack and return

                    InitializeTileStructure
                    &                endp                             ;end InitializeTileStructure

               +1   $eject

0123                ReleaseTileStructure    PROC     FAR              ;

                    ;
                    ;       PROCEDURE ReleaseTileStructure;
                    ;
                    ;       AUTHOR: Rich Knowles
                    ;

0123 1E                              push    ds                       ;save for Pascal
0124 B8----       R                  mov     ax,TileGlobals           ;
0127 8ED8                            mov     ds,ax                    ;
                    ;
0129 C7060C000001 R                  mov     SaveTileSize,DefaultTileSize ;reset initial values
012F C7060E00FF7F R                  mov     SaveY2,7FFFH             ;
0135 C7061000FF7F R                  mov     SaveX2,7FFFH             ;
013B C70612000000 R                  mov     SaveY1,0000              ;
0141 C70614000000 R                  mov     SaveX1,0000              ;
                    ;
0147 BB2A0090     R                  mov     bx,offset TileBlockPtrs  ;offset to first block
014B B9080090                        mov     cx,LENGTH TileBlockPtrs  ;loop control counter
014E 8B07           RTS_loop:        mov     ax,Word Ptr [bx]         ;load paragraph pointer
0151 3D0000                          cmp     ax,0                     ;allocated?
0154 7418                            je      RTS_finished             ;no - then done
                    ;
0156 53                              push    bx                       ;save offset
0157 51                              push    cx                       ;save loop control
0158 BA3C0090     R                  mov     dx,offset ErrorFlag      ;load offset
015C 50                              push    ax                       ;set para. ptr parm
015D 1E                              push    ds                       ;set segment ptr for ErrorFlag
015E 52                              push    dx                       ;set offset ptr for erroflag
015F 9A0000----   E                  call    dqfree                   ;free memory
0164 59                              pop     cx                       ;recover loop control
0165 5B                              pop     bx                       ;recover offset
0166 C7070000                        mov     Word Ptr [bx],0          ;clear block ptr field
016A 43                              inc     bx                       ;point to...
016B 43                              inc     bx                       ;... next table entry
016C E2E1                            loop    RTS_loop                 ;have we reached the end?
                    ;
```

```
016E 1F            RTS_finished:    pop     ds                  ;restore for Pascal
016F CB                             ret

                   ReleaseTileStructure     ENDP

                   $eject
                   ;
                   ;       PROCEDURE GetTileStructureParameters(VAR x1,y1,x2,y2.TileSize : INTEGER);
                   ;
                   ;
                   ;
                   ;

0170               GetTileStructureParameters
                   $                proc    far                 ;far call

----               GetParms         struc

0000               gOld_bp          dw      ?
0002               gOld_ds          dw      ?
0004               gReturn          dd      ?
0008               gTileSize        dd      ?
000C               gY2              dd      ?
0010               gX2              dd      ?
0014               gY1              dd      ?
0018               gX1              dd      ?

----               GetParms         ends

                   ;
                   ;       save registers for Pascal, and establish parm addressability
                   ;

0170 1E                             push    ds                  ;save ds
0171 55                             push    bp                  ;save bp (both for pascal)
0172 8BEC                           mov     bp,sp               ;establish parm addressabilityu
0174 B8----      R                  mov     ax,TileGlobals      ;load TileGlobals segment address
0177 8ED8                           mov     ds,ax               ;set tile segment

                   ;
                   ;       load pointers to var parms, and move globals into them
                   ;

0179 C45E08                         les     bx,[bp].gTileSize   ;load pointer to tilesize parm
017C A10C00      R                  mov     ax,SaveTileSize     ;load the parm
017F 268907                         mov     es:[bx],ax          ;set var parm
0182 C45E0C                         les     bx,[bp].gY2         ;load pointer to Y2 parm
0185 A10E00      R                  mov     ax,SaveY2           ;load the parm
0188 268907                         mov     es:[bx],ax          ;set var parm
018B C45E10                         les     bx,[bp].gX2         ;load pointer to X2 parm
018E A11000      R                  mov     ax,SaveX2           ;load the parm
0191 268907                         mov     es:[bx],ax          ;set var parm
0194 C45E14                         les     bx,[bp].gY1         ;load pointer to Y1 parm
0197 A11200      R                  mov     ax,SaveY1           ;load the parm
```

```
019A 268907                         mov     es:[bx],ax              ;set var parm
019D C45E18                         les     bx,[bp].gX1             ;load pointer to X1 parm
01A0 A11400        R                mov     ax,SaveX1               ;load the parm
01A3 268907                         mov     es:[bx],ax              ;set var parm

                ;
                ;       restore registers and return to pascal
                ;

01A6 5D                             pop     bp                      ;restore bp
01A7 1F                             pop     ds                      ;restore ds
01A8 CA1400                         ret     20                      ;return and cleanup stack

                GetTileStructureParameters
                &                   endp

          +1    $eject

                ;
                ;       FUNCTION FirstNodeInTile (I, J : INTEGER) : NodePointer;
                ;
                ;
                ;
                ;


                FirstNodeInTile
01AB            &                   proc    far                     ;far call

----            fParms              struc

0000            fOld_bp             dw      ?
0002            fOld_ds             dw      ?
0004            fReturn             dd      ?
0008            fJ                  dw      ?
000A            fI                  dw      ?

----            fParms              ends

                ;
                ;       save registers for pascal, and establish parm addressability
                ;

01AB 1E                             push    ds                      ;save ds for pascal
01AC 55                             push    bp                      ;save bp for pascal
01AD 8BEC                           mov     bp,sp                   ;establish parm addressability
01AF B8----        R                mov     ax,TileGlobals          ;load TileGlobals segment address
01B2 8ED8                           mov     ds,ax                   ;set tile segment

                ;
                ;       load the parameters, and pick up the right tileblockptr
                ;

01B4 FF760A                         push    [bp].fI                 ;load the J parm
01B7 FF7608                         push    [bp].fJ                 ;load the I parm
01BA 9AA603----    R                call    Far Ptr GetTilePointer  ;returns es:bx
```

```
01BE 8CC0                          mov     ax,es                    ;temporary for cmp
01C1 3D0000                        cmp     ax,NilPointer            ;does tile exist?
01C4 7427                          je      fnReturnNil              ;if not the return nil pointer

                  ;
                  ;       load the node pointer
                  ;

01C6 268B07                        mov     ax,es:[bx]               ;load the high order word
01C9 268B5702                      mov     dx,es:[bx+2]             ;load the low order word

                  ;
                  ;       run through pseudonode list
                  ;

01CD 250F00       Pseudoloop:      and     ax,BankFieldMask         ;mask all but bank number
01D0 23D2                          and     dx,dx                    ;nil pointer?
01D2 7421                          jz      fnexit                   ;if so, go home
01D4 E790                          out     BankSwitch,ax            ;set the bank
01D6 8EC2                          mov     es,dx                    ;load the paragraph pointer
01D8 26F606000020                  test    es:byte ptr 0,PseudoNodeFlag
01DE 7415                          jz      fnexit                   ;if not a pseudonode, we got it!
01E0 33C0                          xor     ax,ax                    ;clear dx
01E2 26A00000                      mov     al,es:byte ptr 0         ;load flags, bank, etc.
01E6 268B160100                    mov     dx,es:word ptr 1         ;load next node para. ptr.
01EB EBE0                          jmp     Pseudoloop               ;look at next node

                  ;
                  ;       set up return value of nil and return
                  ;

01ED 33C0         fnReturnNil:     xor     ax,ax                    ;clear ax
01EF 99                            cwd                              ;make longint
01F0 5D                            pop     bp                       ;restore bp for pascal
01F1 1F                            pop     ds                       ;restore ds for pascal
01F2 CA0400                        ret     4                        ;return and cleanup stack

                  ;
                  ;       dust off the registers (cleanup) and return
                  ;

01F5 92           fnexit:          xchg    ax,dx                    ;put in proper dx:ax order
01F6 5D                            pop     bp                       ;restore bp for pascal
01F7 1F                            pop     ds                       ;restore ds for pascal
01F8 CA0400                        ret     4                        ;return and cleanup stack

                  FirstNodeInTile
                  $                endp                             ;end procedure

                  $eject

                  ;
                  ;       FUNCTION NextNodeInTile (CurrentNode : NodePointer) : NodePointer;
                  ;
                  ;
```

```
                        ;
                        ;

01FB                    NextNodeInTile  proc    far                    ;far call

----                    nParms          struc

0000                    nOld_bp         dw      ?
0002                    nOld_ds         dw      ?
0004                    nReturn         dd      ?
0008                    nCurrentNode    dw      ?
000A                    nCurrentBank    dw      ?                      ;these are actually one parm

----                    nParms          ends

                        ;
                        ;       save registers for pascal,.and establish parm addressability
                        ;

01FB 1E                                 push    ds                     ;save ds for pascal
01FC 55                                 push    bp                     ;save bp for pascal
01FD 8BEC                               mov     bp,sp                  ;establish addressability
01FF B8----         R                   mov     ax,TileGlobals         ;load TileGlobals segment address
0202 8ED8                               mov     ds,ax                  ;set tile segment

                        ;
                        ;       check to make sure a nil isn't passed in (problems might arise otherwise)
                        ;

0204 33D2                               xor     dx,dx                  ;in case we need nil pointer
0206 8B4608                             mov     ax,[bp].nCurrentNode   ;load paragraph pointer
0209 3D0000                             cmp     ax,NilPointer          ;passed in a Nil?
020C 741B                               je      NextNodeExit           ;if so, we have a nil set!

                        ;
                        ;       load parms and set bank switch
                        ;

020E 8EC0                               mov     es,ax                  ;addressability
0210 8B460A                             mov     ax,[bp].nCurrentBank   ;load bank parameter
0213 250F00                             and     ax,BankFieldMask       ;mask out all but bank no.
0216 E790                               out     bankswitch,ax          ;set bank

                        ;
                        ;       load nodepointer and return
                        ;

0218 26A10100                           mov     ax,es:word ptr 1       ;get paragraph pointer next node
021C 3D0000                             cmp     ax,0                   ;last node in tile?
021F 7408                               je      NextNodeExit           ;if so, we have a nil set!
0221 268A160000                         mov     dl,es:byte ptr 0       ;get flags and bank number
0226 80E20F                             and     dl,BankFieldMask       ;strip off flags
```

```
                ;
                ;       cleanup registers, cleanup stack and return
                ;

0229 5D         NextNodeExit:   pop     bp              ;restore bp for pascal
022A 1F                         pop     ds              ;restore ds for pascal
022B CA0400                     ret     4               ;cleanup stack and return

                NextNodeInTile
                &               endp

             +1 $eject

                ;
                ;       FUNCTION GetConnection ( Node : NodePointer; ConnectionNumber : INTEGER
                ;                               : ConnectionPointer;
                ;
                ;
                ;
                ;

022E            GetConnection   proc    far             ;far call

----            cParms          struc

0000            cOld_bp         dw      ?
0002            cOld_ds         dw      ?
0004            cReturn         dd      ?
                cConnectionNumber
0008            &               dw      ?
000A            cNodePointer    dw      ?
000C            cBankNumber     dw      ?               ;last two are really one parm

----            cParms          ends

                ;
                ;       save registers for pascal, and establish parameter addressability
                ;

022E 1E                         push    ds              ;save ds for pascal
022F 55                         push    bp              ;save bp for pascal
0230 8BEC                       mov     bp,sp           ;establish addressability
0232 B8----       R             mov     ax,TileGlobals  ;load TileGlobals segment address
0235 8ED8                       mov     ds,ax           ;set tile segment

                ;
                ;       load parms, and pack
                ;

0237 8B460A                     mov     ax,[bp].cNodePointer    ;load the paragraph pointer
023A 8B560C                     mov     dx,[bp].cBankNumber     ;load the bank number
023D 8B4E08                     mov     cx,[bp].cConnectionNumber;load the connectionNumber
0240 D0E1                       shl     cl,1                    ;shift...
0242 D0E1                       shl     cl,1                    ;...left...
```

```
0244 D0E1                        shl     cl,1                  ;...four...
0246 D0E1                        shl     cl,1                  ;...places
0248 81E20F00                    and     dx,BankFieldMask      ;make sure only bank no in dx
024C 0AD1                        or      dl,cl                 ;or them together

                ;
                ;       restore registers and return
                ;

024E 5D                          pop     bp                    ;restore bp for pascal
024F 1F                          pop     ds                    ;restore ds for pascal
0250 CA0600                      ret     6                     ;return and cleanup stack

                GetConnection    endp



             +1 $eject

                ;
                ;       PROCEDURE GetNodeLocation (Node : NodePointer; VAR X, Y : INTEGER);
                ;
                ;
                ;
                ;

0253            GetNodeLocation proc     far                   ;far call

----            lParms           struc

0000            lOld_bp          dw      ?
0002            lOld_ds          dw      ?
0004            lReturn          dd      ?
0008            lY               dd      ?
000C            lX               dd      ?
0010            lNodePointer     dw      ?                     ;paragraph pointer....
0012            lBank            dw      ?                     ;...bank no (really a longint)

----            lParms           ends

                ;
                ;       save registers, and establish parameter addressability
                ;

0253 1E                          push    ds                    ;save ds for pascal
0254 55                          push    bp                    ;save bp for pascal
0255 8BEC                        mov     bp,sp                 ;establish parm addressability


                ;
                ;       set bank, and load pointer to node
                ;

0257 8B4612                      mov     ax,[bp].lBank         ;load the bank number
025A 250F00                      and     ax,BankFieldMask      ;take the low order nybble
```

```
025D E790                          out     BankSwitch,ax          ;set the proper bank
025F 8B5610                        mov     dx,[bp].lNodePointer   ;load the paragraph pointer
0262 8EC2                          mov     es,dx

                       ;
                       ;       load the node parameters, and set the var parms
                       ;

0264 26A10C00                      mov     ax,es:word ptr 12      ;load the x value of node
0268 268B0E0E00                    mov     cx,es:word ptr 14      ;load the y value of node
026D C45E0C                        les     bx,[bp].lX             ;load pointer to x var parm
0270 268907                        mov     es:[bx],ax             ;set the x var parm
0273 C45E08                        les     bx,[bp].lY             ;Load pointer to y var parm
0276 26890F                        mov     es:[bx],cx             ;set the y var parm

                       ;
                       ;       restore the registers and return to pascal
                       ;

0279 5D                            pop     bp                     ;restore bp
027A 1F                            pop     ds                     ;restore ds
027B CA0C00                        ret     12                     ;cleanup stack and return

                       GetNodeLocation endp                       ;end procedure

                   +1  $eject

                       ;
                       ;       FUNCTION GetNodePointer  (X, Y : INTEGER) : NodePointer;
                       ;
                       ;
                       ;
                       ;

027E                   GetNodePointer  proc    far                ;far procedure

----                   gnParms         struc

0000                   gnOld_ds        dw      ?
0002                   gnOld_bp        dw      ?
0004                   gnReturn        dd      ?
0008                   gnY             dw      ?
000A                   gnX             dw      ?

----                   gnParms         ends


                       ;
                       ;       save registers, and establish addressability
                       ;

027E 1E                            push    ds                     ;save ds for pascal
027F 55                            push    bp                     ;save bp for pascal
0280 8BEC                          mov     bp,sp                  ;establish parm addressability
```

```
0282 B8----         R        mov    ax,TileGlobals          ;load globals segment
0285 8ED8                    mov    ds,ax                   ;establish global address

                      ;
                      ;     get the tile location for the X and Y coordinate
                      ;

0287 FF760A                  push   [bp].gnX                ;load the x parm
028A FF7608                  push   [bp].gnY                ;load the y parm
028D 1E                      push   ds                      ;address of ...
028E B81600         R        mov    ax,OFFSET I             ;... var parameter
0291 50                      push   ax                      ;... I
0292 1E                      push   ds                      ;address of var ...
0293 B81800         R        mov    ax,OFFSET J             ;... var parameter
0296 50                      push   ax                      ;... J
0297 9A0704----     R        call   Far Ptr GetTileIndex    ;
029C A11600         R        mov    ax,I                    ;
029F 3D0000                  cmp    ax,0                    ;do we have a valid tile index?
02A2 7D03                    jge    gnGetTile               ;if so then get the tile pointer
                      ;
02A4 33C0                    xor    ax,ax                   ;invalid any. Return ...
02A6 99                      cwd                            ;...longint NilPointer
02A7 5D                      pop    bp                      ;restore bp for pascal
02A8 1F                      pop    ds                      ;restore ds for pascal
02A9 CA0400                  ret    4                       ;cleanup stack and return
                      ;
02AC 50               gnGetTile:     push   ax              ;
02AD FF361800       R        push   J                       ;
02B1 9AA603----     R        call   Far Ptr GetTilePointer  ;returns es:bx

                      ;
                      ;     access the tile
                      ;

02B6 C6061A000090   R        mov    NewNodeFlag,0           ;clear node just created flag
02BC C6061B000190   R        mov    FirstNodeFlag,1         ;flag indicating no previous node
02C2 891E1C00       R        mov    PreviousNode,bx         ;save pointer to ...
02C6 8C061E00       R        mov    PreviousNode+2,es       ;... node pointer
02CA 268B5702                mov    dx,es:[bx+2]            ;load paragraph pointer
02CE 83FA00                  cmp    dx,0                    ;blank tile?
02D1 7445                    je     allocateTile            ;if so, allocate first node
02D3 268B07                  mov    ax,es:[bx]              ;load bank no

                      ;
                      ;     search through the tile to see if the node exists
                      ;     NOTE:   CheckY is redundant code for speed purposes.
                      ;             It is designed on the assumption that perfectly
                      ;             vertical lines (equal x coordinates) are relatively
                      ;             rare, and since we want to branch on exception
                      ;             rather than the rule, it is faster to replicate code.
                      ;

02D6 8B7E0A                  mov    di,[bp].gnX             ;get the X parm
02D9 8B7608                  mov    si,[bp].gnY             ;get the Y parm
02DC EB1C90                  jmp    StartSearch             ;bypass first part of loop
```

```
                                ;
02DF C6061B000090   R           SearchLoop:     mov     FirstNodeFlag,0         ;flag indicating valid previous node
02E5 89161C00       R                           mov     PreviousNode,dx         ;save node pointer to ...
02E9 A31E00         R                           mov     PreviousNode+2,ax       ;... previous node
02EC 26A00000                                   mov     al,es:byte ptr 0        ;load the next bank no.
02F0 268B160100                                 mov     dx,es:word ptr 1        ;load the paragraph ptr
02F5 83FA00                                     cmp     dx,0                    ;end of tile? (nil ptr?)
02F8 745F                                       je      createnode              ;then create a node!
02FA 8EC2                       StartSearch:    mov     es,dx                   ;load para pointer
02FC 250F00                                     and     ax,BankFieldMask        ;get bank number
02FF E790                                       out     bankswitch,ax           ;set bank
0301 26393E0C00                                 cmp     es:word ptr 12,di       ;are the X parms equal?
0306 75D7                                       jne     SearchLoop              ;no, then try next one
0308 2639360E00                 CheckY:         cmp     es:word ptr 14,si       ;are the Y parms equal?
030D 75D0                                       jne     SearchLoop              ;almost but not quite. DO IT AGAIN, SAM

                                ;
                                ;       this section handles establishing the nodepointer for return
                                ;       to pascal if the node has been found.
                                ;               entry:
                                ;                       es := pointer to found node
                                ;

030F 8BD0                       FoundIt:        mov     dx,ax                   ;load bank in dx
0311 8CC0                                       mov     ax,es                   ;load para pointer
0313 5D                                         pop     bp                      ;restore bs for pascal
0314 1F                                         pop     ds                      ;restore ds for pascal
0315 CA0400                                     ret     4                       ;cleanup stack and return


                                ;
                                ;       this section of code allocates the first node for a tile
                                ;               entry:
                                ;                       es:[bx] := tile
                                ;

0318 06                         allocatetile:   push    es                      ;save tileblockptr
0319 53                                         push    bx                      ;save offset in block
031A 9A0000----     E                           call    allocateParagraph       ;get a paragraph of mem.
031F 5B                                         pop     bx                      ;restore offset
0320 07                                         pop     es                      ;restore tileblockptr
0321 3D0000                                     cmp     ax,0                    ;out of memory?
0324 742E                                       je      gnExit                  ;tuff nuggets, nil returned.
0326 268917                                     mov     es:[bx],dx              ;save the bank number
0329 26894702                                   mov     es:[bx+2],ax            ;save the block pointer
032D 92                                         xchg    ax,dx                   ;load bank number
032E 32E4                                       xor     ah,ah                   ;zero ah
0330 250F00                                     and     ax,BankFieldMask        ;mask all but bank no.
0333 E790                                       out     BankSwitch,ax           ;set the bank
0335 8EC2                                       mov     es,dx                   ;point to the paragraph
0337 26C606030010                               mov     es:byte ptr 3,VisibleUntaggedState ;create node in untagged state
033D 8B5E0A                                     mov     bx,[bp].gnX             ;load x parm
0340 26891E0C00                                 mov     es:word ptr 12,bx       ;set node x
0345 8B5E08                                     mov     bx,[bp].gnY             ;load y parm
0348 26891E0E00                                 mov     es:word ptr 14,bx       ;set y node
034D 92                                         xchg    ax,dx                   ;restore longint form for pascal
034E C6061A000190   R                           mov     NewNodeFlag,1           ;set node just created flag
```

```
0354 5D                  gnExit:         pop     bp                      ;restore bp
0355 1F                                  pop     ds                      ;restore ds
0356 CA0400                              ret     4                       ;cleaup stack and return

                         ;
                         ;       this section creates an node and links it into the previous node
                         ;               entry:
                         ;                       es := para ptr to present node
                         ;                       cx := bank number
                         ;

0359 9A0000----     E    CreateNode:     call    allocateParagraph       ;get a paragraph of mem
035E 3D0000                              cmp     ax,0                    ;out of memory?
0361 74F1                                je      gnExit                  ;tuff nuggets, nil returned.
0363 8B0E1E00       R                    mov     cx,PreviousNode+2       ;restore previous bank no
0367 8E061C00       R                    mov     es,PreviousNode         ;restore previous para ptr
036B 91                                  xchg    cx,ax                   ;load previous bank no
036C E790                                out     BankSwitch,ax           ;make sure we're in right bank
036E 8BC1                                mov     ax,cx                   ;restore the new bank no
0370 80E20F                              and     dl,BankFieldMask        ;mask out new bank no
0373 2608160000                          or      es:byte ptr 0,dl        ;set new link bank no
0378 26A30100                            mov     es:word ptr 1,ax        ;set new link para ptr
037C 92                                  xchg    ax,dx                   ;load new bank no
037D 250F00                              and     ax.BankFieldMask        ;strip the garbage
0380 E790                                out     BankSwitch,ax           ;set new bank no
0382 8EC2                                mov     es,dx                   ;load paragraph ptr
0384 26C606030010                        mov     es:byte ptr 3,VisibleUntaggedState ;create node in untaged state
038A 8B5E0A                              mov     bx,[bp].gnX             ;load x parm
038D 26891E0C00                          mov     es:word ptr 12,bx       ;set node x parm
0392 8B5E08                              mov     bx,[bp].gnY             ;load y parm
0395 26891E0E00                          mov     es:word ptr 14,bx       ;set node x parm
039A 92                                  xchg    ax,dx                   ;restore longint form for pascal
039B C6061A000190   R                    mov     NewNodeFlag,1           ;set node just created flag
03A1 5D                                  pop     bp                      ;restore bp
03A2 1F                                  pop     ds                      ;restore ds
03A3 CA0400                              ret     4                       ;cleanup stack and return

                         GetNodePointer  endp



                    +1   $eject

                         ;
                         ;
                         ;       FUNCTION GetTilePointer(I,J : INTEGER) : ^NodePointer
                         ;
                         ;
                         ;
                         ;


03A6                     GetTilePointer  PROC    FAR                     ;far call
```

```
----                   gtParms     STRUC

0000                   gtOldBP     DW      ?
0002                   gtOldDS     DW      ?
0004                   gtReturn    DD      ?
0008                   gtJ         DW      ?
000A                   gtI         DW      ?

----                   gtParms     ENDS




                       ;
                       ;       save registers for Pascal, and establish addressability
                       ;

03A6 1E                            PUSH    DS                      ;Save DS for pascal
03A7 55                            PUSH    BP                      ;save BP for pascal
03A8 B8----        R               MOV     AX,TileGlobals          ;load pointer to globals
03AB 8ED8                          MOV     DS,AX                   ;establish addressability
03AD 8BEC                          MOV     BP,SP                   ;estab. parm address.

                       ;
                       ;       check parameter range using clipping algorithm
                       ;

03AF 8B5E0A                        MOV     BX,[BP].gtI             ;load the I parm
03B2 8B4608                        MOV     AX,[BP].gtJ             ;load the J parm
03B5 33C9                          XOR     CX,CX                   ;zero map register
03B7 3B1E0400      R               CMP     BX,xTileBegin           ;compare with beginning tile
03BB 13C9                          ADC     CX,CX                   ;add in borrow (carry) bit
03BD 391E0800      R               CMP     xTileEnd,BX             ;compare with ending tile
03C1 13C9                          ADC     CX,CX                   ;add in borrow bit
03C3 3B060600      R               CMP     AX,yTileBegin           ;compare with beginning y tile
03C7 13C9                          ADC     CX,CX                   ;add in borrow bit
03C9 39060A00      R               CMP     yTileEnd,AX             ;compare with ending y tile
03CD 13C9                          ADC     CX,CX                   ;add in borrow bit
03CF 23C9                          AND     CX,CX                   ;set flags
03D1 752A                          JNZ     NilPtrReturn            ;if non zero, then outside range

                       ;
                       ;       compute the address of the tile
                       ;

03D3 2B1E0400      R               SUB     BX,xTileBegin           ;subtract the x start point
03D7 2B060600      R               SUB     AX,yTileBegin           ;subtract the y start point
03DB 8B0E0200      R               MOV     CX,xTiles               ;load the multiplication factor
03DF D1E1                          SHL     CX,1                    ;was in words, now in dblwords
03E1 F7E1                          MUL     CX                      ;compute the address
03E3 D1E3                          SHL     BX,1                    ;compute x offset...
03E5 D1E3                          SHL     BX,1                    ;...in doublewords
```

```
03E7 03C3                          ADD     AX,BX                     ;add x offset
03E9 83D200                        ADC     DX,0                      ;carry into dx
03EC 8BDA                          MOV     BX,DX                     ;load tileblockpointer
03EE D1E3                          SHL     BX,1                      ;...in words
03E0 81C32A00      R               ADD     BX,OFFSET TileBlockPtrs   ;add the offset so bx is set
03F4 8E07                          MOV     ES,[BX]                   ;load the tile block pointer
03F6 8BD8                          MOV     BX,AX                     ;load the offset

                   ;
                   ;       restore registers and return to pascal
                   ;

03E8 5D                            POP     BP                        ;restore bp
03E9 1F                            POP     DS                        ;restore ds
03EA CA0400                        RET     4                         ;cleanup stack and return

                   ;
                   ;       return an nil pointer (range error)
                   ;

03ED 33DB          NilPtrReturn:   XOR     BX,BX                     ;zero BX
03FF 4B                            DEC     BX                        ;load bx with OFFFFH
0400 8EC3                          MOV     ES,BX                     ;load es with OFFFFH
0402 5D                            POP     BP                        ;restore bp
0403 1F                            POP     DS                        ;restore ds
0404 CA0400                        RET     4                         ;cleanup stack and return

                   GetTilePointer  ENDP                              ;end procedure

              +1   $eject

                   ;
                   ;       PROCEDURE GetTileIndex (X,Y : INTEGER; VAR I,J : INTEGER);
                   ;
                   ;
                   ;
                   ;

0407               GetTileIndex    PROC    FAR                       ;Far Call

----               gtiParms        STRUC

0000               gtiOld_BP       DW      ?
0002               gtiOLD_DS       DW      ?
0004               gtiReturn       DD      ?
0008               gtiJ            DD      ?
000C               gtiI            DD      ?
0010               gtiY            DW      ?
0012               gtiX            DW      ?

----               gtiParms        ENDS
```

```
                           ;
                           ;        save registers and establish addressability
                           ;

0407 1E                             PUSH    DS                      ;save ds for pascal
0408 55                             PUSH    BP                      ;save bp for pascal
0409 B8----         R               MOV     AX,TileGlobals          ;load tile globals segment
040C 8ED8                           MOV     DS,AX                   ;establish globals addressability
040E 8BEC                           MOV     BP,SP                   ;establish adoressabilty

                           ;
                           ;        load parms and check range using clipping algorithm
                           ;

0410 8B4612                         MOV     AX,[BP].gtiX            ;load the x parm
0413 8B4E10                         MOV     CX,[BP].gtiY            ;load the y parm
0416 33DB                           XOR     BX,BX                   ;zero map register
0418 3B061400       R               CMP     AX,SaveX1               ;check the x low range
041C 13DB                           ADC     BX,BX                   ;add the borrow flag
041E 39061000       R               CMP     SaveX2,AX               ;check the x high range
0422 13DB                           ADC     BX,BX                   ;add the borrow flag
0424 3B0E1200       R               CMP     CX,SaveY1               ;check the y low range
0428 13DB                           ADC     BX,BX                   ;add the borrow flag
042A 390E0E00       R               CMP     SaveY2,CX               ;check the y high range
042E 13DB                           ADC     BX,BX                   ;add the borrow flag
0430 23DB                           AND     BX,BX                   ;check map for zero
0432 751E                           JNZ     ReturnMinusOnes         ;if outsize range, flag & return

                           ;
                           ;        compute tile location for the X and Y coordinate
                           ;

0434 33D2                           XOR     DX,DX                   ;Clear DX for divide
0436 F7360C00       R               DIV     SaveTileSize            ;divide by the tile size
043A 91                             XCHG    AX,CX                   ;swap for divide
043B 33D2                           XOR     DX,DX                   ;Clear DX for divide
043D F7360C00       R               DIV     SaveTileSize            ;divide y by tile< size

                           ;
                           ;        set var parms and return
                           ;

0441 C45E0C                         LES     BX,[BP].gtiI            ;load I parm address
0444 26890F                         MOV     ES:[BX],CX              ;set I parm
0447 C45E08                         LES     BX,[BP].gtiJ            ;load J parm address
044A 268907                         MOV     ES:[BX],AX              ;set J parm
044D 5D                             POP     BP                      ;restore bp
044E 1F                             POP     DS                      ;restore ds
044F CA0C00                         RET     12                      ;cleanup stack and return

0452 B8FFFF                ReturnMinusOnes:MOV AX,0FFFFH            ;load a minus one...
0455 8BC8                           MOV     CX,AX                   ;...into the I and J registers
0457 C45E0C                         LES     BX,[BP].gtiI            ;load I parm address
045A 26890F                         MOV     ES:[BX],CX              ;set I parm
045D C45E08                         LES     BX,[BP].gtiJ            ;load J parm address
```

```
0460 26B907                         MOV    ES:[BX],AX          ;set J parm
0463 5D                             POP    BP                  ;restore bp
0464 1E                             POP    DS                  ;restore ds
0465 CA0C00                         RET    12                  ;cleanup stack and return


                 GetTileIndex       ENDP                       ;end procedure



              +1 $eject

                 ;
                 ;       FUNCTION ExamineNodeTraversedFlag (Node : NodePointer) : BOOLEAN;
                 ;
                 ;
                 ;
                 ;

                 ExamineNodeTraversedFlag
0468             $                  proc   far                 ;far call

----             eParms             struc

0000             eOld_bp            dw     ?
0002             eOld_ds            dw     ?
0004             eReturn            dd     ?
0008             ePara              dw     ?                   ;really one parm...
000A             eBank              dw     ?                   ;...of type nodepointer

----             eParms             ends

                 ;
                 ;       save registers for pascal and establish addressability
                 ;
0468 1E                             push   ds                  ;save ds for pascal
0469 55                             push   bp                  ;save bp for pascal
046A B8----      R                  mov    ax,TileGlobals      ;load tile global segment
046D 8ED8                           mov    ds,ax               ;set global segment
046F 8BEC                           mov    bp,sp               ;establish parm. address.
0471 33C0                           xor    ax,ax               ;init false value
0473 837E0800                       cmp    [bp].ePara,NilPointer  ;nil pointer passed in?
0477 7457                           je     eExit               ;then return false

                 ;
                 ;       set the proper bank
                 ;

0479 8B460A                         mov    ax,[bp].eBank       ;load the bank no.
047C 250F00                         and    ax,BankFieldMask    ;mask out all but bank no
047F E790                           out    BankSwitch,ax       ;set the proper bank

                 ;
                 ;       get the tile pointer, and check the tile traversed flag
                 ;
```

```
0481 8E4608                        mov     es,[bp].ePara          ;load paragraph ptr
0484 26FF360C00                    push    es:word ptr 12         ;pass the x parm of the node
0489 26FF360E00                    push    es:word ptr 14         ;pass the y parm of the node
048E 1E                            push    ds                     ;pass the var parm....
048F BB160090     R                mov     bx,offset I            ;....I....
0493 53                            push    bx                     ;for GetTileIndex
0494 1E                            push    ds                     ;pass the var parm....
0495 BB190090     R                mov     bx,offset J            ;....J....
0499 53                            push    bx                     ;for GetTileIndex
045A 9A0704----   R                call    GetTileIndex           ;Get the tile index
049F FF361600     R                push    I                      ;pass the I parm
04A3 FF361800     R                push    J                      ;pass the J parm
04A7 9AA603----   R                call    GetTilePointer         ;find the tile pointer
04AC 32C0                          xor     al,al                  ;set boolean 'false'
                                   test    word ptr es:[bx],
04AE 26F7074000           &                TileTraversedFlag      ;check the tile traversed flag
04B3 741B                          jz      eExit                  ;nothing has been traversed

                          ;
                          ;     load the parms again, and check the actual node referenced
                          ;

04B5 8B5608                        mov     dx,[bp].ePara          ;load the paragraph pointer
04B8 8EC2                          mov     es,dx                  ;set up es for reference
04BA 8B460A                        mov     ax,[bp].eBank          ;load the bank no.
04BD 250F00                        and     ax,BankFieldMask       ;mask out all but bank no
04C0 E790                          out     BankSwitch,ax          ;set the proper bank


                          ;
                          ;     load the nodeflags, and set boolean return value
                          ;

04C2 32C0                          xor     al,al                  ;set boolean 'false'
04C4 268A1E0000                    mov     bl,es:byte ptr 0       ;get the flags
04C9 F6C340                        test    bl,NodeTraversedFlag   ;is the flag set
04CC 7402                          jz      eExit                  ;if not, return the false
04CE FEC0                          inc     al                     ;otherwise set a '1' (true)

                          ;
                          ;     restore registers and return
                          ;

04D0 5D                   eExit:   pop     bp                     ;restore bp
04D1 1F                            pop     ds                     ;restore ds
04D2 CA0400                        ret     4                      ;cleanup stack and return

                          ExamineNodeTraversedFlag
                          &        endp                           ;end procedure

                     +1   $eject

                          ;
                          ;     PROCEDURE SetNodeTraversedFlag (Node : NodePointer);
```

```
                          ;
                          ;
                          ;
                          ;

                          SetNodeTraversedFlag
04D5                      &          proc    far                    ;far call

----                      SetParms           struc

0000                      setOld_ds          dw      ?
0002                      setOld_bp          dw      ?
0004                      setReturn          dd      ?
0006                      setPara            dw      ?              ;paragraph pointer....
000A                      setBank            dw      ?              ;and bank number are one parm

----                      SetParms           ends

                          ;
                          ;      save registers for pascal and establish addressability
                          ;
04D5 1E                              push    ds                     ;save ds for pascal
04D6 55                              push    bp                     ;save bp for pascal
04D7 B8----          R               mov     ax,TileGlobals         ;load tile global segment
04DA 8ED8                            mov     ds,ax                  ;set global segment
04DC 8BEC                            mov     bp,sp                  ;estab. parm. address.
04DE 8E4606                          mov     es,[bp].setPara        ;load paragraph ptr

                          ;
                          ;      set the proper bank
                          ;

04E1 8B460A                          mov     ax,[bp].setBank        ;load the bank no.
04E4 250F00                          and     ax,BankFieldMask       ;mask out all but bank no
04E7 E790                            out     BankSwitch,ax          ;set the proper bank

                          ;
                          ;      get the tile pointer, and check the tile traversed flag
                          ;

04E9 26FF360C00                      push    es:word ptr 12         ;pass the x parm of the node
04EE 26FF360E00                      push    es:word ptr 14         ;pass the y parm of the node
04F3 1E                              push    ds                     ;pass the var parm....
04F4 BB1600          R               mov     bx,offset I            ;....I....
04F7 53                              push    bx                     ;for GetTileIndex
04F8 1E                              push    ds                     ;pass the var parm....
04F9 BB1800          R               mov     bx,offset J            ;....J....
04FC 53                              push    bx                     ;for GetTileIndex
04FD 9A0704----      R               call    GetTileIndex           ;Get the tile index
0502 FF361600        R               push    I                      ;pass the I parm
0506 FF361800        R               push    J                      ;pass the J parm
050A 9AA603----      R               call    GetTilePointer         ;find the tile pointer
                                     test    word ptr es:[bx],
050F 26F7074000           &                  TileTraversedFlag      ;check the tile traversed flag
```

```
0516 7540                 jnz     SetNodeTrav              ;Tile doesn't need resetting

                ;
                ;       set the tile traversed flag
                ;

0518 268B07               mov     ax,es:[bx]               ;load the tile traversed flag
051B 0D4000               or      ax,TileTraversedFlag     ;set the flag
051E 268907               mov     es:[bx],ax               ;replace in Tile
0521 268E4702             mov     es,es:[BX+2]             ;load first node's para
0525 250F00               and     ax,BankFieldMask         ;clear flags
0528 E790                 out     BankSwitch,ax            ;set the first node's bank
052A 26A00000             mov     al,es:byte ptr 0         ;load node traversed flag
052E 24BF                 and     al,NOT(NodeTraversedFlag);unconditional reset
0530 26A20000             mov     es:byte ptr 0,al         ;put it back



                ;
                ;       reset the current tile
                ;

0534 26A00000   CheckNodeTrav:  mov  al,es:byte ptr 0      ;load the bank pointer
0538 268B160100           mov     dx,es:word ptr 1         ;load the parag. pointer
053D 23D2                 and     dx,dx                    ;nil pointer?
053F 7417                 jz      SetNodeTrav              ;if so, we're done.
0541 250F00               and     ax,BankFieldMask         ;isolate the bank number
0544 E790                 out     BankSwitch,ax            ;set the proper bank
0546 8EC2                 mov     es,dx                    ;load the paragraph pointer
0548 26A00000             mov     al,es:byte ptr 0         ;load the travered flag
054C A840                 test    al,NodeTraversedFlag     ;is it set?
054E 74E4                 jz      CheckNodeTrav            ;if not, get the next node
0550 24BF                 and     al,NOT(NodeTraversedFlag);reset the flag
0552 26A20000             mov     es:byte ptr 0,al         ;replace flags
0556 EBDC                 jmp     CheckNodeTrav            ;do the next node

                ;
                ;       access the flag, and set it.  Then put it back
                ;

0558 8E4608     SetNodeTrav:    mov  es,[bp].setPara       ;load paragraph ptr
055B 8B460A               mov     ax,[bp].setBank          ;load the bank no.
055E 250F00               and     ax,BankFieldMask         ;mask out all but bank no
0561 E790                 out     BankSwitch,ax            ;set the proper bank
0563 26A00000             mov     al,es:byte ptr 0         ;get flags
0567 0C40                 or      al,NodeTraversedFlag     ;set the flag
0569 26A20000             mov     es:byte ptr 0,al         ;put it back

                ;
                ;       restore registers and return
                ;

056D 5D                   pop     bp                       ;restore bp
056E 1F                   pop     ds                       ;restore ds
056F CA0400               ret     4                        ;clean up stack and return
```

```
                    SetNodeTraversedFlag
                    &               endp                             ;end of procedure

                    $eject

                    ;
                    ;       PROCEDURE ResetNodeTraversedFlags;
                    ;
                    ;
                    ;
                    ;

                    ;
                    ;       no structure, resets NodeTraversedFlag in every FirstNodeInTile.
                    ;
                    ;       CALLS: FirstNodeInTile
                    ;

                    ;
                    ;       Save pascal parameters, no addressability needed, but bp saved
                    ;       just in case
                    ;

                    ResetNodeTraversedFlags
0572                &               proc    far                      ;far call

                    ;
                    ;       save pascal registers
                    ;

0572 1E                             push    ds                       ;save ds
0573 55                             push    bp                       ;save bp
0574 B8----      R                  mov     ax,TileGlobals           ;load para pointer to globals
0577 8ED8                           mov     ds,ax                    ;establish addressability
0579 8BEC                           mov     bp,sp                    ;estab. parm. address.


                    ;
                    ;       loop through, and reset node traversed flag in first node in
                    ;       every tile.
                    ;

057B 8B0E2800    R                  mov     cx,Partial64KblockSize   ;load length of partial 64K block
057F 8B1E3A00    R                  mov     bx,NumberOfPtrs          ;load number of pointers
0583 D1E3                           shl     bx,1                     ;no. of ptrs in words
0585 81C32A00    R                  add     bx,OFFSET TileBlockPtrs  ;compute address
0589 53             ResetLoop:      push    bx                       ;save ptr address
058A 1E                             push    ds                       ;save ds
058B D1E9                           shr     cx,1                     ;no of nodepointers....
058D D1E9                           shr     cx,1                     ;...in doublewords.
058F 8E1F                           mov     ds,[bx]                  ;load pointer
0591 33DB                           xor     bx,bx                    ;point to first tile
0593 8B07           BlockLoop:      mov     ax,[bx]                  ;pick up tile flags byte
```

```
0595 A94000        test    ax,TileTraversedFlag    ;has the tile been travereseed?
0598 7405          jz      next                    ;if not, don't reset
059A 25BFFF        and     ax,NOT(TileTraversedFlag);reset traversed flag
059D 8907          mov     [bx],ax                 ;replace flags in tile
059F 83C304  Next: add     bx,4                    ;point to next tile
05A2 E2EF          loop    BlockLoop               ;continue till end of block
05A4 1F            pop     ds                      ;restore ds
05A5 5B            pop     bx                      ;restore Tileblockptr
05A6 B9FFFF        mov     cx,0FFFFH               ;load 64K block count
05A9 4B            dec     bx                      ;point to next...
05AA 4B            dec     bx                      ;....block pointer
05AB 81FB2A00 R    cmp     bx,OFFSET TileBlockPtrs ;are we through?
05AF 73D8          jae     ResetLoop               ;if not, then continue


             ;
             ;       cleanup registers, and return to pascal
             ;

05B1 5D      TilesDone:    pop     bp              ;restore bp
05B2 1F                    pop     ds              ;restore ds
05B3 CB                    ret                     ;return, no parm cleanup needed

             ResetNodeTraversedFlags
             &             endp                    ;end procedure

             $eject

             ;
             ;       FUNCTION GetConnectionNumber(Connection : ConnectionPointer) : INTEGER;
             ;
             ;
             ;
             ;
             ;
             ;       This function checks to find the connection number of the present
             ;       connection.
             ;
             ;       ERROR CODES : None.
             ;
             ;               Entry: sp
             ;               Exit : dx,ax
             ;               Blows:
             ;
----         GCNParameters Struc

0000         GCNold_bp       dw      ?
0002         GCNret_addr     dd      ?
0006         GCNconn_addr    dw      ?
0008         GCNconn_bank    dw      ?

----         GCNParameters   Ends
```

```
05B4                GetConnectionNumber     Proc     Far
05B4 55                          push     bp                 ;save for Pascal
05B5 8BEC                        mov      bp,sp              ;establish addressability to parameters
                    ;
                    ; Main body of program.
                    ;
05B7 33D2                        xor      dx,dx                         ;zero out dx
05B9 8B4606                      mov      ax,[bp].GCNconn_bank          ;get connection and bank no.
05BC D1E8                        shr      ax,1                          ;shift left 4 times to
05BE D1E8                        shr      ax,1                          ;get rid of bank number.
05C0 D1E8                        shr      ax,1
05C2 D1E8                        shr      ax,1
05C4 250F00                      and      ax,BankFieldMask              ;clear out upper bits
                    ;
                    ; Return to calling subroutine.
                    ;
05C7 5D                          pop      bp                            ;restore for pascal
05C8 CA0400                      ret      4                             ;remove 4 bytes from stack and return

                    GetConnectionNumber
                    &            endp                                   ;end procedure

                    $eject

                    ;
                    ;       PROCEDURE DeleteNode (Node : NodePointer);
                    ;
                    ;
                    ;
                    ;

                    ;
                    ;    This function procedure removes the specified node from the tile
                    ;      structure and returns it to the pool of available paragraphs.
                    ;      NOTE - There must be no connections to that node or further processing
                    ;      may cause unpredictable results.
                    ;
                    ;      ERROR CODES : None.
                    ;
                    ;              Entry: sp
                    ;              Exit : none
                    ;              Blows:
                    ;
----                DNParameters Struc

0000                DNold_ds        dw      ?
0002                DNold_bp        dw      ?
0004                DNret_addr      dd      ?
0008                DNnode          dw      ?,?

----                DNParameters    Ends

05CB                DeleteNode      PROC    FAR

```

```
05CB 55                 push   bp                      ;save for Pascal
05CC 1E                 push   ds                      ;save for Pascal
05CD B8----      R      mov    ax,TileGlobals          ;load para pointer to globals
05D0 8ED8               mov    ds,ax                   ;establish addressability
05D2 8BEC               mov    bp,sp                   ;establish addressability to parameters
                 ;
05D4 8B450A             mov    ax,[bp].DNnode+2        ;get nodes bank
05D7 250F00             and    ax,BankFieldMask        ;and only bank
05DA E790               out    BankSwitch,ax           ;switch to proper bank
05DC 8E4608             mov    es,[bp].DNnode          ;get para address
                 ;
05DF 50                 push   ax                      ;parameter for later ...
05E0 06                 push   es                      ;... call to DisposeParagraph
                 ;
05E1 26FF360100         push   es:Word Ptr 1           ;save next ...
05E6 26A00000           mov    al,es:Byte Ptr 0        ;... node in tile ...
05EA 250F00             and    ax,BankFieldMask        ;... link information ...
05ED 50                 push   ax                      ;... for later
                 ;
05EE 26FF360C00         push   es:Word Ptr 12          ;push X parm
05F3 26FF360E00         push   es:Word Ptr 14          ;push Y parm
05F8 9A7E02----  R      Call   Far Ptr GetNodePointer  ;get the node (and previous node)
                 ;
05FD 803E1E0001  R      cmp    FirstNodeFlag,1         ;was it the first node in tile?
0602 7427               je     DN_delete_first         ;if so then special case
                 ;
0604 A11E00      R      mov    ax,PreviousNode+2       ;bank # of previous node
0607 250F00             and    ax,BankFieldMask        ;make sure just bank #
060A E790               out    BankSwitch,ax           ;switch to proper bank
060C 8E061C00    R      mov    es,PreviousNode         ;get previous node address
0610 58                 pop    ax                      ;get new link bank #
0611 2680260000F0       and    es:Byte Ptr 0, NOT BankFieldMask ;preserve node flags
0617 2608060000         or     es:Byte Ptr 0,al        ;store new link bank #
061C 268F060100         pop    es:Word Ptr 1           ;store new link para address
0621 9A0000----  E      call   Far Ptr DisposeParagraph;return node to free pool
                 ;
0626 1F                 pop    ds                      ;restore for Pascal
0627 5D                 pop    bp                      ;restore for Pascal
0628 CA0400             ret    4                       ;return - remove parameter
                 ;
062B 8E061E00    R      DN_delete_first:mov  es,PreviousNode+2 ;segment address
062F 8B1E1C00    R      mov    bx,PreviousNode         ;offset of tile ptr
0633 268F07             pop    es:Word Ptr [bx]        ;save new pointer to ...
0636 268F4702           pop    es:Word Ptr [bx+2]      ;... new first node in tile
063A 9A0000----  E      call   Far Ptr DisposeParagraph;return node to free pool
                 ;
063F 1F                 pop    ds                      ;restore for Pascal
0640 5D                 pop    bp                      ;restore for Pascal
0641 CA0400             ret    4                       ;return - remove parameter

                 DeleteNode      ENDP

                 $eject
```

```
----                          CDNparameters   STRUC

0000                          CDNold_ds       dw      ?
0002                          CDNold_bp       dw      ?
0004                          CDNret_addr     dd      ?

0008                          CDNy            dw      ?
000A                          CDNx            dw      ?

----                          CDNparameters   ENDS

0644                          CreateDuplicateNode      PROC    FAR

                              ;FUNCTION CreateDuplicateNode ( X, Y : INTEGER ) : NodePointer;
                              ;
                              ;  This function creates a duplicate node at the given x-y coords,
                              ;  if necessary.  If a node already exists, then a duplicate is created and
                              ;  is linked into the tile following the original.  If a node did not already
                              ;  exist then a node is created and linked into the tile at the end of the
                              ;  link list (which is automatically done by GetNodePointer)
                              ;
                              ;  AUTHOR: Rich Knowles

0644 55                                       push    bp                      ;save for Pascal
0645 1E                                       push    ds                      ;save for Pascal
0646 B8----          R                        mov     ax,TileGlobals          ;
0649 8ED8                                     mov     ds,ax                   ;
064B 8BEC                                     mov     bp,sp                   ;
                              ;
064D FF760A                                   push    [bp].CDNx               ;
0650 FF7608                                   push    [bp].CDNy               ;
0653 9A7E02----      R                        call    Far Ptr GetNodePointer  ;returns dx:ax
0658 803E1A0001      R                        cmp     NewNodeFlag,1           ;was node just gotten a new node
065D 7459                                     je      CDN_return              ;if so then return it
                              ;
                              ;GetNodePointer returned a node that already existed so the remainder of
                              ;this code is creating a new node and linking it in to the tile structure
                              ;
065F 50                                       push    ax                      ;save node ...
0660 52                                       push    dx                      ;... pointer returned
0661 8EC0                                     mov     es,ax                   ;addressability
0663 26A00000                                 mov     al,es:Byte Ptr 0        ;bank field of link
0667 50                                       push    ax                      ;save it for after call
0668 26FF360100                               push    es:Word Ptr 1           ;node address of link
066D 9A0000----      E                        call    Far Ptr AllocateParagraph ;returns dx:ax
                              ;
                              ;Put link to next node in tile into the link field of the node just allocated
                              ;
0672 8EC0                                     mov     es,ax                   ;addressability
0674 268F060100                               pop     es:Word Ptr 1           ;store node address
0679 5B                                       pop     bx                      ;recover link bank
067A 80E30F                                   and     bl,NOT NodeFlagsMask    ;remove flag info
067D 26881E0000                               mov     es:Byte Ptr 0,bl        ;store node bank
                              ;
```

```
                          ;Put link to node just created into node that existed already
                          ;
0682 58                                   pop     ax                        ;recover bank of existing node
0683 E790                                 out     BankSwitch,ax             ;insure proper bank
0685 8CC0                                 mov     ax,es                     ;save created nodes address
0687 07                                   pop     es                        ;addressability
0688 26A30100                             mov     es:Word Ptr 1,ax          ;store link to created node
068C 2680260000F0                         and     es:Byte Ptr 0,NodeFlagsMask ;preserve node flags ...
0692 80E20F                               and     dl,NOT NodeFlagsMask      ;... will storing bank ...
0695 2608160000                           or      es:Byte Ptr 0,dl          ;... # of created node
                          ;
                          ;Place X-Y coordinates in to the created node - this will in effect cause there
                          ;to be two (2) nodes to have the same x-y's.  It is the callers responsiblity
                          ;to insure that this is only temporary.
                          ;
069A 8EC0                                 mov     es,ax                     ;addressability
069C 8BC2                                 mov     ax,dx                     ;switch to ...
069E E790                                 out     BankSwitch,ax             ;... the proper bank
06A0 26C606030010                         mov     es:Byte Ptr 3,VisibleUntaggedState ;create node in untaged state
06A6 8B5E0A                               mov     bx,[bp].CDNx              ;get x value ...
06A9 26891E0C00                           mov     es:Word Ptr 12,bx         ;... and store it
06AE 8B5E08                               mov     bx,[bp].CDNy              ;get y value ...
06B1 26891E0E00                           mov     es:Word Ptr 14,bx         ;... and store it
06B6 8CC0                                 mov     ax,es                     ;restore longint form dx:ax
                          ;
06B8 1F                   CDN_return:     pop     ds                        ;restore for Pascal
06B9 5D                                   pop     bp                        ;restore for Pascal
06BA CA0400                               ret     4

                          CreateDuplicateNode     ENDP

                          $eject

06BD                      FirstTraversedNode      PROC    FAR

                          ;FUNCTION FirstTraversedNode : NodePointer;
                          ;
                          ;  This function (and NextTraversedNode) searches through the entire tile
                          ;  structure looking for nodes that have been traversed.  The search is speeded
                          ;  up by ignoring those tiles that do not have the tile traversed flag set.
                          ;  This flag indicates whether any nodes in the tile have been traversed.


06BD 1E                                   push    ds                        ;save for Pascal
06BE B8----         R                     mov     ax,TileGlobals            ;
06C1 8ED8                                 mov     ds,ax                     ;
                          ;
06C3 A10400         R                     mov     ax,xTileBegin             ;get begining tile x value
06C6 48                                   dec     ax                        ;dec to offset inc later in NTN
06C7 8B1E0600       R                     mov     bx,yTileBegin             ;get begining tile y value
06CB 33C9                                 xor     cx,cx                     ;set to zero
06CD A32000         R                     mov     LastxTileExamined,ax      ;save it for NextTraversedNode
06D0 891E2200       R                     mov     LastyTileExamined,bx      ;save it for NextTraversedNode
06D4 890E2400       R                     mov     NextNodeToExamine,cx      ;clear out next node ...
```

```
06D8 890E2600      R                      mov    NextNodeToExamine+2,cx  ;... to cause first tile to be loaded
                          ;
06DC 9AE206----    R                      call   Far Ptr NextTraversedNode; returns dx,ax
06E1 1F                                   pop    ds                      ;restore for Pascal
06E2 CB                                   ret

                          FirstTraversedNode     ENDP

                      +1  $eject

06E3                      NextTraversedNode      PROC    FAR

                          ;FUNCTION NextTraversedNode : NodePointer;
                          ;
                          ;  This function (and FirstTraversedNode) searches through the entire tile
                          ;  structure looking for nodes that have been traversed.  The search is speeded
                          ;  up by ignoring those tiles that don not have the tile traversed flag set.
                          ;  This flag indicates whether any nodes in the tile have been traversed.
                          ;
                          ;

06E3 1E                                   push   ds                      ;save for Pascal
06E4 B8----        R                      mov    ax,TileGlobals          ;
06E7 8ED8                                 mov    ds,ax                   ;
                          ;
06E9 C4062400      R                      les    ax,Dword Ptr NextNodeToExamine ;get next node
06ED 8CC3                                 mov    bx,es                   ;temporary for cmp
06EF 83FB00                               cmp    bx,NilPointer           ;looked at all nodes in tile?
06F2 753C                                 jne    NTN_next_node           ;if not then get next node
                          ;
06F4 FF062000      R      NTN_next_tile:  inc    LastxTileExamined       ;increment to next tile
06F8 A12000        R                      mov    ax,LastxTileExamined    ;get last x tile value
06FB 3B060800      R                      cmp    ax,xTileEnd             ;at end of x values?
06FE 7E18                                 jle    NTN_get_first_node      ;if not, get first node in tile
                          ;
0701 A10400        R                      mov    ax,xTileBegin           ;reset x tile value ...
0704 A32000        R                      mov    LastxTileExamined,ax    ;... and save it
0707 FF062200      R                      inc    LastyTileExamined       ;point to next set
070B A12200        R                      mov    ax,LastyTileExamined    ;get last y tile value
070E 3B060A00      R                      cmp    ax,yTileEnd             ;at end of y values?
0712 7E05                                 jle    NTN_get_first_node      ;if not, get first node in tile
                          ;
0714 33C0                                 xor    ax,ax                   ;return value ...
0716 99                                   cwd                            ;... of NilPointer
0717 1F                                   pop    ds                      ;restore for Pascal
0718 CB                                   ret
                          ;
                          NTN_get_first_node:
0719 FF362000      R      &               push   LastxTileExamined       ;push x tile value
071D FF362200      R                      push   LastyTileExamined       ;push y tile value
0721 9AA603----    R                      call   Far Ptr GetTilePointer  ;returns es:bx
0726 26F7074000                           test   es:Word Ptr [bx],TileTraversedFlag ;is flag set
072B 74C7                                 jz     NTN_next_tile           ;if not, then skip this tile
                          ;
072D 26C407                               les    ax,es:Dword Ptr [bx]    ;get first node in tile
```

```
                       ;
0730 8CC3              NTN_next_node:  mov   bx,es                    ;temporary for cmp
0732 83FB00                            cmp   bx,NilPointer            ;is next node a nil pointer?
0735 74BD                              je    NTN_next_tile            ;if so then look at next tile
                       ;
0737 250F00                            and   ax,BankFieldMask         ;clear all but bank #
073A E790                              out   BankSwitch,ax            ;insure proper bank
073C 268A160000                        mov   dl,es:Byte ptr 0         ;get flags
0741 F6C240                            test  dl.NodeTraversedFlag     ;has node been traversed?
0744 7509                              jnz   NTN_found_node           ;if so then clear up and return
                       ;
0746 8AC2                              mov   al,dl                    ;get next ...
0748 268E060100                        mov   es,es:Word Ptr 1         ;... node in tile
074D EBE1                              jmp   NTN_next_node            ;try this one
                       ;
                       ;
074E 81E20F00          NTN_found_node: and   dx,BankFieldMask         ;get pointer to ...
0753 268B1E0100                        mov   bx,es:Word Ptr 1         ;... next node in tile
0758 89162400     R                    mov   NextNodeToExamine,dx     ;save the pointer for ...
075C 891E2600     R                    mov   NextNodeToExamine+2,bx   ;... for next time around
0760 8BD0                              mov   dx,ax                    ;restore to proper ...
0762 8CC0                              mov   ax,es                    ;... longint form
0764 1F                                pop   ds                       ;restore for Pascal
0765 CB                                ret

                       NextTraversedNode       ENDP

----                   TileSegment     ends

                    +1 $eject

----                   TileGlobals     segment word                   ;word aligned for fast access


                       ;
                       ;       TileGlobals:  abandon all hope, ye who enter here
                       ;

0000 ????              yTiles                dw    ?        ;no. of tiles on y axis (words)
0002 ????              xTiles                dw    ?        ;no. of tiles on x axis (words)
0004 ????              xTileBegin            dw    ?        ;index of first x tile number
0006 ????              yTileBegin            dw    ?        ;index of first y tile number
0008 ????              xTileEnd              dw    ?        ;index of last x tile
000A ????              yTileEnd              dw    ?        ;index of last y tile
000C 0001              SaveTileSize          dw    256      ;TileSize
000E FF7F              SaveY2                dw    7FFFH    ;save area for Y2
0010 FF7F              SaveX2                dw    7FFFH    ;save area for X2
0012 0000              SaveY1                dw    0000     ;save area for Y1
0014 0000              SaveX1                dw    0000     ;save area for X1
0016 ????              I                     dw    ?        ;x tile variable (scratch)
0018 ????              J                     dw    ?        ;y tile variable (scratch)

001A ??                NewNodeFlag           db    ?        ;indicates last node was a new node
```

```
001B ??           1803    FirstNodeFlag          db      ?             ;indicates invalid previous node
001C ????         1804    PreviousNode           dw      ?,?           ;node pointer of previous node ...
001E ????
                  1805                                                 ;... of last node gotten in GetNodePtr
                  1806
0020 ????         1807    LastxTileExamined      dw      ?             ;last tile looked at ...
0022 ????         1808    LastyTileExamined      dw      ?             ;... in traversed node routines
0024 ????         1809    NextNodeToExamine      dw      ?,?           ;next node to test for travsersed
0026 ????
                  1810
                  1811    Partial64KBlockSize
0028 ????         1812    &              dw      ?                     ;space for partial block size
                  1813
002A (8           1814    TileBlockPtrs  dw      NoOfTileBlockPtrs dup (?) ;pointers to tileblocks
     ????
     )
                  1815
003A ????         1816    NumberOfPtrs   dw      ?                     ;total number of TileBlockPtrs
                  1817
003C ????         1818    ErrorFlag      dw      ?                     ;error flag for Allocate
                  1819
                  1820
                  1821    TileGlobals
----              1822    &              ends                          ;end globals segment
                  1823
                  1824                   end                           ;end

ASSEMBLY COMPLETE, NO ERRORS FOUND
```

```
Source File: A:CONNECTP.PAS
Object File: <none>
Controls Specified:  ERRORPRINT. NOOBJECT, PRINT(D:CONNECTP.LST[G9]), SUBTITLE(            PROCEDURES AND FUNCTIONS),
TITLE(                CONNECTION ROUTINES (PASCAL)).

STMT LINE NESTING       SOURCE TEXT: A:CONNECTP.PAS
   1     3  0  0
                        MODULE Connections;
   2     5  0  0

                        {*****************************************************************************}

                        PUBLIC SpatialLibrary;

   3    12  0  0          CONST
                            NilConnection       = 0;
   4    14  0  0            NilNode             = 0;
   5    15  0  0            MaxConnections      = 14;
```

```
 6  17  0  0     TYPE
                    ConnectionPointer     = LongInt;

 7  20  0  0        NodePointer           = LongInt;

 8  22  0  0        ParagraphPointer      = LongInt;

 9  24  0  0        PointerToNodePointer= ^NodePointer;

10  26  0  0        StateType             = (Hidden,
                                              Untagged,
                                              Selected,
                                              Written,
                                              SelectedAndWritten,
                                              Primitive,
                                              Reserved6,
                                              Reserved7);

11  35  0  0        StructureActionType = (DoNothing,
                                              AddToStructure,
                                              DeleteFromStructure);

12  39  0  0        TransitionMask        = PACKED ARRAY [Hidden..Reserved7] OF CHAR;

13  41  0  0        TypeOfNeighbor        = (Nodes, Lines, Edges);

14  44  0  0     FUNCTION  ConnectionTraversable (Connection : ConnectionPointer) : Boolean;

15  46  0  0     FUNCTION  CreateConnection (Node1            : NodePointer;
                                             Node2            : NodePointer;
                                             FilledAreaFlag   : Boolean;
                                             ConnectionState: StateType)
                                           : ConnectionPointer;

16  52  0  0     FUNCTION  CreateDuplicateNode (x,y : INTEGER)

17  55  0  0     PROCEDURE DeleteConnection (Connection : ConnectionPointer);

18  57  0  0     PROCEDURE DeleteNode (Node : NodePointer);

19  59  0  0     FUNCTION  EndNode (Connection : ConnectionPointer)
                                 : NodePointer;

20  62  0  0     FUNCTION  ExamineNodeTraversedFlag (Node : NodePointer)
                                                      : Boolean;

21  65  0  0     FUNCTION  FirstPolylineInObject (Node : NodePointer)
                                                  : ConnectionPointer;

22  68  0  0     FUNCTION  FirstTraversedNode : NodePointer;

23  70  0  0     FUNCTION  GetConnection (Node             : NodePointer;
                                          ConnectionNumber : INTEGER)
                                        : ConnectionPointer;
```

```
24   74  0  0        PROCEDURE GetConnectionInformation (     Connection : ConnectionPointer;
                                                          VAR Edge       : Boolean;
                                                          VAR State      : StateType);

25   78  0  0        FUNCTION  GetConnectionNumber (Connection : ConnectionPointer)
                                                   : INTEGER;

26   81  0  0        PROCEDURE GetNodeLocation (     Node : NodePointer;
                                                 VAR x,y  : INTEGER);

27   84  0  0        FUNCTION  GetNodePointer (x,y : INTEGER)
                                              : NodePointer;

28   87  0  0        FUNCTION  NextConnectionInPolyline (CurrentConnection : ConnectionPointer;
                                                        FirstConnection   : ConnectionPointer)
                                                       : ConnectionPointer;

29   91  0  0        FUNCTION  NextPolylineInObject : ConnectionPointer;

30   93  0  0        FUNCTION  NextTraversedNode : NodePointer;

31   95  0  0        FUNCTION  NumberOfConnections (Node : NodePointer)
                                                   : INTEGER;

32   98  0  0        FUNCTION  NumberOfTilesContainingLine (x1,y1 : INTEGER;
                                                            x2,y2 : INTEGER)
                                                           : INTEGER;

33  102  0  0        FUNCTION  ReciprocalConnection (Connection : ConnectionPointer)
                                                    : ConnectionPointer;

34  105  0  0        PROCEDURE ResetNodeTraversedFlags;

35  107  0  0        PROCEDURE SetNodeTraversedFlag (Node : NodePointer);
36  109  0  0        PROCEDURE SetTransitionMask (VAR NextMask     : TransitionMask;
                                                  VAR PreviousMask : TransitionMask);

37  112  0  0        FUNCTION TransferConnectionField ( CurrentConnection : ConnectionPointer;
                                                        NewNode           : NodePointer)
                                                      : ConnectionPointer;

38  116  0  0      PUBLIC BankRam;

39  118  0  0        FUNCTION  NumberOfAvailableParagraphs : LongInt;

40  120  0  0      $INCLUDE (Maskdefs.ext);
              =1   PUBLIC MaskDefinitions;
41    2  0  0 =1     VAR
              =1       ClearSelectedStructureMask : TransitionMask;
42    4  0  0 =1       CorrectModeMask : TransitionMask;
43    5  0  0 =1       HideModeMask : TransitionMask;
44    6  0  0 =1       RecoverHiddenStructureMask : TransitionMask;
45    7  0  0 =1       SelectModeMask : TransitionMask;
46    8  0  0 =1       WriteSelectedStructureMask : TransitionMask;
```

```
47    9  0  0 =1        TraverseHiddenMask : TransitionMask;
48   10  0  0 =1        TraversePrimitiveMask : TransitionMask;
49   11  0  0 =1        TraverseReserved6Mask : TransitionMask;
50   12  0  0 =1        TraverseReserved7Mask : TransitionMask;
51   13  0  0 =1        TraverseSelectedMask : TransitionMask;
52   14  0  0 =1        TraverseSelectedWrittenMask : TransitionMask;
53   15  0  0 =1        TraverseUntaggedMask : TransitionMask;
54   16  0  0 =1        TraverseWrittenMask : TransitionMask;

55  123  0  0      {*****************************************************************************}

                   PUBLIC Connections;

56  127  0  0        PROCEDURE DeleteNodeAndConnections ( Node                : NodePointer);

57  129  0  0        PROCEDURE DeleteObject             ( Node                : NodePointer;
                                                        State               : StateType);

58  132  0  0        FUNCTION  MergeTwoNodes            ( Node1_              : NodePointer;
                                                        Node2               : NodePointer)
                                                      : NodePointer;

59  136  0  0        FUNCTION  MergeThreeNodes          ( Node1               : NodePointer;
                                                        Node2               : NodePointer;
                                                        Node3               : NodePointer)
                                                      : NodePointer;

60  141  0  0        FUNCTION  MoveNode                 ( Node                : NodePointer;
                                                        NewX, NewY          : INTEGER)
                                                      : Boolean;

61  145  0  0        FUNCTION TransferConnection        ( CurrentConnection : ConnectionPointer;
                                                        NewNode             : NodePointer)
                                                      : ConnectionPointer;

62  149  0  0      $eject;

                   PRIVATE Connections;

63  153  0  0      {*****************************************************************************}
                   {*                                                                           *}
                   {*                                                                           *}
                   {*                                                                           *}
                   {*****************************************************************************}

                   PROCEDURE DeleteNodeAndConnections ( Node              : NodePointer);

64  161  1  0      VAR
                     I : INTEGER;

65  164  1  0      BEGIN

65  166  1  1        FOR I := NumberOfConnections (Node) DOWNTO 1  DO
66  167  1  1          DeleteConnection (GetConnection (Node, I));
```

```
67  169  1  1          DeleteNode (Node);

68  171  1  1        END; {DeleteNodeAndConnections}

69  173  0  0        $eject;
                     {************************************************************************}
                     {*                                                                      *}
                     {*                                                                      *}
                     {*                                                                      *}
                     {************************************************************************}

                     PROCEDURE DeleteObject          ( Node              : NodePointer;
69  182  1  0                                          State             : StateType);

70  184  1  0        VAR
                       I                 : INTEGER;
71  186  1  0          DummyMask         : TransitionMask;
72  187  1  0          PreviousMask      : TransitionMask;
73  188  1  0          BeginConnection   : ConnectionPointer;
74  189  1  0          Connection        : ConnectionPointer;
75  190  1  0          EndConnection     : ConnectionPointer;
76  191  1  0          LastNode          : ConnectionPointer;

77  193  1  0        BEGIN

77  195  1  1          CASE State OF
78  196  1  2            Hidden              : DummyMask := TraverseHiddenMask;
79  197  1  2            Untagged            : DummyMask := TraverseUntaggedMask;
80  198  1  2            Selected            : DummyMask := TraverseSelectedMask;
81  199  1  2            Written             : DummyMask := TraverseWrittenMask;
82  200  1  2            SelectedAndWritten  : DummyMask := TraverseSelectedWrittenMask;
83  201  1  2            Primitive           : DummyMask := TraversePrimitiveMask;
84  202  1  2            Reserved6           : DummyMask := TraverseReserved6Mask;
85  203  1  2            Reserved7           : DummyMask := TraverseReserved7Mask;
86  204  1  2            OTHERWISE             DummyMask := TraverseUntaggedMask;
88  205  1  2          END; {CASE}

90  207  1  1          SetTransitionMask (DummyMask, PreviousMask);
91  208  1  1          ResetNodeTraversedFlags;

92  210  1  1          Node          := GetConnection (Node, 0);
93  211  1  1          Connection    := FirstPolylineInObject (Node);
94  212  1  1          EndConnection := Connection;

95  214  1  1          WHILE Connection <> NilConnection DO
96  215  1  1            BEGIN

96  217  1  2              BeginConnection := Connection;

97  219  1  2              While (Connection <> NilConnection) DO
98  220  1  2                BEGIN

98  222  1  3                  EndConnection := Connection;
99  223  1  3                  Connection    := NextConnectionInPolyline (Connection, BeginConnection);
```

```
100  225  1  3              END;{For While Inside}

102  227  1  2            LastNode := EndNode (EndConnection);
103  228  1  2            I        := NumberOfConnections (LastNode);

104  230  1  2            WHILE (I > 0) DO
105  231  1  2              BEGIN

105  233  1  3                EndConnection := GetConnection (LastNode, I);
106  234  1  3                IF ((ConnectionTraversable              (EndConnection))  AND
                                  (NOT ExamineNodeTraversedFlag (EndNode (EndConnection))))
                                THEN I := -1
107  237  1  3                ELSE I := I - 1;

109  239  1  3              END;

111  241  1  2            IF (I = 0) THEN SetNodeTraversedFlag (LastNode);

113  243  1  2            Connection := NextPolylineInObject;

114  245  1  2          END {WHILE Original} ;

116  247  1  1        Node := FirstTraversedNode;

117  249  1  1        WHILE (Node <> NilNode) DO
118  250  1  1          BEGIN

118  252  1  2            FOR I := NumberOfConnections (Node)  DOWNTO  1  DO
119  253  1  2            BEGIN

119  255  1  3              Connection := GetConnection (Node, I);
120  256  1  3              IF (ConnectionTraversable (Connection))
                             THEN DeleteConnection (Connection);

122  259  1  3            END; {FOR I}

124  261  1  2            IF (NumberOfConnections (Node) = 0)
                           THEN DeleteNode (Node);

126  264  1  2            Node := NextTraversedNode;

127  266  1  2          END; {WHILE (Node <> NilNode) DO}

129  268  1  1        SetTransitionMask (PreviousMask, DummyMask);

130  270  1  1      END; {DeleteObject}
131  271  0  0      $eject;

                    {***************************************************************************}
                    {*                                                                         *}
                    {*                                                                         *}
                    {*                                                                         *}
                    {***************************************************************************}
```

```
                    FUNCTION  MergeTwoNodes           ( Node1              : NodePointer;
131  280  1  0                                          Node2              : NodePointer)
                                                      : NodePointer;

132  283  1  0      LABEL 0000 {Program end },
                          9999 {Error return};

133  286  1  0      VAR
                      ConnectionsNew     : INTEGER;
134  288  1  0        Connections_1      : INTEGER;
135  289  1  0        Connections_2      : INTEGER;
136  290  1  0        ConnectionsTotal   : INTEGER;
137  291  1  0        I                  : INTEGER;
138  292  1  0        MemoryFreed        : INTEGER;
139  293  1  0        MemoryNeeded       : INTEGER;
140  294  1  0        NumPseudos         : INTEGER;
141  295  1  0        X1,   Y1           : INTEGER;
142  296  1  0        X2,   Y2           : INTEGER;
143  297  1  0        Xnew, Ynew         : INTEGER;
144  298  1  0        Xt,   Yt           : INTEGER;
145  299  1  0        DummyNode          : NodePointer;
146  300  1  0        NewNode            : NodePointer;
147  301  1  0        OtherEnd           : NodePointer;
148  302  1  0        UnneededConnection : ARRAY [1..4] OF ConnectionPointer;

149  304  1  0      BEGIN

149  306  1  1        Node1 := GetConnection (Node1, 0);  {Insure that the nodes are ... }
150  307  1  1        Node2 := GetConnection (Node2, 0);  {... nodes and not connections.}

151  309  1  1        GetNodeLocation (Node1, X1, Y1);
152  310  1  1        GetNodeLocation (Node2, X2, Y2);

153  312  1  1        Xnew := (X1 + X2) DIV 2;
154  313  1  1        Ynew := (Y1 + Y2) DIV 2;
155  314  1  1        NewNode := GetNodePointer (Xnew, Ynew);

156  316  1  1        IF (NewNode <> NilNode)
                      THEN ConnectionsNew := NumberOfConnections (NewNode);
158  318  1  1        IF ((NewNode = NilNode)  OR (Node1 = Node2))
                      THEN GOTO 9999;

160  321  1  1        Connections_1 := NumberOfConnections (Node1);
161  322  1  1        Connections_2 := NumberOfConnections (Node2);
162  323  1  1        UnneededConnection [1] := 0;
163  324  1  1        UnneededConnection [2] := 0;
164  325  1  1        UnneededConnection [3] := 0;
165  326  1  1        UnneededConnection [4] := 0;
166  328  1  1        FOR I := 1 TO Connections_1 DO
167  329  1  1          BEGIN
167  330  1  2            OtherEnd := EndNode (GetConnection (Node1, I));
168  331  1  2            IF (OtherEnd = Node2)
                          THEN UnneededConnection [3] := I
169  333  1  2            ELSE IF (OtherEnd = NewNode)
```

```
170  334  1  2            THEN UnneededConnection [1] := I;
172  335  1  2        END; {FOR}

174  337  1  1      FOR I := 1 TO Connections_2 DO
175  338  1  1        BEGIN
175  339  1  2          OtherEnd := EndNode (GetConnection (Node2, I));
176  340  1  2          IF (OtherEnd = Node1)
                          THEN UnneededConnection [4] := I
177  342  1  2            ELSE IF (OtherEnd = NewNode)
178  343  1  2                   THEN UnneededConnection [2] := I;
180  344  1  2        END; {FOR}

182  346  1  1      ConnectionsTotal := ConnectionsNew + Connections_1 + Connections_2;
183  347  1  1      IF (UnneededConnection [1] <> 0)
                      THEN ConnectionsTotal := ConnectionsTotal - 1;
185  349  1  1      IF (UnneededConnection [2] <> 0)
                      THEN ConnectionsTotal := ConnectionsTotal - 1;
187  351  1  1      IF (UnneededConnection [3] <> 0) {also covers [4] <reciprocals>}
                      THEN ConnectionsTotal := ConnectionsTotal - 2;

189  354  1  1      IF (ConnectionsTotal > MaxConnections)
                    THEN GOTO 9999;

191  357  1  1      {Now count up the amount of memory that will be needed in order to merge
                     the nodes and check to see if enough memory is available.  If so, then do
                     the merge, otherwise count up the amount of memory that will be freed due
                     to the merge and see if that additional amount provides enough memory to
                     complete the merge.  If not enough memory is available then the merge cannot
                     take place.  NOTE - This is not an exact determination due to the way the
                     connections are transfered (dynamics of freeing and allocating memory are
                     almost indeterminate) but it should be pretty close to the worse case amount
                     without getting ridiculous}

                    MemoryNeeded := 0;

192  369  1  1      FOR I := 1 TO Connections_1 DO
193  370  1  1        IF ((I <> UnneededConnection [1]) AND
                          (I <> UnneededConnection [3]))
                        THEN BEGIN
194  373  1  2          GetNodeLocation (EndNode (GetConnection (Node1, I)), Xt, Yt);
195  374  1  2          NumPseudos := ABS (NumberOfTilesContainingLine (Xnew, Ynew, Xt, Yt))
                                       - 2; {don't count tiles at end nodes}
196  376  1  2          IF (NumPseudos > 0)
                          THEN MemoryNeeded := MemoryNeeded + NumPseudos;
198  378  1  2        END; {FOR ... IF}

200  380  1  1      FOR I := 1 TO Connections_2 DO
201  381  1  1        IF ((I <> UnneededConnection [2]) AND
202  384  1  2          GetNodeLocation (EndNode (GetConnection (Node2, I)), Xt, Yt);
203  385  1  2          NumPseudos := ABS (NumberOfTilesContainingLine (Xnew, Ynew, Xt, Yt))
                                       - 2; {don't count tiles at end nodes}
204  387  1  2          IF (NumPseudos > 0)
                          THEN MemoryNeeded := MemoryNeeded + NumPseudos;
206  389  1  2        END; {FOR ... IF}
```

```
208  391  1  1      MemoryNeeded := MemoryNeeded
                                   + (ConnectionsTotal DIV 4)  {Determine number of secondary ...}
                                   - (ConnectionsNew   DIV 4); {... nodes by dividing by 4.}

209  395  1  1      IF (MemoryNeeded > NumberOfAvailableParagraphs)
                    THEN BEGIN {How much memory will become free}

210  398  1  2        MemoryFreed := 0;

211  400  1  2        FOR I := 1 TO Connections_1 DO
212  401  1  2          IF (I <> UnneededConnection [3]) {avoid dubble counting of reciprocals }
                         THEN BEGIN
213  403  1  3            GetNodeLocation (EndNode (GetConnection (Node1, I)), Xt, Yt);
214  404  1  3            NumPseudos := ABS (NumberOfTilesContainingLine (X1, Y1, Xt, Yt))
                                         - 2; {don't count tiles at end nodes}
215  406  1  3            IF (NumPseudos > 0)
                           THEN MemoryFreed := MemoryFreed + NumPseudos;
217  408  1  3          END; {FOR ... IF}

219  410  1  2        FOR I := 1 TO Connections_2 DO
220  411  1  2          BEGIN
220  412  1  3            GetNodeLocation (EndNode (GetConnection (Node2, I)), Xt, Yt);
221  413  1  3            NumPseudos := ABS (NumberOfTilesContainingLine (X2, Y2, Xt, Yt))
                                         - 2; {don't count tiles at end nodes}
222  415  1  3            IF (NumPseudos > 0)
                           THEN MemoryFreed := MemoryFreed + NumPseudos;
224  417  1  3          END; {IF}

226  419  1  2        MemoryFreed := MemoryFreed
                                    + (Connections_1 DIV 4)   {Determine number of secondary ...}
                                    + (Connections_2 DIV 4)   {... nodes by dividing by 4.}
                                    + 2;                      {Plus 2 = Freeing the nodes themselves}

227  424  1  2        IF (MemoryNeeded > (NumberOfAvailableParagraphs + MemoryFreed))
                       THEN GOTO 9999;

229  427  1  2      END; {IF (MemoryNeeded > NumberOfAvailableParagraphs)}

231  429  1  1      {All error conditions are accounted for now, so go do merge!}

                    FOR I := Connections_1  DOWNTO  1  DO
232  432  1  1        IF ((I <> UnneededConnection [1]) AND
                          (I <> UnneededConnection [3]))
                       THEN DummyNode := TransferConnectionField (GetConnection (Node1, I),
233  435  1  1                                                   NewNode);
234  437  1  1      DeleteNodeAndConnections (Node1);

235  439  1  1      FOR I := Connections_2  DOWNTO  1  DO
236  440  1  1        IF ((I <> UnneededConnection [2]) AND
                          (I <> UnneededConnection [4]))
                       THEN DummyNode := TransferConnectionField (GetConnection (Node2, I),
237  443  1  1                                                   NewNode);

238  445  1  1      DeleteNodeAndConnections (Node2);
```

```
    MergeTwoNodes := NewNode;
    GOTO 0000;

9999:
      MergeTwoNodes := NilNode;
      IF ((NewNode <> NilNode) AND (ConnectionsNew = 0))
      THEN DeleteNode (NewNode);

0000: END; {MergeTwoNodes}

$eject;
{***************************************************************************}
{*                                                                         *}
{*                                                                         *}
{*                                                                         *}
{***************************************************************************}

FUNCTION  MergeThreeNodes          ( Node1              : NodePointer;
                                     Node2              : NodePointer;
                                     Node3              : NodePointer)
                                   : NodePointer;

LABEL 0000 {Program end },
      9999 {Error return};

VAR
    ConnectionsNew      : INTEGER;
    Connections_1       : INTEGER;
    Connections_2       : INTEGER;
    Connections_3       : INTEGER;
    ConnectionsTotal    : INTEGER;
    I                   : INTEGER;
    MemoryFreed         : INTEGER;
    MemoryNeeded        : INTEGER;
    NumPseudos          : INTEGER;
    X1,    Y1           : INTEGER;
    X2,    Y2           : INTEGER;
    X3,    Y3           : INTEGER;
    Xnew, Ynew          : INTEGER;
    Xt,    Yt           : INTEGER;
    DummyNode           : NodePointer;
    NewNode             : NodePointer;
    OtherEnd            : NodePointer;
    UnneededConnection  : ARRAY [1..9] OF ConnectionPointer;
   {UnneededConnection [1] = # of the conn of node 1 that points to new node
    UnneededConnection [2] = # of the conn of node 2 that points to new node
    UnneededConnection [3] = # of the conn of node 3 that points to new node
    UnneededConnection [4] = # of the conn of node 1 that points to node 2
    UnneededConnection [5] = # of the conn of node 1 that points to node 3
    UnneededConnection [6] = # of the conn of node 2 that points to node 1
    UnneededConnection [7] = # of the conn of node 2 that points to node 3
    UnneededConnection [8] = # of the conn of node 3 that points to node 1
    UnneededConnection [9] = # of the conn of node 3 that points to node 2  }
```

```
BEGIN
  Node1 := GetConnection (Node1, 0);  {Insure that the nodes are ... }
  Node2 := GetConnection (Node2, 0);  {... nodes and not connections.}
  Node3 := GetConnection (Node3, 0);

  GetNodeLocation (Node1, X1, Y1);
  GetNodeLocation (Node2, X2, Y2);
  GetNodeLocation (Node3, X3, Y3);

  Xnew := (X1 + X2 + X3) DIV 3;
  Ynew := (Y1 + Y2 + Y3) DIV 3;
  NewNode := GetNodePointer (Xnew, Ynew);

  IF (NewNode <> NilNode)
  THEN ConnectionsNew := NumberOfConnections (NewNode);
  IF ((NewNode = NilNode)
     OR (Node1 = Node2)
     OR (Node1 = Node3)
     OR (Node3 = Node2))
  THEN GOTO 9999;

  Connections_1 := NumberOfConnections (Node1);
  Connections_2 := NumberOfConnections (Node2);
  Connections_3 := NumberOfConnections (Node3);
  FOR I := 1 TO 9 DO
    UnneededConnection [I] := 0;

  FOR I := 1 TO Connections_1 DO
    BEGIN
      OtherEnd := EndNode (GetConnection (Node1, I));
      IF (OtherEnd = Node2)
      THEN UnneededConnection [4] := I
      ELSE IF (OtherEnd = Node3)
           THEN UnneededConnection [5] := I
           ELSE IF (OtherEnd = NewNode)
                THEN UnneededConnection [1] := I;
    END; {FOR}

  FOR I := 1 TO Connections_2 DO
    BEGIN
      OtherEnd := EndNode (GetConnection (Node2, I));
      IF (OtherEnd = Node1)
      THEN UnneededConnection [6] := I
      ELSE IF (OtherEnd = Node3)
           THEN UnneededConnection [7] := I
           ELSE IF (OtherEnd = NewNode)
                 THEN UnneededConnection [2] := I;
    END; {FOR}

  FOR I := 1 TO Connections_3 DO
    BEGIN
      OtherEnd := EndNode (GetConnection (Node3, I));
      IF (OtherEnd = Node1)
      THEN UnneededConnection [8] := I
```

```
306  557  1  2        ELSE IF (OtherEnd = Node2)
307  558  1  2             THEN UnneededConnection [9] := I
308  559  1  2             ELSE IF (OtherEnd = NewNode)
309  560  1  2                   THEN UnneededConnection [3] := I;
311  561  1  2      END; {FOR}

313  563  1  1    ConnectionsTotal := ConnectionsNew + Connections_1
                                    + Connections_2 + Connections_3;
314  565  1  1    IF (UnneededConnection [1] <> 0)
                    THEN ConnectionsTotal := ConnectionsTotal - 1;
316  567  1  1    IF (UnneededConnection [2] <> 0)
318  569  1  1    IF (UnneededConnection [3] <> 0)
                    THEN ConnectionsTotal := ConnectionsTotal - 1;
320  571  1  1    IF (UnneededConnection [4] <> 0) {also covers [6] <reciprocals>}
                    THEN ConnectionsTotal := ConnectionsTotal - 2;
322  573  1  1    IF (UnneededConnection [5] <> 0) {also covers [7] <reciprocals>}
                    THEN ConnectionsTotal := ConnectionsTotal - 2;
324  575  1  1    IF (UnneededConnection [7] <> 0) {also covers [9] <reciprocals>}
                    THEN ConnectionsTotal := ConnectionsTotal - 2;

326  578  1  1    IF (ConnectionsTotal > MaxConnections)
                  THEN GOTO 9999;

328  581  1  1    {Now count up the amount of memory that will be needed in order to merge
                   the nodes and check to see if enough memory is available.  If so, then do
                   the merge, otherwise count up the amount of memory that will be freed due
                   to the merge and see if that additional amount provides enough memory to
                   complete the merge.  If not enough memory is available then the merge cannot
                   take place.  NOTE - This is not an exact determination due to the way the
                   connections are transfered (dynamics of freeing and allocating memory are
                   almost indeterminate) but it should be pretty close to the worse case amount
                   without getting ridiculous}

                  MemoryNeeded := 0;

329  593  1  1    FOR I := 1 TO Connections_1 DO
330  594  1  1      IF ((I <> UnneededConnection [1]) AND
                         (I <> UnneededConnection [4]) AND
                         (I <> UnneededConnection [5]))
                     THEN BEGIN
331  598  1  2         GetNodeLocation (EndNode (GetConnection (Node1, I)), Xt, Yt);
332  599  1  2         NumPseudos := ABS (NumberOfTilesContainingLine (Xnew, Ynew, Xt, Yt))
                                     - 2; {don't count tiles at end nodes}
333  601  1  2         IF (NumPseudos > 0)
                        THEN MemoryNeeded := MemoryNeeded + NumPseudos;
335  603  1  2       END; {FOR ... IF}

337  605  1  1    FOR I := 1 TO Connections_2 DO
338  606  1  1      IF ((I <> UnneededConnection [2]) AND
                         (I <> UnneededConnection [6]) AND
                         (I <> UnneededConnection [7]))
                     THEN BEGIN
339  610  1  2         GetNodeLocation (EndNode (GetConnection (Node2, I)), Xt, Yt);
340  611  1  2         NumPseudos := ABS (NumberOfTilesContainingLine (Xnew, Ynew, Xt, Yt))
                                     - 2; {don't count tiles at end nodes}
```

```
341  613  1  2            IF (NumPseudos > 0)
                          THEN MemoryNeeded := MemoryNeeded + NumPseudos;
343  615  1  2          END; {FOR ... IF}

345  617  1  1        FOR I := 1 TO Connections_3 DO
346  618  1  1          IF ((I <> UnneededConnection [3]) AND
                            (I <> UnneededConnection [8]) AND
                            (I <> UnneededConnection [9]))
                        THEN BEGIN
347  622  1  2            GetNodeLocation (EndNode (GetConnection (Node3, I)), Xt, Yt);
348  623  1  2            NumPseudos := ABS (NumberOfTilesContainingLine (Xnew, Ynew, Xt, Yt))
                                        - 2; {don't count tiles at end nodes}
349  625  1  2            IF (NumPseudos > 0)
                          THEN MemoryNeeded := MemoryNeeded + NumPseudos;
351  627  1  2          END; {FOR ... IF}

353  629  1  1        MemoryNeeded := MemoryNeeded
                                      + (ConnectionsTotal DIV 4)  {Determine number of secondary ...}
                                      - (ConnectionsNew   DIV 4); {... nodes by dividing by 4.}

354  633  1  1        IF (MemoryNeeded > NumberOfAvailableParagraphs)
                      THEN BEGIN {How much memory will become free}

355  636  1  2          MemoryFreed := 0;

356  638  1  2          FOR I := 1 TO Connections_1 DO
357  639  1  2            IF (I <> UnneededConnection [4]) {don't want to double count reciprocals}
                          THEN BEGIN
358  641  1  3              GetNodeLocation (EndNode (GetConnection (Node1, I)), Xt, Yt);
359  642  1  3              NumPseudos := ABS (NumberOfTilesContainingLine (X1, Y1, Xt, Yt))
                                            - 2; {don't count tiles at end nodes}
360  644  1  3              IF (NumPseudos > 0)
                              THEN MemoryFreed := MemoryFreed + NumPseudos;
362  646  1  3            END; {FOR ... IF}

364  648  1  2          FOR I := 1 TO Connections_2 DO
365  649  1  2            IF (I <> UnneededConnection [7]) {don't want to double count reciprocals}
                          THEN BEGIN
366  651  1  3              GetNodeLocation (EndNode (GetConnection (Node2, I)), Xt, Yt);
367  652  1  3              NumPseudos := ABS (NumberOfTilesContainingLine (X2, Y2, Xt, Yt))
                                            - 2; {don't count tiles at end nodes}
368  654  1  3              IF (NumPseudos > 0)
                              THEN MemoryFreed := MemoryFreed + NumPseudos;
370  656  1  3            END; {FOR ... IF}

372  658  1  2          FOR I := 1 TO Connections_3 DO
373  659  1  2            IF (I <> UnneededConnection [8]) {don't want to double count reciprocals}
                          THEN BEGIN
374  661  1  3              GetNodeLocation (EndNode (GetConnection (Node3, I)), Xt, Yt);
375  662  1  3              NumPseudos := ABS (NumberOfTilesContainingLine (X3, Y3, Xt, Yt))
                                            - 2; {don't count tiles at end nodes}
376  664  1  3              IF (NumPseudos > 0)
                              THEN MemoryFreed := MemoryFreed + NumPseudos;
378  666  1  3            END; {FOR ... IF}
```

```
380  668  1  2        MemoryFreed := MemoryFreed
                                     + (Connections_1 DIV 4)    {Determine number of secondary ...}
                                     + (Connections_2 DIV 4)    {... nodes by dividing by 4.}
                                     + (Connections_3 DIV 4)
                                     + 3;                       {Plus 3 = Freeing the nodes themselves}

351  674  1  2        IF (MemoryNeeded > (NumberOfAvailableParagraphs + MemoryFreed))
                      THEN GOTO 9999;

383  677  1  2      END; {IF (MemoryNeeded > NumberOfAvailableParagraphs)}
385  679  1  1      {All error conditions are accounted for now, so go do merge!}

                    FOR I := Connections_1  DOWNTO  1  DO
386  682  1  1       IF ((I <> UnneededConnection [1]) AND
                         (I <> UnneededConnection [4]) AND
                         (I <> UnneededConnection [5]))
                      THEN DummyNode := TransferConnectionField (GetConnection (Node1. I),
387  686  1  1                                                  NewNode);

388  688  1  1      DeleteNodeAndConnections (Node1);

389  690  1  1      FOR I := Connections_2  DOWNTO  1  DO
390  691  1  1       IF ((I <> UnneededConnection [2]) AND
                         (I <> UnneededConnection [6]) AND
                         (I <> UnneededConnection [7]))
                      THEN DummyNode := TransferConnectionField (GetConnection (Node2, I),
391  695  1  1                                                  NewNode);

392  697  1  1      DeleteNodeAndConnections (Node2);

393  699  1  1      FOR I := Connections_3  DOWNTO  1  DO
394  700  1  1       IF ((I <> UnneededConnection [3]) AND
                         (I <> UnneededConnection [8]) AND
                         (I <> UnneededConnection [9]))
                      THEN DummyNode := TransferConnectionField (GetConnection (Node3, I),
395  704  1  1                                                  NewNode);

396  706  1  1      DeleteNodeAndConnections (Node3);

397  708  1  1      MergeThreeNodes := NewNode;
398  709  1  1      GOTO 0000;

399  711  1  1     9999:
                      MergeThreeNodes := NilNode;
400  713  1  1       IF ((NewNode <> NilNode) AND (ConnectionsNew = 0))
                      THEN DeleteNode (NewNode);

402  716  1  1     0000: END; {MergeThreeNodes}

403  718  0  0     $eject;
                   {*************************************************************************}
                   {*                                                                       *}
                   {*                                                                       *}
                   {*                                                                       *}
                   {*************************************************************************}
```

```
                    FUNCTION  MoveNode                ( Node            : NodePointer;
403  727  1  0                                          NewX, NewY      : INTEGER)
                                                      : Boolean;

404  730  1  0      VAR
                      NodeConnections    : INTEGER;
405  732  1  0        MemoryNeeded       : INTEGER;
406  733  1  0        MemoryFreed        : INTEGER;
407  734  1  0        I, X1, Y1, X2, Y2  : INTEGER;
408  735  1  0        NumPseudos         : INTEGER;
409  736  1  0        NewNode            : NodePointer;
410  737  1  0        DummyConnection    : ConnectionPointer;

411  739  1  0      BEGIN

411  741  1  1        NodeConnections := NumberOfConnections (NewNode);
412  742  1  1        MemoryNeeded    := 1;  {for node to be allocated}
413  743  1  1        MemoryFreed     := 0;

414  745  1  1        GetNodeLocation (Node, X1, Y1);

415  747  1  1        FOR I := 1 TO NodeConnections DO
416  748  1  1          BEGIN

416  750  1  2            GetNodeLocation (EndNode (GetConnection (Node, I)), X2, Y2);

417  752  1  2            NumPseudos := ABS (NumberOfTilesContainingLine (NewX, NewY, X2, Y2))
                                        - 2; {don't count end node tiles}
418  754  1  2            IF (NumPseudos > 0)
                           THEN MemoryNeeded := MemoryNeeded + NumPseudos;

420  757  1  2            NumPseudos := ABS (NumberOfTilesContainingLine (X1, Y1, X2, Y2))
                                        - 2; {don't count end node tiles}
421  759  1  2            IF (NumPseudos > 0)
                           THEN MemoryFreed := MemoryFreed + NumPseudos;

423  762  1  2          END;

425  764  1  1        IF (MemoryNeeded < (NumberOfAvailableParagraphs + MemoryFreed))
                      THEN BEGIN

426  767  1  2                   {CreateDuplicateNode allocates a node at the given x-y
                                   regardless of whether a node exists at that place or not}
                        NewNode := CreateDuplicateNode (NewX, NewY);

427  771  1  2          For I := NodeConnections DOWNTO 1 DO
428  772  1  2            DummyConnection := TransferConnectionField (GetConnection (Node, I), NewNode);
429  774  1  2          DeleteNode (Node);

430  776  1  2          MoveNode := TRUE;

431  778  1  2          END
432  779  1  1        ELSE MoveNode := FALSE;

434  781  1  1      END; {MoveNode}
```

```
435  783  0  0          $eject;
                        {**************************************************************************}
                        {*                                                                        *}
                        {*                                                                        *}
                        {*                                                                        *}
                        {**************************************************************************}

                        FUNCTION TransferConnection       ( CurrentConnection : ConnectionPointer;
435  792  1  0                                              NewNode           : NodePointer)
                                                          : ConnectionPointer;

436  795  1  0          LABEL 0000 {Program end },
                              9999 {Error return};

437  798  1  0          VAR
                          State                   : StateType;
438  800  1  0            FilledArea              : BOOLEAN;
439  801  1  0            OtherEnd                : NodePointer;
440  802  1  0            I, X1, Y1, X2, Y2       : INTEGER;
441  803  1  0            NumPseudos              : INTEGER;
442  804  1  0            MemoryNeeded            : INTEGER;
443  805  1  0            MemoryFreed             : INTEGER;
444  806  1  0            CurrentNodeConnections  : INTEGER;
445  807  1  0            NewNodeConnections      : INTEGER;

446  809  1  0          BEGIN

446  811  1  1            GetConnectionInformation (CurrentConnection, FilledArea, State);
447  812  1  1            IF (State <> Untagged)
                          THEN GOTO 9999;

449  815  1  1            NewNode  := GetConnection (NewNode, 0); {insure only a node passed}
450  816  1  1            OtherEnd := EndNode (CurrentConnection);

451  818  1  1            IF ((OtherEnd = NewNode) OR (OtherEnd <= NilNode))
                          THEN GOTO 9999;

453  821  1  1            NewNodeConnections := NumberOfConnections (NewNode);
454  822  1  1            FOR I := 1 to NewNodeConnections DO
455  823  1  1            BEGIN

455  825  1  2              IF (OtherEnd = EndNode (GetConnection (NewNode, I)))
                            THEN BEGIN {connection already exists}

456  828  1  3                IF (NewNode <> GetConnection (CurrentConnection, 0))
                                THEN TransferConnection := TransferConnectionField (CurrentConnection,
457  830  1  3                                                                      NewNode)
                                ELSE TransferConnection := GetConnection (NewNode, I);
459  832  1  3                GOTO 0000;

460  834  1  3              END;
462  835  1  2            END;

464  837  1  1            IF (NewNodeConnections >= 14)
                          THEN GOTO 9999;
```

```
466  840  1  1        GetNodeLocation (NewNode,  X1, Y1);
467  841  1  1        GetNodeLocation (OtherEnd, X2, Y2);

468  843  1  1        NumPseudos := ABS (NumberOfTilesContainingLine (X1, Y1, X2, Y2))
                                   - 2; {subtract end node tiles}
469  845  1  1        IF (NumPseudos < 0)
                      THEN NumPseudos := 0;

471  848  1  1        MemoryNeeded := NumPseudos + ((NewNodeConnections + 1) DIV 4)
                                                 - ( NewNodeConnections     DIV 4);

472  851  1  1        IF (MemoryNeeded > NumberOfAvailableParagraphs)
                      THEN BEGIN

473  854  1  2          GetNodeLocation (CurrentConnection, X1, Y1);

474  856  1  2          NumPseudos := ABS (NumberOfTilesContainingLine (X1, Y1, X2, Y2))
                                     - 2; {subtract end node tiles}
475  858  1  2          IF (NumPseudos < 0)
                        THEN NumPseudos := 0;

477  861  1  2          CurrentNodeConnections := NumberOfConnections ({node at} CurrentConnection);
478  862  1  2          MemoryNeeded := NumPseudos + ( CurrentNodeConnections     DIV 4)
                                                   - ((CurrentNodeConnections - 1) DIV 4);

479  865  1  2          IF (MemoryNeeded > (NumberOfAvailableParagraphs + MemoryFreed))
                        THEN GOTO 9999;

481  868  1  2        END;

483  870  1  1        TransferConnection := TransferConnectionField (CurrentConnection, NewNode);
484  871  1  1        GOTO 0000;

485  873  1  1      9999: TransferConnection := NilConnection;

486  875  1  1      0000: END; {TransferConnection}

487  877  0  0      . {Connections}

893 Lines Read.
  0 Errors Detected.
54% Utilization of Memory.


Source File: A:PSEUDO.PAS
Object File: <none>
Controls Specified:  ERRORPRINT, NOOBJECT, PRINT(D:PSEUDO.LST[G9]), SUBTITLE(
       PSEUDO NODE TILE IDENTIFICATION PROCEDURES), TITLE(            PSEUDO NODES).

STMT LINE NESTING        SOURCE TEXT: A:PSEUDO.PAS
   1    3  0  0
                         MODULE PseudoNodes;
   2    5  0  0
```

```
PUBLIC PseudoNodes;
FUNCTION GetFirstTileContainingLine(Xa,Ya,Xb,Yb:INTEGER):LONGINT;
FUNCTION GetNextTileContainingLine:LONGINT;
FUNCTION NumberOfTilesContainingLine(Xa,Ya,Xb,Yb:INTEGER):INTEGER;

PUBLIC TileStructure;
PROCEDURE GetTileStructureParameters(VAR Xmin,Ymin,Xmax,Ymax,TileSize:INTEGER);
PROCEDURE GetTileIndex (     x,y : INTEGER;
                         VAR I,J : INTEGER);

PRIVATE PseudoNodes;

TYPE INTLONG = RECORD CASE Switch : BOOLEAN OF
                           true : (y_coord : INTEGER;
                                   x_coord : INTEGER);
                           false: (x_y_coords : LONGINT);
               END;

VAR
  Xa, Ya, Xb, Yb, XaTile, YaTile, XbTile, YbTile, DeltaXTile, DeltaYTile,
  Boundary, YStep, I, Old_I, YTileEnd, YTileBegin, TileSize : INTEGER;

  Slope, Intercept, BoundaryPoint : REAL;

  Temp : INTLONG;

$eject
BEGIN

    Temp.Switch := True;

    IF (DeltaXTile <> 0)  AND  (Old_I <> I)
    THEN BEGIN

         Boundary      := (I + 1) * TileSize;
         BoundaryPoint := Slope * Boundary + Intercept;
         Old_I         := I;

         IF (ABS(BoundaryPoint) > MAXINT)
         THEN YTileEnd := YbTile
         ELSE BEGIN
              YTileEnd := TRUNC(BoundaryPoint) DIV TileSize;
              IF ( YStep = 0) OR
                 ((YStep > 0) AND (YTileEnd > YbTile))  OR
                 ((YStep < 0) AND (YTileEnd < YbTile))
              THEN YTileEnd := YbTile;
              END;

    END;

    IF I > XbTile
    THEN BEGIN

         Temp.X_coord := -1;
```

```
35   65  1  2                  Temp.Y_coord := -1;

36   67  1  2                  END
37   68  1  1             ELSE BEGIN

38   70  1  2                  Temp.X_coord := I;
39   71  1  2                  Temp.Y_coord := YTileBegin;

40   73  1  2                  IF (YTileBegin <> YTileEnd)
                               THEN YTileBegin   := YTileBegin + YStep
41   75  1  2                  ELSE I := I + 1;

43   77  1  2             END;

45   79  1  1             Temp.Switch := False;
46   80  1  1             GetNextTileContainingLine := Temp.X_Y_coords;

47   82  1  1         END;

48   84  0  0         $eject
49   88  1  0         BEGIN

49   90  1  1             GetTileStructureParameters (XaTile,YaTile,XbTile,YbTile, TileSize);

50   92  1  1             IF (Xa > Xb)  {make sure points are in X-major order}
                          THEN BEGIN
51   94  1  2                 XaTile := Xa;           {swap x co-ordinates}
52   95  1  2                 Xa     := Xb;
53   96  1  2                 Xb     := XaTile;
54   97  1  2                 YaTile := Ya;           {swap Y co-ordinates}
55   98  1  2                 Ya     := Yb;
56   99  1  2                 Yb     := YaTile;
57  100  1  2             END;

59  102  1  1             GetTileIndex (Xa, Ya, XaTile, YaTile); {compute endpoint tile indicies}
60  103  1  1             GetTileIndex (Xb, Yb, XbTile, YbTile);

61  105  1  1             DeltaXTile := XbTile - XaTile;
62  106  1  1             DeltaYTile := YbTile - YaTile;

63  108  1  1             IF DeltaYTile > 0           {determine Y direction}
                          THEN Ystep := 1
64  110  1  1             ELSE
65  111  1  1                 IF DeltaYTile < 0
                                THEN YStep := -1
66  113  1  1                   ELSE YStep := 0;

68  115  1  1             YTileBegin := YaTile;
69  116  1  1             YTileEnd   := YbTile;

70  118  1  1             I      := XaTile;
71  119  1  1             Old_I  := I - 1;

72  121  1  1             IF DeltaXTile <> 0          {compute slope & intercept if not vertical}
                          THEN BEGIN
```

```
73  124  1  2            Slope     := (Yb - Ya) / (Xb - Xa);
74  125  1  2            Intercept := Ya - Slope * Xa;

75  127  1  2            END;

77  129  1  1        GetFirstTileContainingLine := GetNextTileContainingLine;

78  131  1  1    END;

79  133  0  0    $eject;
80  137  1  0    VAR
                   XaTile, YaTile, XbTile, YbTile, DeltaXTile, DeltaYTile,
                   Boundary, YStep, I, Old_I, YTileEnd, YTileBegin, TileSize : INTEGER;
81  140  1  0      TileCount : INTEGER;
82  141  1  0      SwapFlag : BOOLEAN;

83  143  1  0      Slope, Intercept, BoundaryPoint : REAL;

84  145  1  0    BEGIN

84  147  1  1        GetTileStructureParameters (XaTile,YaTile,XbTile,YbTile, TileSize);

85  149  1  1        IF (Xa > Xb)  {make sure points are in X-major order}
                     THEN BEGIN
86  151  1  2            XaTile   := Xa;           {swap x co-ordinates}
87  152  1  2            Xa       := Xb;
88  153  1  2            Xb       := XaTile;
89  154  1  2            YaTile   := Ya;           {swap Y co-ordinates}
90  155  1  2            Ya       := Yb;
91  156  1  2            Yb       := YaTile;
92  157  1  2            SwapFlag := TRUE;
93  158  1  2          END
94  159  1  1        ELSE SwapFlag := FALSE;

96  161  1  1        GetTileIndex (Xa, Ya, XaTile, YaTile); {compute endpoint tile indicies}
97  162  1  1        GetTileIndex (Xb, Yb, XbTile, YbTile);

98  164  1  1        DeltaXTile := XbTile - XaTile;
99  165  1  1        DeltaYTile := YbTile - YaTile;

100 167  1  1        IF DeltaYTile > 0            {determine Y direction}
                     THEN Ystep := 1
101 169  1  1        ELSE
102 170  1  1            IF DeltaYTile < 0
                           THEN YStep := -1
103 172  1  1            ELSE YStep := 0;

105 174  1  1        YTileBegin := YaTile;
106 175  1  1        YTileEnd   := YbTile;

107 177  1  1        I      := XaTile;
108 178  1  1        Old_I := I - 1;

109 180  1  1        IF DeltaXTile <> 0           {compute slope & intercept if not vertical}
                     THEN BEGIN
```

```
110  183  1  2              Slope     := (Yb - Ya) / (Xb - Xa);
111  184  1  2              Intercept := Ya - Slope * Xa;

112  186  1  2              END;

114  188  1  1          TileCount := 0;
115  190  1  1          WHILE (I <= XbTile) DO
116  191  1  1            BEGIN

116  193  1  2              IF (DeltaXTile <> 0)  AND  (Old_I <> I)
                            THEN BEGIN

117  196  1  3                  Boundary      := (I + 1) * TileSize;
118  197  1  3                  BoundaryPoint := Slope * Boundary + Intercept;
119  198  1  3                  Old_I         := I;

120  200  1  3                  IF (ABS(BoundaryPoint) > MAXINT)
                                THEN YTileEnd := YbTile
121  202  1  3                  ELSE BEGIN
122  203  1  4                       YTileEnd := TRUNC(BoundaryPoint) DIV TileSize;
123  204  1  4                       IF ( YStep = 0) OR
                                        ((YStep > 0) AND (YTileEnd > YbTile))  OR
                                        ((YStep < 0) AND (YTileEnd < YbTile))
                                     THEN YTileEnd := YbTile;
125  208  1  4                       END;

127  210  1  3              END;

129  212  1  2              IF (I <= XbTile)
                            THEN BEGIN

130  215  1  3                  TileCount := TileCount + 1;

131  217  1  3                  IF (YTileBegin <> YTileEnd)
                                THEN YTileBegin   := YTileBegin + YStep
132  219  1  3                  ELSE I := I + 1;

134  221  1  3              END;

136  223  1  2          END; {WHILE (I <= XbTile) DO}

138  225  1  1      IF (SwapFlag)
                    THEN NumberOfTilesContainingLine := -TileCount
139  227  1  1      ELSE NumberOfTilesContainingLine :=  TileCount;

141  229  1  1      END;
142  230  0  0      . {PseudoNodes}

230 Lines Read.
  0 Errors Detected.
43% Utilization of Memory.
```

LOC OBJ LINE SOURCE

```
$title(Connection and Node functions)








;*****************************************************************************
;*
;*      FILE NAME:         FRSTNXTA.ASM
;*
;*      MODULE NAME:       NodeConn
;*
;*      SEGMENT NAME:      Connections  (Code Segment)
;*                         ConnGlobals  (Data Segment)
;*
;*      LINKAGE/ACCESS:    Linked with TEKMAN main module.  Accessed by direct
;*                         call within TEKMAN, Accessed through support vector
;*                         from external .LTL modules.
;*
;*      FUNCTIONS:         Contains routines which deal specifically with
;*                         first connection/next connection in tile, as well
;*                         as transition mask functions.
;*
;*
;*
;*
;*
;*      KNOWN BUGS:        None at SR1
;*
;*      ENHANCEMENTS:      None identified.
;*
;*****************************************************************************


                name    NodeConn

                extrn   GetParagraphLink:far,
&                       GetNodeLocation:far,
&                       FirstNodeInTile:far,
&                       NextNodeInTile:far,
&                       GetConnFieldAddress:far,
&                       SetLineIndex:far,
&                       PixelMoveTransformed:far,
&                       PixelDrawTransformed:far,
&                       GetTilePointer:far


                public  FirstConnectionInTile,
&                       NextConnectionInTile,
```

```
                 &                        GetConnectionField,
                 &                        SetTransitionMask,
                 &                        UpdateConnectionStatus,
                 &                        ConnectionTraversable,
                 &                        SetDuplicateOutputEnabled



                           assume  cs:Connections,ds:ConnGlobals


0080             AdditionalParaFlag      equu      80h        ;additional para flag mask
0090             BankSwitch              equ       90h        ;bank switch port
0000             NilPointer              equ       0          ;nil pointer value
0020             PseudoNodeFlag          equ       20h        ;pseudonode flag

00F0             ConnFieldMask           equ       0F0h
000F             BankFieldMask           equ       0Fh
0070             ConnStateMask           equ       70h

0000             DoNothing               equ       0
0001             AddToStructure          equ       1
0002             DeleteFromStructure     equ       2
0002             HighestNumberedAction   equ       2

0003             SelectedState           equ       3
0004             SelectedAndWrittenState equ       4


----             Connections     segment

             +1  $eject


                 ;
                 ;       UTILITY PROCEDURES
                 ;
                 ;
                 ;



                 ;
                 ; WARNING! NON-STANDARD LINKAGE!
                 ;
                 ;       GetConnectionField (*** NOT CALLABLE FROM PASCAL!  ASM-86 ONLY! ***)
                 ;               entry:
                 ;                       dx:ax := primary node pointer
                 ;                       bx    := desired connection number
                 ;               blows:
                 ;                       all registers
                 ;               returns:
                 ;                       dx:ax := connection pointer (nil if non-existant)
                 ;
```

```
0000                    GetConnectionField
0000                    $             proc    far                       ;far call

0000 8EC0                             mov     es,ax                     ;establish node addressibility
0002 8BC2                             mov     ax,dx                     ;load bank number
0004 250F00                           and     ax,0FH                    ;mask out garbage
0007 E790                             out     bankswitch,ax             ;set bank
0009 43                               inc     bx                        ;connection no. is offset by 1...
                                                                        ;...for primary node.
000A 268A2E0000                       mov     ch,es:byte ptr 0          ;load node flags

                        ;
                        ;       Check to see if the desired connection is in the current paragraph
                        ;

000F B80400                           mov     ax,4                      ;load max avail conn primary node
                        IsNodeInThisPara?:
0012 F6C580             $             test    ch,AdditionalParaFlag     ;check for additional paragraph
0015 7401                             jz      CompareAvailibleConn      ;if not, check range
0017 48                               dec     ax                        ;one less availible conn, otherwise

                        ;
                        ;       Check to see if the number of availible connections in this
                        ;       paragraph contains the desired connection
                        ;

                        CompareAvailibleConn:
0018 3BC3               $             cmp     ax,bx                     ;avail conn > desired conn?
001A 7327                             jae     ReturnConnection          ;if so, it's in this paragraph
001C F6C580                           test    ch,AdditionalParaFlag     ;if not, is there another para?
001F 7436                             jz      ReturnNil                 ;if not, return a nil

0021 53                               push    bx                        ;save desired connection no.
0022 50                               push    ax                        ;save availible connections
0023 40                               inc     ax                        ;link := availible conn + 1
0024 52                               push    dx                        ;establish para pointer parm...
0025 06                               push    es                        ;...for GetParagraphLink
0026 50                               push    ax                        ;push link number parm
0027 9A0000----    E                  call    GetParagraphLink          ;find the secondary node
002C 8EC0                             mov     es,ax                     ;point to node paragraph
002E 8BC2                             mov     ax,dx                     ;load bank number
0030 250F00                           and     ax,0fh                    ;mask flags out
0033 E790                             out     bankswitch,ax             ;set bank
0035 58                               pop     ax                        ;restore availible connections
0036 5B                               pop     bx                        ;restore desired connection

0037 2BD8                             sub     bx,ax                     ;Desired := Desired - Availible
0039 268A2E0F00                       mov     ch,es:byte ptr 15         ;load flags
003E B80500                           mov     ax,5                      ;load max availible conn
0041 EBCF                             jmp     IsNodeInThisPara?         ;see if we've found it

                        ;
                        ;       If the connection is within the paragraph currently being examined,
```

```
                       ;       return the connection pointer (which can be accessed using
                       ;       GetParagraphLink, with the proper displacment)
                       ;

                       ReturnConnection:
0043 52                &                 push    dx                      ;establish para ptr parm...
0044 06                                  push    es                      ;...for GetParagraphLink
0045 53                                  push    bx                      ;as well as connection displacment
0046 9A0000----     E                    call    GetParagraphLink        ;get the connection pointer
004B 8BD8                                mov     bx,ax                   ;save ax
004D 8BC2                                mov     ax,dx                   ;load bank pointer
004F 250F00                              and     ax,0fh                  ;isolate bank number
0052 E790                                out     bankswitch,ax           ;set the bank
0054 8BC3                                mov     ax,bx                   ;restore paragraph pointer
0056 CB                                  ret                             ;all done

                       ;
                       ;       This section of code returns a nil, indicating that the desired
                       ;       connection is not in the current structure
                       ;

0057 33C0              ReturnNil:        xor     ax,ax                   ;load nil...
0059 33D2                                xor     dx,dx                   ;connection pointer
005B CB                                  ret                             ;all done

                       GetConnectionField
                       &                 endp                            ;end far proc


                    +1 $eject


                       ;
                       ;       GetNextConnection
                       ;               dx:ax = NodePointer
                       ;               bx = CurrentConnectionNumber
                       ;
                       ;
                       ;

                       ;
                       ;       GetNextConnectionScope is the procedure bounds that is used to
                       ;       restrict all internal returns to near returns.  The actual
                       ;       entry points are called specifically by label.
                       ;


                       GetNextConnectionScope
005C                   &                proc    near                     ;near call

                       ;
                       ;       PseudoNodeHandler is a code segment for handling any Pseudonodes
                       ;       encountered when looking for the next connection.  Its strategy is
                       ;       to induce a connection check for only one iteration of 'GetConn'
```

```
                         ;       (see label GetConn).  It does this by setting up the Pseudo node
                         ;       beginning node field as the actual node pointer, and the beggining
                         ;       node connection number as the connection number field for GetConn.
                         ;       It will set the Pseudo node up as the node to be scrutinized
                         ;       along a connection number of 14 (pseudo nodes should NEVER, NEVER
                         ;       have any additional paragraphs), so that the next GetConnectionField
                         ;       will return a nil pointer, forcing GetNextConnection to move on to the
                         ;       next node.
                         ;

                         PseudoNodeHandler:
005C 26A10400            &              mov     ax,es:word ptr 4        ;load the begin node para.
0060 33D2                               xor     dx,dx                   ;clear dx
0062 268A160300                         mov     dl,es:byte ptr 3        ;load the begin node bank
0067 8BDA                               mov     bx,dx                   ;load the bank & conn no.
0069 D1EB                               shr     bx,1                    ;isolate...
006B D1EB                               shr     bx,1                    ;...the...
006D D1EB                               shr     bx,1                    ;...connection...
006F D1EB                               shr     bx,1                    ;...number.
0071 891E0000      R                    mov     TrueConnectionNumber,bx ;save the real connection number
0075 B90E00                             mov     cx,14                   ;load ptr to 14th connection
0078 890E0200      R                    mov     CurrentConnNumber,cx    ;save it as the current conn.
007C A30400        R                    mov     CurrentNode,ax          ;save current node para. ptr
007F 89160600      R                    mov     CurrentNode+2,dx        ;save current node bank
0083 EB4190                             jmp     GetField                ;go get the field, and carry on.

                         ;
                         ;       ReturnNilPtr is a code segment designed to return a nil connection
                         ;       pointer.  It is placed here for two reasons:
                         ;
                         ;               1.  This is followed with and preceeded by disjoint code.
                         ;
                         ;               2.  Placing ReturnNilPtr here puts it in the range
                         ;                   of a conditional jump (within 128 bytes) that will
                         ;                   call it.


0086 33C0                ReturnNilPtr:  xor     ax,ax                   ;zero out ax:dx....
0088 33D2                               xor     dx,dx                   ;register pair (connection ptr)
008A C3                                 ret                             ;cleanup stack and return


                         ;
                         ;       NextNode Restores the current node pointer, gets the next
                         ;       node in tile, and jumps to the node checking sequence
                         ;

008B FF360E00      R     NextNode:      push    CurrentNodeInTile+2     ;setup parm list with current...
008F FF360C00      R                    push    CurrentNodeInTile       ;...parms and call...
0093 9A0000----    E                    call    NextNodeInTile          ;...NextNodeInTile.

                         ;
                         ;       Check for nil node.  If found, return a nil node
                         ;       (entry for GetNext Connection!)
```

```
0098                        GetNextConnection:

0098 23C0                   NodeCheck:    and    ax,ax                       ;set flags
009A 74EA                                 jz     ReturnNilPtr                ;if zero, return a nil connection

009C A30400         R                     mov    CurrentNode,ax              ;save current node paragraph
009F 89160600       R                     mov    CurrentNode+2,dx            ;save current node bankno.
00A3 A30C00         R                     mov    CurrentNodeInTile,ax        ;save current node (tile)
00A6 89160E00       R                     mov    CurrentNodeInTile+2,dx      ;save current node bankno. (tile)
00AA 92                                   xchg   ax,dx                       ;swap bank and para. ptr.
00AB 250F00                               and    ax,0FH                      ;clear all but bank number
00AE E790                                 out    BankSwitch,ax               ;set the bank number
00B0 8EC2                                 mov    es,dx                       ;load es to point to para.
00B2 92                                   xchg   ax,dx                       ;put back in proper order
                                          test   es:byte ptr 0,PseudoNodeFlag
00B3 26F606000020           &                                                ;check for pseudonodes
00B9 7541                                 jnz    PseudoNodeHandler           ;handle special case
00BB 33DB                                 xor    bx,bx                       ;zero bx for current Conn.

                            ;
                            ;       Check through all connections for this node.
                            ;

00BD 43                     GetConn:      inc    bx                          ;bump bx
00BE 891E0200       R                     mov    CurrentConnNumber,bx        ;save current connection no.
00C2 891E0000       R                     mov    TrueConnectionNumber,bx     ;save the 'real' connection no.
00C6 9A0000----     R       GetField:     call   GetConnectionField          ;get the field
00CB A30800         R                     mov    CurrentConnection,ax        ;save the paragraph pointer
00CE 89160A00       R                     mov    CurrentConnection+2,dx      ;...and the bank number.
00D2 23C0                                 and    ax,ax                       ;nil pointer?
00D4 74D5                                 jz     NextNode                    ;if so, try the next node.
00D6 A10400         R                     mov    ax,CurrentNode              ;restore current node pointer
00D9 8B160600       R                     mov    dx,CurrentNode+2            ;restore current node bank.
00DD 8B1E0200       R                     mov    bx,CurrentConnNumber        ;restore CurrentConnNumber
00E1 8B360A00       R                     mov    si,CurrentConnection+2      ;load current connection flags
00E5 D1EE                                 shr    si,1                        ;shift right...
00E7 D1EE                                 shr    si,1                        ;...four places...
00E9 D1EE                                 shr    si,1                        ;...to isolate...
00EB D1EE                                 shr    si,1                        ;...the state field.
00ED 81E60700                             and    si,07H                      ;mask out any other garbage.
00F1 81C61800       R                     add    si,offset TransitionMask;add in transition mask offset
00F5 8A0C                                 mov    cl,byte ptr [si]            ;load new state mask
00F7 880E2200       R                     mov    NextState,cl                ;save new state mask
00FB 840E2000       R                     test   cl,DuplicateOutputFlag      ;test for valid traversal.
00FE 75BC                                 jnz    GetConn                     ;if not valid, try next conn.



                            ;
                            ;       load the coordinates of the source and destination nodes
                            ;
```

```
0101 52                          CheckConnRange: push  dx                     ;establish nodepointer for...
0102 50                                          push  ax                     ;...get node location parm
0103 B81000            R                         mov   ax,offset x1           ;load offset for parm x1
0106 BA120090          R                         mov   dx,offset y1           ;load offset for parm y1
010A 1E                                          push  ds                     ;establish...
010B 50                                          push  ax                     ;...var parm x1
010C 1E                                          push  ds                     ;establish...
010D 52                                          push  dx                     ;...var parm y1
010E 9A0000----        E                         call  GetNodeLocation        ;get x1, y1 for source node

0113 FF360A00          R                         push  CurrentConnection+2    ;establish pointer for....
0117 FF360800          R                         push  CurrentConnection      ;...destination node
011B B81400            R                         mov   ax,offset x2           ;load offset for parm x2
011E BA160090          R                         mov   dx,offset y2           ;load offset for parm y2
0122 1E                                          push  ds                     ;establish...
0123 50                                          push  ax                     ;...var parm x2
0124 1E                                          push  ds                     ;establish...
0125 52                                          push  dx                     ;...var parm y2
0126 9A0000----        E                         call  GetNodeLocation        ;get x2, y2 for destination node

                                 ;
                                 ;       CheckViewAbility:
                                 ;
                                 ;       uses clipping algorithm described in 'Principles of
                                 ;       Interactive Computer Graphics', Newman and Sproull, p. 123
                                 ;       Results of clipping of two independent points are 'ANDed' together
                                 ;       If the results are zero, the resultant vector MAY go through the
                                 ;       window bounded by XMAX, XMIN. YMAX and YMIN, but no checking is done.
                                 ;       (See TEKPCS DEC data structures document for FirstConnection.)
                                 ;


                                 CheckViewability:
012B 33C9                        ;               xor   cx,cx                  ;clear bit map register for point 1
012D 33D2                                        xor   dx,dx                  ;clear for point 2

012F A12300            R                         mov   ax,yMax                ;load max Y
0132 8B1E2500          R                         mov   bx,yMin                ;load min Y
0136 8B361200          R                         mov   si,y1                  ;load y1
013A 8B3E1600          R                         mov   di,y2                  ;load y2
013E 3BC6                                        cmp   ax,si                  ;flags  <-  ymax - y1
0140 13C9                                        adc   cx,cx                  ;shift, add in borrow bit
0142 3BF3                                        cmp   si,bx                  ;flags  <-  y1 - ymin
0144 13C9                                        adc   cx,cx                  ;shift, add in borrow bit
0146 3BC7                                        cmp   ax,di                  ;flags  <-  ymax - y2
0148 13D2                                        adc   dx,dx                  ;shift, add in borrow bit
014A 3BFB                                        cmp   di,bx                  ;flags  <-  y2 - ymin
014C 13D2                                        adc   dx,dx                  ;shift, add in borrow bit

014E A12700            R                         mov   ax,xMax                ;load max x
0151 8B1E2900          R                         mov   bx,xMin                ;load min x
0155 8B361000          R                         mov   si,x1                  ;load x1
0159 8B3E1400          R                         mov   di,x2                  ;load x2
015D 3BC6                                        cmp   ax,si                  ;flags  <-  xmax - x1
```

```
015F 13C9                             adc     cx,cx                   ;shift, add in borrow bit
0161 3BF3                             cmp     si,bx                   ;flags  <-  x1 - xmin
0163 13C9                             adc     cx,cx                   ;shift, add in borrow bit
0165 3BC7                             cmp     ax,di                   ;flags  <-  xmax - x2
0167 13D2                             adc     dx,dx                   ;shift, add in borrow bit
0169 3BFB                             cmp     di,bx                   ;flags  <-  x2 - xmin
016B 13D2                             adc     dx,dx                   ;shift, add in borrow bit

                ;
                ;       Check possible node location
                ;

016D 8BF1                             mov     si,cx                   ;save the result
016F 0BF2                             or      si,dx                   ;...of the logical or
0171 7416                             jz      CheckOrder              ;if both inside area, check order
0173 85C9                             test    cx,cx                   ;source node viewable?
0175 7439                             jz      ReturnPtr               ;if so, pass back first conn.
0177 23CA                             and     cx,dx                   ;check result, indeterminate case
0179 A10400          R                mov     ax,currentNode          ;restore...
017C 8B160600        R                mov     dx,currentNode + 2      ;...registers for...
0180 8B1E0200        R                mov     bx,currentConnNumber    ;...GetConn
0184 742A                             jz      ReturnPtr               ;If in scope, return the ...
0186 E934FF                           jmp     GetConn                 ;if non zero result, skip it.

                ;       Check order of two nodes.  Valid iff:
                ;                                     Destination X > Source X
                ;                                     Destination X = Source X
                ;                                             Valid iff:
                ;                                                  Destination Y > Source Y
                ;                                     ELSE Invalid.
                ;



0189 8B1E0200        R  CheckOrder:   mov     bx,CurrentConnNumber    ;restore connection number
018D A10400          R                mov     ax,CurrentNode          ;restore current node...
0190 8B160600        R                mov     dx,CurrentNode+2        ;....paragraph and bank ptrs.
0194 8B0E1000        R                mov     cx,x1                   ;load x1
0198 3B0E1400        R                cmp     cx,x2                   ;is x1 > x2
019C 7219                             jb      ReturnPtrloaded         ;if x1 < x2, return result
019E 7403                             je      CheckY                  ;if equal, check the y parm
01A0 E91AFF                           jmp     GetConn                 ;else get the next connection

01A3 8B0E1200        R  CheckY:       mov     cx,y1                   ;load y1
01A7 3B0E1600        R                cmp     cx,y2                   ;if we get here x1 = x2
01AB 720A                             jb      ReturnPtrloaded         ;if y1 < y2 then see if viewable
01AD E90DFF                           jmp     GetConn                 ;if y1 >= y2, try next connection

01B0 A10400          R  ReturnPtr:    mov     ax,currentNode          ;Set function
01B3 8B160600        R                mov     dx,currentNode + 2      ;...function retun value
01B7 8B1E0000        R  ReturnPtrloaded:mov   bx,TrueConnectionNumber ;load the real connection no.
01BB D1E3                             shl     bx,1                    ;isolate...
01BD D1E3                             shl     bx,1                    ;...the...
01BF D1E3                             shl     bx,1                    ;...connection...
```

```
01C1 D1E3                     shl     bx,1              ;...number.
01C3 81E20F00                 and     dx,0fH            ;isolate bank
01C7 81E3F000                 and     bx,0f0H           ;isolate connection number
01CB 0BD3                     or      dx,bx             ;set connection number and bank
01CD C3                       ret                       ;return to calling sequence

                  GetNextConnectionScope
                  &           endp                      ;end of procedure scope

             +1   $eject

                  ;
                  ;       PROCEDURE FirstConnectionInTile(I,J,Xmin,Ymin,Xmax,Ymax)
                  ;
                  ;
                  ;
                  ;



                  FirstConnectionInTile
01CE              &           proc    far               ;far call


----              fParms      struc

0000              fOld_bp     dw      ?
0002              fOld_ds     dw      ?
0004              fReturn     dd      ?
0008              fYmax       dw      ?
000A              fXmax       dw      ?
000C              fYmin       dw      ?
000E              fXmin       dw      ?
0010              fJ          dw      ?
0012              fI          dw      ?

----              fParms      ends


                  ;
                  ;       Save registers for pascal, and establish parm addressiblity
                  ;


01CE 1E                       push    ds                ;save ds for pascal
01CF 55                       push    bp                ;save bp for pascal
01D0 B8----      R            mov     ax,ConnGlobals    ;load pointer to globals
01D3 8ED8                     mov     ds,ax             ;establish addressiblity
01D5 8BEC                     mov     bp,sp             ;estab. parm. address.


                  ;
                  ;       Set up calling sequnce, and get the first node in tile I,J
```

```
                              ;
01D7 8B460A                             mov     ax,[bp].fXmax          ;load the upper x limit
01DA 8B5E0E                             mov     bx,[bp].fXmin          ;load the lower x limit
01DD A32700         R                   mov     xMax,ax                ;save the upper x limit
01E0 891E2900       R                   mov     xMin,bx                ;save the lower x limit
01E4 8B4608                             mov     ax,[bp].fYmax          ;load the upper y limit
01E7 8B5E0C                             mov     bx,[bp].fYmin          ;load the lower y limit
01EA A32300         R                   mov     yMax,ax                ;save the upper y limit
01ED 891E2500       R                   mov     yMin,bx                ;save the lower y limit

01F1 FF7612                             push    [bp].fI                ;set parm X tile value
01F4 FF7610                             push    [bp].fJ                ;set parm Y tile value

01F7 9A0000----     E                   call    GetTilePointer         ;get the tile pointer

01FC 268B17                             mov     dx,es:[bx]             ;load the bank number
01FF 268B4702                           mov     ax,es:[bx+2]           ;load the parag. ptr.
0203 33DB                               xor     bx,bx                  ;clear bx....
0205 891E0000       R                   mov     TrueConnectionNumber,bx ;initialize true conn. number
0209 891E0800       R                   mov     CurrentConnection,bx   ;...and current connection no.

020D E888FE                             call    GetNextConnection      ;get the next connection



                              ;
                              ;     restore registers, and return to calling sequence
                              ;

0210 5D                                 pop     bp                     ;restore bp for pascal
0211 1F                                 pop     ds                     ;restore ds for pascal
0212 CA0C00                             ret     12                     ;cleanup stack and go home



                              FirstConnectionInTile
                              &         endp



                           +1 $eject

                              ;
                              ;      FUNCTION NextConnectionInTile(CurrentConnection : ConnectionPointer)
                              ;             : ConnectionPointer;
                              ;
                              ;
                              ;
                              ;


                              NextConnectionInTile
```

```
0215                    &               proc    far                         ;far call

----                    nParms          struc

0000                    nOld_bp         dw      ?
0002                    nOld_ds         dw      ?
0004                    nReturn         dd      ?
0008                    nCurrentConn    dw      ?,?

----                    nParms          ends


                        ;
                        ;       save registers for pascal, and establish addressability
                        ;

0215 1E                                 push    ds                          ;save ds for pascal
0216 55                                 push    bp                          ;save bp for pascal
0217 B8----       R                     mov     ax,ConnGlobals              ;load pointer to globals
021A 8ED8                               mov     ds,ax                       ;establish addressibility
021C 8BEC                               mov     bp,sp                       ;estab. parm. address.

                        ;
                        ;       load parms and setup for GetNextConnection
                        ;

021E 8B460B                             mov     ax,[bp].nCurrentConn        ;load paragraph pointer
0221 8B560A                             mov     dx,[bp].nCurrentConn+2      ;load bank number, conn no.
0224 8BDA                               mov     bx,dx                       ;save connection no in bx
0226 A30800       R                     mov     CurrentConnection,ax        ;save current connection...
0229 89160A00     R                     mov     CurrentConnection+2,dx      ;...bank and paragraph
022D D1EB                               shr     bx,1                        ;isolate...
022F D1EB                               shr     bx,1                        ;...current...
0231 D1EB                               shr     bx,1                        ;...connection...
0233 D1EB                               shr     bx,1                        ;...number.
0235 81E30F00                           and     bx,0fh                      ;mask out any trash.
0239 891E0200     R                     mov     CurrentConnNumber,bx        ;save it.
023D E87DFE                             call    GetConn                     ;go get the next connection

                        ;
                        ;       restore the registers and return to calling sequence
                        ;

0240 5D                                 pop     bp                          ;restore bp
0241 1F                                 pop     ds                          ;restore ds
0242 CA0400                             ret     4                           ;clean up stack and return


                        NextConnectionInTile
                        &               endp                                ;end procedure


                    +1  $eject
```

```
                        ;
                        ;      PROCEDURE SetTransitionMask(VAR NewMask,PreviousMask : TransitionMask);
                        ;
                        ;
                        ;
                        ;



                        SetTransitionMask
0245                    &                PROC    FAR                          ;far call

----                    stmParms         STRUC

0000                    stmOld_bp        DW      ?
0002                    stmOld_ds        DW      ?
0004                    stmReturn        DD      ?
0008                    stmPrevMask      DD      ?
000C                    stmNewMask       DD      ?

----                    stmParms         ENDS



                        ;
                        ;      save registers for pascal, and establish addressability
                        ;

0245 1E                                  PUSH    DS                           ;save ds for pascal
0246 55                                  PUSH    BP                           ;save bp for pascal
0247 B8----        R                     MOV     AX,ConnGlobals               ;load seg addr for globals
024A 8ED8                                MOV     DS,AX                        ;establish addressability
024C 8BEC                                MOV     BP,SP                        ;address argument list

                        ;
                        ;      load address of previous mask, and set it's value
                        ;

024E BE180090      R                     MOV     SI,OFFSET Transitionmask;point to old trans. mask
0252 C47E08                              LES     DI,[BP].stmPrevMask          ;Point to previous mask
0255 B90400                              MOV     CX,4                         ;load length in words
0258 9C                                  PUSHF                                ;save current direction flag
0259 FC                                  CLD                                  ;forward string ops
025A F3                                  REP MOVSW                            ;save the old mask (wordwise)
025B A5

                        ;
                        ;      load address of new mask, and set it's value
                        ;

025C 8CD8                                MOV     AX,DS                        ;setup: set segment register...
025E 8EC0                                MOV     ES,AX                        ;setup: ....to source
0260 BF180090      R                     MOV     DI,OFFSET TransitionMask;setup: point to trans. mask
```

```
0264 C5760C            LDS    SI,[BP].stmNewMask       ;Point to new mask
0267 B90400            MOV    CX,4                     ;load length in words
026A F3                REP MOVSW                       ;save the old mask (wordwise)
026B A5
026C 9D                POPF                            ;restore direction flag

            ;
            ;      restore registers, and return to calling sequence
            ;

026D 5D                POP     BP                      ;restore bp
026E 1E                POP     DS                      ;restore ds
026F CA0800            RET     8                       ;cleanup stack and return

            SetTransitionMask
            $                  ENDP                    ;end procedure



            $eject

            ;PROCEDURE UpdateConnectionStatus (CurrentConnection : ConnectionPointer;
            ;                                 VAR SelectedStructureAction : StructureActionType;
            ;                                 VAR WrittenStructureAction  : StructureActionType;
            ;
            ;
            ;
            ;
            ;       entry: SP               ;Pointer to parameters
            ;       exit:  none             ;all values are VAR parameters
            ;       blows: all registers
            ;

----        UCSParameters    STRUC

0000        UCS_Y1_coord     dw      ?
0002        UCS_X1_coord     dw      ?
0004        UCS_Y2_coord     dw      ?
0006        UCS_X2_coord     dw      ?
0008        UCS_Old_status   db      ?
0009        UCS_New_status   db      ?
000A        UCS_old_bp       dw      ?
000C        UCS_old_ds       dw      ?
000E        UCS_ret_addr     dd      ?
0012        UCS_WS_action    dd      ?
0016        UCS_SS_action    dd      ?
001A        UCS_Conn_addr    dw      ?
001C        UCS_Conn_bank    dw      ?

----        UCSParameters    ENDS


0272        UpdateConnectionStatus  PROC    FAR

```

```
0272 1E                        push   ds                        ;save for Pascal
0273 55                        push   bp                        ;save for Pascal
0274 B8----        R           mov    ax,ConnGlobals            ;establish addressability ...
0277 8ED8                      mov    ds,ax                     ;... to data storage
0279 83EC0A                    sub    sp,10                     ;reserve space for temp data
027C 8BEC                      mov    bp,sp                     ;establish addressability to parameters
                   ;
027E 8E461A                    mov    es,[bp].UCS_Conn_addr     ;
0281 8B461C                    mov    ax,[bp].UCS_Conn_bank     ;
0284 8BD8                      mov    bx,ax                     ;
0286 250F00                    and    ax,BankFieldMask          ;just want bank number
0289 E790                      out    BankSwitch,ax             ;insure proper bank
028B 268B160C00                mov    dx,es:word ptr 12         ;get x coord ...
0290 895602                    mov    [bp].UCS_X1_coord,dx      ;... and save it
0293 268B160E00                mov    dx,es:word ptr 14         ;get y coord ...
0298 895600                    mov    [bp].UCS_Y1_coord,dx      ;... and save it
029B 8BD0                      mov    dx,ax                     ;set up ...
029D 8CC0                      mov    ax,es                     ;... for following call
029F 81E3F000                  and    bx,ConnFieldMask          ;get connection ...
02A3 D1EB                      shr    bx,1                      ;... number ...
02A5 D1EB                      shr    bx,1                      ;... and place ...
02A7 D1EB                      shr    bx,1                      ;... in low ...
02A9 D1EB                      shr    bx,1                      ;... order nibble
02AB 9A0000----    E           call   Far Ptr GetConnFieldAddress ;returns es:si
                   ;
02B0 268A04                    mov    al,es:byte ptr [si]       ;get connection state
02B3 257000                    and    ax,ConnStateMask          ;remove edge flag
02B6 8BD8                      mov    bx,ax                     ;
02B8 D1EB                      shr    bx,1                      ;shift ...
02BA D1EB                      shr    bx,1                      ;... to low ...
02BC D1EB                      shr    bx,1                      ;... order ...
02BE D1EB                      shr    bx,1                      ;... nibble
02C0 81C31800      R           add    bx,OFFSET TransitionMask;determine the new ...
02C4 8A27                      mov    ah,ds:[bx]                ;... connection state
02C6 80E470                    and    ah,ConnStateMask          ;remove any garbage
02C9 3AC4                      cmp    al,ah                     ;does old state = new state
02CB 7508                      jne    StateChanged              ;if so, then all done
                   ;
02CD 83C40A                    add    sp,10                     ;clean up reserved space
02D0 33C9                      xor    cx,cx                     ;return DoNothings
02D2 E9E200                    jmp    UCS_Return                ;
                   ;
02D5 2680248F      StateChanged:  and  es:byte ptr [si],NOT ConnStateMask ;clear out old state
02D9 260824                    or     es:byte ptr [si],ah       ;stuff in new state
02DC D1E8                      shr    ax,1                      ;shift both new and old states ...
02DE D1E8                      shr    ax,1                      ;... to low ...
02E0 D1E8                      shr    ax,1                      ;... order ...
02E2 D1E8                      shr    ax,1                      ;... nibbles
02E4 884608                    mov    [bp].UCS_Old_status,al    ;save old status
02E7 886609                    mov    [bp].UCS_New_status,ah    ;save new status
                   ;
                   ;get the reciprocal connection fields address
                   ;
02EA 268A04                    mov    al,es:byte ptr [si]       ;get node pointer ...
02ED 268E4401                  mov    es,es:word ptr [si+1]     ;... to end node
```

```
02F1 250F00                            and     ax,BankFieldMask          ;just want bank number
02F4 E790                              out     BankSwitch,ax             ;switch to proper bank
02F6 268B1E0C00                        mov     bx,es:word ptr 12         ;get x coord
02FB 895E06                            mov     [bp].UCS_X2_coord,bx      ;save it
02FE 268B1E0E00                        mov     bx,es:word ptr 14         ;get y coord
0303 895E04                            mov     [bp].UCS_Y2_coord,bx      ;save it
0306 8B561C                            mov     dx,[bp].UCS_Conn_bank     ;save bank number ...
0309 81E20F00                          and     dx,BankFieldMask          ;... for comparision
030D 8B4E1A                            mov     cx,[bp].UCS_Conn_addr     ;save addr for comparision
0310 BE0300                            mov     si,3                      ;offset to first connection field
0313 BF0900                            mov     di,9                      ;max connection offset in primary node
0316 26F606000080                      test    es:byte ptr 0,AdditionalParaFlag ;is flag set?
031C 7401                              jz      ConnLoop                  ;skip next instruction if not set
031E 4F                                dec     di                        ;back off 1 (faster than sub di,3)
                          ;
                          ;Scan through connections looking for the reciprocal connection
                          ;
031F 268B4401             ConnLoop:    mov     ax,es:[si+1]              ;get current fields pointer info
0323 3BC1                              cmp     ax,cx                     ;same as original nodes?
0325 7509                              jne     NextConn                  ;nope, go try next field
0327 268A04                            mov     al,es:[si]                ;get current fields bank info
032A 240F                              and     al,BankFieldMask          ;and only bank number
032C 3AC2                              cmp     al,dl                     ;same bank as original node?
032E 7424                              je      FoundRecipConn            ;if so, then we've found it
0330 83C603               NextConn:    add     si,3                      ;offset to next connection field
0333 3BF7                              cmp     si,di                     ;check against max offset
0335 76E8                              jbe     ConnLoop                  ;if <= then check that field
0337 268A04                            mov     al,es:[si]                ;get secondary node's bank
033A 268E4401                          mov     es,es:[si+1]              ;get secondary node pointer
033E 250F00                            and     ax,BankFieldMask          ;just want bank number
0341 E790                              out     BankSwitch,ax             ;switch to proper bank
0343 BE0000                            mov     si,0                      ;offset to first connection field
0346 BF0C00                            mov     di,12                     ;offset of last connection field
0349 26F6060F0080                      test    es:byte ptr 15,AdditionalParaFlag ;more paragraphs linked in
034E 74CE                              jz      ConnLoop                  ;nope, go look for recip connection
0351 4F                                dec     di                        ;back off last connection's offset
0352 EBCB                              jmp     ConnLoop                  ;go look for recip connection
                          ;
0354 268A1C               FoundRecipConn: mov  bl,es:byte ptr [si]       ;get conn states ...
0357 81E37000                          and     bx,ConnStateMask          ;... and only conn states
035B 2680248F                          and     es:byte ptr [si],NOT ConnStateMask ;remove old state info from field
035F D1EB                              shr     bx,1                      ;shift ...
0361 D1EB                              shr     bx,1                      ;... to low ...
0363 D1EB                              shr     bx,1                      ;... order ...
0365 D1EB                              shr     bx,1                      ;... nibble
0367 81C31800        R                 add     bx,OFFSET TransitionMask  ;determine ...
036B 8A0F                              mov     cl,ds:[bx]                ;... new state
036D 80E170                            and     cl,ConnStateMask          ;remove any garbage
0370 26080C                            or      es:byte ptr [si],cl       ;stuff it back
                          ;
                          ;Setup and draw the connection with the new state (color changes)
                          ;
0373 8A4E09                            mov     cl,[bp].UCS_New_status    ;get new state
0376 80F904                            cmp     cl,SelectedAndWrittenState ;is it a special case?
0379 7502                              jne     $+4                       ;skip next instruction if not
```

```
037B B103                         mov    cl,SelectedState          ;if special case, set to selected
037D 32ED                         xor    ch,ch                     ;clear high-order for call
037F 51                           push   cx                        ;parameter to call
0380 9A0000----    E              call   far ptr SetLineIndex      ;set color according to state
                       ;
                       ;The next two calls will use two words (each) from the stack.  The words used will be
                       ;the x and y coords that were stored on the stack in space previously reserved.
                       ;The info was NOT pushed on the stack but will be popped from the stack by the next
                       ;two calls.  Pushing the info would have created a lot of stack rearrangement to
                       ;get the info in the desired order.
                       ;
0385 9A0000----    E              call   far ptr PixelMoveTransformed ;move beam to first location
038A 9A0000----    E              call   far ptr pixelDrawTransformed ;draw line to second location
                       ;
                       ;Determine Selected structure and Written structure action.  The pop ax has no
                       ;corresponding push -- the two bytes were stored directly into reserved space on the
                       ;stack.  This pop gets the values back as well as cleaning up the stack.
                       ;Also, cx contains two values; ch=written structure action, and cl=selected structure
                       ;action.  The actions are computed concurrently but since the values are less
                       ;than one byte's worth there is no danger of overlap (e.g. 0101 + 0202 = 0303)
                       ;
038E 58                           pop    ax                        ;ah=old status, al=new status
0390 D1E0                         shl    ax,1                      ;make them word offsets (ah & al)
0392 8BF0                         mov    si,ax                     ;temp storage
0394 32E4                         xor    ah,ah                     ;
0396 96                           xchg   ax,si                     ;si contains new status
0397 8AC4                         mov    al,ah                     ;
0399 32E4                         xor    ah,ah                     ;
039B 8BF8                         mov    di,ax                     ;di contains old status
039D BB2B0090      R              mov    bx,OFFSET OldStatusAction ;pointer to action table
03A1 8B09                         mov    cx,ds:word ptr [bx+di]    ;get action to do based on old state
03A3 BB3B0090      R              mov    bx,OFFSET NewStatusAction ;pointer to action table
03A7 030B                         add    cx,ds:word ptr [bx+si]    ;combine old action with action based on new stat

03A9 80FD02                       cmp    ch,HighestNumberedAction  ;Too big a number?
03AC 7602                         jbe    $+4                       ;if not, skip next instruction
03AE 32ED                         xor    ch,ch                     ;if so, set to zero
03B0 80F902                       cmp    cl,HighestNumberedAction  ;too big a number
03B3 7602                         jbe    $+4                       ;if not, skip next instruction
03B5 32C9                         xor    cl,cl                     ;if so, set to zero
                       ;
03B7 C55E12            UCS_Return: lds   bx,[bp].UCS_WS_action     ;get addr of var parameter
03BA 882F                         mov    ds:byte ptr [bx],ch       ;store written structure action
03BC C55E16                       lds    bx,[bp].UCS_SS_action     ;get addr of var parameter
03BF 880F                         mov    ds:byte ptr [bx],cl       ;store selected structure action
                       ;
03C1 5D                           pop    bp                        ;restore for Pascal
03C2 1F                           pop    ds                        ;restore for Pascal
03C3 CA0C00                       ret    12                        ;remove 12 bytes and return

                       UpdateConnectionStatus  ENDP


                 +1    $eject
```

```
                                ;FUNCTION ConnectionTraversable (Connection : ConnectionPointer) : BOOLEAN;
                                ;
                                ;
                                ;
                                ;
                                ;-- This function checks the connection in question and determines if it is
                                ;   traversable (as determined by the state of the connection, the current
                                ;   value of the transition mask, and the current value of the duplicate
                                ;   output flag)
                                ;
                                ;       entry: sp
                                ;       exit:  ax
                                ;       blows:
                                ;
----                            CTparameters    STRUC

0000                            CTold_bp        dw      ?
0002                            CTold_ds        dw      ?
0004                            CTret_addr      dd      ?
0008                            CTconnection    dw      ?,?

----                            CTparameters    ENDS

03C6                            ConnectionTraversable   PROC    FAR

03C6 1E                                         push    ds                      ;save for Pascal
03C7 55                                         push    bp                      ;save for Pascal
03C8 B8----             R                       mov     ax,ConnGlobals          ;establish addressability ...
03CB 8ED8                                       mov     ds,ax                   ;... to data storage
03CD 8BEC                                       mov     bp,sp                   ;establish addressability to parameters

03CF 8B560A                                     mov     dx,[bp].CTconnection+2  ;get conn # and bank #
03D2 8B4608                                     mov     ax,[bp].CTconnection    ;get pointer to node para
03D5 3D0000                                     cmp     ax,NilPointer           ;passed in a NilPointer?
03D8 742C                                       je      NotTraversable          ;if so then return a false
                                ;
03DA 8BDA                                       mov     bx,dx                   ;
03DC 81E3F000                                   and     bx,ConnFieldMask        ;just want conn #
03E0 D1EB                                       shr     bx,1                    ;shift ...
03E2 D1EB                                       shr     bx,1                    ;... conn # to ...
03E4 D1EB                                       shr     bx,1                    ;... low order ...
03E6 D1EB                                       shr     bx,1                    ;... nibble
03E8 9A0000----         E                       call    Far Ptr GetConnFieldAddress ;returns es:si
                                ;
03ED 268A1C                                     mov     bl,es:[si]              ;get connection state
03F0 81E37000                                   and     bx,ConnStateMask        ;remove excess info
03F4 D1EB                                       shr     bx,1                    ;shift ...
03F6 D1EB                                       shr     bx,1                    ;... conn state ...
03F8 D1EB                                       shr     bx,1                    ;... to low order ...
03FA D1EB                                       shr     bx,1                    ;... nibble
03FC 8A871000           R                       mov     al,TransitionMask[bx]   ;get traversability flags
0400 84062000           R                       test    al,DuplicateOutputFlag  ;is it traversable?
```

```
0404 7408                       jz      Traversable             ;Yes, then return true
                   ;
0406 B80000        NotTraversable: mov  ax,0                    ;value of FALSE
0409 5D                         pop     bp                      ;restore for Pascal
040A 1F                         pop     ds                      ;restore for Pascal
040B CA0400                     ret     4                       ;return and pop 4 bytes
                   ;
040E B80100        Traversable:  mov    ax,1                    ;value of TRUE
0411 5D                         pop     bp                      ;restore for Pascal
0412 1F                         pop     ds                      ;restore for Pascal
0413 CA0400                     ret     4                       ;return and pop 4 bytes

                   ConnectionTraversable   ENDP


              +1   $eject

                   ;PROCEDURE SetDuplicateOutputEnabled (DuplicateOutput : BOOLEAN);
                   ;
                   ;
                   ;
                   ;
                   ;  Enables or Disables duplicate output
                   ;
                   ;       entry:  sp
                   ;       exit:   none
                   ;       blows:
                   ;

----               SDOEparameters  STRUC

0000               SDOEold_ds      dw      ?
0002               SDOEold_bp      dw      ?
0004               SDOEret_addr    dd      ?
0008               SDOEdup_output  db      ?
0009               SDOEfiller      db      ?

----               SDOEparameters  ENDS

0416               SetDuplicateOutputEnabled       PROC    FAR

0416 55                         push    bp                      ;save for Pascal
0417 1E                         push    ds                      ;save for Pascal
0418 B8----      R              mov     ax,ConnGlobals          ;establish addressablity ...
041B 8ED8                       mov     ds,ax                   ;... to data storage
041D 8BEC                       mov     bp,sp                   ;establish addressablity to parameters
                   ;
041F B001                       mov     al,1                    ;this bit always set
0421 807E0801                   cmp     [bp].SDOEdup_output,1   ;to be enabled?
0425 D0D0                       rcl     al,1                    ;rotate carry into low order bit
0427 A20000      R              mov     DuplicateOutputFlag,al  ;store it
                   ;
042A 1F                         pop     ds                      ;restore for Pascal
042B 5D                         pop     bp                      ;restore for Pascal
```

```
042C CA0200                      ret      2                       ;return and pop 2 bytes

                      SetDuplicateOutputEnabled        ENDP


----                  Connections     ends                        ;end segment connections


                      $eject


                      ConnGlobals
----                  &               segment word                ;Data segment, word aligned


                      ;
                      ;        ConnGlobals:  abandon all hope, ye who enter here
                      ;

                      TrueConnectionNumber
0000 ????             &               dw      ?                   ;true connection no for dealing
                                                                  ;with pseudo nodes
                      CurrentConnNumber
0002 ????             &               dw      ?                   ;current connection number

                      CurrentNode
0004 ????             &               dw      ?,?                 ;current node bank and para.
0006 ????

                      CurrentConnection
0008 ????             &               dw      ?,?                 ;current connection bank and para.
000A ????

                      CurrentNodeInTile
000C ????             &               dw      ?,?                 ;current node in tile being processed
000E ????

0010 ????             x1              dw      ?                   ;Source node X coordinate
0012 ????             y1              dw      ?                   ;Source node Y coordinate
0014 ????             x2              dw      ?                   ;Destination node X coordinate
0016 ????             y2              dw      ?                   ;Destination node Y coordinate


0018 (8               TransitionMask  db      8 DUP (?)           ;transition mask storage area
      ??
      )

                      DuplicateOutputFlag
0020 ??               &               db      ?                   ;duplicate output flag

                      CheckTraversalFlag
0021 ??               &               db      ?                   ;check traversal flag boolean

                      NextState
```

```
'0022 ??                &               db      ?                       ;current 'next state'



 0023 ????              yMax            dw      ?                       ;y Maximum temp storage

 0025 ????              yMin            dw      ?                       ;y Minimum temp storage

 00'7 ????              xMax            dw      ?                       ;x Maximum temp storage

 0029 ????              xMin            dw      ?                       ;x Minimum temp storage


                        ;                  Selected Structure Action    Written Structure Action

 002B 00                OldStatusAction db      DoNothing,              DoNothing            ;Hidden
 002C 00
 002D 00                                db      DoNothing,              DoNothing            ;Untagged
 002E 00
 002F 02                                db      DeleteFromStructure,    DoNothing            ;Selected
 0030 00
 0031 00                                db      DoNothing,              DeleteFromStructure  ;Written
 0032 02
 0033 02                                db      DeleteFromStructure,    DeleteFromStructure  ;Selected + Written
 0034 02
 0035 00                                db      DoNothing,              DoNothing            ;Primitive
 0036 00
 0037 00                                db      DoNothing,              DoNothing            ;Reserved6
 0038 00
 0039 00                                db      DoNothing,              DoNothing            ;Reserved7
 003A 00

 003B 00                NewStatusAction db      DoNothing,              DoNothing            ;Hidden
 003C 00
 003D 00                                db      DoNothing,              DoNothing            ;Untagged
 003E 00
 003F 01                                db      AddToStructure,         DoNothing            ;Selected
 0040 00
 0041 00                                db      DoNothing,              AddToStructure       ;Written
 0042 01
 0043 01                                db      AddToStructure,         AddToStructure       ;Selected + Written
 0044 01
 0045 00                                db      DoNothing,              DoNothing            ;Primitive
 0046 00
 0047 00                                db      DoNothing,              DoNothing            ;Reserved6
 0048 00
 0049 00                                db      DoNothing,              DoNothing            ;Reserved7
 004A 00

                        ConnGlobals
 ----                   &               ends


                                        end                             ;end assembly

ASSEMBLY COMPLETE, NO ERRORS FOUND
```

```
Source File: A:IOSUP.PAS
Object File: <none>
Controls Specified:  ERRORPRINT, NOOBJECT, PRINT(D:IOSUP.LST[G9]), TITLE(          PASCAL I/O SUPPORT LIBRARY).

STMT LINE NESTING       SOURCE TEXT: A:IOSUP.PAS
   1    2  0  0
                        MODULE IOsupportLibrary;
   2    4  0  0

                        PUBLIC IOsupportLibrary;
   3    8  0  0         TYPE
                          STRING = PACKED ARRAY [1..1] OF CHAR;
   4   10  0  0         PROCEDURE InitializeFileVariable(VAR FileVariable:INTEGER);
   5   11  0  0         PROCEDURE ReadQuotedString(VAR InputFile:TEXT;VAR Str:STRING;MaximumLength:INTEGER);
   6   12  0  0         PROCEDURE ReadUnquotedString(VAR InputFile:TEXT;VAR Str:STRING;MaximumLength:INTEGER);

   7   14  0  0         PRIVATE IOsupportLibrary;

   8   16  0  0         {=========================================================================}
                        { InitializeFileVariable          This procedure sets the file connection     }
                        {                                 number (first two bytes) of the specified   }
                        {                                 file variable (six bytes long) to zero.     }
                        {                                 This operation should be performed by the   }
                        {                                 Pascal compiler for all file variables, but }
                        {                                 is not performed for PRIVATE file variables }
                        {                                 which are not part of the module containing }
                        {                                 the main BEGIN.  A run-time exception occurs }
                        {                                 upon RESET or REWRITE.  For more information }
                        {                                 about file variables, refer to page H-4 (Run }
                        {                                 Time Data Representation) in the INTEL Pascal}
                        {                                 Manual.                                     }
                        {=========================================================================}

                        PROCEDURE InitializeFileVariable(VAR FileVariable:INTEGER);
   9   32  1  0           BEGIN
   9   33  1  1             FileVariable := 0;
  10   34  1  1           END;

  11   36  0  0         {=========================================================================}
                        { ReadQuotedString                This procedure reads the contents of a      }
                        {                                 quoted string into a PACKED ARRAY OF CHAR,  }
                        {                                 padding with blanks.                        }
                        {=========================================================================}

                        PROCEDURE ReadQuotedString(VAR InputFile:TEXT;VAR Str:STRING;MaximumLength:INTEGER);
  12   43  1  0           VAR
                            I, J: INTEGER;
  13   45  1  0             Ch: CHAR;
  14   46  1  0           BEGIN
       47  1  1             Ch := ' ';
       48  1  1             I := 0;
       49  1  1             WHILE (NOT EOF(InputFile)) AND (Ch <> '"') AND (Ch <> '''') DO
       '0  1  1               READ(InputFile,Ch);
           1  1             REPEAT
           1  2               I := I + 1;
```

```
STMT LINE NESTING       SOURCE TEXT: A:IOSUP.PAS
  19   53   1  2              IF (NOT EOF(InputFile)) AND (NOT EOLN(InputFile))
                                THEN READ(InputFile,Ch)
  20   55   1  2                ELSE Ch := '"';
  32   56   1  2              IF (Ch = '"') OR (Ch = '''')
                                THEN
  23   58   1  2                  BEGIN
  23   59   1  3                    FOR J := I TO MaximumLength DO
  24   60   1  3                      Str[J] := ' ';
  25   61   1  3                    I := MaximumLength;
  26   62   1  3                  END
  27   63   1  2                ELSE Str[I] := Ch;
  29   64   1  2            UNTIL I = MaximumLength;
  31   65   1  1            WHILE (NOT EOF(InputFile)) AND (NOT EOLN(InputFile)) AND (Ch <> '"') AND (Ch <> '''') DO
  32   66   1  1              READ(InputFile,Ch);
  33   67   1  1          END;

  34   69   0  0        {=========================================================================}
                        { ReadUnquotedString               This procedure reads the contents of an       }
                        {                                  unquoted string into a PACKED ARRAY OF CHAR,  }
                        {                                  padding with blanks.                          }
                        {=========================================================================}

                        PROCEDURE ReadUnquotedString(VAR InputFile:TEXT;VAR Str:STRING;MaximumLength:INTEGER);
  35   76   1  0          VAR
                            I, J: INTEGER;
  36   78   1  0            Ch: CHAR;
  37   79   1  0          BEGIN
  37   80   1  1            Ch := ' ';
  38   81   1  1            I := 0;
  39   82   1  1            WHILE (NOT EOF(InputFile)) AND (Ch <= ' ') DO
  40   83   1  1              READ(InputFile,Ch);
  41   84   1  1            IF Ch <> ','
                              THEN
  42   86   1  1                REPEAT
  42   87   1  2                  I := I + 1;
  43   88   1  2                  Str[I] := Ch;
  44   89   1  2                  IF (NOT EOF(InputFile)) AND (NOT EOLN(InputFile))
                                    THEN READ(InputFile,Ch)
  45   91   1  2                    ELSE Ch := ' ';
  47   92   1  2                UNTIL (I = MaximumLength) OR (Ch <= ' ') OR (Ch = ',');
  49   93   1  1            FOR J := I + 1 TO MaximumLength DO
  50   94   1  1              Str[J] := ' ';
  51   95   1  1          END;

  52   97   0  0        .

  97 Lines Read.
   0 Errors Detected.
 39% Utilization of Memory.
```

We claim:

1. A method of creating a structured image data set based on acquired image data, comprising the steps of:

creating a template based on the acquired image data and displaying this template on a computer controlled screen, selecting portions of the template to be used for the construction of a new drawing superimposed on the display template, and saving the new drawing as a structured image data set.

2. The method as in claim 1 wherein a template portion is selected by placing the selection means within a selectable distance from the template portion.

3. The method as in claim 2 wherein the selection means includes a graphics input device.

4. The method as in claim 2 wherein a user controls the selection means position on the screen by means of a tablet and stylus, the table sensing the position of the stylus on the tablet and transmitting data representing the position to the computer.

5. The method as in claim 2 wherein the template comprises lines and nodes.

6. The method as in clalm 5 wherein a plurality of template lines interconnected by nodes is selected by the selection means by placing the selection means within a selectable distance from any of the plurality of lines.

7. The method as in claim 5 wherein a polygon of template lines is selected by a selection means placed within an area most nearly bounded by the polygon.

8. The method as in claim 5 wherein the selected template lines are displayed on the screen with an attribute different from displayed unselected template lines.

9. The method as in claim 8 wherein the selected template lines are displayed on the screen in a color different from that of unselected template line.

10. A method of creating a structured image data set based on acquired image data, comprising the steps of:

creating on a computer controlled display screen a template based on the acquired image data, and selecting portions of the acquired image data to be included in the structured data set by selecting portions of the template by means of a moveable selection means also displayed on the screen.

11. A method of creating a structured data set based on acquired image data, comprising the steps of:

displaying on a computer controlled display screen a template image comprising template lines and nodes corresponding to the acquired image data, selecting portions of the acquired image data to be designated for inclusion in a structured image data set by using a moveable selection means also displayed on the screen to select the corresponding template lines displayed on the screen, and removing as desired the inclusion designations from portions of the acquired image data from the acquired data set by using the cursor to select the corresponding lines and nodes on the screen, copying all remaining designated data into the structured image data set exclusive of undesignated data, and repeating any or all of the previous three steps until all desired portions of the acquired image data are included in the restructured image data set.

12. Apparatus for restructuring acquired image data, comprising:

a computer controlled display screen, means to display a template comprising template lines and nodes corresponding to the acquired image data, means to control a moveable selection means on the screen, means to select portions of the acquired image data to be temporarily designated for inclusion in a restructured image data set by moving the selection means to the vicinity of corresponding template lines and nodes displayed on the screen, means to remove as desired the temporary designations from selected portions of the acquired image data by moving the cursor to the vicinity of the corresponding lines and nodes on the screen, and means to copy all temporarily designated image data into the restructured data set exclusive of undesignated data.

* * * * *